US00RE36963E

United States Patent [19]

Ando et al.

[11] E Patent Number: Re. 36,963

[45] **Reissued Date of Patent: *Nov. 21, 2000**

[54] METHOD AND APPARATUS FOR REGENERATING IMAGE HOLDING MEMBER

[75] Inventors: Kazuhiro Ando, Tokyo; Yoshiaki Miyashita, Kawasaki; Youichi Asaba; Kiyoshi Tanikawa, both of Yokohama; Satoshi Singuryo, Kawasaki; Shinichi Kuramoto, Numazu; Sadao Takahashi; Yoshiyuki Kimura, both of Tokyo; Tadashi Saito, Yokohama; Mitsuru Ohminato, Yokohama; Masaru Nakano, Yokohama; Eiichi Kawamura, Numazu, all of Japan

[73] Assignee: Ricoh Company, Ltd., Tokyo, Japan

[ * ] Notice: This patent is subject to a terminal disclaimer.

[21] Appl. No.: 09/257,675

[22] Filed: Feb. 25, 1999

Related U.S. Patent Documents

Reissue of:

[64] Patent No.: 5,605,777
Issued: Feb. 25, 1997
Appl. No.: 08/563,131
Filed: Nov. 27, 1995

U.S. Applications:

[63] Continuation of application No. 08/213,152, Mar. 14, 1994, abandoned, which is a continuation-in-part of application No. 08/115,194, Aug. 31, 1993, Pat. No. 5,474,617.

[30] Foreign Application Priority Data

| | | | |
|---|---|---|---|
| Aug. 31, 1992 | [JP] | Japan | 4-255915 |
| Aug. 31, 1992 | [JP] | Japan | 4-255916 |
| Apr. 8, 1993 | [JP] | Japan | 5-106062 |
| Apr. 27, 1993 | [JP] | Japan | 5-123344 |
| Jul. 21, 1993 | [JP] | Japan | 5-201169 |
| Aug. 31, 1993 | [JP] | Japan | 5-239075 |

[51] Int. Cl.[7] ..... G06G 13/095

[52] U.S. Cl. ..... 430/97; 430/125; 399/343

[58] Field of Search ..... 430/97, 125; 399/343; 162/5

[56] References Cited

U.S. PATENT DOCUMENTS

| | | | |
|---|---|---|---|
| 207,626 | 9/1878 | Sargent . | |
| 722,252 | 3/1903 | Richards . | |
| 1,947,748 | 2/1934 | Van Wormer | 15/7 |
| 2,207,966 | 7/1940 | Billings et al. | 101/1 |
| 2,831,409 | 4/1958 | Bixby et al. | 85/1.7 |
| 2,937,390 | 5/1960 | Bolton et al. | 15/3 |
| 3,098,784 | 7/1963 | Gorman, Jr. . | |
| 3,108,895 | 10/1963 | Howell | 117/19 |
| 3,202,535 | 8/1965 | Labombarde . | |
| 3,237,231 | 3/1966 | Zink | 15/102 |
| 3,328,821 | 7/1967 | LaMura | 15/102 |
| 3,448,720 | 6/1969 | Graham . | |
| 3,598,487 | 8/1971 | Mizuguchi | 355/15 |
| 3,613,701 | 10/1971 | Ando | 134/64 |
| 3,630,776 | 12/1971 | Barr | 430/125 |
| 3,656,948 | 4/1972 | Mammino | 96/1.4 |
| 3,776,631 | 12/1973 | Mammino | 355/15 |
| 4,249,653 | 2/1981 | Kufferath-Kassner . | |
| 4,252,882 | 2/1981 | Herrmann | 430/125 |
| 4,388,391 | 6/1983 | Schell | 430/125 |
| 4,392,742 | 7/1983 | Landa | 355/15 |
| 4,482,241 | 11/1984 | Moraw et al. | 355/10 |
| 4,504,995 | 3/1985 | Zippwald | 15/102 |
| 4,733,422 | 3/1988 | Schramm et al. | 15/77 |
| 4,740,075 | 4/1988 | Schoernig | 354/320 |
| 4,800,839 | 1/1989 | Ariyama et al. | 118/691 |
| 4,899,872 | 2/1990 | Hokao . | |

(List continued on next page.)

FOREIGN PATENT DOCUMENTS

| | | | |
|---|---|---|---|
| 50-56942 | 5/1975 | Japan | G03G 21/00 |
| 51-100728 | 9/1976 | Japan | G03G 21/00 |
| 54-27435 | 3/1979 | Japan | G03G 5/00 |
| 54-99353 | 8/1979 | Japan | B08B 1/04 |
| 55-30500 | 3/1980 | Japan | D21C 5/02 |
| 55-154198 | 12/1980 | Japan | B41M 5/26 |
| 57-114171 | 7/1982 | Japan | G03G 21/00 |
| 57-125962 | 8/1982 | Japan | G03G 21/00 |
| 57-125963 | 8/1982 | Japan | G03G 21/00 |
| 57-190675 | 11/1982 | Japan | B05D 3/00 |
| 58-105569 | 7/1983 | Japan | G03G 21/00 |
| 59-2069 | 1/1984 | Japan | G03G 21/00 |
| 59-33483 | 2/1984 | Japan . | |
| 59-89372 | 5/1984 | Japan | C09D 9/00 |
| 59-93764 | 5/1984 | Japan . | |
| 59-98172 | 6/1984 | Japan | C09D 9/00 |

(List continued on next page.)

OTHER PUBLICATIONS

A Wiley–Interscience Publication, Encyclopedia of Chemical Technology, Third Edition, vol. 6 (1979).

*Primary Examiner*—John Goodrow
*Attorney, Agent, or Firm*—Cooper & Dunham LLP

[57] ABSTRACT

A predetermined processing liquid is supplied by a liquid supplying unit to a sheet of transfer paper having a surface on which toner is stably attached. An adhesive state of the toner on the transfer paper sheet is changed to an unstable adhesive state. The processing liquid is constructed by water, aqueous solutions of a surfactant, a water-soluble polymer, etc. The transfer paper sheet including the processing liquid is fed to a toner separating unit. While the toner is heated and pressurized in the toner separating unit, the toner is attached to a separating roller having a surface on which the softened toner is easily attached. The toner separating unit then separates only the transfer paper sheet from the surface of the separating roller by a separating claw. The processing liquid is removed from the transfer paper sheet by heating the transfer paper sheet, etc. using a drying unit such that the transfer paper sheet can be reused for a copying machine, etc. Thereafter, the transfer paper sheet is discharged onto a paper discharging tray. Accordingly, it is possible to provide a method and an apparatus for regenerating and reusing the transfer paper sheet by removing the toner therefrom without damaging paper fibers.

39 Claims, 57 Drawing Sheets

U.S. PATENT DOCUMENTS

| | | | |
|---|---|---|---|
| 4,905,047 | 2/1990 | Ariyama | 355/256 |
| 4,965,640 | 10/1990 | Watarai et al. . | |
| 5,063,411 | 11/1991 | Haneda et al. . | |
| 5,215,852 | 6/1993 | Kato et al. | 430/126 |
| 5,262,259 | 11/1993 | Chou et al. | 430/47 |
| 5,359,398 | 10/1994 | Echigo . | |
| 5,474,617 | 12/1995 | Saite et al. | 430/125 |
| 5,837,099 | 11/1998 | Borchardt | 162/5 |

FOREIGN PATENT DOCUMENTS

| | | | |
|---|---|---|---|
| 60-133458 | 7/1985 | Japan | G03G 7/00 |
| 60-182465 | 9/1985 | Japan | G03G 15/20 |
| 60-193691 | 10/1985 | Japan | B41M 5/18 |
| 60-230899 | 11/1985 | Japan | B44C 1/16 |
| 61-213185 | 9/1986 | Japan | B41J 29/373 |
| 61-237684 | 10/1986 | Japan | B41M 5/18 |
| 62-14163 | 1/1987 | Japan | G03G 9/08 |
| 62-102270 | 5/1987 | Japan | G03G 21/00 |
| 62-203190 | 9/1987 | Japan | G09F 3/02 |
| 62-212187 | 9/1987 | Japan | B41M 3/12 |
| 62-199767 | 12/1987 | Japan | G03G 21/00 |
| 63-39377 | 2/1988 | Japan | B41M 5/18 |
| 63-73282 | 4/1988 | Japan | G03G 21/00 |
| 63-140577 | 9/1988 | Japan | G03G 21/00 |
| 1101576 | 4/1989 | Japan . | |
| 1101577 | 4/1989 | Japan | G03G 21/00 |
| 1137266 | 5/1989 | Japan | G03G 9/08 |
| 1145680 | 6/1989 | Japan | G03G 21/00 |
| 1297294 | 11/1989 | Japan | B41N 3/00 |
| 211400 | 1/1990 | Japan | B44C 1/175 |
| 23400 | 1/1990 | Japan | B44C 1/175 |
| 23876 | 1/1990 | Japan | B42D 15/10 |
| 219568 | 2/1990 | Japan | B41M 5/26 |
| 255195 | 2/1990 | Japan | B41M 5/40 |
| 259926 | 2/1990 | Japan | G06F 3/12 |
| 262277 | 3/1990 | Japan | B41M 1/145 |
| 2111987 | 4/1990 | Japan | G03G 21/00 |
| 2188293 | 7/1990 | Japan | B41M 5/30 |
| 2188294 | 7/1990 | Japan | B41M 5/30 |
| 2117547 | 9/1990 | Japan | G03G 7/00 |
| 2227299 | 9/1990 | Japan | B43L 19/00 |
| 2-178664 | 11/1990 | Japan | 430/125 |
| 3116594 | 5/1991 | Japan | G11B 23/40 |
| 3218898 | 9/1991 | Japan | B42D 15/10 |
| 3249661 | 11/1991 | Japan | G03G 7/00 |
| 422968 | 1/1992 | Japan | G03G 7/00 |
| 457070 | 2/1992 | Japan | G03G 15/01 |
| 464472 | 2/1992 | Japan | B41J 29/36 |
| 464473 | 2/1992 | Japan | B41J 29/36 |
| 467043 | 3/1992 | Japan | B41J 29/36 |
| 482983 | 3/1992 | Japan | D21B 1/02 |
| 489271 | 3/1992 | Japan | B41J 29/36 |
| 491298 | 3/1992 | Japan | D21H 25/00 |
| 4126900 | 4/1992 | Japan | D21H 27/30 |
| 4234056 | 4/1992 | Japan | G03G 15/00 |
| 4118499 | 10/1992 | Japan | D21H 25/00 |
| 4118500 | 10/1992 | Japan | D21H 25/00 |
| 4281096 | 10/1992 | Japan | D21H 25/00 |
| 4300395 | 10/1992 | Japan | D21H 25/00 |
| 4327299 | 11/1992 | Japan | D21H 25/00 |
| 4333088 | 11/1992 | Japan | G03G 21/00 |
| 4333699 | 11/1992 | Japan | D21H 25/00 |
| 4356085 | 12/1992 | Japan | G03G 21/00 |
| 4356086 | 12/1992 | Japan | G03G 21/00 |
| 4356087 | 12/1992 | Japan | G03G 21/00 |
| 4356088 | 12/1992 | Japan | G03G 21/00 |
| 4356089 | 12/1992 | Japan | G03G 21/00 |
| 52356 | 1/1993 | Japan | G03G 21/00 |
| 562382 | 3/1993 | Japan | G11B 21/08 |
| 5127571 | 5/1993 | Japan | G03G 21/00 |
| 5216374 | 8/1993 | Japan | G03G 21/00 |
| 5216376 | 8/1993 | Japan | G03G 21/00 |
| 0643682 | 2/1994 | Japan | G03G 21/00 |
| 613651 | 2/1994 | Japan | C09D 9/00 |
| 613652 | 2/1994 | Japan | C09D 9/00 |
| 667576 | 3/1994 | Japan | G03G 21/00 |
| 8903728 | 5/1989 | WIPO | B08B 1/02 |

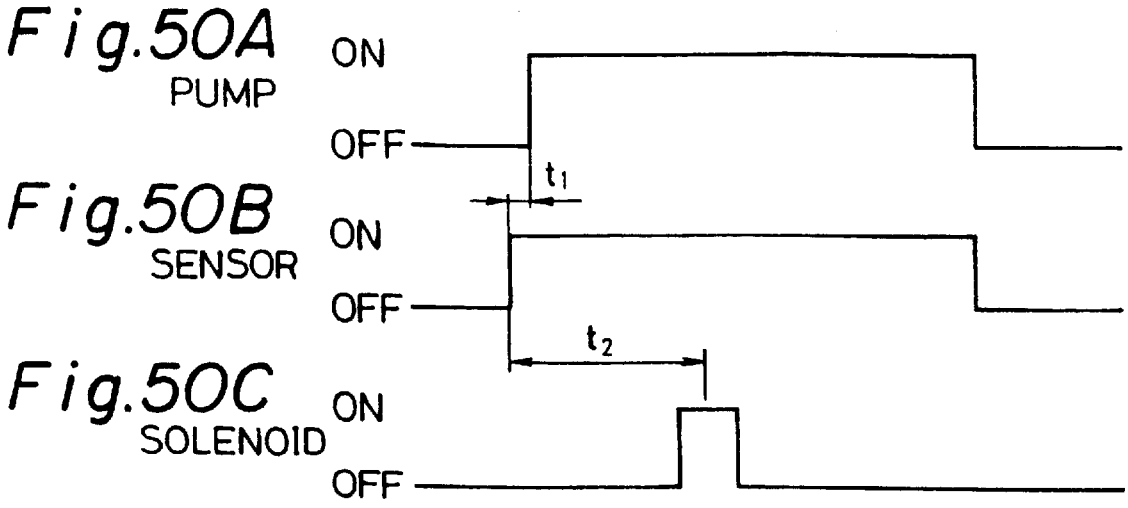
Fig. 51
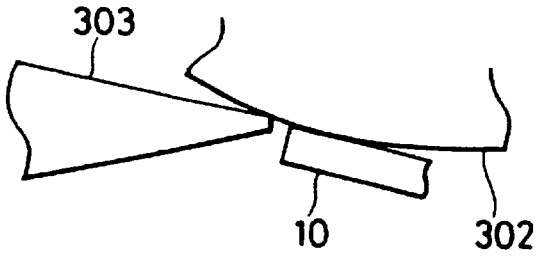

METHOD AND APPARATUS FOR REGENERATING IMAGE HOLDING MEMBER

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation of application Ser. No. 08/213,152 filed Mar. 14, 1994, now abandoned which in turn is a continuation-in-part of Ser. No. 08/115,194 filed Aug. 31, 1993 now U.S. Pat. No. 5,474,617*, which is incorporated herein by reference*.

BACKGROUND OF THE INVENTION

1. Field of the Invention

The present invention relates to a method and an apparatus for regenerating an image holding member in which an image forming substance is stably attached onto a surface of the image holding member by an image forming apparatus such as a copying machine, a facsimile telegraph, a printer, etc., and this image forming substance is removed from the surface of the image holding member.

2. Description of the Related Art

A large amount of printer paper sheets and copying paper sheets has recently been used by office automation (OA). Therefore, a problem about a change for the worse of earth environment is caused by deforestation. This problem is generally solved by only one method. In this method, toner, ink, etc. are removed from a sheet of paper once used, and the paper sheet is crushed in water. This water is removed from the paper sheet by filtration so that the paper sheet is regenerated as a so-called sheet of used paper. However, a new sheet of paper reusable for making a copy or printing has been recently developed. This new paper sheet is reused by removing character images from a paper sheet once used by cleaning.

For example, Japanese Patent Application Laying Open (KOKAI) No. 4-67043 shows such a paper sheet. In this publication, mold-releasing processing is performed with respect to a surface of a sheetlike supporting member, especially, only one face of this sheetlike supporting member. This supporting member as a sheet of copying paper is then marked to discriminate the supporting member from plain paper.

However, such copying paper has the following disadvantages.

(1) This sheet of copying paper is a special sheet of paper having a surface obtained by mold-releasing processing and is not each of sheets of general copying paper and printing paper used so much at present. Therefore, it is difficult to use this surface-processed copying paper as each of the general copying and printing papers.

(2) Accordingly, it is difficult to make a copy by mixing the sheet of surface-processed paper with a sheet of general copying paper.

(3) It is important to make a double-sided copy in view of reuse of resources. Namely, it is important to make a copy on each of front and rear faces of one sheet of copying paper in view of reuse of resources. It is considered that the double-sided copy will become a main current in the future. In such a situation, it is difficult to utilize a sheet of regenerative paper coated with a mold-releasing agent on one face thereof.

(4) An image is formed on the mold-releasing agent so that no image is reliably fixed onto the paper sheet. Accordingly, it is difficult to use such a paper sheet.

Japanese Patent Application Laying Open (KOKAI) Nos. 1-101576 and 1-101577 will next be described.

In each of these publications, an image supporting member forming an image thereon is dipped into an organic solvent for dissolving toner resin for forming the image on this image supporting member. The image is removed from the image supporting member by ultrasonic processing.

However, in this method, problems about environmental pollution, firing, toxicity, etc. are caused by using the organic solvent. Accordingly, it is difficult to use this image supporting member in general offices, homes, etc.

Japanese Patent Application Laying Open (KOKAI) No. 1-297294 will next be described.

This publication shows a method for cleaning an image forming-supporting member. In this cleaning method, the image forming-supporting member is formed by plastic, a metal, a sheet of paper or ceramic having low permeability with respect to a liquid, etc. An image is formed on the image forming-supporting member. This image is heated through a separating material thermally melted so that the image is removed from the image forming-supporting member. However, in this cleaning method, it is necessary to use a sheet of special erasable paper having a surface on which mold-releasing processing is performed. Accordingly, such an image forming-supporting member cannot be used as sheets of general copying and printing papers used so much at present.

For example, the basic system of an electrostatic electrophotographic copying machine is classified into three systems composed of an electrofax system, a zerography system and an NP system. In the electrofax system, a sheet of photosensitive or sensitized paper is required to make a copy. Therefore, the zerographic system is especially a main current at present as a system able to use a sheet of plain paper. In a plain paper copier (PPC) using a sheet of plain paper, there is no restriction about a sheet of copying paper and running cost using the plain paper sheet is low. Further, it is easy to increase a copying speed.

As mentioned above, a large amount of printer paper sheets and copying paper sheets has recently been used by office automation (OA). Therefore, a problem about a change for the worse of earth environment is caused by deforestation. This problem is generally solved by only one method. In this method, ink, etc. are removed from a sheet of paper once used, and the paper sheet is crushed in water. This water is removed from the paper sheet by filtration so that the paper sheet is regenerated as a so-called sheet of used paper. However, a method for reusing a sheet of used paper to make a copy or print has been recently developed. In this method, the used paper sheet is reused by removing character images therefrom by cleaning.

For example, in Japanese Patent Application Laying Open (KOKAI) Nos. 1-101576 (publication ①) and 1-101577 (publication ②), a solvent is used in a method for regenerating an image holding member such as a sheet of paper. In this regenerating method, the sheet of paper attaching toner thereonto is dipped into a soluble solvent of toner resin and a supersonic wave is vibrated in this solvent. Thus, the toner dissolved into the solvent is separated from a surface of the paper sheet.

Further, each of Japanese Patent Application Laying Open (KOKAI) No. 4-300595 (publication ③) and Japanese Utility Model Application Laying Open (KOKAI) No. 4-118500 (publication ④) shows another method for regenerating an image holding member such as a sheet of paper. In this regenerating method, a solvent is attached to a printed portion of a sheet of used paper by a dipping, spraying or coating method, etc. so as to dissolve toner in the printed portion. The dissolved toner is removed from the printed portion by a method using cleaning, air suction, adsorbent contact, mechanical separation or electrostatic adsorption, etc.

For example, Japanese Patent Application Laying Open (KOKAI) No. 1-297294 (publication ⑤) shows a cleaning method for separating an image from an image holding member without using any solvent. In this cleaning method, the image holding member is formed by plastic, a metal, a sheet of paper or ceramic having low permeability with respect to a liquid, etc. An image is formed on the image holding member. This image is heated through a separating member thermally melted so that the image is removed from the image holding member.

Japanese Patent Application Laying Open (KOKAI) No. 2-255195 (publication ⑥) shows another method for regenerating an image holding member. In this regenerating method, thermally melted ink or toner is attached by an electrophotographic or thermal transfer system onto a printing member in which a supporting member is coated with a mold-releasing agent. An ink separating member is then overlapped with this printing member and is transmitted between a heating roller and a pressure roller. The ink separating member is separated from the printing member after the ink separating member is cooled. Thus, the thermally melted ink or toner is attached to the ink separating member and is removed from the printing member so that the image holding member is regenerated.

In Japanese Patent Application Laying Open (KOKAI) No. 4-64472 (publication ⑦), an eraser has at least an endless sheet, a heating roller, a cooling roller, a pressing roller and a driving portion. The endless sheet has thermally melted resin on a surface thereof. The heating and cooling rollers are arranged to support and rotate the endless sheet. The pressing roller presses a sheet of erasable paper having a mold-releasing processed surface against resin thermally softened or melted. The driving portion is used to move the endless sheet, the heating roller, the cooling roller and the pressing roller in association with each other. In one example of the mold-releasing processing on the paper sheet surface, a surface of a sheet of unused copying paper is coated with a mold-releasing agent such as a silicon sealant and is then dried.

Japanese Patent Application Laying Open (KOKAI) No. 4-82983 (publication ⑧) shows an apparatus for removing an image forming substance from a sheet of paper. This removing apparatus has two parallel rollers, a heater, a scraper and a separator. The two parallel rollers come in press contact with each other and are rotated to make the paper sheet pass through a press contact portion. The heater heats at least one of the two rollers. The scraper separates the paper sheet passing through the press contact portion from the rollers. The separator removes an image forming substance attached onto the rollers therefrom.

In the regenerating method and the regenerating apparatus shown in each of the above publications ① to ④ using a solvent, an organic solvent for dissolving image forming toner resin on the image holding member is used to remove an image from this image holding member. However, it is not suitable to generally arrange and use such an organic solvent in offices, homes, etc. in consideration of influences of the organic solvent on human body and environment. It is necessary to properly and separately use plural types of solvents in accordance with kinds of binder resins such as toner and paint so that processed objects are limited. Further, when toner is dissolved by a solvent, probability of reattachment of this toner into a fibrous tissue of the paper sheet is increased so that a removing rate of the toner is totally reduced. Further, no problem about dyeing can be easily avoided and cost of a sheet of regenerated paper is economically high in comparison with a general system for regenerating a sheet of used paper.

No solvent is used in the regenerating method and the regenerating apparatus shown in publications ⑤ to ⑦. However, in this case, a sheet of erasable paper having a mold-releasing surface must be used. Accordingly, it is difficult to apply these regenerating method and apparatus to general sheets of copying and printing papers, etc. used so much at present. Since an image is formed on a mold-releasing agent, fixing force of the image is naturally reduced. Further, a copy must be made by discriminating erasable and plain paper sheets from each other so that no copying operation is efficiently performed. It is also difficult to make a copy in a real state in which the erasable and plain paper sheets are mixed with each other.

In particular, for example, the following problems are caused when a mold-releasing agent such as a silicon sealant is coated and dried to provide a mold-releasing property on a paper sheet surface as described in the above publication ⑦. Namely, a paper fibrous structure on the paper sheet surface is maintained as it is when only the mold-releasing agent such as a silicon sealant is coated and dried. An endless sheet having thermally melted resin on a surface thereof is adhered onto an image face of the erasable paper sheet to mechanically separate the image from the erasable paper sheet in a heating state. However, it is difficult to completely remove the image from the paper sheet until toner resin of the image permeating into clearances between paper fibers. Accordingly, regenerating efficiency is insufficient.

It is important to make a double-sided copy in view of reuse of resources. Namely, it is important to make a copy on each of front and rear faces of one sheet of copying paper in view of reuse of resources. It is considered that the double-sided copy will become a main current in the future. Accordingly, regenerating efficiency is reduced in a method for coating one face of the paper sheet with a mold-releasing agent. The silicon sealant permeates a sheet of copying paper even when the mold-releasing agent is coated and dried on both side faces of the paper sheet. As a result, a semi-transparent sheet of copying paper is obtained. Accordingly, no images can be clearly seen in the case of the double-sided copy.

No solvent is also used in the regenerating method and apparatus shown in publication ⑧. An image forming substance is removed from a recorded image holding member in which an image is recorded onto a sheet of normal paper having paper fibers exposed onto a surface thereof. Accordingly, there is a fear that the paper fibers are separated from the paper sheet surface together with the image forming substance in removal thereof, thereby damaging a chartaceous property. This is because the image forming substance is firmly fixed to paper fibers on a surface of the image holding member. For example, the image forming substance is firmly fixed to the paper fibers by melting and attaching the image forming substance having thermally melted resin as a principal component onto the image holding member in a fixing process of an electrophotographic system.

When the above ink separating member, the endless sheet or each of the rollers is heated and pressurized to efficiently remove the image forming substance from the image holding member, fixing force of the image forming substance on the image holding member is conversely increased in accordance with various kinds of fixing conditions. Accordingly, it is difficult to remove the image forming substance from the image holding member in a certain case.

SUMMARY OF THE INVENTION

It is therefore a first object of the present invention to provide a method for regenerating an image holding member in which a sheet of copying or printing paper is regenerated and reused to make a copy or print by cleaning of copied and printed images on a special sheet of erasable paper and cleaning of a common PPC copied image and a PPC printed image utilized in markets at present as mentioned above.

A second object of the present invention is to provide an apparatus for regenerating an image holding member in which only an image forming substance can be removed from the image holding member without relatively damaging a fibrous surface and a chartaceous property of the image holding member.

In accordance with a first construction of the present invention, the above first object can be achieved by a method for regenerating an image holding member in which at least one portion of the image holding member is constructed by paper; an image constructed by an image forming substance is formed on a paper layer of the image holding member and at least one kind of water or aqueous solution is selected from a group of water, an aqueous solution including a surfactant, an aqueous solution including a water-soluble polymer, and an aqueous solution including a water-soluble polymer and a surfactant; the regenerating method comprising the steps of holding the at least one kind of water or aqueous solution in the image holding member having the image; and separating the image from the image holding member through an image separating member by heating adhesion or pressure adhesion.

In accordance with a second construction of the present invention, at least one portion of the image holding member forming an image thereon in the first construction is constructed by paper and an image constructed by an image forming substance can be formed on a paper layer of the image holding member; at least one kind of aqueous solution is selected from a group of an aqueous solution including a surfactant, an aqueous solution including a water-soluble polymer, and an aqueous solution including a water-soluble polymer and a surfactant; the at least one kind of aqueous solution is held in the image holding member; the image holding member is dried after this holding; and the image is formed on the dried image holding member.

In accordance with a third construction of the present invention, the above second object can be achieved by an apparatus for regenerating an image holding member in which the image holding member has a fibrous surface and an image forming substance is stably formed on this fibrous surface; the regenerating apparatus removing the image forming substance from the image holding member and constructed such that a stabilized adhesive state between the fibrous surface and the image forming substance is changed to an unstable state; a separating member comes in close contact with the image forming substance with reduced adhesive force on the fibrous surface; and the image forming substance is removed from the fibrous surface.

In accordance with a fourth construction of the present invention, the image forming substance in the third construction is softened when the image forming substance is removed from the fibrous surface.

In accordance with a fifth construction of the present invention, the above second object can be also achieved by an apparatus for regenerating an image holding member in which the image holding member has a fibrous surface and an image forming substance is stably formed on this fibrous surface; the regenerating apparatus removing the image forming substance from the image holding member and constructed such that an adhesive state of the fibrous surface is set to an unstable state in which stabilized adhesion between the fibrous surface and the image forming substance is changed to unstable adhesion; a separating member comes in close contact with the image forming substance with reduced adhesive force on the fibrous surface; and the image forming substance is removed from the fibrous surface.

In accordance with a sixth construction of the present invention, after the image forming substance is removed from the fibrous surface in the fifth construction, the adhesive state of the fibrous surface is restored to a stabilizing state between the fibrous surface and an image forming substance approximately equal to the image forming substance on the image holding member before regenerative processing.

In accordance with a seventh construction of the present invention, the above second object can be also achieved by an apparatus for regenerating an image holding member in which the image holding member has a fibrous surface and thermally melted toner is stably fixed onto the fibrous surface; the regenerating apparatus removing the thermally melted toner from the image holding member and comprising impregnating means for impregnating the image holding member with a fixing state reducing substance for reducing fixing force stabilized between the fibrous surface and the thermally melted toner; and toner removing means for making a toner separating member come in close contact with the thermally melted toner with unstable reduced adhesive force on the fibrous surface; the toner removing means removing the thermally melted toner from the image holding member by transferring the thermally melted toner onto the separating member from the fibrous surface.

In accordance with an eighth construction of the present invention, the thermally melted toner in the seventh construction is softened by heating means to easily transfer the thermally melted toner onto the separating member when the thermally melted toner is removed from the fibrous surface.

In accordance with a ninth construction of the present invention, the regenerating apparatus in the seventh or eighth construction further comprises restoring means for setting smoothness and humidity of the image holding member as a sheet to be approximately equal to those before regenerative processing after the thermally melted toner is removed from the fibrous surface.

In the above constructions of the regenerating method and apparatus, a sheet of copying or printing paper is regenerated and reused to make a copy or print by cleaning of copied and printed images on a special sheet of erasable paper and cleaning of a common PPC copied image and a PPC printed image utilized in markets at present as mentioned above.

Further, only the image forming substance can be removed from the image holding member without relatively damaging a fibrous surface and a chartaceous property of the image holding member.

Further objects and advantages of the present invention will be apparent from the following description of the preferred embodiments of the present invention as illustrated in the accompanying drawings.

BRIEF DESCRIPTION OF THE DRAWINGS

FIG. 17b is an enlarged view of an interfacial portion between this transfer paper sheet and this toner in FIG. 17a;

FIG. 29b is a perspective view of a processing head of the liquid supplying unit shown in FIG. 29a;

FIG. 31b is a cross-sectional view of a processing head of the liquid supplying unit shown in FIG. 31a;

FIG. 47b is a cross-sectional view of a toner collecting portion of the toner separating unit shown in FIG. 47a;

FIG. 50 is a timing chart of operations of the toner separating unit and the liquid supplying unit shown in FIG. 49;

FIG. 51 is an enlarged view of a contact portion of a separating claw in the toner separating unit shown in FIG. 49;

FIG. 53b is a perspective view of the toner separating unit shown in FIG. 53a;

FIG. 54a is a front view of a liquid supplying portion of the liquid supplying unit used together with the toner separating unit shown in FIG. 53a;

FIG. 54b is a side view of the liquid supplying portion shown in FIG. 54a;

Figure 58A:
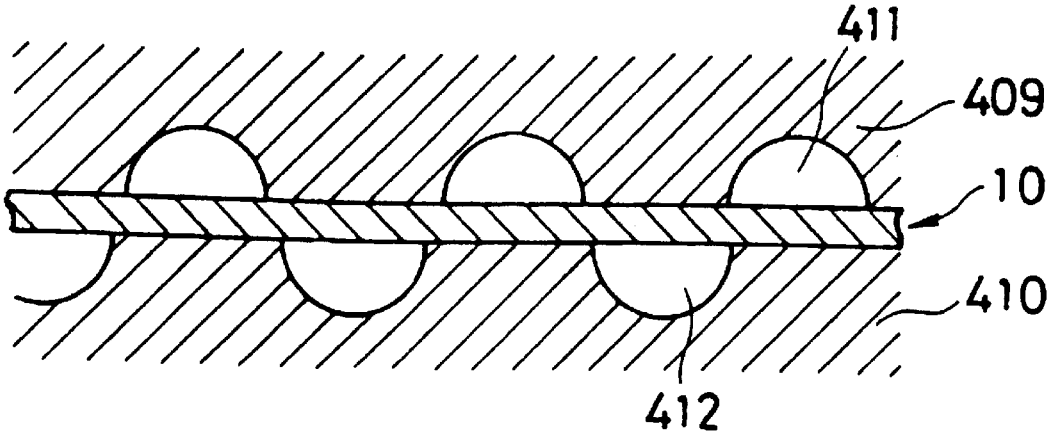
Figure 58B:
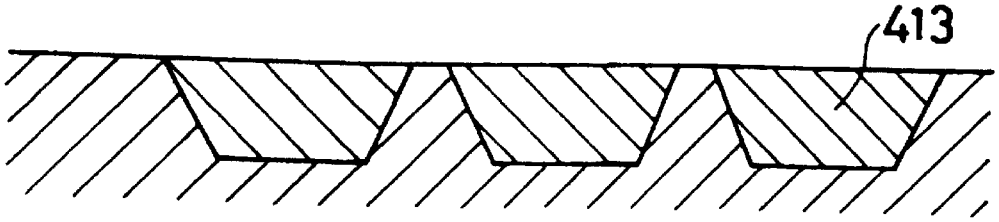
Figure 59A:
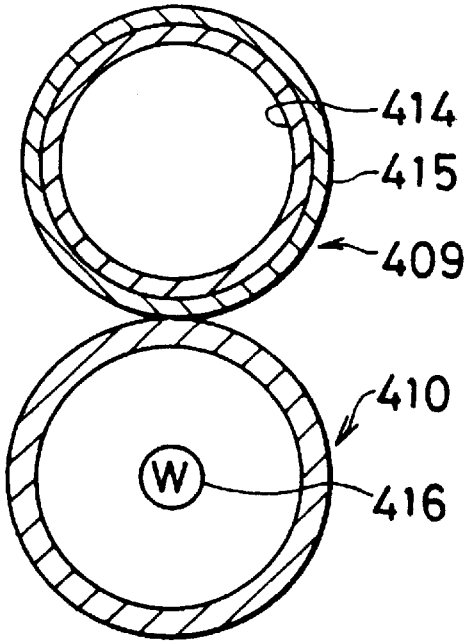
Figure 59B:
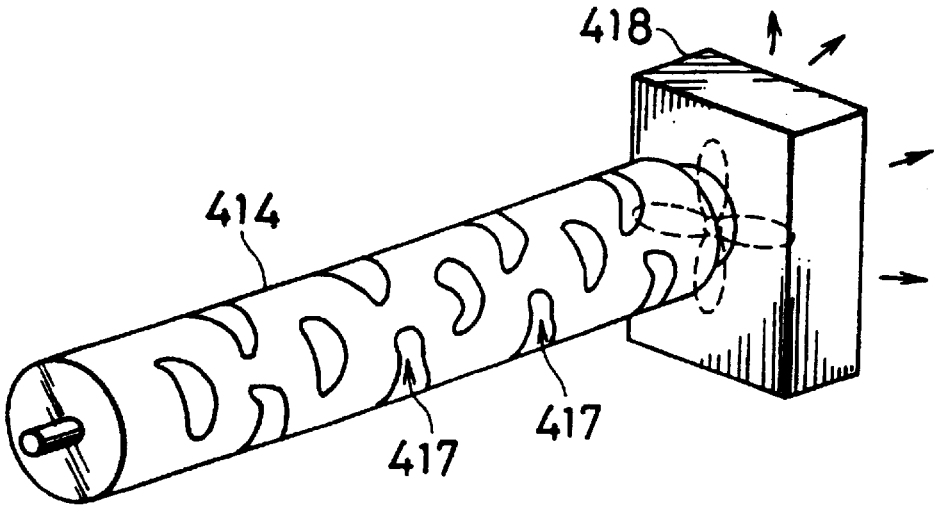
Figure 60A:
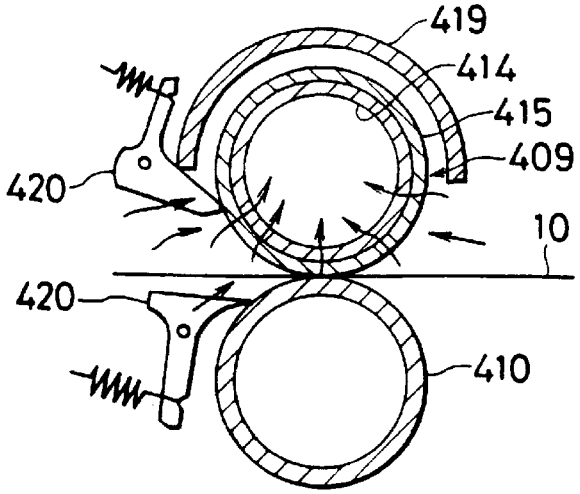
Figure 60B:
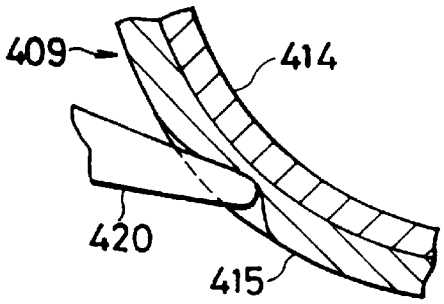
Figure 60C:
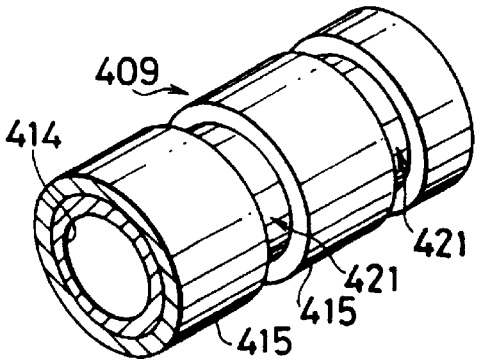
Figure 61:
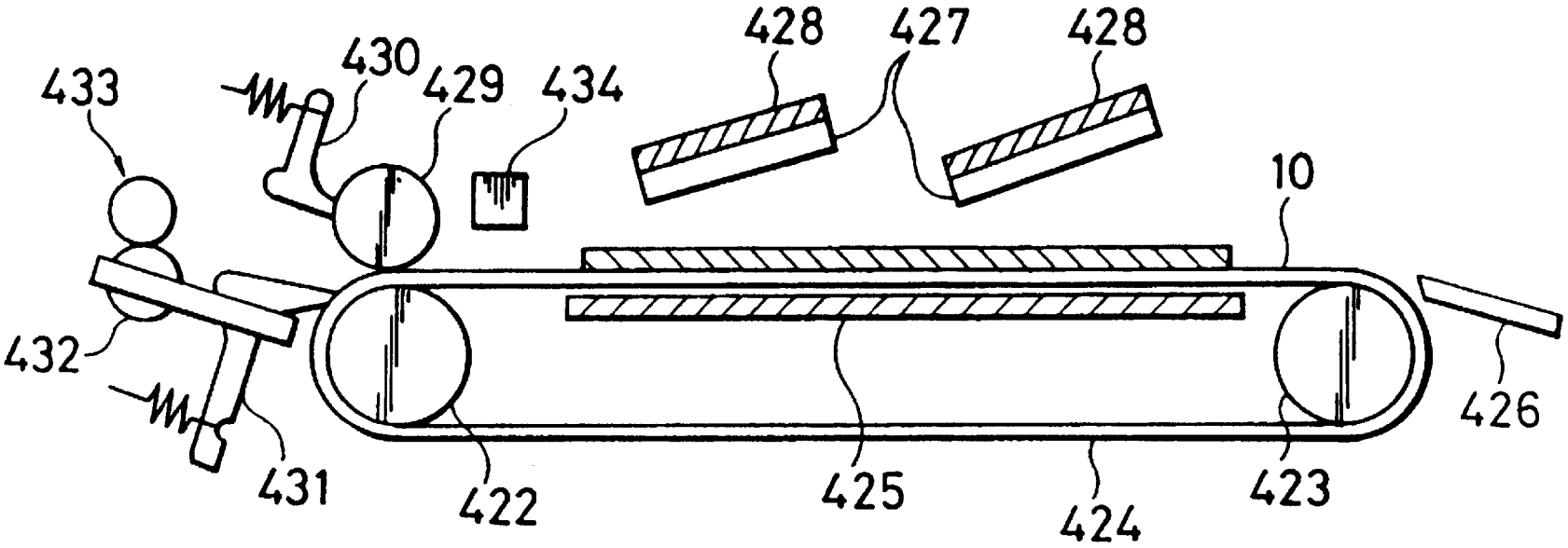
Figure 62A:
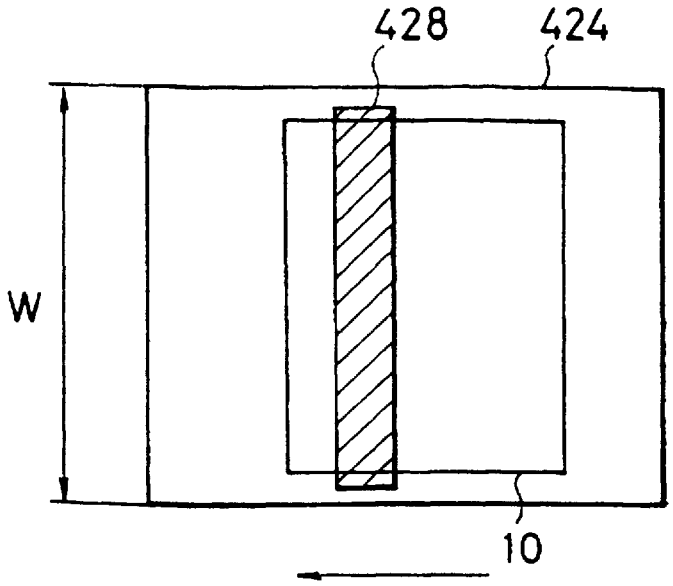
Figure 62B:
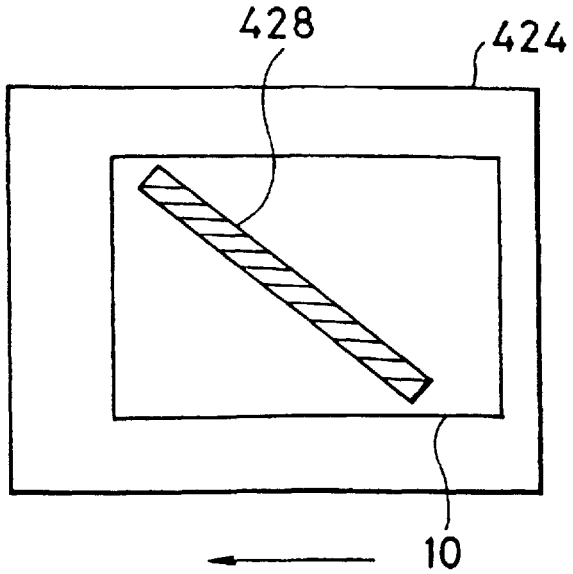
Figure 64A:
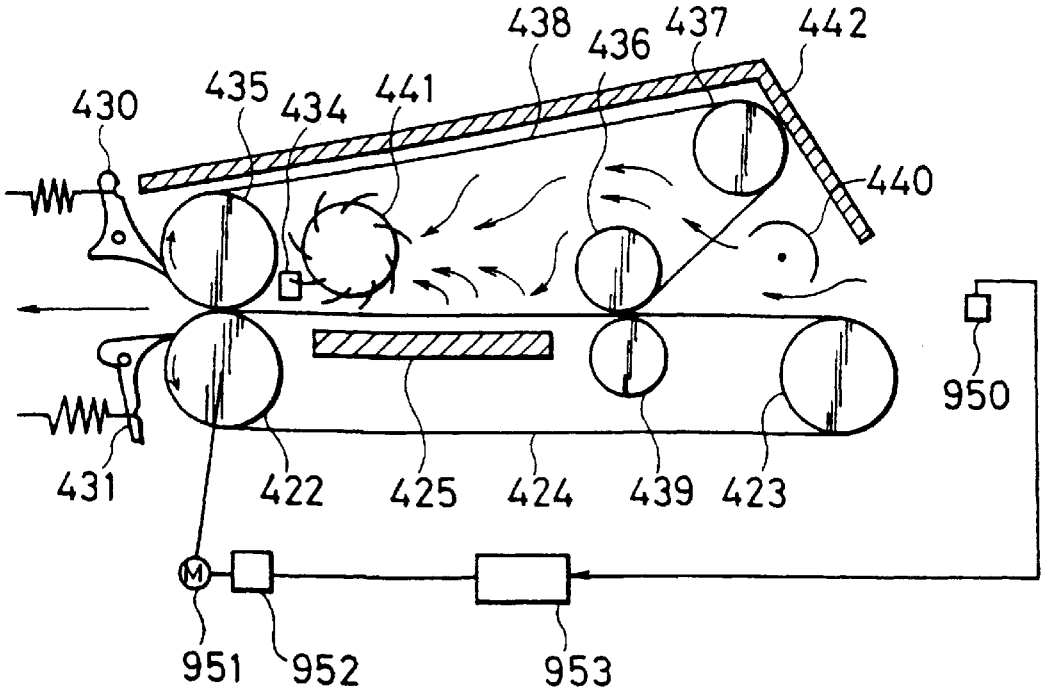
Figure 64B:
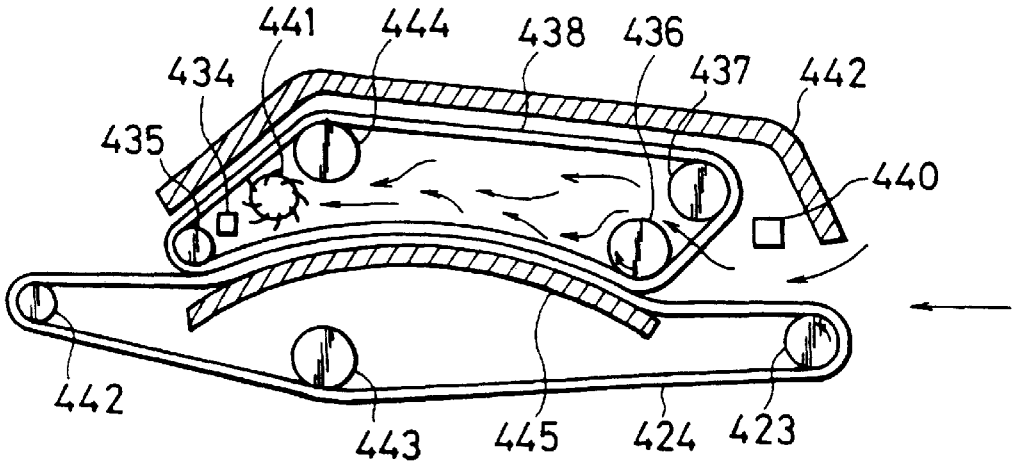
Figure 65A:
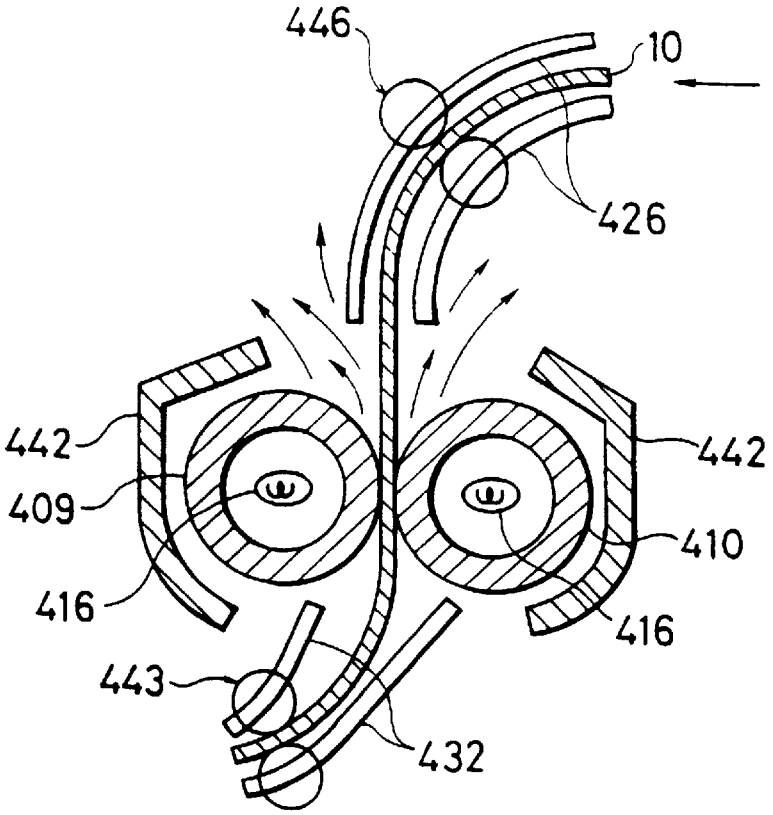
Figure 65B:
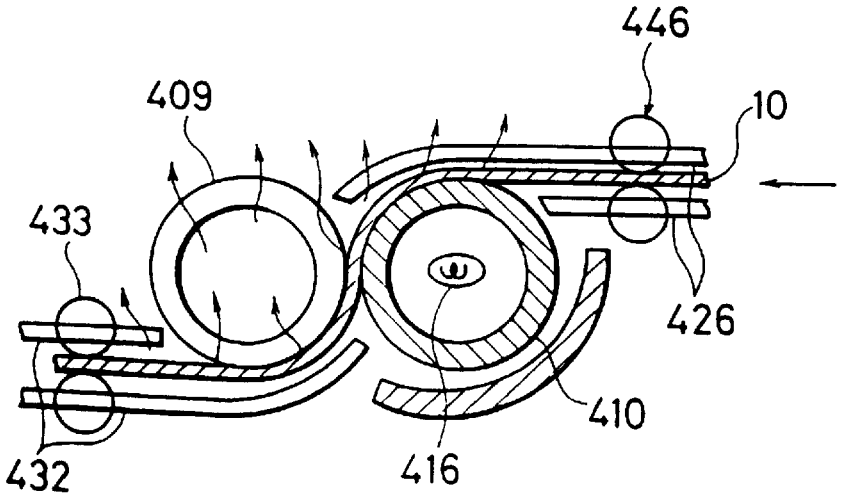
Figure 66A:
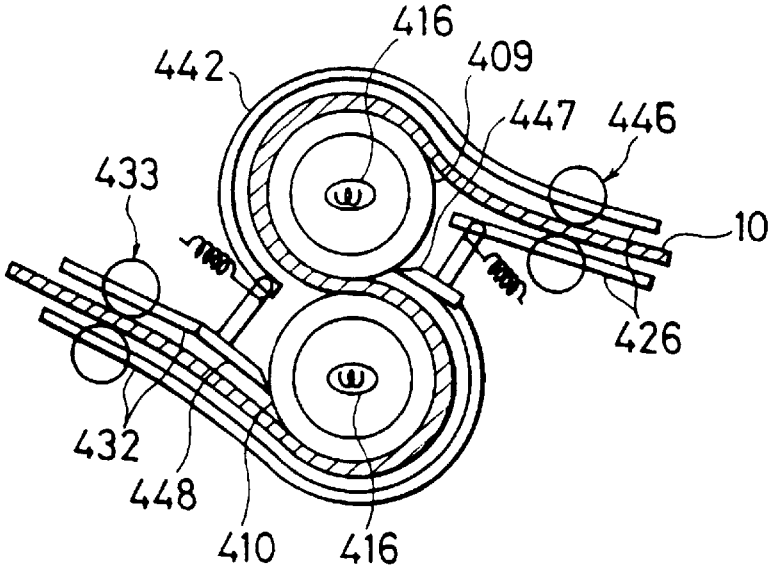
Figure 66B:
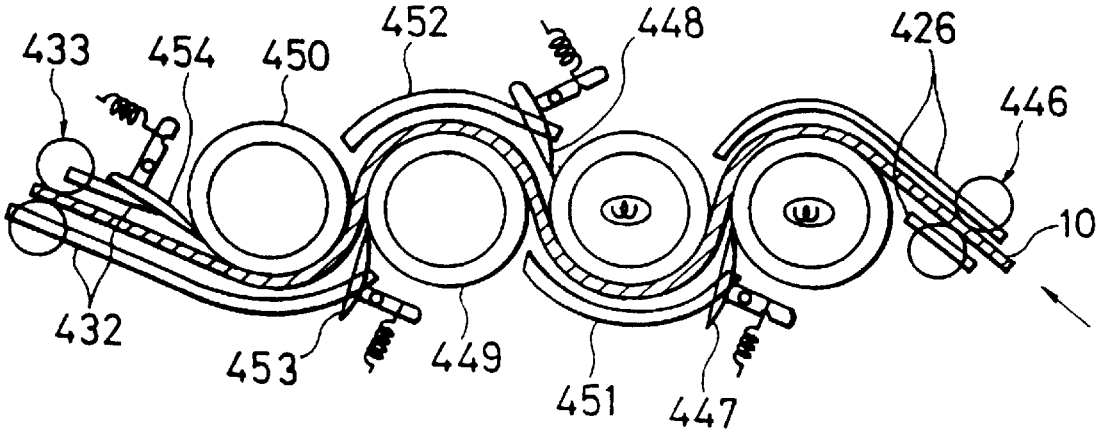
Figure 67A:
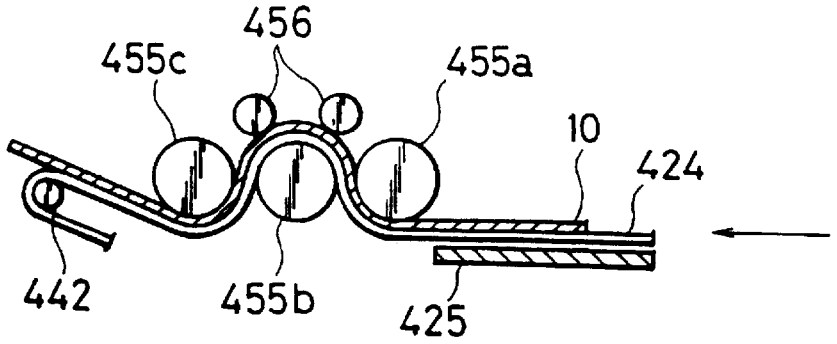
Figure 67B:
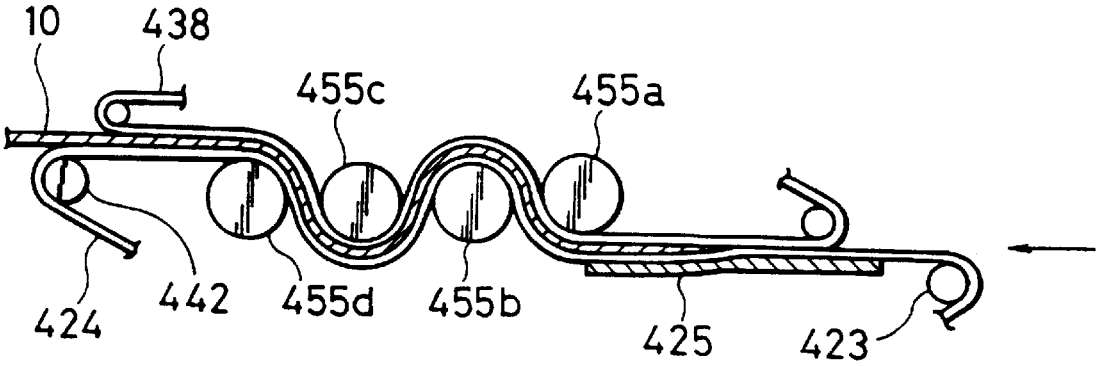
Figure 68A:
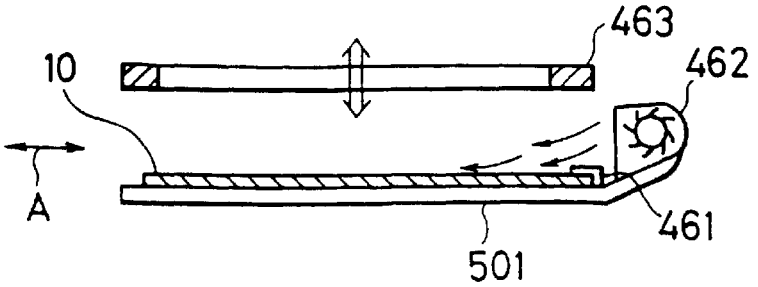
Figure 68B:
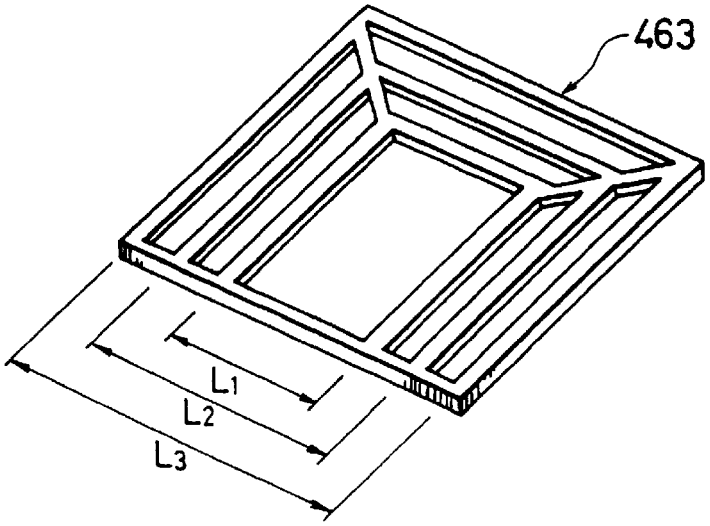
Figure 68C:
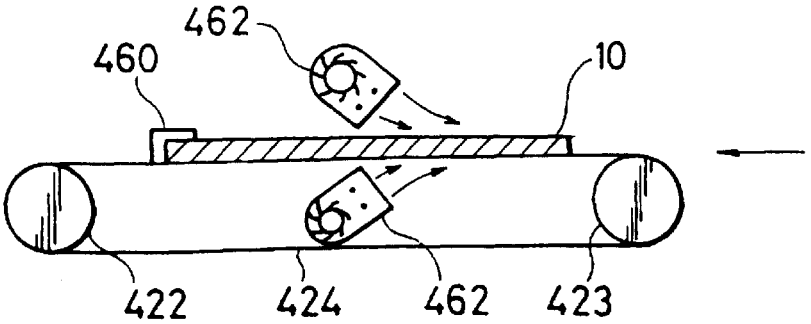
Figure 69A:
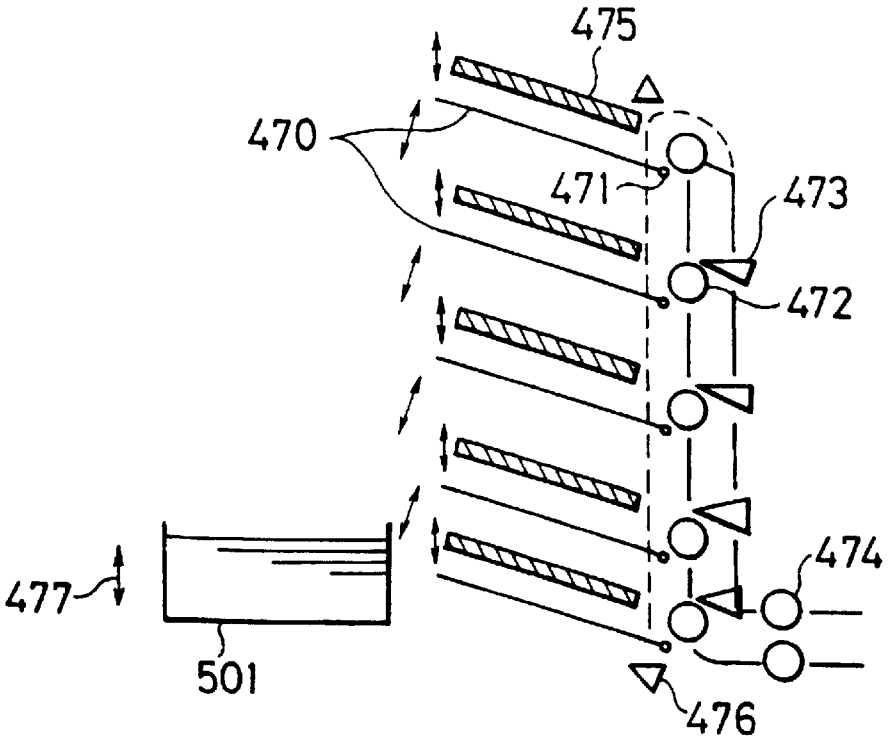
Figure 69B:
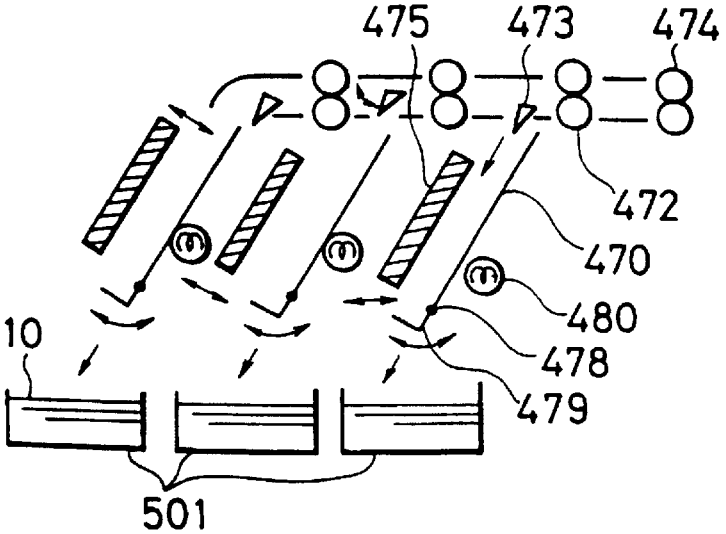
Figure 70A:
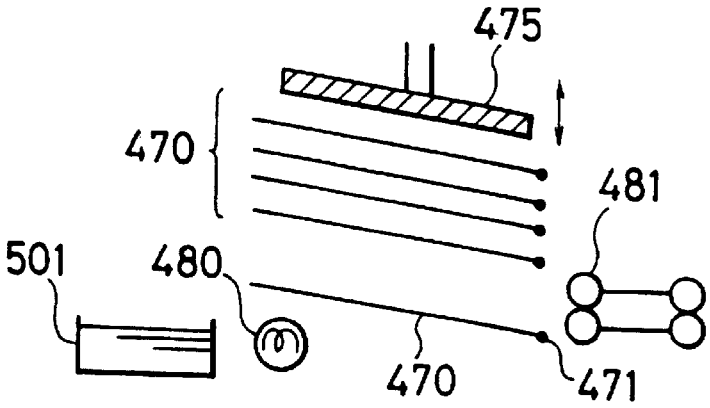
Figure 70B:
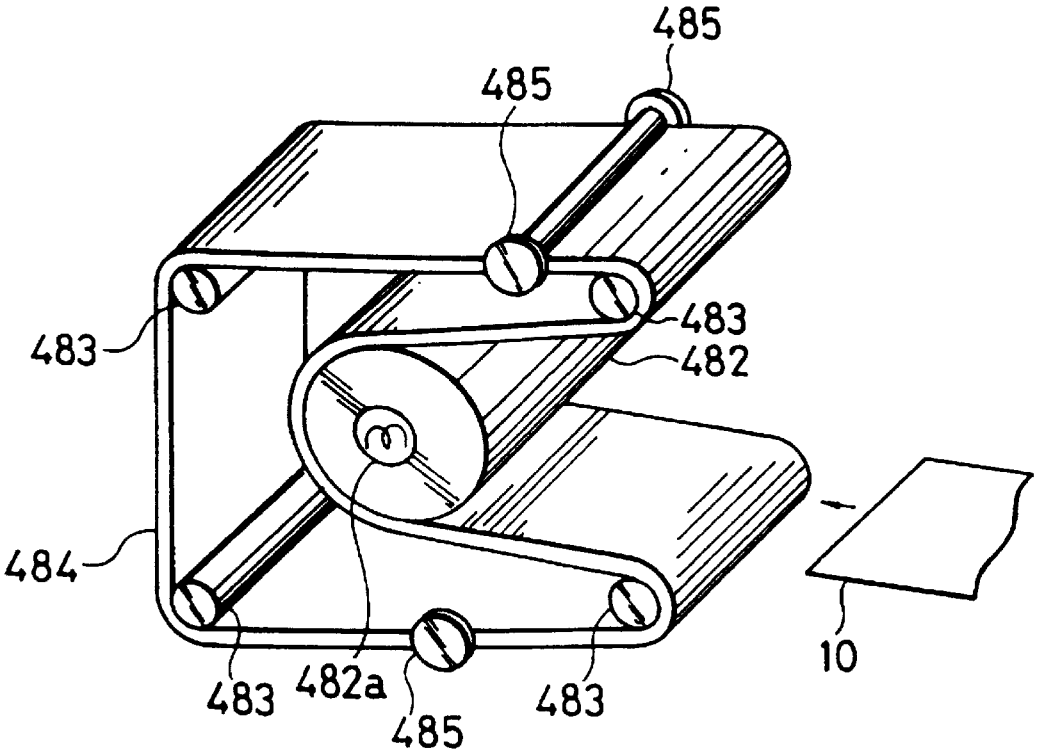
Figure 71A:
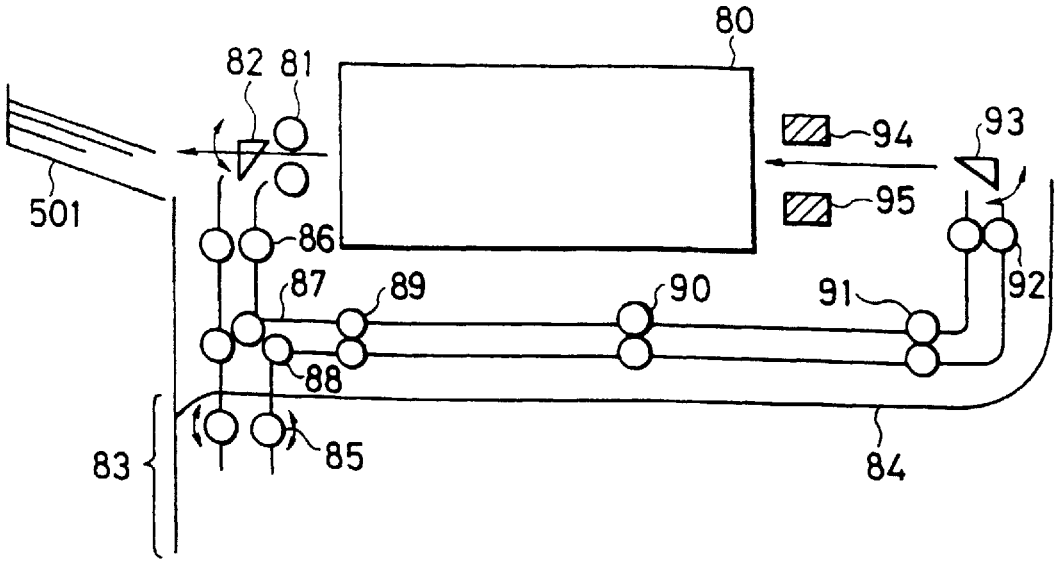
Figure 71B:
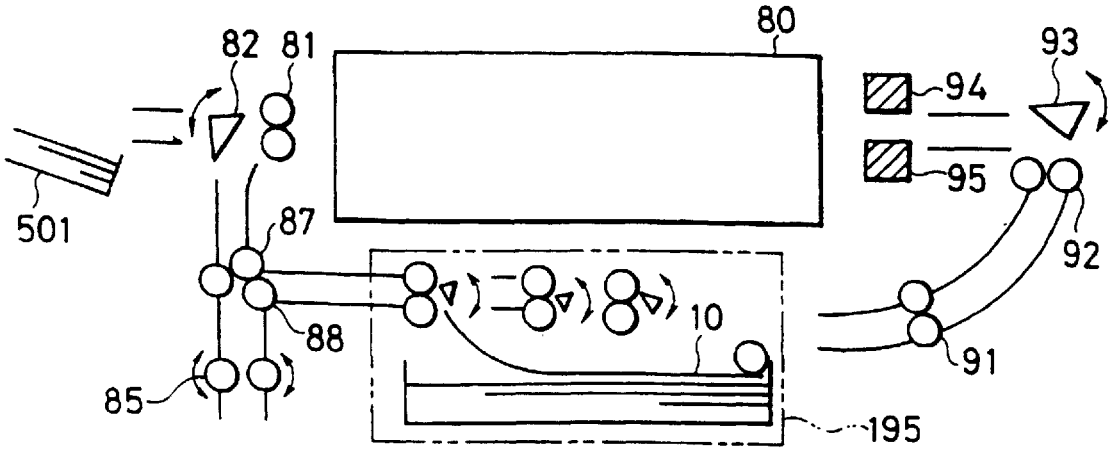
Figure 72A:
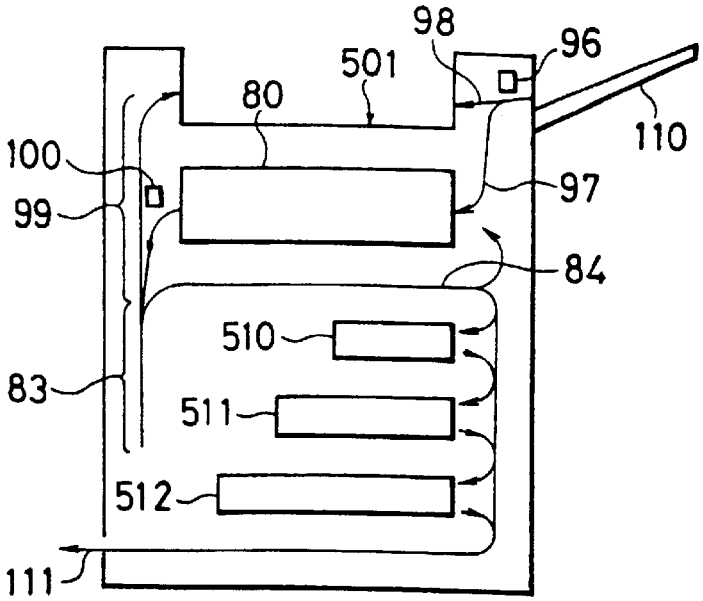
Figure 72B:
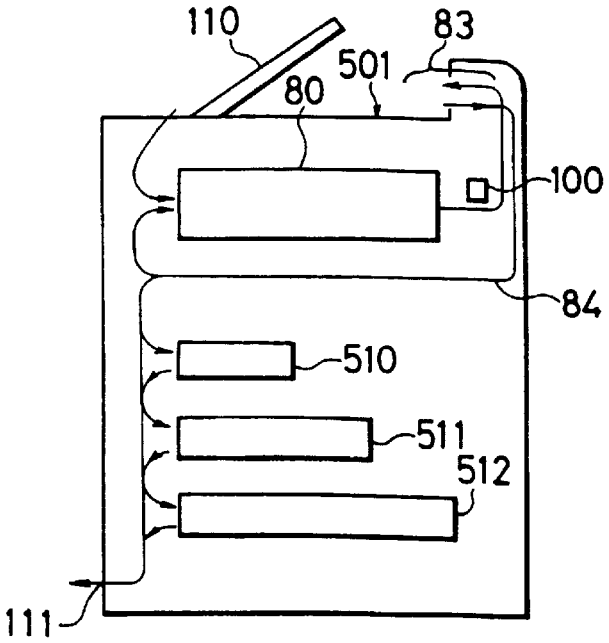

each of FIGS. 56a to 56f is a view for explaining a modified example of a drying roller;

each of FIGS. 57a to 57f is a view for explaining a modified example of a surface shape of the drying roller;

each of FIGS. 58a and 58b is a view for explaining another modified example of the surface shape of the drying roller;

each of FIGS. 59a and 59b is a view for explaining a modified example of the drying unit;

each of FIGS. 60a to 60c is a view for explaining another modified example of the drying unit;

FIG. 61 is a view for explaining another modified example of the drying unit;

FIGS. 62a and 62b are views for explaining the operation of a heater of the drying unit shown in FIG. 61;

each of FIGS. 63a to 63d is a characteristic graph of the drying unit;

each of FIGS. 64a and 64b is a view for explaining another modified example of the drying unit;

each of FIGS. 65a and 65b is a view for explaining another modified example of the drying unit;

each of FIGS. 66a and 66b is a view for explaining another modified example of the drying unit;

each of FIGS. 67a and 67b is a view for explaining another modified example of the drying unit;

each of FIGS. 68a and 68b is a view for explaining another modified example of the drying unit;

FIG. 68c is a view for explaining another modified example of the drying unit;

each of FIGS. 69a and 69b is a view for explaining another modified example of the drying unit;

each of FIGS. 70a and 70b is a view for explaining another modified example of the drying unit;

FIGS. 71a and 71b are views showing the entire construction of a conveying system of the toner removing device; and FIGS. 72a and 72b are views showing an entire construction of the toner removing device having the conveying system shown in FIG. 71a.

DESCRIPTION OF THE PREFERRED EMBODIMENTS

The preferred embodiments of a method and an apparatus for regenerating an image holding member in the present invention will next be described in detail with reference to the accompanying drawings.

The present invention resides in an image holding-supporting member which has a chartaceous material constructed by cellulose as a principal component in at least one portion of the image holding-supporting member and has a hydrophobic image formed on this chartaceous material. The hydrophobic image is formed by thermally flexible ink or toner. The image holding-supporting member is impregnated with at least one kind of separating liquid or aqueous solution including water molecules. The separating liquid or aqueous solution is selected from a group of a liquid including water molecules, an aqueous solution including a surfactant, an aqueous solution including a water-soluble polymer, and an aqueous solution including a water-soluble polymer and a surfactant. The hydrophobic image is separated from the chartaceous material in a state in which the image holding-supporting member is impregnated with the separating liquid or aqueous solution, thereby regenerating the chartaceous material as an image supporting member.

The present invention also resides in an image holding-supporting member which has a chartaceous material constructed by cellulose as a principal component in at least one portion of the image holding-supporting member and has a hydrophobic image able to be formed on this chartaceous material. The hydrophobic image can be formed on the chartaceous material as an image supporting member by thermally flexible ink or toner. The image holding-supporting member is impregnated with at least one kind of aqueous solution. This aqueous solution is selected from a group of an aqueous solution including a surfactant, an aqueous solution including a water-soluble polymer, and an aqueous solution including a water-soluble polymer and a surfactant. Thereafter, the image holding-supporting member is dried to regenerate the chartaceous material as the image supporting member.

The present invention also resides in a method for regenerating an image holding-supporting member which has a chartaceous material constructed by cellulose as a principal component in at least one portion of the image holding-supporting member and has a hydrophobic image formed on this chartaceous material. The hydrophobic image is formed on the chartaceous material as an image supporting member by thermally flexible ink or toner. The image holding-supporting member is impregnated with at least one kind of separating liquid or aqueous solution including water molecules. The separating liquid or aqueous solution is selected from a group of a liquid including water molecules, an aqueous solution including a surfactant, an aqueous solution including a water-soluble polymer, and an aqueous solution including a water-soluble polymer and a surfactant. An image separating member is heated or pressurized and is adhered to the image holding-supporting member in a state in which the image holding-supporting member is impregnated with the separating liquid or aqueous solution. Thus, the hydrophobic image is separated from the chartaceous material, thereby regenerating the chartaceous material.

The present invention also resides in an apparatus for regenerating an image holding-supporting member which has a chartaceous material constructed by cellulose as a principal component in at least one portion of the image holding-supporting member and has a hydrophobic image formed on this chartaceous material. The hydrophobic image is formed on the chartaceous material as an image supporting member by thermally flexible ink or toner. The above regenerating method can be executed by this regenerating apparatus. The regenerating apparatus comprises means for coating the image holding-supporting member with at least one kind of separating liquid or aqueous solution including water molecules; the separating liquid or aqueous solution being selected from a group of a liquid including at least water molecules, an aqueous solution including a surfactant, an aqueous solution including a water-soluble polymer, and an aqueous solution including a water-soluble polymer and a surfactant; means for separating the hydrophobic image from the chartaceous material; and means for drying the image supporting member in which the hydrophobic image is separated from the chartaceous material.

The image supporting member in the present invention is mainly constructed by a sheet of copying or printing paper, but is not limited to such a paper sheet. For example, a supporting member holding an image thereon may be used. Further, the image supporting member is not necessarily constructed by the chartaceous material. It is sufficient to construct a paper layer for holding the hydrophobic image of thermally flexible toner or ink as a chartaceous material constructed by cellulose as a principal component. For example, the image supporting member may be constructed by a laminated material of a paper layer and a plastic layer laminated with each other.

The present invention is characterized in that only an image is removed from the chartaceous material in a state in which the image holding-supporting member is impregnated with a liquid or aqueous solution including water molecules, thereby regenerating and reusing the image supporting member as it is.

When paper is impregnated with an aqueous solution, this paper generally tends to be flexed. At this time, adhesive force between the paper layer and the hydrophobic image of thermally flexible toner or ink held on the paper layer is very reduced.

Namely, a surface of the chartaceous material constructed by cellulose fibers as a principal component is innumerably irregular since these fibers are entwined with each other. Further, small clearances are also innumerably formed inside the chartaceous material. When a hydrophobic image is formed on the chartaceous material in such a state, an image of thermally flexible toner fixed in a PPC copying process has a size larger than that of each of the small clearances and the irregularities caused by the cellulose fibers entwined with each other. Therefore, many small spaces are formed in a contact portion of the cellulose fibers and the hydrophobic image.

The image holding-supporting member having such a hydrophobic image is impregnated with the above separating liquid by the above coating means using coating, dipping, spraying, etc. Thus, the separating liquid such as a liquid, an aqueous solution, etc. constructed by water molecules as a principal component permeates the cellulose fibers and their clearances and spatial portions by a capillary phenomenon. Thus, the separating liquid permeates the cellulose fibers until a contact portion of the thermally flexible toner image and the cellulose fibers.

As a result, adhesive force of the thermally flexible toner image and the cellulose fibers is reduced and the cellulose fibers absorb the separating liquid. Thus, the cellulose fibers are deformed by a so-called swelling phenomenon. Accordingly, a space for the contact portion between the cellulose fibers and the thermally flexible toner image is increased so that an area for the contact of the cellulose fibers and the thermally flexible toner image is reduced. Therefore, adhesive force between the cellulose fibers and the thermally flexible toner image is reduced.

Accordingly, the image can be easily removed from the paper layer without damaging the paper layer by using a suitable separating means.

The above coating means impregnates the holding-supporting member of a hydrophobic image and/or an image supporting member capable of carrying the hydrophobic image with the above separating liquid by coating, dipping, spraying, etc. The concentration of a surfactant included in the separating liquid is preferably ranged from 0.01% to 20%. The concentration of a surfactant included in the image supporting member capable of carrying the hydrophobic image is also preferably ranged from 0.01% to 20%. In contrast to this, the concentration of a water-soluble polymer included in the separating liquid is preferably ranged from 0.1% to 20%. The concentration of a water-soluble polymer included in the image supporting member capable of carrying the hydrophobic image is also preferably ranged from 0.1% to 20%.

The above separating means makes an adhesive image separating member adhesively come in press contact with the hydrophobic image on the image supporting member when the hydrophobic image is heated or pressurized. Thus, the separating means separates the image from the image holding member as the chartaceous material by transferring the image onto the image separating member. The image separating member is constructed by an organic high molecular (or polymer) material having an solubility parameter-value (SP-value) similar to that of a substance constituting this image, a metallic material having high surface active energy, an evaporation film material for this metallic material, an inorganic material such as a ceramic material, etc., a material having irregular and porous surfaces, etc. The image separating member is preferably formed by each of such materials in the shape of each of a sheet, a belt, a roller, etc. such that the image separating member can be repeatedly used.

For example, component resin of the thermally flexible ink or toner removed from the chartaceous material in the present invention is constructed by polystyrene, acrylic resin, methacrylic resin, styrene-butylacrylic copolymer, styrene-butadiene copolymer, polyester, epoxy resin, etc.

Wettability of a paper sheet holding the image of thermally flexible toner or ink with respect to water is important to sufficiently impregnate the image holding paper sheet with water for a short time. Further, water must sufficiently permeate a boundary of the image holding paper sheet and the thermally flexible toner or ink so as to remove the image from the image holding paper sheet.

A surfactant acts as a surface active agent for accelerating or promoting a capillary phenomenon and rapidly impregnating the image holding paper sheet holding the hydrophobic image of thermally flexible toner or ink with the above separating liquid. Molecules of the surfactant are generally constructed by a combination of a lipophilic group and a hydrophilic group. The following Tables 1 and 2 respectively show examples of the lipophilic and hydrophilic groups in accordance with Applied Chemistry Editing of Chemical Handbook in Japan (1986), but the present invention is not limited to these examples.

Many kinds of surfactants are disclosed. The surfactants are generally composed of anionic surfactants of fatty acid derivative, sulfate, sulfonic acid and phosphate types, etc., cationic surfactants of quaternary ammonium salt, ester bonding amine, quaternary ammonium salt having ether linkage, heterocyclic amine, amine derivative, etc., an amphoteric surfactant, a nonionic surfactant, etc. The following Tables 3 to 7 show these typical surfactants, but the present invention is not limited to these surfactants.

Table 1

Kinds of lipophilic group Hydrocarbon (composed of carbon chains 6 to 22 in many cases)

n-alkyl, branching chain alkyl, substitutional alkyl, aromatic, plural chain alkyl and polyoxyalkylene Partial fluorination alkyl and perfect fluorination alkyl Polysiloxane class Table 2

Kinds of hydrophilic group Anionic kind carboxylate, sulfonate, sulfate, phosphate and phosphonate Cationic kind amine salt, quaternary ammonium salt, pyridinium salt, sulfonium salt, phosphonium salt and polyethylene-polyamine Amphoteric kind amino acid, betaine, amino sulfate and sulfobetaine Nonionic kind polyhydric alcohol (glycerol, glucose, sorbital, cane sugar), amino alcohol, polyethylene glycol, semipolar bond (amine oxide, sulfoxide, amine imide)

TABLE 3

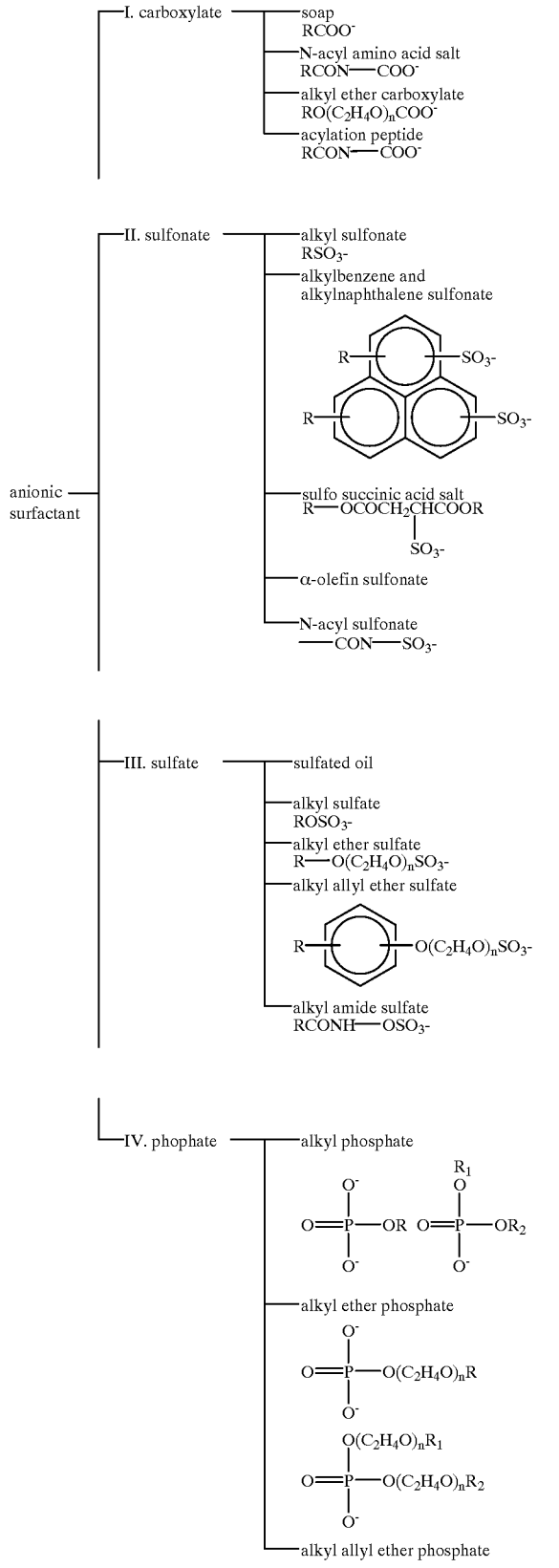

TABLE 4

Cationic surfactant

1) Aliphatic amine salt and quaternary ammonium salt thereof

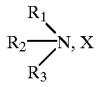

$R_1$ = 12–18
$R_2$, $R_3$ = H or $CH_3$
X = organic or inorganic acid

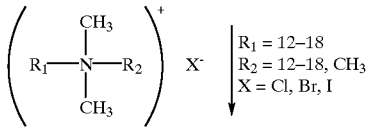

$R_1$ = 12–18
$R_2$ = 12–18, $CH_3$
X = Cl, Br, I

2) Aromatic quaternary ammonium salt

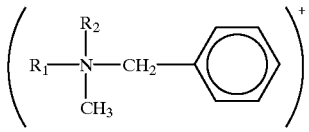

$R_1$ = 12–18
$R_2$ = $CH_3$, 12–18
X = Cl, Br, I benzal coniun salt
benzethonium chloride 3) Heterocyclic quaternary ammonium salt

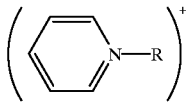

R = 12–18
X = Cl, Br, I

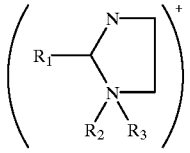

$R_1$ = 12–18
$R_2$ = $CH_2CH_2OH$,

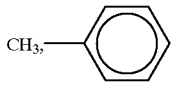

, etc.

X = Cl, Br, I pyridinium slat
imidazolinium salt

TABLE 5

Amphoteric surfactant

A. Betaine 1. carboxybetaine

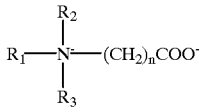

($R_1$ = $C_{12}$–$C_{18}$; $R_2$,$R_3$:$CH_3$, etc.: n = 1–2

2. sulfobetaine

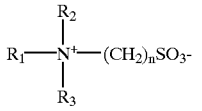

($R_1$ = $C_{12}$–$C_{18}$; $R_2$,$R_3$:$CH_3$, etc.: n = 1–2

B. Aminocarboxylate

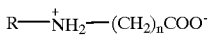

(R = $C_{12}$–$C_{18}$; $R_2$,$R_3$:$CH_3$, etc.: n = 1–2)

C. Imidazoline derivative

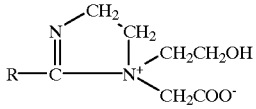

(R = $C_{12}$–$C_{18}$)

Table 6

Nonionic surfactant

I. Ether type alkyl and alkyl allyl polyoxy ethylene ether alkyl allyl formaldehyde condensation polyoxy ethylene ether block polymer having polyoxy propylene as lipophilic group polyoxy ethylene-polyoxy propyl alkly ether II. Ether ester type polyoxy ethylene ether of glycerol ester polyoxy ethylene ether of sorbitan ester polyoxy ethylene ether of sorbitol ester III. Ester type polyethylene glycol-fatty acid ester glycerol ester polyglycerol ester sorbitan ester propylene glycol ester cane sugar ester IV. Nitrogen-including type fatty acid alkanol amide polyoxy ethylene-fatty acid amide polyoxy ethylene-alkyl amine amine oxide

TABLE 7

Fluorine surfactant

Similar to normal surfactants there are the following four kinds of fluorine surfactants.

(1) anionic type
(2) nonionic type
(3) cationic type
(4) amphoteric type

Typical fluorine surfactants product names fluoroalkyl($C_2$—$C_{10}$)carboxylate
N-perfluorooctane sulfonyl disodium glutamate
3-[fluoroalkyl($C_6$—$C_{11}$)oxy]-1-alkyl($C_3$—$C_4$)sodium sulfonate
3-[ω-fluroalkanoyl($C_6$—$C_8$)-N-ethyl amino]-1-propane sodium sulfonate
N-[3-(perfluorooctane sulfonamide)propyl]-N,N-dimethyl-N-carboxymethylene ammonium betaine
fluoroalkyl($C_{11}$–$C_{20}$)carboxylate
perfluoroalkyl carboxylate($C_7$—$C_{13}$ )
perfluorooctane sulfonic diethanol amide
perfluoroalkyl($C_4$—$C_{12}$)sulfonate(Li, K, Na)
N-propyl-N-(2-hydroxy ethyl)perfluorooctane sulfonamide
perfluoroalkyl($C_6$—$C_{10}$)sulfonamide propyl trimethyl ammonium salt
perfluoroalkyl($C_6$—$C_{10}$)-N-ethyl sulfonyl glycine salt(K)
bisphosphate(N-perfluorooctyl sulfonyl-N-ethyl amino ethyl
monoperfluoroalkyl($C_6$—$C_{16}$)ethyl phosphate In the present invention, the separating member of thermally flexible toner or ink can be formed by holding a water-soluble polymer in a state in which water is included in the image supporting member as the chartaceous material. Further, in the image supporting member of cellulose fibers, the water-soluble polymer can come in contact with a thermally flexible toner image inside cellulose fibers unable to come in contact with the separating member of the above separating means. In this case, the water-soluble polymer can come in contact with the cellulose fibers, the thermally flexible toner image and the separating member. The thermally flexible toner image can be separated from the chartaceous material by adhesive force of the separating member without damaging the chartaceous material.

The following Table 8 shows typical water-soluble polymers, but the present invention is not limited to these water-soluble polymers.

TABLE 8

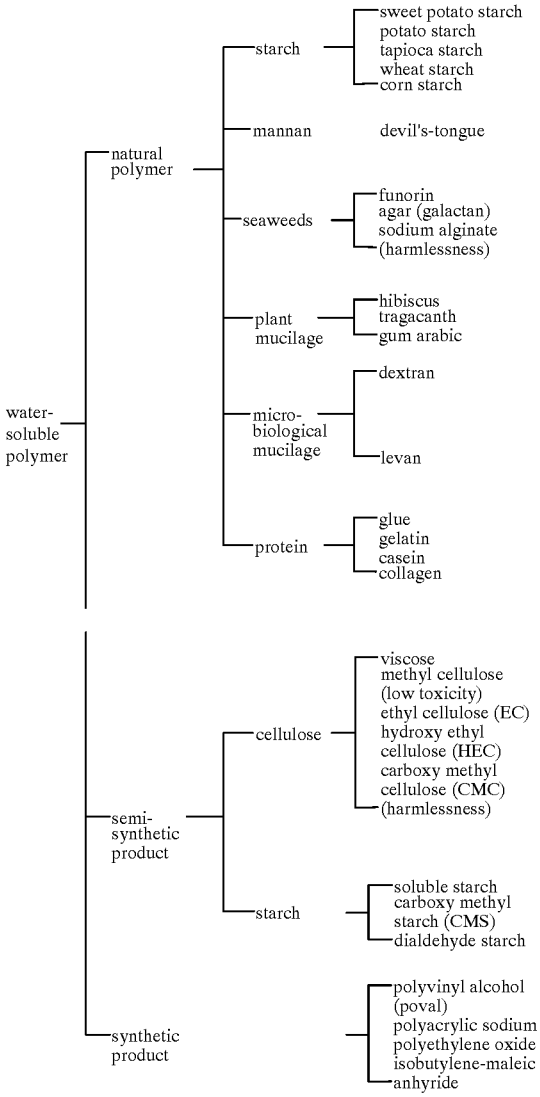

In the present invention, the image supporting member forming a hydrophobic image thereon is impregnated with Water. In particular, a suitable image separating means is used to separate the image from the image supporting member in a state in which water is sufficiently included in the image supporting member by using a surfactant, or the separating member of thermally flexible toner or ink is formed. For example, the suitable image separating means is constructed by a rubber roller for heating pressure and fixing, or an adhesive tape such as a pressure sensitive adhesive tape having a pressure sensitive adhesive layer. When such an image separating means is used, the image can be removed from the image supporting member as a paper layer by the separating member for separation of the thermally flexible toner or ink without almost removing paper fibers from the image supporting member.

In the present invention, resin for forming the separating member for separation of the thermally flexible toner or ink is constructed by toner component resin of the thermally flexible ink or component resin of an adhesive as follows in addition to the above water-soluble polymer.

(1) Toner component resin of thermally flexible ink

For example, the toner component resin of thermally flexible ink is constructed by polystyrene, acrylic resin, methacrylic resin, styrene-butylacrylic copolymer, styrene-butadiene copolymer, polyester, epoxy resin, etc.

(2) Component resin of adhesive

For example, the component resin of an adhesive is constructed by protein resins of glue, gelatin, albumin, casein, etc., carbohydrate resins of starch, cellulose, composite polysaccharide such as gum arabic, tragacanth rubber, etc., thermoplastic resins of polymer and copolymer of vinyl acetate, acrylic, ethylene copolymer, polyamide, polyester, polyurethane, etc., resins of polychloroprene, nitrile rubber, regenerated rubber, SBR, natural rubber, etc.

No kinds of resins are limited if these resins have an adhesive property with respect to an image. Accordingly, the present invention is not limited to the above resins, but water-soluble or non-water-soluble resin can be also used.

Resin forming the above thermally flexible ink separating member can be formed on a surface of another supporting member forming the separating means such as a roller, a sheet, a tape, etc. Otherwise, the separating means can be formed in the shape of a roller, a sheet, a tape, etc. by using only this resin. This thermally flexible ink separating means may be constructed by an adhesive tape having a pressure sensitive adhesive layer of rubber, acrylic, etc. on a supporting member of each of a cellophane adhesive tape, a Kraft paper tape, a polyvinyl chloride tape, an acetate tape, a filament tape.

Each of the above surfactant and the above water-soluble polymer in the present invention is used as a paper sizing agent, etc. in a paper manufacturing industry. Accordingly, no paper surface is damaged by the surfactant or the water-soluble polymer even when the surfactant or the water-soluble polymer is used. Further, the surfactant improves the paper surface when the surfactant in an aqueous solution preferably has a concentration of 0.01% to 20%. The water-soluble polymer also improves the paper surface when the water-soluble polymer in an aqueous solution preferably has a concentration of 0.1% to 20% and more preferably has a concentration of 0.5% to 10%. When the aqueous solution has an excessively high concentration, a sheet of regenerative paper is hardened and becomes adhesive since this paper sheet absorbs water in the air.

Figure 1:
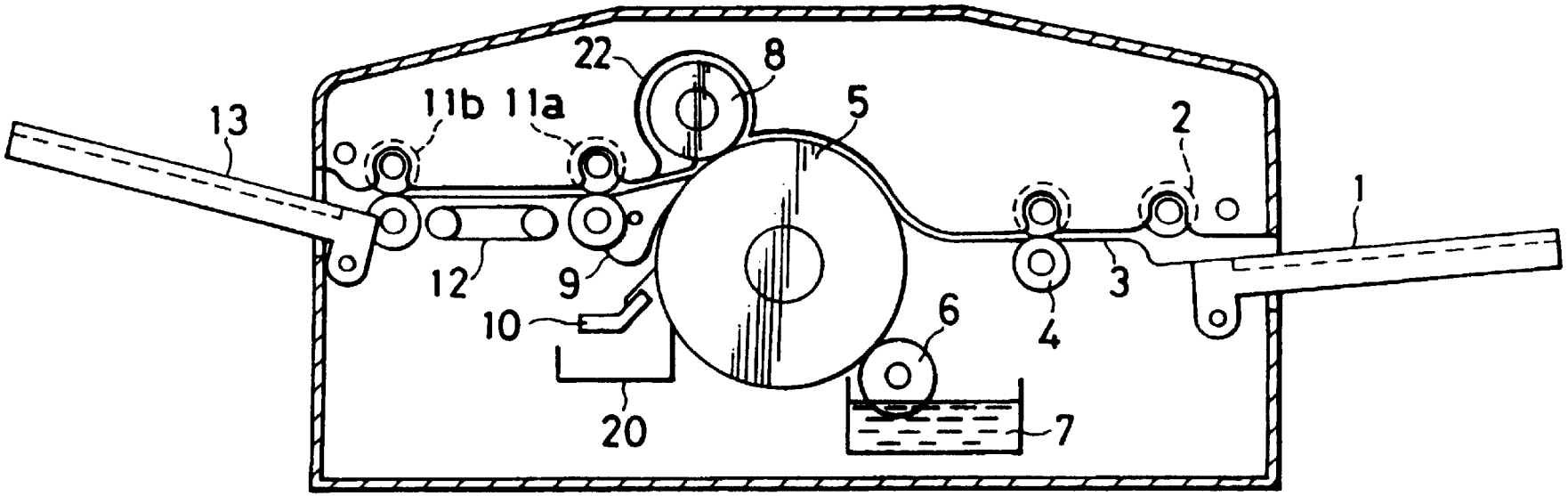
FIG. 1 is a view for explaining an apparatus for regenerating an image holding-supporting member in accordance with one embodiment of the present invention.

A method for regenerating an image holding-supporting member is executed by using a regenerating apparatus of the image holding-supporting member shown in FIG. 1. However, the present invention is not limited to this regenerating apparatus.

The regenerating apparatus has means for coating an image holding-supporting member with at least one kind of separating liquid or aqueous solution including water molecules; the separating liquid or aqueous solution being selected from a group of a liquid including at least water molecules, an aqueous solution including a surfactant, an aqueous solution including a water-soluble polymer, and an aqueous solution including a water-soluble polymer and a surfactant; means for separating a hydrophobic image from a chartaceous material; and means for drying an image supporting member in which the hydrophobic image is separated from the chartaceous material.

As shown in FIG. 1, an image holding-supporting member has a hydrophobic image. Otherwise, an image supporting member can hold a hydrophobic image. The image holding-supporting member or the image supporting member is fed by a paper feed roller 2 from a paper feed tray 1 onto a guide plate 3 and is then fed to a separating roller 5 by conveying rollers 4 from the guide plate 3. A surface of the separating roller 5 is coated with a separating liquid 7 by a liquid supplying roller 6. Thus, the image supporting member fed from the conveying rollers 4 is coated and impregnated with the separating liquid 7. The image supporting member coated and impregnated with the separating liquid 7 comes in contact with a toner separating material. This image supporting member is then heated by a heating roller 8 and comes in press contact with the heating roller 8. Thereafter, the separating material is separated from the image supporting member by a separating claw 9. The separating material is removed from the surface of the separating roller 5 by a toner cleaning portion 10. The surface of the separating roller 5 is again coated with the separating liquid 7. The image supporting member separated by the separating claw 9 has no hydrophobic image on its surface. Accordingly, this image supporting member attains a state in which characters, etc. can be again copied and printed on the image supporting member. This image supporting member able to be recopied and reprinted is then guided onto a drying belt 12 by conveying rollers 11a and is dried. The dried image supporting member having no image is discharged onto a paper discharging tray 13 by conveying rollers 11b so that the image supporting member able to be recopied and reprinted can be finally obtained. In FIG. 1, reference numerals 20 and 22 respectively designate a toner collecting portion and a conveying rib.

Concrete embodiments of the present invention will next be described.

Embodiment 1

A sheet of PPC copying paper unused and having a size A4 is dipped into a starch aqueous solution of a 1% water-soluble polymer and is then dried by a suitable method. Thus, a sheet of copying paper able to be repeatedly used is manufactured.

An image is formed on this dried sheet of copying paper by a PPC copying machine manufactured by e.g., RICHO in Japan as IMAGIO320 FP1. Thereafter, this paper sheet is dipped into an aqueous solution including starch of a 1% water-soluble polymer. Then, a heated rubber roller comes in press contact with a copied image face of the paper sheet. When the sheet of copying paper is then separated from the rubber roller, the image formed on the paper sheet is clearly transferred onto the rubber roller from the paper face. After the paper sheet is fed from the rubber roller, this paper sheet becomes a sheet of plain or solid-color paper having no image thereon. Further, this image is separated from the paper sheet face without almost removing fibers from the paper sheet. Accordingly, the paper sheet has a face equal to that of a sheet of unused copying paper before a copy is made.

When the image is removed from the sheet of copying paper once copied and the paper sheet is dried and reused in the above copying machine, it is possible to obtain a sheet of copying paper having a clear image thereon. Such an operation is repeatedly performed ten times. However, the quality of a copied image on the paper sheet is equal to that on a sheet of copying paper which is not repeatedly used to make a copy.

Embodiment 2

A sheet of PPC copying paper unused and having a size A4 is dipped into an aqueous solution of carboxymethylcellulose (CMC) of a 2% water-soluble polymer and is then dried by a suitable method. Thus, a sheet of copying paper able to be repeatedly used is manufactured.

An image is formed on this dried sheet of copying paper by a PPC copying machine manufactured by e.g., RICHO in Japan as IMAGIO320 FP1. Thereafter, this paper sheet is dipped into an aqueous solution of 1.5% CMC. The image is then removed from the sheet of copying paper by the same manufacturing method as the Embodiment 1 so that a sheet of plain or solid-color paper having no image is manufactured. This solid-color paper sheet has a face equal to that of a sheet of unused copying paper.

When the image is removed from the sheet of copying paper once copied and the paper sheet is dried and reused in the above copying machine, it is possible to obtain a sheet of copying paper having a clear image thereon. Such an operation is repeatedly performed ten times. However, the quality of a copied image on the paper sheet is equal to that on a sheet of copying paper which is not repeatedly used to make a copy.

Embodiment 3

A sheet of PPC copying paper unused and having a size A4 is dipped into a starch aqueous solution of a 1% water-soluble polymer and is then dried by a suitable method. Thus, a sheet of copying paper able to be repeatedly used is manufactured.

An image is formed on each of front and rear faces of this dried sheet of copying paper by a PPC copying machine manufactured by e.g., RICHO in Japan as IMAGIO320 FP1. Thereafter, this paper sheet is dipped into an aqueous solution including starch of a 1% water-soluble polymer. Then, a heated rubber roller sequentially comes in press contact with the front and rear copied image faces of the paper sheet. When the sheet of copying paper is separated from the rubber roller, the images formed on the front and rear faces of the paper sheet are clearly transferred onto the rubber roller from the paper sheet faces. After the paper sheet is fed from the rubber roller, this paper sheet becomes-a sheet of plain or solid-color paper having no image on each of the front and rear faces thereof. Further, this image is separated from each of the front and rear paper sheet faces without almost removing fibers from the paper sheet. Accordingly, the paper sheet has front and rear faces equal to those of a sheet of unused copying paper before a copy is made.

When the images are removed from the sheet of copying paper once copied and the paper sheet is dried and reused in the above copying machine, it is possible to obtain a sheet of copying paper having a clear image on each of front and rear faces thereof. Such an operation is repeatedly performed ten times. However, the quality of a copied image on each of the front and rear faces of the paper sheet is equal to that on each of the front and rear faces of a sheet of copying paper which is not repeatedly used to make a copy.

Embodiment 4

A sheet of PPC copying paper unused and having a size A4 is dipped into an aqueous solution of 1% tonakurin 205 surfactant as a surface active agent manufactured by e.g., NIHON EMULSIFIER in Japan and is then dried by a suitable method. Thus, a sheet of copying paper able to be repeatedly used is manufactured.

An image is formed on this dried sheet of copying paper by a PPC copying machine manufactured by e.g., RICHO in Japan as IMAGIO320 FP1. Thereafter, this paper sheet is dipped into an aqueous solution including starch of a 1% water-soluble polymer. Then, a heated rubber roller comes in press contact with a copied image face of the paper sheet. When the sheet of copying paper is separated from the rubber roller, the image formed on the paper sheet is clearly transferred onto the rubber roller from the paper face. After the paper sheet is fed from the rubber roller, this paper sheet becomes a sheet of plain or solid-color paper having no image thereon. Further, this image is separated from the paper sheet face without almost removing fibers from the paper sheet. Accordingly, the paper sheet has a face equal to that of a sheet of unused copying paper before a copy is made.

When the image is removed from the sheet of copying paper once copied and the paper sheet is dried and reused in the above copying machine, it is possible to obtain a sheet of copying paper having a clear image thereon. Such an operation is repeatedly performed ten times. However, the quality of a copied image on the paper sheet is equal to that on a sheet of copying paper which is not repeatedly used to make a copy.

Embodiment 5

Processing operations in this Embodiment 5 are similar to those in the Embodiment 4 except that a 2% CMC aqueous solution is used instead of the aqueous solution including 1% water-soluble starch in the Embodiment 4. As a result, a face of a sheet of copying paper and the quality of an image thereon are the same as a sheet of copying paper which is not repeatedly used to make a copy.

Embodiment 6

No regenerative processing of a sheet of PPC copying paper is performed in advance in an unused state. An image is then formed on this paper sheet by a PPC copying machine manufactured by e.g., RICHO in Japan as IMAGIO320 FP1. Thereafter, this paper sheet is dipped into water. Then, a heated rubber roller comes in press contact with a copied image face of the paper sheet. When the sheet of copying paper is next separated from the rubber roller, the image formed on the paper sheet is clearly transferred onto the rubber roller from the paper face. After the paper sheet is fed from the rubber roller, this paper sheet becomes a sheet of plain or solid-color paper having no image thereon. This paper sheet is dried so that it is possible to manufacture a sheet of regenerative paper reusable to make a copy.

When the image is removed from the sheet of copying paper once copied and the paper sheet is dried and reused in the above copying machine, it is possible to obtain a sheet of copying paper having a clear image thereon. Such an operation is repeatedly performed ten times. However, the quality of a copied image on the paper sheet is equal to that on a sheet of copying paper which is not repeatedly used to make a copy.

Embodiment 7

Processing operations in this Embodiment 7 are similar to those in the Embodiment 6 except that an aqueous solution of 1% tonakurin 205 surfactant as a surface active agent manufactured by e.g., NIHON EMULSIFIER in Japan is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 8

Processing operations in this Embodiment 8 are similar to those in the Embodiment 6 except that an aqueous solution including 2% starch is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 9

Processing operations in this Embodiment 9 are similar to those in the Embodiment 6 except that an aqueous solution including 2% CMC is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 10

Processing operations in this Embodiment 10 are similar to those in the Embodiment 6 except that an aqueous solution including 1.5% tonakurin 205 surfactant as a surface active agent manufactured by e.g., NIHON EMULSIFIER in Japan and 3% starch of a water-soluble polymer is used instead of water. Thus,-a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 11

Processing operations in this Embodiment 11 are similar to those in the Embodiment 6 except that an aqueous solution including 1.5% tonakurin 205 surfactant as a surface active agent manufactured by e.g., NIHON EMULSIFIER in Japan and 2% CMC of a water-soluble polymer is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 12

An image is formed on a sheet of copying paper by a normal PPC copying machine manufactured by e.g., RICHO in Japan as IMAGIO 320 FP1. Thereafter, this paper sheet is dipped into an aqueous solution including 1% tonakurin 205 surfactant as a surface active agent manufactured by e.g., NIHON EMULSIFIER in Japan. Then, an adhesive face of a cellophane adhesive tape manufactured by e.g., NICHIBAN in Japan comes in press contact with a copied image face of the paper sheet. When the sheet of copying paper is separated from the cellophane adhesive tape, the copied image formed on the paper sheet is clearly transferred onto the adhesive face of the cellophane adhesive tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 13

An image is formed on a sheet of copying paper by a normal PPC copying machine manufactured by e.g., RICHO in Japan as IMAGIO 320 FP1. Then, this paper sheet is dipped into an aqueous solution including 1.5% tonakurin 205 surfactant as a surface active agent manufactured by e.g., NIHON EMULSIFIER in Japan and carboxymethylcellulose (CMC) of a 3% water-soluble polymer. Thereafter, a heated rubber roller comes in press contact with a copied image face of the paper sheet. When the sheet of copying paper is next separated from the rubber roller, the image formed on the paper sheet is clearly transferred onto the rubber roller from the paper face. After this sheet of copying paper is fed from the rubber roller, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 14

An image is formed on a sheet of copying paper by a normal PPC copying machine manufactured by e.g., RICHO in Japan as IMAGIO 320 FP1. Then, this paper sheet is dipped into an aqueous solution including 1.5% tonakurin 205 surfactant as a surface active agent manufactured by e.g., NIHON EMULSIFIER in Japan and carboxymethylcellulose (CMC) of a 3% water-soluble polymer. Thereafter, an adhesive face of a gummed tape comes in press contact with a copied image face of the paper sheet. When the sheet of copying paper is separated from the gummed tape, the image formed on the paper sheet is clearly transferred onto the gummed tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 15

An image is formed on a sheet of copying paper by a normal PPC copying machine manufactured by e.g., RICHO in Japan as IMAGIO 320 FP1. Then, this paper sheet is dipped into an aqueous solution including 1.5% tonakurin 205 surfactant as a surface active agent manufactured by e.g., NIHON EMULSIFIER in Japan and carboxymethylcellulose (CMC) of a 3% water-soluble polymer, Thereafter, a separating member sheet is heated and comes in press contact with a copied image face of the paper sheet. This separating member sheet is constructed by toner component resin of thermally melted or flexible ink having polystyrene, poly-n-butylacrylate and poly-i-butylmethacrylate in a ratio of 10:4:8. When the sheet of copying paper is then separated from the separating member sheet, the image formed on the paper sheet is clearly transferred onto the separating member sheet from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 16

Processing operations in this Embodiment 16 are similar to those in the Embodiment 6 except that an aqueous solution of 0.02% BT-7 surfactant as a surface active agent manufactured by e.g., NIKKO CHEMICALS in Japan is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 17

Processing operations in this Embodiment 17 are similar to those in the Embodiment 6 except that an aqueous solution of 0.05% BT-9 surfactant as a surface active agent manufactured by e.g., NIKKO CHEMICALS in Japan is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 18

Processing operations in this Embodiment 18 are similar to those in the Embodiment 6 except that an aqueous solution of 0.2% BT-12 surfactant as a surface active agent manufactured by e.g., NIKKO CHEMICALS in Japan is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 19

Processing operations in this Embodiment 19 are similar to those in the Embodiment 4 except that an aqueous solution of 0.02% BT-7 surfactant as a surface active agent manufactured by e.g., NIKKO CHEMICALS in Japan is used instead of the tonakurin 205 surfactant. Thus, a sheet of copying paper reusable to make a copy is manufactured by the same manufacturing method as the Embodiment 4. An image is formed on this paper sheet and is then separated from this paper sheet.

When the image is removed from the paper sheet once copied and the paper sheet having no image is dried and reused in the above PPC copying machine, a clear copied image can be formed on this sheet of copying paper. Such an operation is repeatedly performed ten times. However, the quality of a copied image on the paper sheet is equal to that on a sheet of copying paper which is not repeatedly used to make a copy.

Embodiment 20

Processing operations in this Embodiment 20 are similar to those in the Embodiment 4 except that an aqueous solution of 0.05% BT-9 surfactant as a surface active agent manufactured by e.g., NIKKO CHEMICALS in Japan is used instead of the tonakurin 205 surfactant. Thus, a sheet of copying paper reusable to make a copy is manufactured by the same manufacturing method as the Embodiment 4. An image is formed on this paper sheet and is then separated from this paper sheet.

When the image is removed from the paper sheet once copied and the paper sheet having no image is dried and reused in the above PPC copying machine, a clear copied image can be formed on this sheet of copying paper. Such an operation is repeatedly performed ten times. However, the quality of a copied image on the paper sheet is equal to that on a sheet of copying paper which is not repeatedly used to make a copy.

Embodiment 21

Processing operations in this Embodiment 21 are similar to those in the Embodiment 4 except that an aqueous solution of 0.2% BT-12 surfactant as a surface active agent manufactured by e.g., NIKKO CHEMICALS in Japan is used instead of the tonakurin 205 surfactant. Thus, a sheet of copying paper reusable to make a copy is manufactured by the same manufacturing method as the Embodiment 4. An image is formed on this paper sheet and is then separated from this paper sheet.

When the image is removed from the paper sheet once copied and the paper sheet having no image is dried and reused in the above PPC copying machine, a clear copied image can be formed on this sheet of copying paper. Such an operation is repeatedly performed ten times. However, the quality of a copied image on the paper sheet is equal to that on a sheet of copying paper which is not repeatedly used to make a copy.

Embodiment 22

Processing operations in this Embodiment 22 are similar to those in the Embodiment 5 except that an aqueous solution of 0.02% BT-7 surfactant as a surface active agent manufactured by e.g., NIKKO CHEMICALS in Japan is used instead of the tonakurin 205 surfactant. Thus, a sheet of copying paper reusable to make a copy is manufactured by the same manufacturing method as the Embodiment 5. An image is formed on this paper sheet and is then separated from this paper sheet.

When the image is removed from the paper sheet once copied and the paper sheet having no image is dried and reused in the above PPC copying machine, a clear copied image can be formed on this sheet of copying paper. Such an operation is repeatedly performed ten times. However, the quality of a copied image on the paper sheet is equal to that on a sheet of copying paper which is not repeatedly used to make a copy.

Embodiment 23

Processing operations in this Embodiment 23 are similar to those in the Embodiment 5 except that an aqueous solution of 0.05% BT-9 surfactant as a surface active agent manufactured by e.g., NIKKO CHEMICALS in Japan is used instead of the tonakurin 205 surfactant. Thus, a sheet of copying paper reusable to make a copy is manufactured by the same manufacturing method as the Embodiment 5. An image is formed on this paper sheet and is then separated from this paper sheet.

When the image is removed from the paper sheet once copied and the paper sheet having no image is dried and reused in the above PPC copying machine, a clear copied image can be formed on this sheet of copying paper. Such an operation is repeatedly performed ten times. However, the quality of a copied image on the paper sheet is equal to that on a sheet of copying paper which is not repeatedly used to make a copy.

Embodiment 24

Processing operations in this Embodiment 24 are similar to those in the Embodiment 5 except that an aqueous solution of 0.2% BT-12 surfactant as a surface active agent manufactured by e.g., NIKKO CHEMICALS in Japan is used instead of the tonakurin 205 surfactant. Thus, a sheet of copying paper reusable to make a copy is manufactured by the same manufacturing method as the Embodiment 5. An image is formed on this paper sheet and is then separated from this paper sheet.

When the image is removed from the paper sheet once copied and the paper sheet having no image is dried and reused in the above PPC copying machine, a clear copied image can be formed on this sheet of copying paper. Such an operation is repeatedly performed ten times. However, the quality of a copied image on the paper sheet is equal to that on a sheet of copying paper which is not repeatedly used to make a copy.

Embodiment 25

Processing operations in this Embodiment 25 are similar to those in the Embodiment 6 except that an aqueous solution including 0.02% BT-7 surfactant as a surface active agent manufactured by e.g., NIKKO CHEMICALS in Japan and 3% starch of a water-soluble polymer is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 26

Processing operations in this Embodiment 26 are similar to those in the Embodiment 6 except that an aqueous solution including 0.05% BT-9 surfactant as a surface active agent manufactured by e.g., NIKKO CHEMICALS in Japan and 2% CMC of a water-soluble polymer is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 27

Processing operations in this Embodiment 27 are similar to those in the Embodiment 6 except that an aqueous solution including 0.2% BT-12 surfactant as a surface active agent manufactured by e.g., NIKKO CHEMICALS in Japan and 3% starch of a water-soluble polymer is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 28

Processing operations in this Embodiment 28 are similar to those in the Embodiment 6 except that an aqueous solution including 0.02% BT-7 surfactant as a surface active agent manufactured by e.g., NIKKO CHEMICALS in Japan and 2% CMC of a water-soluble polymer is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 29

Processing operations in this Embodiment 29 are similar to those in the Embodiment 6 except that an aqueous solution including 0.05% BT-9 surfactant as a surface active agent manufactured by e.g., NIKKO CHEMICALS in Japan and 3% starch of a water-soluble polymer is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 30

Processing operations in this Embodiment 30 are similar to those in the Embodiment 6 except that an aqueous solution including 0.2% BT-12 surfactant as a surface active agent manufactured by e.g., NIKKO CHEMICALS in Japan and 2% CMC of a water-soluble polymer is used instead of water. Thus, a sheet of regenerative paper reusable to make a copy is manufactured by the same manufacturing method as the Embodiment 6.

A copying operation, an image removing operation and a drying operation are repeatedly performed ten times by using this sheet of regenerative paper and the same manufacturing method as the Embodiments 1 to 6. However, a face of the sheet of regenerative paper and the quality of a copied image thereon are the same as a sheet of copying paper which is not repeatedly used to make a copy.

Embodiment 31

An image is formed on a sheet of copying paper by a normal PPC copying machine manufactured by e.g., RICHO in Japan as IMAGIO 320 FP1. Thereafter, this paper sheet is dipped into an aqueous solution including 0.02% BT-7 surfactant as a surface active agent manufactured by e.g., NIKKO CHEMICALS in Japan. Then, an adhesive face of a cellophane adhesive tape manufactured by e.g., NICHIBAN in Japan comes in press contact with a copied image face of the paper sheet. When the sheet of copying paper is separated from the cellophane adhesive tape, the copied image formed on the paper sheet is clearly transferred onto the adhesive face of the cellophane adhesive tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 32

An image is formed on a sheet of copying paper by a normal PPC copying machine manufactured by e.g., RICHO in Japan as IMAGIO 320 FP1. Then, this paper sheet is dipped into an aqueous solution including 0.02% BT-7 surfactant as a surface active agent manufactured by e.g., NIKKO CHEMICALS in Japan and carboxymethylcellulose (CMC) of a 3% water-soluble polymer. Thereafter, a heated rubber roller comes in press contact with a copied image face of the paper sheet. When the sheet of copying paper is next separated from the rubber roller, the image formed on the paper sheet is clearly transferred onto the rubber roller from the paper face. After this sheet of copying paper is fed from the rubber roller, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 33

An image is formed on a sheet of copying paper by a normal PPC copying machine manufactured by e.g., RICHO in Japan as IMAGIO 320 FP1. Then, this paper sheet is dipped into an aqueous solution including 0.02% BT-7 surfactant as a surface active agent manufactured by e.g., NIKKO CHEMICALS in Japan and carboxymethylcellulose (CMC) of a 3% water-soluble polymer. Thereafter, an adhesive face of a gummed tape comes in press contact with a copied image face of the paper sheet. When the sheet of copying paper is separated from the gummed tape, the image formed on the paper sheet is clearly transferred onto the gummed tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 34

An image is formed on a sheet of copying paper by a normal PPC copying machine manufactured by e.g., RICHO in Japan as IMAGIO 320 FP1. Then, this paper sheet is dipped into an aqueous solution including 0.02% BT-7 surfactant as a surface active agent manufactured by e.g., NIKKO CHEMICALS in Japan and carboxymethylcellulose (CMC) of a 3% water-soluble polymer. Thereafter, a separating member sheet is heated and comes in press contact with a copied image face of the paper sheet. This separating member sheet is constructed by toner component resin of thermally melted or flexible ink having polystyrene, poly-n-butylacrylate and poly-i-butylmethacrylate in a ratio of 10:4:8. When the sheet of copying paper is then separated from the separating member sheet, the image formed on the paper sheet is clearly transferred onto the separating member sheet from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 35

An image is formed on a sheet of copying paper by a normal PPC copying machine manufactured by e.g., RICHO in Japan as IMAGIO 320 FP1. Thereafter, this paper sheet is dipped into an aqueous solution including 0.05% BT-9 surfactant as a surface active agent manufactured by e.g., NIKKO CHEMICALS in Japan. Then, an adhesive face of a cellophane adhesive tape manufactured by e.g., NICHIBAN in Japan comes in press contact with a copied image face of the paper sheet. When the sheet of copying paper is separated from the cellophane adhesive tape, the copied image formed on the paper sheet is clearly transferred onto the adhesive face of the cellophane adhesive tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 36

An image is formed on a sheet of copying paper by a normal PPC copying machine manufactured by e.g., RICHO in Japan as IMAGIO 320 FP1. Then, this paper sheet is dipped into an aqueous solution including 0.05% BT-9 surfactant as a surface active agent manufactured by e.g., NIKKO CHEMICALS in Japan and carboxymethylcellulose (CMC) of a 3% water-soluble polymer. Thereafter, a heated rubber roller comes in press contact with a copied image face of the paper sheet. When the sheet of copying paper is next separated from the rubber roller, the image formed on the paper sheet is clearly transferred onto the rubber roller from the paper face. After this sheet of copying paper is fed from the rubber roller, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 37

An image is formed on a sheet of copying paper by a normal PPC copying machine manufactured by e.g., RICHO in Japan as IMAGIO 320 FP1. Then, this paper sheet is dipped into an aqueous solution including 0.05% BT-9 surfactant as a surface active agent manufactured by e.g., NIKKO CHEMICALS in Japan and carboxymethylcellulose (CMC) of a 3% water-soluble polymer. Thereafter, an adhesive face of a gummed tape comes in press contact with a copied image face of the paper sheet. When the sheet of copying paper is separated from the gummed tape, the image formed on the paper sheet is clearly transferred onto the gummed tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 38

An image is formed on a sheet of copying paper by a normal PPC copying machine manufactured by e.g., RICHO in Japan as IMAGIO 320 FP1. Then, this paper sheet is dipped into an aqueous solution including 0.05% BT-9 surfactant as a surface active agent manufactured by e.g., NIKKO CHEMICALS in Japan and carboxymethylcellulose (CMC) of a 3% water-soluble polymer. Thereafter, a separating member sheet is heated and comes in press contact with a copied image face of the paper sheet. This separating member sheet is constructed by toner component resin of thermally melted or flexible ink having polystyrene, poly-n-butylacrylate and poly-i-butylmethacrylate in a ratio of 10:4:8. When the sheet of copying paper is then separated from the separating member sheet, the image formed on the paper sheet is clearly transferred onto the separating member sheet from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 39

An image is formed on a sheet of copying paper by a normal PPC copying machine manufactured by e.g., RICHO in Japan as IMAGIO 320 FP1. Thereafter, this paper sheet is dipped into an aqueous solution including 0.2% BT-12 surfactant as a surface active agent manufactured by e.g., NIKKO CHEMICALS in Japan. Then, an adhesive face of a cellophane adhesive tape manufactured by e.g., NICHIBAN in Japan comes in press contact with a copied image face of the paper sheet. When the sheet of copying paper is separated from the cellophane adhesive tape, the copied image formed on the paper sheet is clearly transferred onto the adhesive face of the cellophane adhesive tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 40

An image is formed on a sheet of copying paper by a normal PPC copying machine manufactured by e.g., RICHO in Japan as IMAGIO 320 FP1. Then, this paper sheet is dipped into an aqueous solution including 0.2% BT-12 surfactant as a surface active agent manufactured by e.g., NIKKO CHEMICALS in Japan and carboxymethylcellulose (CMC) of a 3% water-soluble polymer. Thereafter, a heated rubber roller comes in press contact with a copied image face of the paper sheet. When the sheet of copying paper is next separated from the rubber roller, the image formed on the paper sheet is clearly transferred onto the rubber roller from the paper face. After this sheet of copying paper is fed from the rubber roller, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 41

An image is formed on a sheet of copying paper by a normal PPC copying machine manufactured by e.g., RICHO in Japan as IMAGIO 320 FP1. Then, this paper sheet is dipped into an aqueous solution including 0.2% BT-12 surfactant as a surface active agent manufactured by e.g., NIKKO CHEMICALS in Japan and carboxymethylcellulose (CMC) of a 3% water-soluble polymer. Thereafter, an adhesive face of a gummed tape comes in press contact with a copied image face of the paper sheet. When the sheet of copying paper is separated from the gummed tape, the image formed on the paper sheet is clearly transferred onto the gummed tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

Embodiment 42

An image is formed on a sheet of copying paper by a normal PPC copying machine manufactured by e.g., RICHO in Japan as IMAGIO 320 FP1. Then, this paper sheet is dipped into an aqueous solution including 0.2% BT-12 surfactant as a surface active agent manufactured by e.g., NIKKO CHEMICALS in Japan and carboxymethylcellulose (CMC) of a 3% water-soluble polymer. Thereafter, a separating member sheet is heated and comes in press contact with a copied image face of the paper sheet. This separating member sheet is constructed by toner component resin of thermally melted or flexible ink having polystyrene, poly-n-butylacrylate and poly-i-butylmethacrylate in a ratio of 10:4:8. When the sheet of copying paper is then separated from the separating member sheet, the image formed on the paper sheet is clearly transferred onto the separating member sheet from the paper face. Thus, this paper sheet becomes a sheet of plain or solid-color paper having no image thereon. When the paper sheet having no image is dried and reused in the above PPC copying machine, a clearcopied image can be formed on this sheet of copying paper.

Such an operation is repeatedly performed five times. However, the quality of a copied image on the paper sheet is equal to that on a new sheet of copying paper which is not repeatedly used to make a copy.

In the present invention, each of a copied hydrophobic image and a printed hydrophobic image is formed on an image holding-supporting member such as a sheet of paper. At least one portion of this image holding-supporting member is constructed by a chartaceous material having cellulose as a principal component. Each of these images can be sufficiently removed from the image holding-supporting member without damaging a paper layer. The image holding-supporting member removing each of the images therefrom constitutes an image supporting member. Accordingly, the image holding-supporting member such as a sheet of paper can be repeatedly used without throwing away the sheet of paper once used so that a consuming amount of paper can be reduced.

Further, as mentioned above, each of the above surfactant and the above water-soluble polymer in the present invention is used as a paper sizing agent, etc. in a paper manufacturing industry. Accordingly, no paper surface is damaged by the surfactant or the water-soluble polymer even when the surfactant or the water-soluble polymer is used. Furthermore, the surfactant improves the paper surface when the surfactant in an aqueous solution preferably has a concentration of 0.01% to 20%. The water-soluble polymer also improves the paper surface when the water-soluble polymer in an aqueous solution preferably has a concentration of 0.1% to 20% and more preferably has a concentration of 0.5% to 10%.

In a regenerating method of an image holding or supporting member in one embodiment of the present invention, at least one portion of the image supporting or holding member is constructed by paper. An image of thermally melted ink as an image forming substance is formed on a paper layer of the image holding member. At least one kind of water or aqueous solution is selected from a group of water, an aqueous solution including a surfactant, an aqueous solution including a water-soluble polymer, and an aqueous solution including a water-soluble polymer and a surfactant. The selected water or aqueous solution is held in the image holding member. Thereafter, the image of the image supporting member is adhered by heating or pressure through an image separating member so that this image is separated from the image supporting member.

The image holding member in this reproducing method is mainly constructed by a sheet of copying or printing paper. However, the present invention is not limited to the copying or printing paper sheet, but the image holding member may be constructed by any member for holding an image thereon. Further, it is not necessary to construct all portions of the image holding member by a paper layer. It is sufficient to construct a layer for holding an image of thermally melted ink by a paper layer. For example, it is possible to construct the image holding member by a laminated material of paper and plastic layers.

The regenerating method in the present invention is characterized in that only an image is removed from a sheet of paper in a state in which the image holding member is impregnated with an aqueous solution, and the image holding member is then regenerated and reused as it is.

Figure 2:
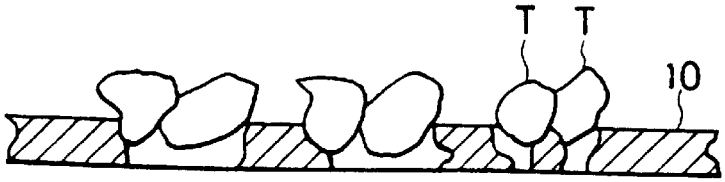
FIG. 2 is a view typically showing a state in which an image is formed on an image holding member such as a sheet of paper.

In a coupling state of the used paper sheet and the image thereon, the image gets on the paper sheet as schematically shown in FIG. 2 although this coupling state is different in accordance with the close property of a used paper tissue.

When paper is impregnated with water or an aqueous solution, this paper generally tends to be flexed. At this time, this water is held on an interface between the paper layer and hydrophobic thermally melted ink held in the paper layer and constituting an image layer. Accordingly, adhesive force between the paper layer and the thermally melted ink is very reduced.

Therefore, the image can be easily removed from the paper layer by using a suitable separating means without damaging the paper layer.

In the regenerating method of the present invention, the above separating means is constructed by a separating member having an adhesive property with respect to the thermally melted ink constituting the image layer. For example, the separating means can be constructed by carrying an adhesive on the supporting member. For example, this adhesive is made of each of the following synthetic resins.

(1) Toner component resin of thermally melted ink

For example, the toner component resin of thermally melted ink is constructed by polystyrene, acrylic resin, methacrylic resin, styrene-butylacrylic copolymer, styrene-butadiene copolymer, polyester, epoxy resin, etc.

(2) Component resin of adhesive

For example, an adhesive for component resin is constructed by each of protein adhesives of glue, gelatin, albumin, casein, etc. This adhesive is also constructed by each of carbohydrate adhesives of starch, cellulose, composite polysaccharide such as gum arabic, tragacanth rubber, etc. This adhesive is also constructed by each of thermoplastic adhesives of polymer and copolymer of vinyl acetate, acrylic, ethylene copolymer, polyamide, polyester, polyurethane, etc. This adhesive is also constructed by each of rubber adhesives of polychloroprene, nitrile rubber, regenerated rubber, SBR, natural rubber, etc. This adhesive is also constructed by each of pressure sensitive adhesives of rubber, acrylic, etc.

No kinds of synthetic resins are limited to the above synthetic resins in the present invention and water-soluble or non-water-soluble resin can be also used.

In the regenerating method of the present invention, wettability of a paper sheet holding an image of the thermally melted ink with respect to water is important to sufficiently impregnate the image holding paper sheet with water for a short time. Further, water must sufficiently permeate a boundary of the image holding paper sheet and the thermally melted ink so as to remove the image from the image holding paper sheet.

There is a surfactant as a surface active agent for making water acceleratedly permeate the paper sheet. For example, the surfactant is constructed by each of anionic surfactants of fatty acid derivative, sulfate, sulfonic acid and phosphate types, etc., cationic surfactants of quaternary ammonium salt, ester bonding amine, quaternary ammonium salt having ether linkage, heterocyclic amine, amine derivative, etc., an amphoteric surfactant, a nonionic surfactant, etc.

In the regenerating method of the present invention, it is desirable to interpose a material acting as a binder between a Surface of the separating member and ink permeating clearances of paper fibers and unable to be easily adhered onto the separating member surface such that this ink is efficiently removed from the clearances and the separating member surface. Such a binder material can be constructed by a water-soluble polymer. The above-mentioned Table 8 shows typical water-soluble polymers, but the present invention is not limited to these water-soluble polymers.

Each of the above surfactant and the above water-soluble polymer is used as a paper sizing agent, etc. in a paper manufacturing industry. Accordingly, no paper surface is damaged by the surfactant or the water-soluble polymer even when the surfactant or the water-soluble polymer is used. Further, the surfactant improves the paper surface when the surfactant in an aqueous solution preferably has a concentration of 0.1% to 20% and more preferably has a concentration of 0.5% to 10%. The water-soluble polymer also improves the paper surface when the water-soluble polymer in an aqueous solution preferably has a concentration of 0.1% to 20% and more preferably has a concentration of 0.5% to 10%. When the aqueous solution has an excessively high concentration, a sheet of regenerative paper is hardened and becomes adhesive since this paper sheet absorbs water in the air.

In the regenerating method of the present invention, the image holding member forming an image thereon is impregnated with water. In particular, a suitable image separating means is used to separate the image from the image holding member as a paper layer in a state in which water is sufficiently included in the image holding member by using a surfactant. Otherwise, the suitable image separating means is used to separate the image from the image holding member as a paper layer in a state in which the water-soluble polymer is interposed between the thermally melted ink and the separating member as mentioned above. For example, the suitable image separating means is constructed by a rubber roller for heating pressure and fixing, or a pressure sensitive adhesive tape having an adhesive or cohesive layer. When such an image separating means is used, the image can be removed from the image holding member as a paper layer without almost removing paper fibers from the image holding member. For example, the above pressure sensitive adhesive tape is constructed by a cellophane tape, a Kraft paper adhesive tape, a polyvinyl chloride tape, an acetate tape, a filament reinforcing tape, etc. in accordance with kinds of basic films. The image is formed on the image holding member in a state in which the image holding member is impregnated with water, a surfactant, a water-soluble polymer, etc. as mentioned above. The image can be similarly separated from the image holding member by heating adhesion or pressure adhesion through a thermally melted separating member constructed by the above component resin of an adhesive. In particular, the above image can be more efficiently separated from the image holding member when an aqueous solution including a surfactant mentioned above, an aqueous solution including a water-soluble polymer, or an aqueous solution including a water-soluble polymer and a surfactant is held in the image holding member before formation of the image.

In the regenerating method of the image holding member in this embodiment, for example, a copied or printed image is formed on at least one portion of the image holding member constructed by paper. Thermally melted ink is simply removed from the image holding member without damaging a paper layer of the image holding member, thereby regenerating the image holding member. Accordingly, a sheet of used paper can be repeatedly reused without throwing it away so that a consuming amount of paper can be reduced.

At least one portion of the image holding member forming the image thereon is constructed by paper and the image of thermally melted ink can be formed on the paper layer. At least one kind of aqueous solution is selected from a group of water, an aqueous solution including a surfactant, an aqueous solution including a water-soluble polymer, and an aqueous solution including a water-soluble polymer and a surfactant and is held in the image holding member. Thereafter, this image holding member is dried and an image is formed on this dried image holding member. In this case, the thermally melted ink can be more preferably removed from the image holding member.

Concrete examples of the regenerating method in the present invention will next be explained.

[Concrete example 1]

An image is formed on a sheet of copying paper by a normal PPC copying machine manufactured by e.g., RICHO in Japan as IMAGIO 320 FP1. Then, this paper sheet is dipped into water. Thereafter, a heated rubber roller comes in press contact with a copied image face of the paper sheet. When the sheet of copying paper is next separated from the rubber roller, the image formed on the paper sheet is clearly transferred onto the rubber roller from the paper face. After this sheet of copying paper is fed from the rubber roller, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

[Concrete example 2]

The same regenerating method as the Concrete example 1 is used except for that an aqueous solution including 1% tonakurin 205 surfactant manufactured by e.g., NIHON EMULSIFIER in Japan is used instead of water in the Concrete example 1. An image is formed on a sheet of copying paper and is removed from this paper sheet. Such image forming and removing operations are performed five times.

Although the image forming and removing operations have been performed five times, the quality of a copied image on the paper sheet is equal to that on a new sheet of copying paper which is not repeatedly used to make a copy.

[Concrete example 3]

The same regenerating method as the Concrete example 1 is used except for that an aqueous solution including 2% starch is used instead of water in the Concrete example 1. An image is formed on a sheet of copying paper and is removed from this paper sheet. Such image forming and removing operations are performed five times.

Although the image forming and removing operations have been performed five times, the quality of a copied image on the paper sheet is equal to that on a new sheet of copying paper which is not repeatedly used to make a copy.

[Concrete example 4]

The same regenerating method as the Concrete example 1 is used except for that an aqueous solution including 1.5% tonakurin 205 surfactant manufactured by e.g., NIHON EMULSIFIER in Japan and 3% starch of a water-soluble polymer is used instead of water in the Concrete example 1. An image is formed on a sheet of copying paper and is removed from this paper sheet. Such image forming and removing operations are performed five times.

Although the image forming and removing operations have been performed five times, the quality of a copied image on the paper sheet is equal to that on a new sheet of copying paper which is not repeatedly used to make a copy.

[Concrete example 5]

An image is formed on a sheet of copying paper by a normal PPC copying machine manufactured by e.g., RICHO in Japan as IMAGIO 320 FP1. Thereafter, this paper sheet is dipped into an aqueous solution including 1% tonakurin 205 surfactant as a surface active agent manufactured by e.g., NIHON EMULSIFIER in Japan. Then, an adhesive face of a cellophane adhesive tape manufactured by e.g., NICHIBAN in Japan comes in press contact with a copied image face of the paper sheet. When the sheet of copying paper is then separated from the cellophane adhesive tape, the copied image formed on the paper sheet is clearly transferred onto the adhesive face of the cellophane adhesive tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

[Concrete example 6]

An image is formed on a sheet of copying paper by a normal PPC copying machine manufactured by e.g., RICHO in Japan as IMAGIO 320 FP1. Then, this paper sheet is dipped into an aqueous solution including 1.5% tonakurin 205 surfactant as a surface active agent manufactured by e.g., NIHON EMULSIFIER in Japan and carboxymethylcellulose (CMC) of a 3% water-soluble polymer. Thereafter, a heated rubber roller comes in press contact with a copied image face of the paper sheet. When the sheet of copying paper is next separated from the rubber roller, the image formed on the paper sheet is clearly transferred onto the rubber roller from the paper face. After this sheet of copying paper is fed from the rubber roller, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

[Concrete example 7]

An image is formed on a sheet of copying paper by a normal PPC copying machine manufactured by e.g., RICHO in Japan as IMAGIO 320 FP1. Then, this paper sheet is dipped into an aqueous solution including 1.5% tonakurin 205 surfactant as a surface active agent manufactured by e.g., NIHON EMULSIFIER in Japan and carboxymethylcellulose (CMC) of a 3% water-soluble polymer. Thereafter, an adhesive face of a gummed tape comes in press contact with a copied image face of the paper sheet. When the sheet of copying paper is then separated from the gummed tape, the image formed on the paper sheet is clearly transferred onto the gummed tape from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

[Concrete example 8]

An image is formed on a sheet of copying paper by a normal PPC copying machine manufactured by e.g., RICHO in Japan as IMAGIO 320 FP1. Then, this paper sheet is dipped into an aqueous solution including 1.5% tonakurin 205 surfactant as a surface active agent manufactured by e.g., NIHON EMULSIFIER in Japan and carboxymethylcellulose (CMC) of a 3% water-soluble polymer. Thereafter, a separating member sheet is heated and comes in press contact with a copied image face of the paper sheet. This separating member sheet is constructed by toner component resin of thermally melted ink having polystyrene, poly-n-butylacrylate and poly-i-butylmethacrylate in a ratio of 10:4:8. When the sheet of copying paper is then separated from the separating member sheet, the image formed on the paper sheet is clearly transferred onto the separating member sheet from the paper face. Thus, this paper sheet becomes a sheet of plain or solid-color paper having no image thereon. When the paper sheet having no image is dried and reused in the above PPC copying machine, a clear copied image can be formed on this sheet of copying paper.

Such an operation is repeatedly performed five times. However, the quality of a copied image on the paper sheet is equal to that on a new sheet of copying paper which is not repeatedly used to make a copy.

[Concrete example 9]

An image is formed on a sheet of copying paper by a normal PPC copying machine manufactured by e.g., RICHO in Japan as IMAGIO 320 FP1. Then, this paper sheet is dipped into an aqueous solution including water, a solvent and a surfactant. This aqueous solution includes a solvent, but no image ink is dissolved by this solvent. This solvent is used to easily separate the image ink from the paper sheet by impregnating the image ink with this solvent. After the paper sheet is dipped into the aqueous solution, a resin or rubber roller comes in press contact with a copied image face of the paper sheet in a state in which the paper sheet is impregnated with the aqueous solution. This resin roller is constructed by a material of the same composition as the image ink or toner. When the sheet of copying paper is next separated from the rubber roller, the image formed on the paper sheet is clearly transferred onto the resin roller from the paper face. After the sheet of copying paper is fed from the resin roller, this paper sheet becomes a sheet of plain or solid-color paper having no image thereon. This paper sheet having no image can be supplied to the copying machine capable of performing a copying operation at a speed of 20 sheets/minute. When the paper sheet having no image is dried and reused in the above PPC copying machine, a clear copied image can be formed on this sheet of copying paper. Such an operation is repeatedly performed five times. However, the quality of a copied image on the paper sheet is equal to that on a new sheet of copying paper which is not repeatedly used to make a copy.

One example of an apparatus for executing the regenerating method of an image holding member in the above embodiment will next be explained with reference to FIG. 3.

Figure 3:
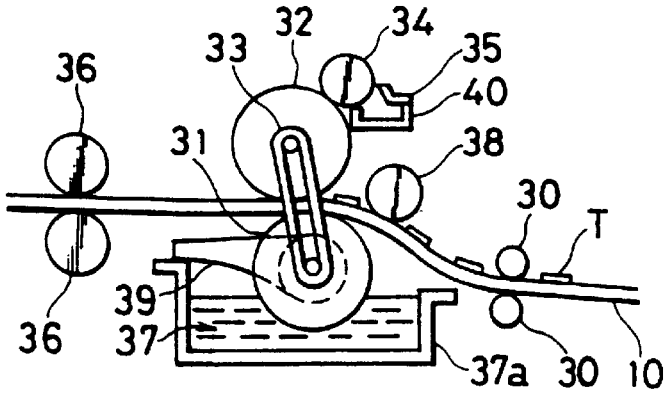
FIG. 3 is a view showing a separating mechanism of a sheet of paper having an image on one side face thereof.

FIG. 3 shows an apparatus for regenerating an image holding member. This regenerating apparatus has a pair of paper feed rollers 30, 30, a water-including roller 31, an image separating-heating roller 32, a roller pressure adjuster 33, an image constructional component collecting roller 34, a scraping claw 35 for scraping off an image constructional component, a pair of calender rollers 36, 36, etc.

Each of the paper feed rollers 30, 30 is a roller for conveying a sheet 10 of paper stocked in advance in an unillustrated tray, etc. or manually supplied. The water-including roller is a roller for impregnating the paper sheet 10 with water or an aqueous solution 37 including a surfactant, etc. stored within a container 37a. The water-including roller 31 is preferably constructed by a rubber roller or a grooved roller, etc. In the example shown in FIG. 3, an auxiliary roller 38 for impregnating the paper sheet with the aqueous solution, etc. is arranged such that this auxiliary roller 38 is opposed to this water-including roller 31.

The above image separating-heating roller 32 is constructed by a material for making an image constructional component tend to be easily attached onto at least a surface of this roller 32 in comparison with a sheet of. paper including water. The image constructional component can be reversely transferred onto this roller 32 in comparison with the paper sheet.

The roller pressure adjuster 33 constructs a means for adjusting a roller pressure between the water-including roller 31 and the image separating-heating roller 32. For example, such an adjusting means is constructed by a sheet belt. When an image is separated from the paper sheet by using the image separating-heating roller 32, it is necessary to adjust pressures between the above rollers together with a heating temperature and a rotational speed of the image separating-heating roller 32 so as to efficiently separate the image from the paper sheet. The roller pressure adjuster 33 is used to adjust these pressures.

For example, the image constructional component collecting roller 34 is constructed by a material for making the image constructional component tend to be easily attached onto this collecting roller 34 in comparison with the image separating-heating roller 32. Such a material is constructed by using rubber, plastic, a metal such as aluminum, etc. The image constructional component collecting roller 34 also functions as a heating roller preferably. A sheet belt can be used instead of this collecting roller 34. In the example shown in FIG. 3, the image constructional component attached onto the image constructional component collecting roller 34 is scraped off by the scraping claw 35 having an end tip portion coming in contact with the image constructional component collecting roller 34. The scraped image constructional component is collected into the collecting container 37a.

The pair of calender rollers 36, 36 are used to remove wrinkles, etc. from the paper sheet processed with respect to the image separation and restore a rough paper face caused at a processing time of the image separation. Further, for example, each of the calender rollers 36, 36 also functions as a feed roller for directly feeding a sheet of regenerative paper to the next operating system such as a paper storing device or a copying machine.

In the example shown in FIG. 3, a plurality of pick-off claws 39 are arranged to pick off a sheet of paper tending to be wound and drawn from the image separating-heating roller 32 to a watery constructional portion.

Another example of the regenerating apparatus for executing the regenerating method of an image holding member in the above embodiment will next be explained with reference to FIG. 4.

Figure 4:
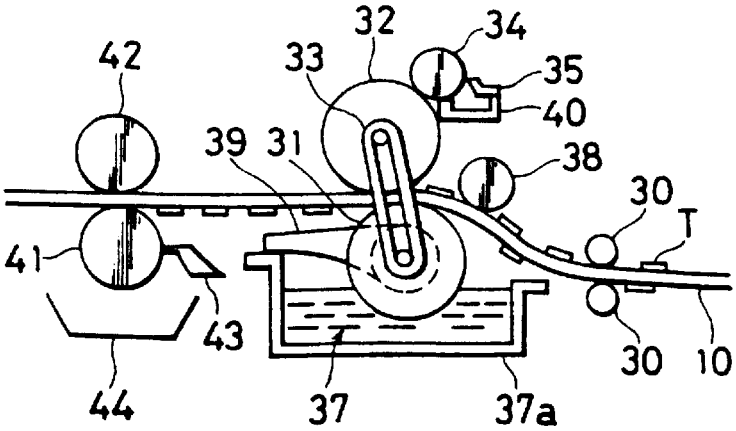
FIG. 4 is a view showing a separating mechanism of a sheet of paper having an image on each of both side faces thereof.

The regenerating apparatus of an image holding member shown in FIG. 4 regenerates a sheet of used paper forming images on both side faces thereof. A basic construction of this regenerating apparatus is similar to that shown in FIG. 3. An image is separated from one side face of the paper sheet by an image separating-heating roller 33 and another image is separated from the other side face of the paper sheet by a separating roller 41. In the example shown in FIG. 4, a scraping claw 43 for scraping off an image constructional component and a collecting container 44 for collecting the scraped image constructional component are also arranged with respect to the separating roller 41. Further, a backup roller 42 is arranged such that this backup roller 42 is opposed to the separating roller 41.

In the regenerating apparatus shown in each of FIGS. 3 and 4, an image reversely transferred to each of the image separating-heating roller 32 and the separating roller 41 is scraped off by the scraping claw 35 for the image constructional component and is collected within a collecting container 40. Thus, it is possible to collect toner, paint, etc. constituting the image.

Figure 5:
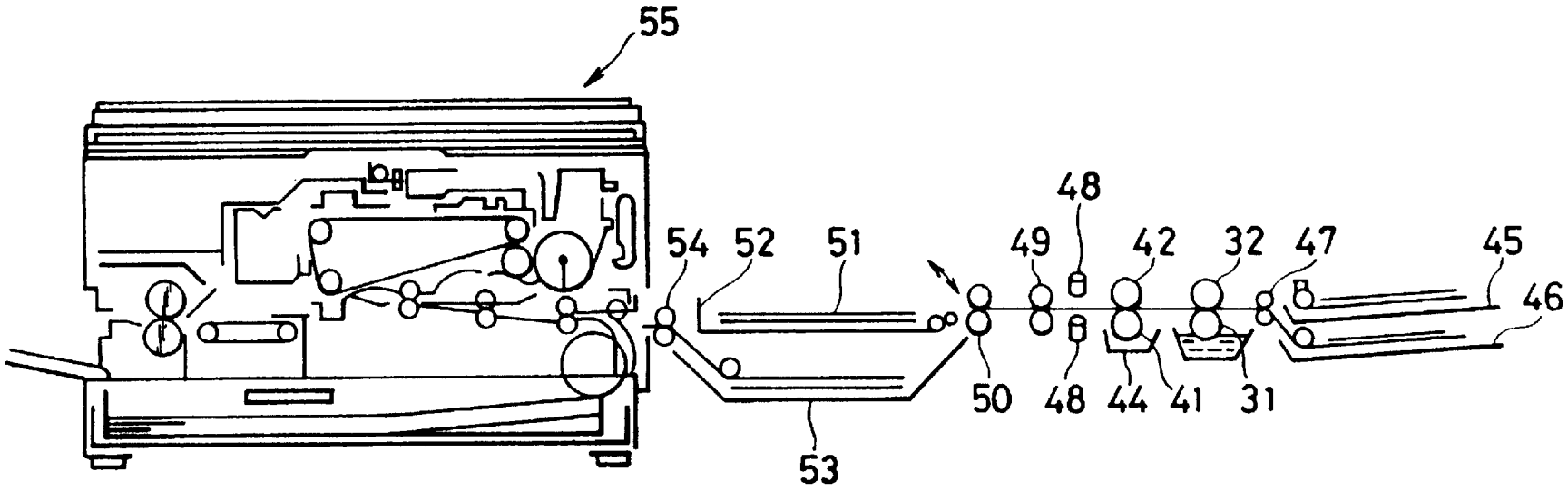
FIG. 5 is a view showing a separating mechanism of a sheet of copied paper and a copying machine using a sheet of regenerative coping paper supplied by this separating mechanism.

FIG. 5 shows an apparatus for mainly regenerating a sheet of used copying paper having an image layer formed by making a double-sided copy. This regenerating apparatus separates an image from the paper sheet and directly supplies the sheet of regenerative paper to a copying machine.

Sheets of paper are separately discriminated from each other and are stored into stockers 45 and 46 in advance in accordance with a single-sided copy or a double-sided copy and paper sizes. The sheets of paper are fed by a feed roller 47 from the stockers 45 and 46. The sheets of paper according to the single-sided copy, the double-sided copy and the paper sizes can be simultaneously discriminated from each other together with a paper feeding operation by using the feed roller 47 constructed such that the feed roller 47 has a sensor function for discriminating these paper sheets from each other. The feed roller 47 having this sensor function may also have functions for detecting a feed speed of a paper sheet, a printing width of an image, a printing position, etc. Based on information obtained from such sensor functions, it is possible to control an impregnating width or position of water or an aqueous solution by the water-including roller 32. It is also possible to control a heating source width and a heating source position of the image separating-heating roller 32 and/or the separating roller 41. Further, it is possible to control a rotational speed of the separating roller 41, etc. Energy saving of the regenerating apparatus can be attained by performing such control operations. Further, no image is separated from a constructional portion having no image layer so that no paper is damaged. The paper sheet can be fed from each of the stockers 45 and 46 on the basis of information such as a paper size emitted from a copying machine 55.

A detailed construction of an image separating portion is shown in FIG. 4. Separating state detecting sensors 48, 48 are arranged on both side faces of the paper sheet to mainly detect separating states of images on front and rear faces of the paper sheet. The separating state detecting sensors 48, 48 are also used to detect a state in which the front and rear faces of a single-sided copied paper sheet are turned upside down and this paper sheet is fed.

The calender rollers 49, 49 are not necessarily required. However, wrinkles or a rough paper face is sometimes caused in the image separation. When such a wrinkle or rough face state is detected by each of the separating state detecting sensors 48, 48, the wrinkles or the rough paper face can be calendered and restored by each of the calender rollers 49, 49. It is effective to restore the wrinkles or the rough paper face while the wrinkles or the rough paper face is heated and/or water vapor, etc. are supplied to the wrinkles or the rough paper face.

A guide claw 50 ejects a sheet of paper judged by each of the separating state detecting sensors 48, 48 as a defective sheet 51 with respect to a separating state. The guide claw 50 stores this ejected paper sheet 51 to one stocker 52 for ejected paper sheets. An image is separated from the paper sheet and this sheet of regenerative paper is stored into the other stocker 53. This paper sheet is resupplied to the copying machine 55 by a feed-out roller 54.

In the following embodiment, the present invention is applied to a toner removing device. In this embodiment, an image holding member has a fibrous surface and an image forming substance is stably formed on this fibrous surface. A regenerating apparatus of the image holding member in the present invention removes the image forming substance from the image holding member. In this embodiment, a stable adhesive state of the image forming substance on the fibrous surface is changed to an unstable state. A separating member comes in close contact with the image forming substance having adhesive force reduced on the fibrous surface so that the image forming substance is removed from the fibrous surface. The toner removing device removes thermally melted toner as the image forming substance from a sheet of transfer paper as the image holding member forming an image thereon by an electrophotographic copying machine of a transfer type. One example of an entire construction of the toner removing device will first be explained.

Figure 6:
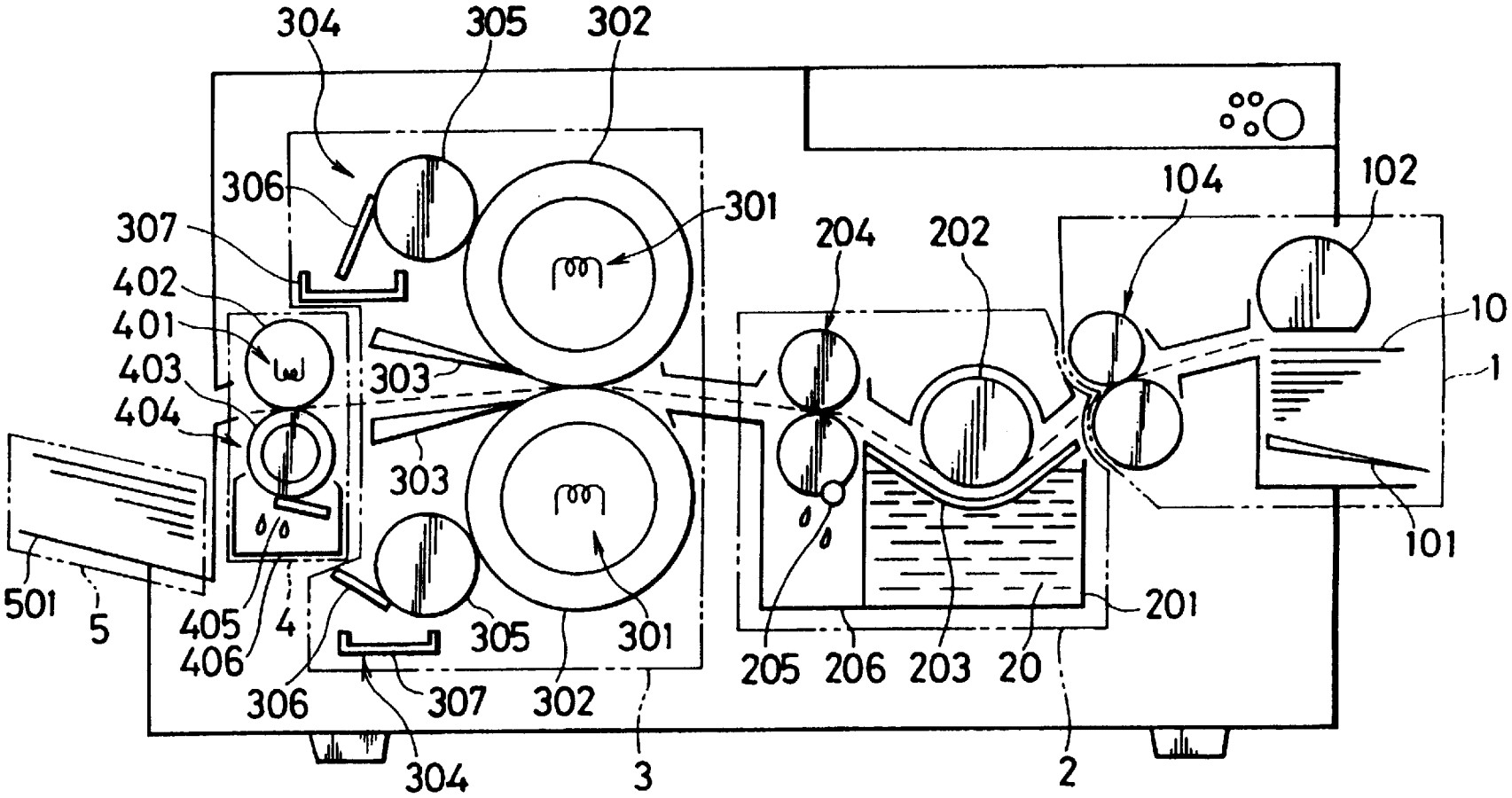
FIG. 6 is a view showing the schematic construction of a toner removing device in accordance with one embodiment of the present invention.

In FIG. 6, this toner removing device has a paper feed unit 1, a liquid supplying unit 2, a toner separating unit 3, a drying unit 4 and a paper receiving unit 5. Sheets 10 of transfer paper forming toner images thereon are stored in the paper feed unit 1 in a stacked state. The paper feed unit 1 separates these paper sheets from each other one by one and feeds each of the paper sheets. The liquid supplying unit 2 supplies a liquid to a sheet 10 of transfer paper fed from the paper feed unit 1. The toner separating unit 3 removes toner from this paper sheet 10 having the liquid. The drying unit 4 dries the paper sheet 10 removing the toner therefrom. The paper receiving unit 5 receives the transfer paper sheet 10 discharged from the drying unit 4. In this toner removing device, an unstabilizing processing liquid 20 for unstabilizing an attaching state of the transfer paper sheet 10 and the toner is supplied to the transfer paper sheet 10 by the liquid supplying unit 2. Thus, the processing liquid 20 permeates at least an interfacial portion between the transfer paper sheet 10 and the toner. The toner is then separated from the transfer paper sheet 10 by separating rollers 302 of the toner separating unit 3 in a state in which the attachment of the toner and the transfer paper sheet 10 is unstable. Thereafter, the transfer paper sheet 10 is dried by the drying unit 4 and can be reused.

The above processing liquid 20 can be constructed by using at least one kind of water or aqueous solution selected from a group of water, an aqueous solution including a water-soluble polymer, an aqueous solution including a surfactant, and an aqueous solution including a water-soluble polymer and a surfactant. A predetermined organic solvent can be included in this selected water or aqueous solution. The processing liquid 20 can be also constructed by using only the organic solvent.

The water-soluble polymer can be constructed by using each of water-soluble polymers described in the Table 1 in association with the above-mentioned embodiment of the regenerating method of the image holding member. However, the present invention is not limited to the water-soluble polymers shown in the Table 1.

For example, the above surfactant is normally constructed by an anionic surfactant such as fatty acid derivative, carboxylate, sulfonate, sulfate, phosphate, phosphonate, etc. The above surfactant is also constructed by a cationic surfactant such as amine salt, quaternary ammonium salt, ester bonding amine, quaternary ammonium salt having ether linkage, heterocyclic amine, amine derivative, benzal conium salt, benzethonium chloride, pyridinium salt, imidazolinium salt, sulfonium salt, polyethylene-polyamine, etc. The above surfactant is also constructed by an amphoteric surfactant such as amino acid, carboxybetaine, sulfobetaine, amino sulfate, amino carboxylate, imidazoline derivative, etc. The above surfactant is also constructed by a nonionic surfactant of ether type, ether-ester type, ester type, nitrogen-including type, polyhydric alcohol, amino alcohol, polyethylene glycol, etc. The above surfactant is also constructed by a fluorosurfactant, etc. However, the present invention is not limited to these surfactants.

The above organic solvent included in water or an aqueous solution is constructed by turpentine, dipentene, butyl acetate, carbon tetrachloride, Cellosolve acetate, xylene, toluene, ethyl acetate, diacetone alcohol, methyl Cellosolve acetate, benzene, methyl ethyl ketone, methyl acetate, methylene chloride, ethylene dichloride, cyclohexane, Cellosolve, dioxane, acetone, methyl Cellosolve, cyclohexanol, butanol, etc. However, the present invention is not limited to these organic solvents.

When only the organic solvent is independently used as the processing liquid, the organic solvent is constructed by a hydrocarbon solvent such as hexane, heptane, octane, nonane, spirit, naphtha Nos. 1 to 6 (trade name of SHELL OIL corporation), isopar E, L, K, V (trade name of EXON corporation), ip-solvent (trade name of IDEMITSU OIL Co., Ltd.), shell-sol 70, 71, solbesso 100, 150 (trade name of SHELL OIL corporation), ascom OMS, 460 (trade name of SPIRITS Co., Ltd.), begasol 1030, 2130, 3040 (trade name of MOBIL OIL Co., Ltd.), etc. Further, this organic solvent is constructed by a fluorosolvent such as florinate FC40, 43, 70, 77 (trade name of SUMITOMO 3M Co., Ltd.), afludo E10, 16, 18, etc., a silicon solvent such as sin-etsu silicon KF96 (trade name), tohre silicon SH200, 344 (trade name), toshiba silicon TSF431 (trade name), etc. However, the present invention is not limited to these solvents.

The paper feed unit 1, the liquid supplying unit 2, the toner separating unit 3, the drying unit 4 and the paper receiving unit 5 shown in FIG. 6 will next be explained in detail.

The paper feed unit 1 feeds sheets 10 of transfer paper stacked on a bottom plate 101 from an uppermost sheet by a paper feed roller 102. An unillustrated separating mechanism separates overlapped sheets of transfer paper from each other. Thus, the paper feed unit 1 feeds one sheet 10 of transfer paper to a pair of resist rollers 104 for timing adjustment and skew correction of the paper sheet. Concrete construction and operation of this paper feed unit 1 are similar to those in a paper feed mechanism in an electrophotographic copying machine. Accordingly, a detailed explanation of the construction and operation of the paper feed unit 1 is omitted in the following description.

The liquid supplying unit 2 has a liquid container 201, a liquid interior conveying roller 202, an unillustrated driving portion of the liquid interior conveying roller 202, a liquid interior guide plate 203, a pair of drawing rollers 204, a drawing bar 205, etc. The liquid container 201 is filled with a predetermined amount of the processing liquid 20. The liquid interior conveying roller 202 guides and conveys the transfer paper sheet 10 into the processing liquid 20 of the liquid container 201 while the liquid interior conveying roller 202 comes in contact with one face of the transfer paper sheet 10. This one face of the transfer paper sheet 10 is set to an upper face in FIG. 6. The liquid interior guide plate 203 guides the other face of the transfer paper sheet 10 as a lower face into the processing liquid 20 of the liquid container 201. The pair of drawing rollers 204 also function as a means for supporting and conveying the transfer paper sheet. The drawing bar 205 is arranged such that the drawing bar 205 is buried into a lower drawing roller 204. In this liquid supplying unit 2, the transfer paper sheet 10 fed from the paper feed unit 1 is guided into the processing liquid 20 of the liquid container 201 by the liquid interior conveying roller 202 and the liquid interior guide plate 203. After the transfer paper sheet 10 is dipped into the processing liquid 20, a surplus amount of the processing liquid is removed from the transfer paper sheet 10 by the pair of drawing rollers 204. The transfer paper sheet 10 is then conveyed to the next toner separating unit 3. In this example, the transfer paper sheet 10 directly passes through the processing liquid so that the processing liquid is supplied to the transfer paper sheet 10. However, instead of this liquid supplying method, a surface of the transfer paper sheet 10 may be coated with the processing liquid by a coating roller. Otherwise, the processing liquid may be sprayed and attached onto a surface of the transfer paper sheet 10 by a sprayer. Another arbitrary method for supplying the processing liquid to the transfer paper sheet can be also used. The liquid supplying unit 2 is changed in various kinds of modifications as described later.

The toner separating unit 3 has a pair of separating rollers 302 as a pair of separating members, a separating claw 303, a cleaner 304, an unillustrated driving section, etc. Each of the separating rollers 302 has a heating lamp 301 therein as a means for softening toner T. The separating rollers 302 are arranged in a state in which the separating rollers 302 come in press contact with each other. The separating claw 303 is arranged such that the separating claw 303 comes in contact with a surface of each of the separating rollers 302 in the vicinity of a press contact portion thereof on a discharging side of the transfer paper sheet. The cleaner 304 cleans the surface of each of the separating rollers 302.

The surface of each of the separating rollers 302 is constructed such that adhesive force on the surface of each of the separating rollers 302 with respect to at least the softened toner is greater than adhesive force between the transfer paper sheet 10 and this softened toner. Concretely, the surface of each of the separating rollers 302 can be constructed by component resin equal to or similar to this toner, component resin of an adhesive, etc. The surface of each of the separating rollers 302 can be constructed by using a metallic material including aluminum, copper, nickel, ion, etc. However, no surface of each of the separating rollers 302 is limited to these materials. Further, the above resin may be constructed by water-soluble or non-water-soluble resin.

The toner component resin is constructed by polystyrene resin, acrylic resin, methacrylic resin, styrene-butylacrylic copolymer, styrene-butadiene copolymer, polyester resin, epoxy resin, etc. However, no toner component resin is limited to these resins.

For example, an adhesive for component resin is constructed by each of protein adhesives of glue, gelatin, albumin, casein, etc. This adhesive is also constructed by each of carbohydrate adhesives of starch, cellulose, composite polysaccharide such as gum arabic, tragacanth rubber, etc. This adhesive is also constructed by each of thermoplastic adhesives of polymer and copolymer of vinyl acetate, acrylic, ethylene copolymer, polyamide, polyester, polyurethane, etc. This adhesive is also constructed by each of rubber adhesives of polychloroprene, nitrile rubber, regenerated rubber, SBR, natural rubber, etc. This adhesive is also constructed by each of pressure sensitive adhesives of rubber, acrylic, etc. Further, this adhesive is constructed by polyethylene terephthalate (PET) having dispersed titanium oxide. However, this adhesive for component resin is not limited to these adhesives.

When each of the above resins is used as the component resin, it is desirable to provide a multiple layer structure composed of at least two layers of a supporting member and a surface layer so as to prevent the component resin from being extended by tension, heat, etc. and improve durability of the component resin. Namely, when a separating member is formed in the shape of a roller as shown in the example illustrated in FIG. 6, the separating member is desirably constructed by forming a surface layer made of the component resin on a roller-shaped basic member such as a rubber roller. The separating member can be formed in the shape of a belt or a cut sheet. The shape of the separating member is divided in accordance with kinds of the supporting member for directly supporting the component resin. The separating member can be constructed by a pressure sensitive adhesive tape having a sticky adhesive layer. For example, the pressure sensitive adhesive tape is constructed by a cellophane tape, a Kraft paper adhesive tape, a polyvinyl chloride tape, an acetone tape, a filament reinforcing tape, etc.

The heating lamp 301 within each of the upper and lower separating rollers 302 heats and softens toner coming in close contact with front and rear faces of the transfer paper sheet 10 and fixed to this transfer paper sheet 10 such that this toner are easily separated from fibers of the transfer paper sheet 10. Accordingly, it is desirable to heat the toner to such an extent that no toner on the transfer paper sheet 10 is melted in a press contact portion of each of the separating rollers 302. When the toner is melted, it is difficult to transfer the toner onto each of the separating rollers 302 without separating the toner on the transfer paper sheet 10 onto paper and separating roller sides. When the toner is excessively heated, the transfer paper sheet 10 is excessively dried while the transfer paper sheet 10 passes through the press contact portion of the pair of separating rollers 302. Accordingly, fixing force of the toner with respect to the dried transfer paper sheet 10 is increased in comparison with a case in which the transfer paper sheet 10 is wet. Therefore, there is a fear that the transfer paper sheet 10 is stuck to each of the separating rollers 302 through the toner and cannot be separated from each of the separating rollers 302 by the above separating claw 303. Accordingly, it is desirable to heat the toner to such an extent that moisture is slightly left in the transfer paper sheet 10 and reattachment of the toner can be prevented after the transfer paper sheet 10 has passed through a heating portion of the pair of separating rollers 502.

The above cleaner 304 has a cleaning roller 305, a scraper blade 306, a toner receiver or container 307. The cleaning roller 305 removes toner T from a surface of one separating roller 302. The scraper blade 306 scrapes off the toner T on the cleaning roller 305. The toner receiver 307 stores the toner T scraped off by the scraper blade 306.

At least a surface of the cleaning roller 305 is constructed by a material set such that a mold-releasing property of this surface with respect to the toner T attached onto the separating roller 302 is inferior to that of a surface of the separating roller 302 with respect to this toner T. Concretely, this material is constructed by a metallic material including aluminum, copper, nickel, etc., or a high molecular or polymer material of polyethylene terephthalate (PET) having dispersed titanium oxide, etc. However, the present invention is not limited to these materials.

The toner separating unit 3 is changed in various kinds of modifications as described later in detail.

The drying unit 4 is used to dry the transfer paper sheet 10. The drying unit 4 is constructed by an upper drying roller 402 and a lower drying roller 404. For example, the upper drying roller 402 has a heating lamp 401 therein and is made of aluminum. The lower drying roller 404 comes in press contact with the upper drying roller 402 from below. This lower drying roller 404 has a surface layer constructed by a liquid supplying member and comes in contact with a drawing blade 405 for drawing and dropping a liquid of this surface layer. This drying unit 4 composed of the pair of drying rollers 402 and 404 can be improved and changed in various kinds of modifications to improve drying efficiency. The drying unit 4 can be constructed by using a belt means instead of the pair of drying rollers 402 and 404. Modified examples of the drying unit including such a construction will be described later.

This paper receiving unit 5 has a paper discharging tray 501 for receiving the transfer paper sheet discharged from this drying unit 4.

Figure 7:
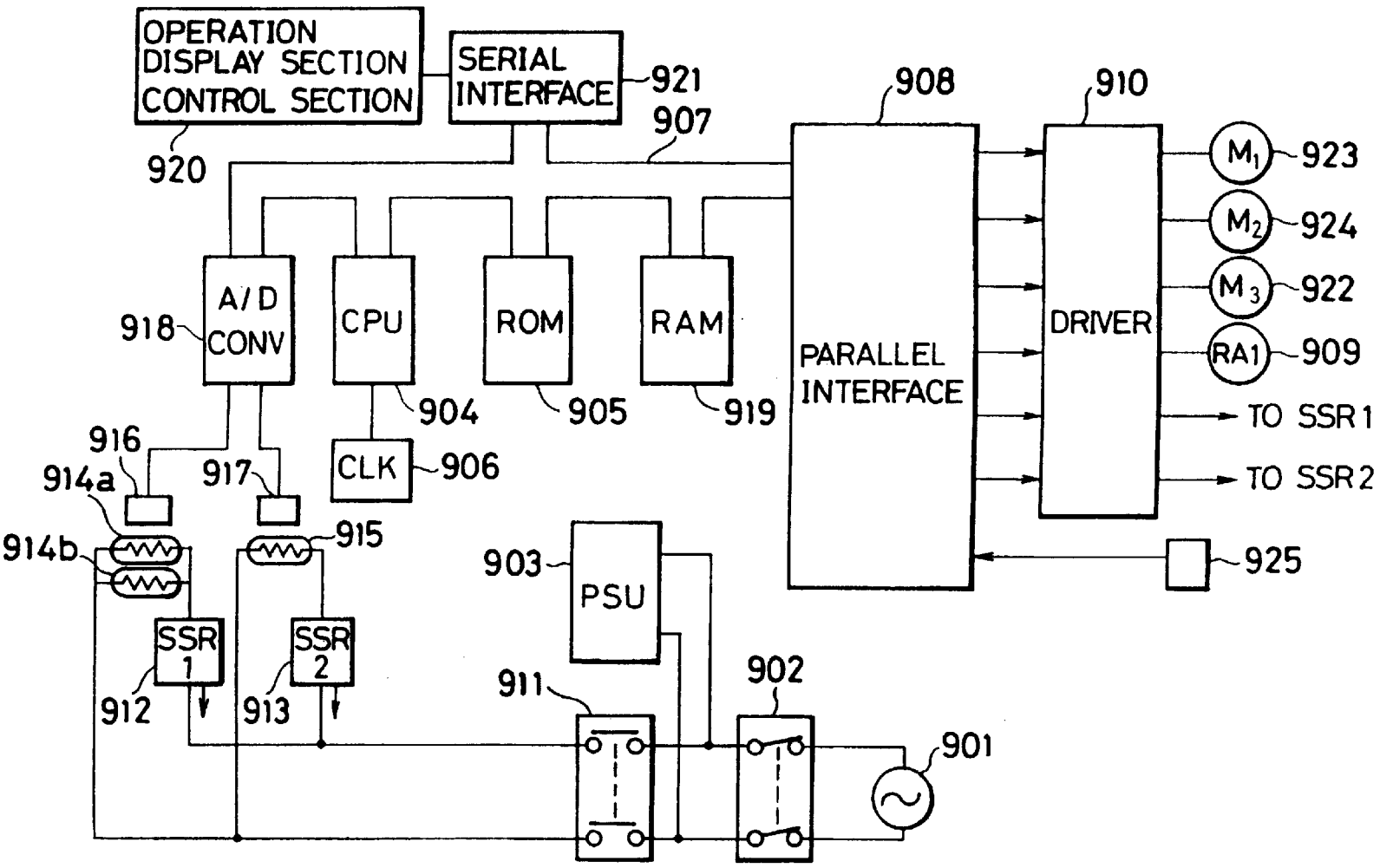
FIG. 7 is a block diagram of an electric circuit section of the toner removing device shown in FIG. 6.

FIG. 7 is a diagram of a control block for operating the toner removing device shown in FIG. 6. Alternating current (AC) power is supplied from a commercial power source 901 to the toner removing device. When a main switch 902 is turned on, a direct current (DC) power voltage is supplied to each of control integrated circuits from a direct current power source (PSU) 903. Power is supplied to a central processing unit (CPU) 904 and this central processing unit 904 resets a program counter, etc. The central processing unit (CPU) 904 starts a control operation of the toner removing device based on programmed contents written to a ROM 905. A reference clock (CLK) signal required to operate the central processing unit (CPU) 904 is supplied to this central processing unit 904 by a CLK oscillator 906.

Data for turning on a relay 909 are transmitted to a parallel interface 908 through an address data bus 907. A driver 910 for operating each of loads is connected to output ports of the parallel interface 908. A contact driving coil of a relay 1 is connected to one portion of the driver 910 so as to close a contact 911 of the relay 1.

Data for turning on each of SSR1 (912) and SSR2 (913) are similarly transmitted to the driver 910 as mentioned above. The SSR1 (912) is connected to one or two resistors 914a and 914b each corresponding to the heating lamp 301 for heating one separating roller 302 to that the separating roller 302 begins to be heated. The SSR2 (913) is connected to a resistor 915 corresponding to the heating lamp 401 for heating the drying roller 402 so that the drying roller 402 begins to be heated. Temperatures of the separating roller 302 and the drying roller 402 are respectively detected by thermistors 916 and 917 and are inputted to an A/D converter 918. The A/D converter 918 converts analog data indicative of each of these temperatures to digital data. Each of control temperatures of the separating roller 302 and the drying roller 402 is written to a RAM 919. The temperatures of the separating roller 302 and the drying roller 402 are respectively controlled by comparing their detected temperatures with these control temperatures. Temperature data can be also written to the RAM 919 through a serial interface 921 from an operation display section 920.

When the temperatures of the separating roller 302 and the drying roller 402 respectively reach set values of the RAM 919 as temperatures sufficient to perform their separating and drying operations, the operation display section 920 turns on an LED, etc. to show that the toner removing device can be operated. When operational command data are transmitted from the operation display section 920, the central processing unit (CPU) 904 drives a main drive motor 922. When a load of the main drive motor 922 can be operated at a constant speed, a paper feed motor 923 is driven to start a paper feeding operation. A resist motor 924 is rotated while timing of the resist motor 924 and the paper feed motor 923 is measured to prevent a sheet of paper from being skewed. Thus, the paper sheet is fed out by the paper feed motor 923 and the resist motor 924. Thereafter, the above impregnating processing of the processing liquid and the above separating and drying processings are performed.

All loads except for the paper feed roller 102 and the resist roller 104 are synchronously operated by the main drive motor 922. The toner removing device (LCT) has a paper end sensor 925 for detecting existence or non-existence of the paper sheet. When there is no paper sheet, data indicative of no paper sheet are transmitted to the central processing unit (CPU) 904 through the parallel interface 908. When the central processing unit (CPU) 904 detects that there is no paper sheet, the central processing unit (CPU) 904 stops the operation of the toner removing device and turns on an LED, etc. to display the stoppage of the operation of the toner removing device by the operation display section 920.

In the above construction, a liquid is uniformly supplied by the liquid supplying unit 2 onto a toner image face of the transfer paper sheet 10 fed from the paper feed unit 1. This paper sheet is then fed to the toner separating unit 3. Toner fixed onto the paper sheet is softened by this toner separating unit 3 by heat from the separating roller 302 so that this toner is adhesively attached onto a surface of the separating roller 302. When the paper sheet is separated from the separating roller 302, the toner attached onto the surface of the separating roller 302 is separated from the paper sheet. Thus, the toner is removed from the paper sheet. This paper sheet is then dried by the drying unit 4 and is discharged to the paper receiving unit 5.

In this toner removing device, the liquid is supplied to the paper sheet attaching the toner thereto. The toner is separated from the paper sheet in a state in which the liquid permeates an interfacial portion between the paper sheet and the toner. Accordingly, the toner can be removed from the paper sheet without damaging paper fibers.

The paper sheet comes in contact with the separating roller 302 in a state in which a paper surface is wet with the liquid. When the paper sheet is separated from the separating roller 302, the paper sheet is heated to such an extent that the wet state of the paper sheet can be maintained. Accordingly, when a surface of the separating roller 302 is constructed by a material adhesive to the toner, it is possible to prevent the paper surface from being adhered to the surface of the separating roller 302 so that insufficient separation of the toner can be prevented. Further, it is possible to prevent retransfer of the toner caused by recontact between a portion of the separated paper sheet and the separating roller 302.

In this toner removing device, the transfer paper sheet 10 is supported by two separating rollers 302 therebetween and the toner is removed from each of front and rear faces of the transfer paper 10. Accordingly, when the transfer paper sheet 10 having the toner to be removed is set on the bottom plate 101 of the paper feed unit 1, it is not necessary to consider the front and rear faces of the transfer paper sheet. Further, when the toner on each of the front and rear faces of the transfer paper sheet as a double-sided copy is removed from this paper sheet, it is sufficient to pass this paper sheet through the toner removing device at only one time.

The discharged transfer paper sheet 10 is dried by the drying unit 4 so that it is easy to treat the transfer paper sheet 10. This transfer paper sheet 10 can be used in an electrophotographic copying machine, etc. as it is since the paper sheet is dried by heat of the drying unit 4 and toner again tends to be easily attached onto the paper sheet.

Another example of the entire construction of the toner removing device using the present invention will next be explained with reference to FIG. 8.

Figure 8:
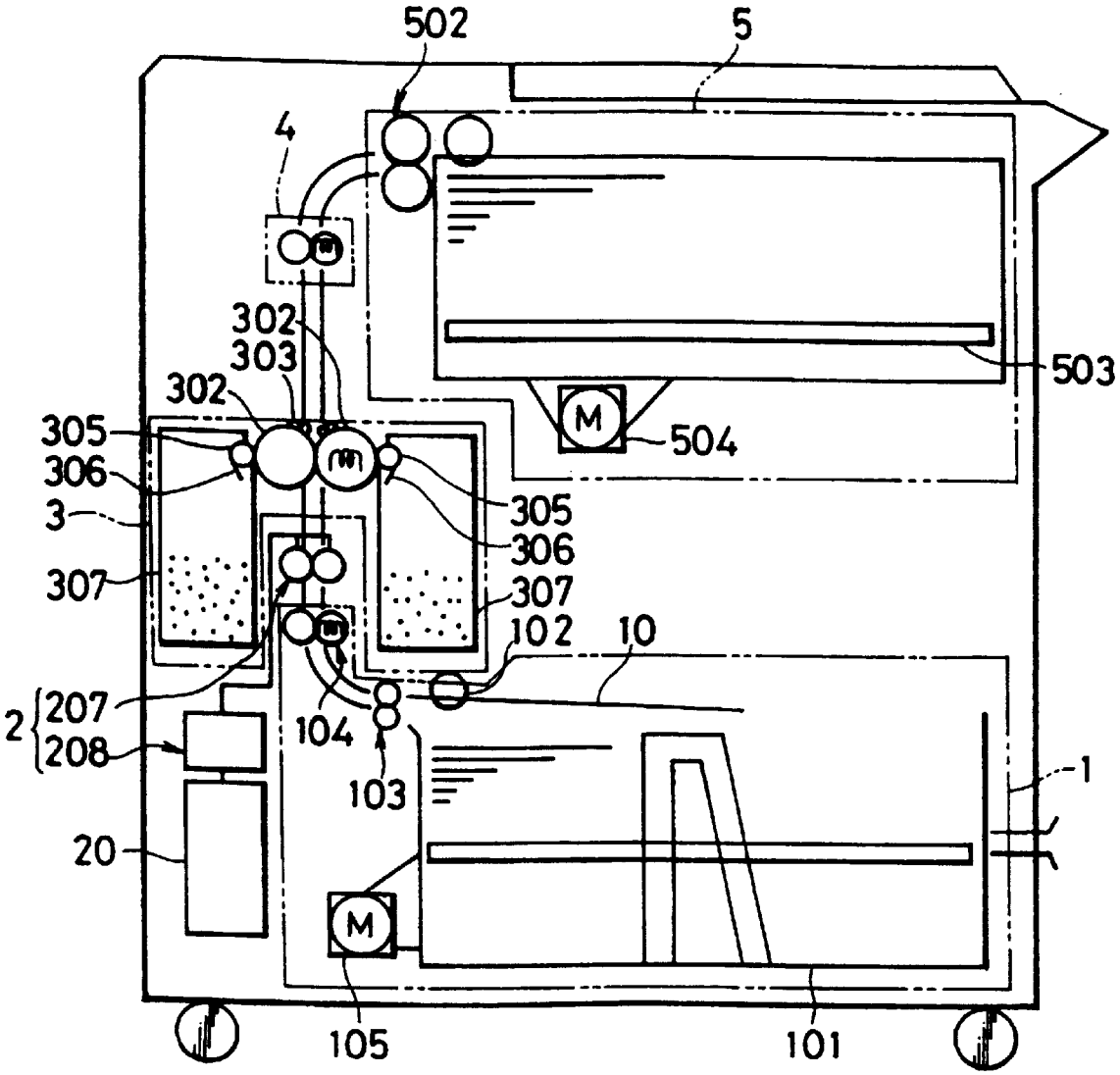
FIG. 8 is a view showing the schematic construction of a toner removing device in accordance with another embodiment of the present invention.

In FIG. 8, this toner removing device is a toner removing device of a paper conveying type for conveying a sheet of transfer paper in its longitudinal direction. A space for this toner removing device can be reduced so that this toner removing device can be built in a copying machine. Different from the toner removing device shown in FIG. 6, this toner removing device shown in FIG. 8 is constructed such that the transfer paper sheet 10 is conveyed in its longitudinal direction from a paper feed unit 1 located below to a paper receiving unit 5 located above. This toner removing device does not use the above-mentioned liquid supplying unit 2 constructed by the liquid interior conveying roller 202, etc. such that the transfer paper sheet 10 is dipped into the processing liquid 20. Instead of this liquid supplying unit 2, a processing liquid 20 is supplied to the transfer paper sheet 10 by conveying the transfer paper sheet 10 using a coating roller 207 while the transfer paper sheet 10 is supported by the coating roller 207. The processing liquid 20 is supplied to the coating roller 207 by a liquid supplying device 208. An operation of this toner removing device can be also controlled by a control section similar to that shown in FIG. 7.

Figure 14:
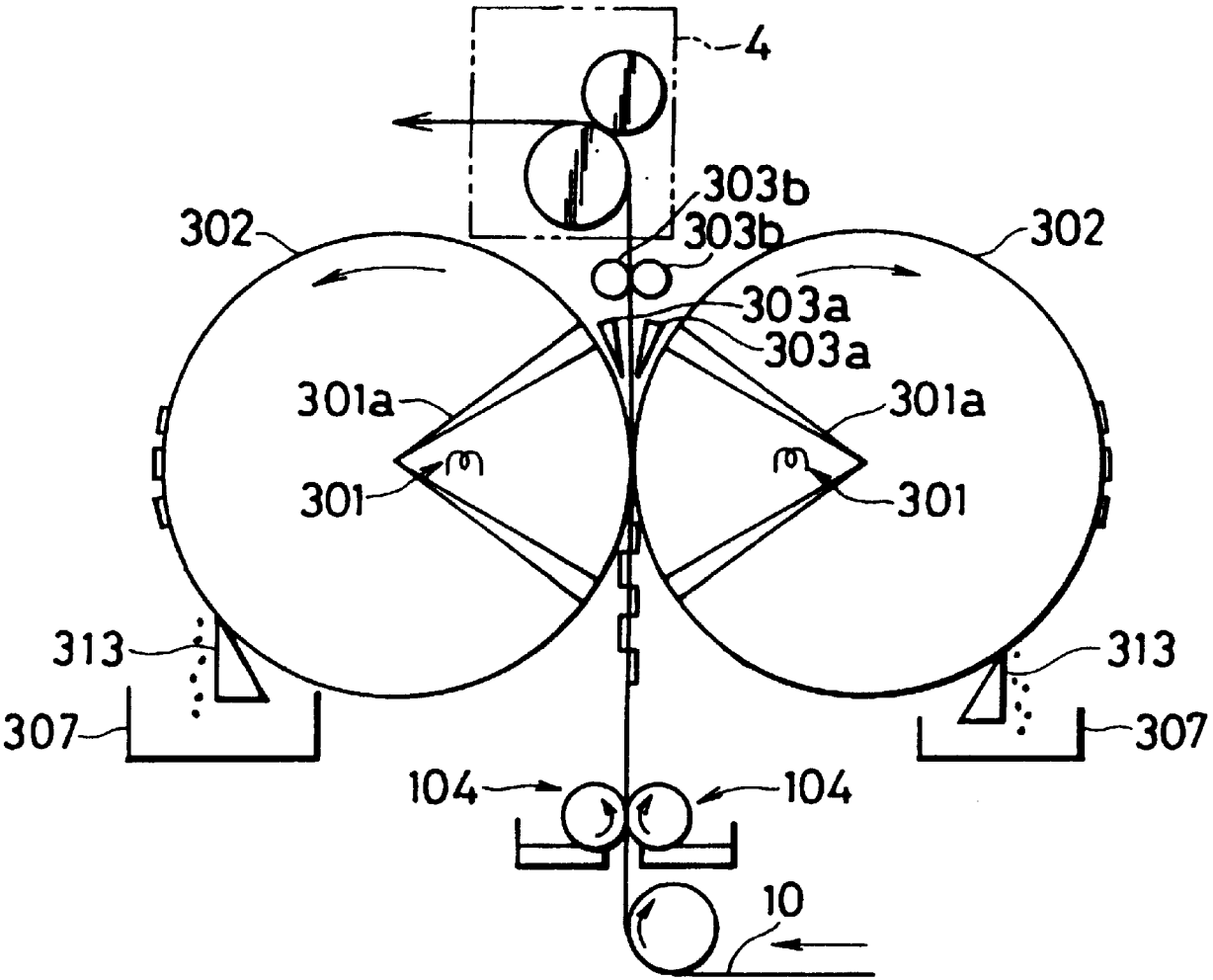
FIG. 14 is a view for explaining a toner removing device in accordance with another embodiment of the present invention.

As shown in FIG. 14, for example, a pair of introducing claws 303a and a pair of introducing rollers 303b may be arranged instead of the above separating claw 303. Each of end tips of the introducing claws 303a is in proximity to a circumferential face of each of a pair of separating rollers 302, or comes in contact with this circumferential face. A raised front end of the transfer paper sheet fed out of a press contact portion of the pair of separating rollers 302 is inserted and conveyed by the pair of introducing rollers 303b while this front end of the transfer paper sheet is guided by the pair of introducing claws 303a. In this case, the transfer paper sheet is smoothly separated from the separating rollers 302 so that the transfer paper sheet can be fed onto the drying unit 4. No toner image is almost formed normally in an end portion of the transfer paper sheet having several centimeters in width. Further, both front and rear faces of the transfer paper sheet are coated with the processing liquid, and adhesive and heating operations of the separating rollers 302 are performed in this example. Accordingly, the front and rear faces of the transfer paper sheet approximately have the same wetness, etc. so that the front end of the transfer paper sheet is straightly raised. Therefore, as mentioned above, the transfer paper sheet is smoothly separated from the separating rollers 302 and can be fed onto the drying unit 4. After the front end portion of the transfer paper sheet is inserted into the introducing rollers 303b, the transfer paper sheet is supported and conveyed by the introducing rollers 303b therebetween. Thus, a rear portion of the transfer paper sheet can be reliably separated from each of the separating rollers 302.

Figure 9:
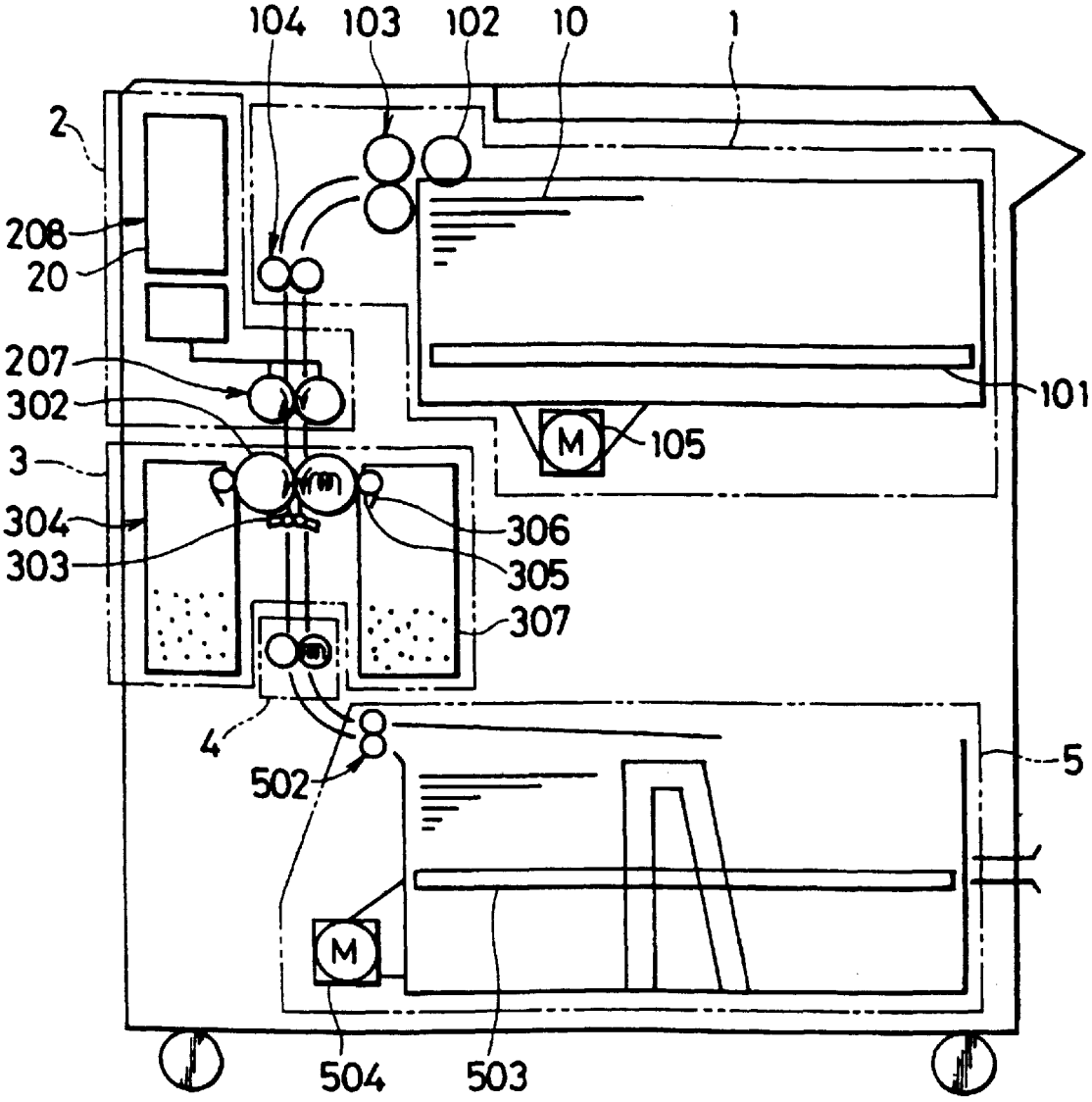
FIG. 9 is a view showing the schematic construction of a toner removing device in accordance with another embodiment of the present invention.

In contrast to the toner removing device shown in FIG. 8, a paper feed unit 1 may be arranged in an upper portion of such a toner removing device of a longitudinal type and a paper receiving unit 5 may be arranged in a lower portion of the toner removing device. In this case, as shown in FIG. 9, the respective constructional units 2 to 4 between the paper feed unit 1 and the paper receiving unit 5 are also reversely arranged with respect to upper and lower directions.

Figure 10:
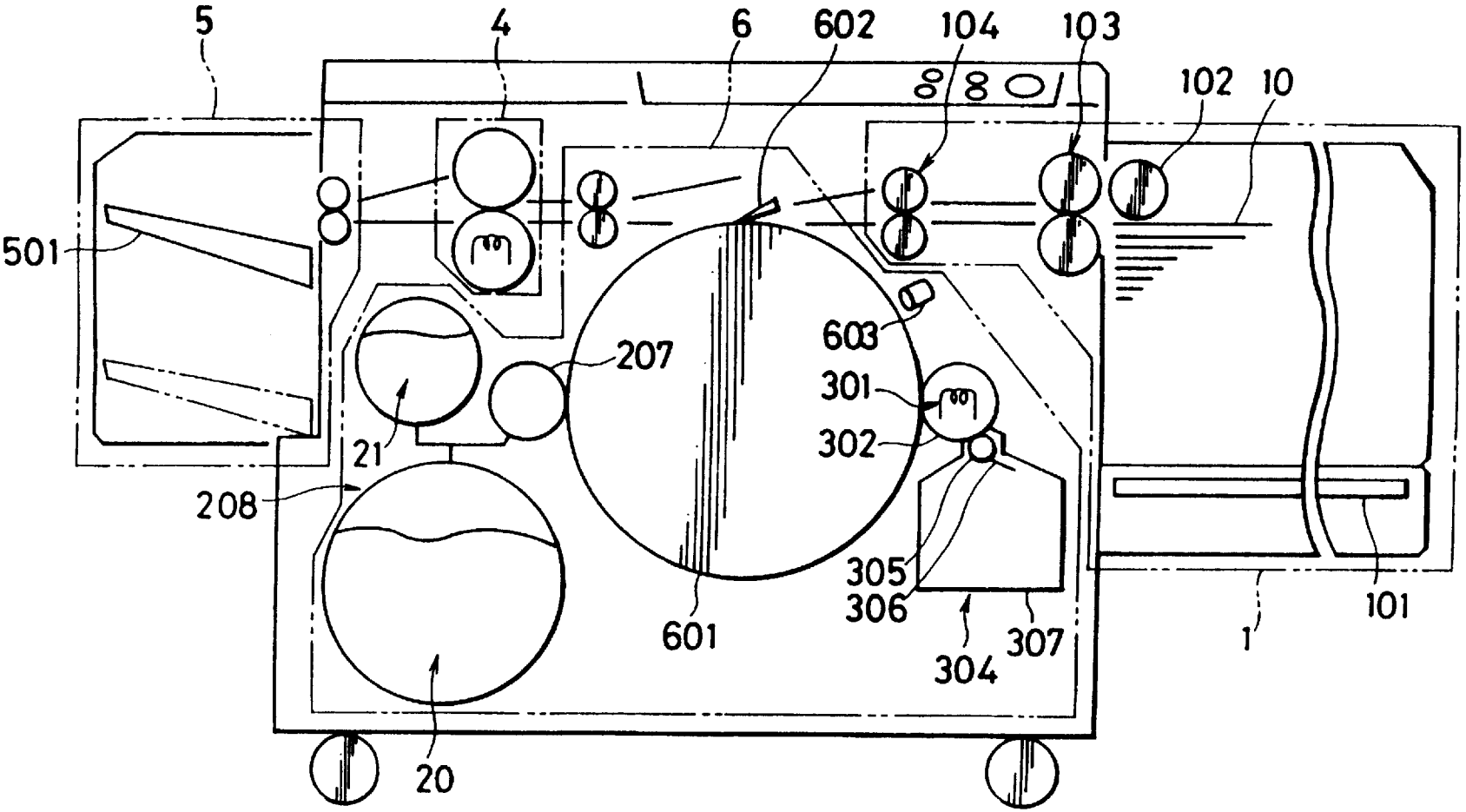
FIG. 10 is a view showing the schematic construction of a toner removing device in accordance with another embodiment of the present invention.

In the above example of the entire construction of the toner removing device, the liquid supplying unit 2, the toner separating unit 3 and the drying unit 5 are separately arranged. However, as shown in FIG. 10, the liquid supplying unit 2 and the toner separating unit 3 may be integrated with each other so that a liquid supplying unit-toner separating unit 6 is constructed. This liquid supplying unit-toner separating unit 6 has a paper holding drum 601 for clamping a front end of the transfer paper sheet by a clamp claw 602 and holding and rotating this front end on a circumferential face of this drum 601. For example, a separating roller 302 and a sponge roller 207 for supplying a processing liquid to the circumferential face of the paper holding drum 601, etc. are arranged such that the separating roller 302 and the sponge roller 207 come in contact with the paper holding drum 601. Constructional members similar to those of the toner removing device shown in each of FIGS. 6, 8 and 9 are designated by the same reference numerals. In the toner removing device shown in FIG. 10, a liquid 21 for accelerating or promoting liquid permeation is also supplied to the sponge roller 207 as a liquid supplying roller in addition to the processing liquid 20. The sponge roller 207 can approach the paper holding drum 601 and can be separated from this paper holding drum 601. Toner can be partially removed from the transfer paper sheet by approaching and separating operations of the sponge roller 207. The processing liquid 20 and the permeation accelerating liquid 21 can be supplied by separate rollers to the transfer paper sheet on the paper holding drum 601. This permeation accelerating liquid 21 will be described in detail later.

Figure 11:
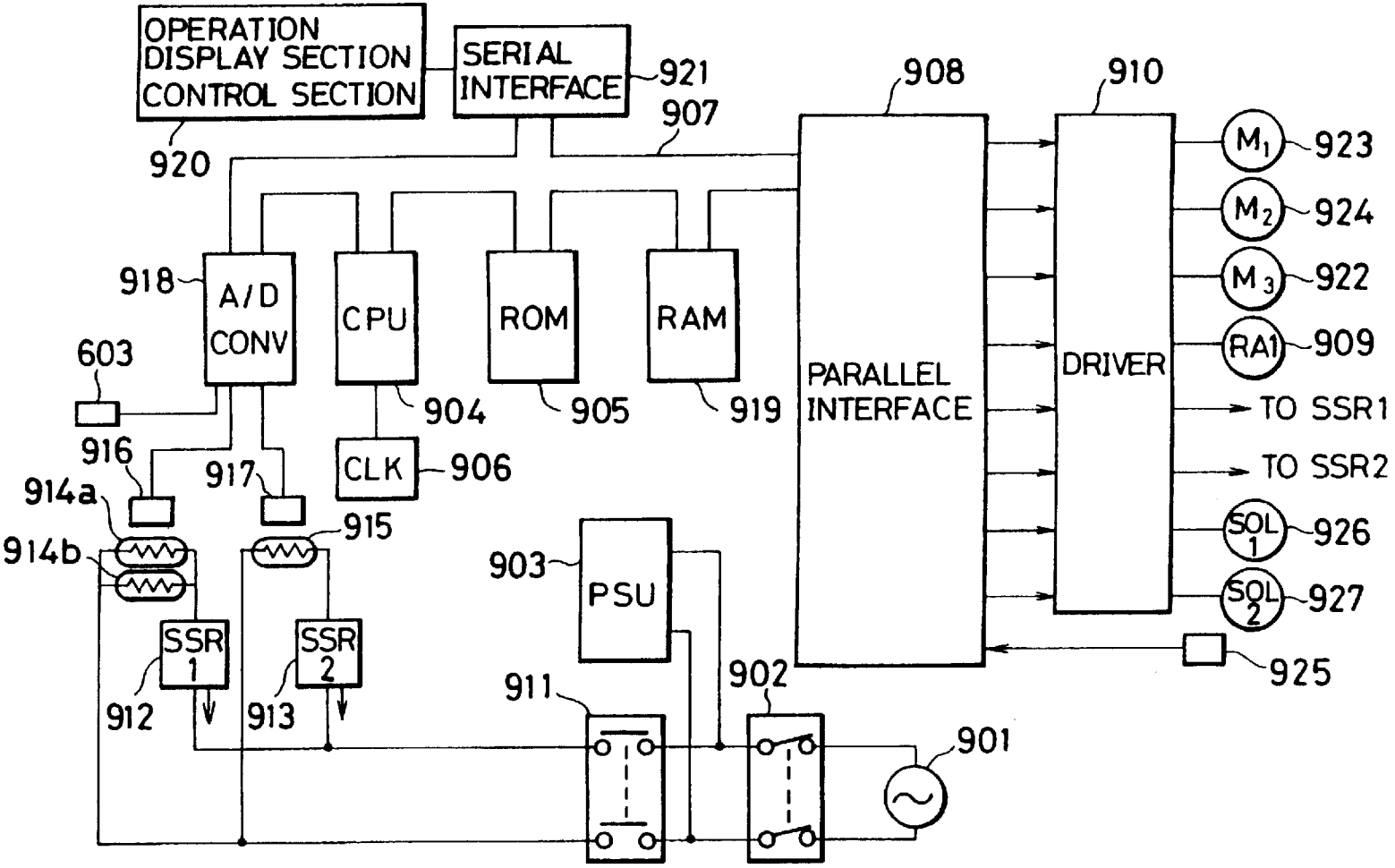
FIG. 11 is a block diagram of an electric circuit section of the toner removing device shown in FIG. 10.

FIG. 11 is a block diagram of an electric circuit section of the toner removing device shown in FIG. 10. Different from the electric circuit section shown in FIG. 7, a solenoid 928 and a coating roller solenoid 927 are connected to a driver, and a charge coupled device (CCD) sensor 603 is arranged and connected to an A/D converter 918. The solenoid 928 opens and closes the clamp claw 602 of the paper holding drum 601. The coating roller solenoid 927 moves the sponge roller 207 such that the sponge roller 207 as a processing liquid coating roller approaches the paper holding drum 601 and is separated from the paper holding drum 601. The CCD sensor 603 detects toner on a sheet of reused paper. In the above construction, a sheet of transfer paper is fixed by the clamp claw 602 of the paper holding drum 601 and is rotated together with the paper holding drum 601. While the transfer paper sheet is rotated, the transfer paper sheet is coated with the processing liquid 20 and the permeation accelerating liquid 21 by the coating sponge roller 207. Thereafter, the toner is removed from the transfer paper sheet by the separating roller 302. After the transfer paper sheet has passed through the separating roller 302, an amount of the toner on the transfer paper sheet is detected by the above CCD sensor 603. When no toner on the transfer paper sheet is completely separated therefrom, the same processing is repeatedly performed some times so that the toner is completely removed from the transfer paper sheet. When the toner has been completely removed from the transfer paper sheet, the clamp claw 602 is opened and the transfer paper sheet is separated from the paper holding drum 601 and is fed to the drying unit 4. The other control operations of the toner removing device shown in FIG. 11 are similar to those shown in FIG. 7.

Figure 12:
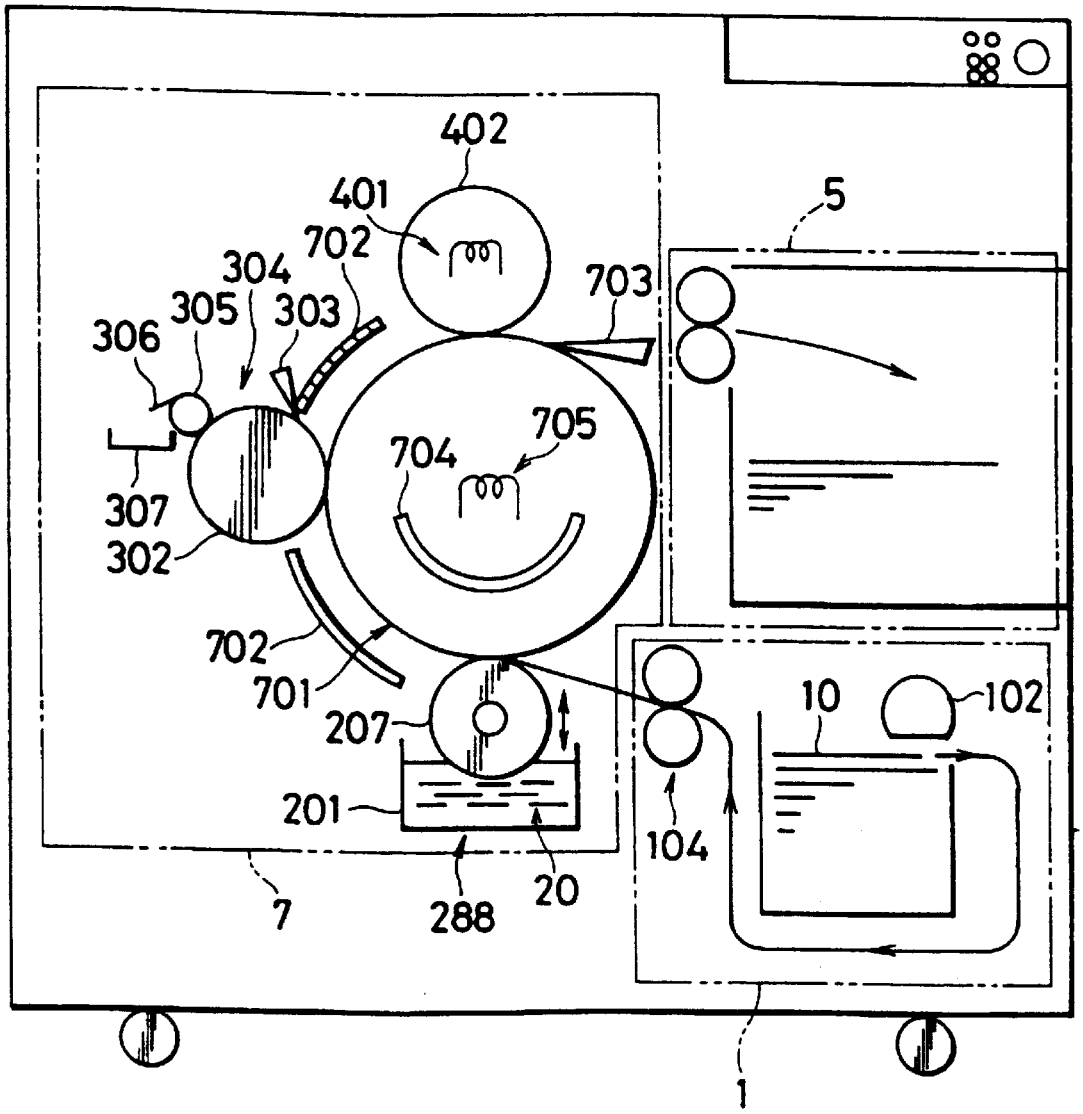
FIG. 12 is a view showing the schematic construction of a toner removing device in accordance with another embodiment of the present invention.
Figure 13:
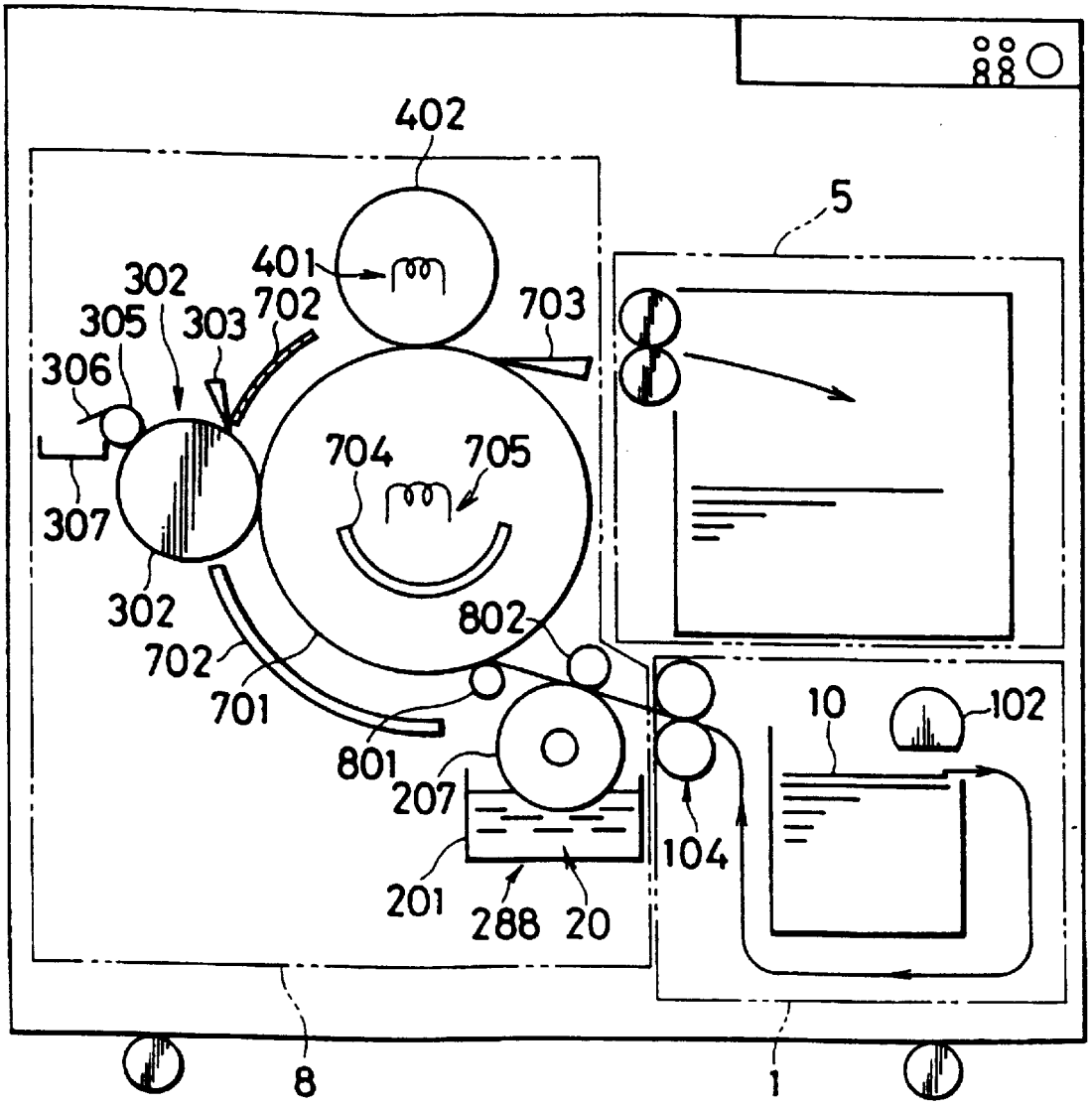
FIG. 13 is a view showing the schematic construction of a toner removing device in accordance with another embodiment of the present invention.

As shown in FIG. 12, the liquid supplying unit 2, the toner separating unit 5 and the drying unit 5 can be integrated with each other. In this example, a liquid supplying roller 207, a separating roller 302 and a heating roller 402 are arranged around a drum 701 having a built-in lamp 705 with a reflecting plate 704. Further, the toner removing device shown in FIG. 12 also has a guide 702 for covering the drum 701 and a separating claw 703 for separating a sheet of transfer paper from this drum 701. The lamp 705 is used to supplementarily separate and dry the transfer paper sheet. Constructional portions similar to those of the toner removing device shown in each of FIGS. 6, 8 and 9 are designated by the same reference numerals. As shown in FIG. 13, the toner separating unit 3 and the drying unit 5 can be integrated with each other.

Figure 15A:
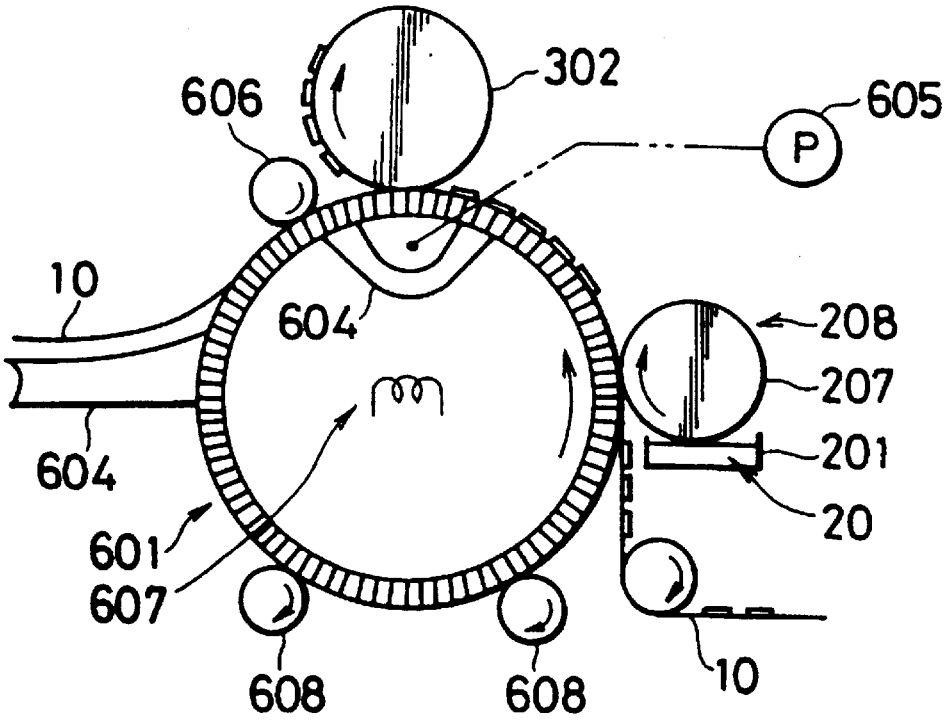
FIGS. 15a to 15c are views for explaining a toner removing device in accordance with another embodiment of the present invention.
Figure 15B:
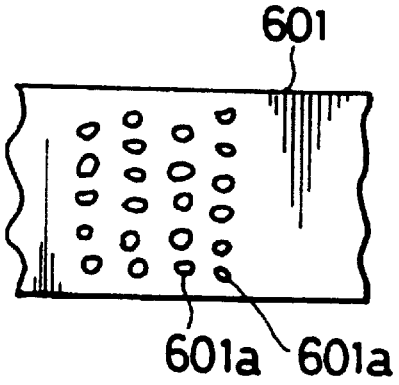
Figure 15C:
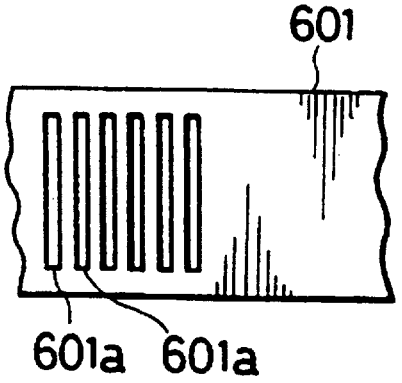

In each of FIGS. 11 and 12, the separating roller 302 comes in contact with each of the drums 601 and 701. It is therefore necessary to theoretically set an optimum condition for separating the transfer paper sheet from the separating roller 302. To set such a theoretical optimum condition, it is desirable to convey the transfer paper sheet without completely floating the paper sheet from each of the drums 601 and 701 in a drum portion opposed to the separating roller 302 as if the paper sheet is adhered by the separating roller 302 to a drum side with strong force. To do this, for example, as shown in FIG. 15a, a plurality of through holes are formed on a circumferential face of a drum such that the through holes extend through the interior of this drum. Further, a space is formed in an opposite internal portion of the drum opposed to the separating roller 302 such that this space is shielded from the other drum interior by using a shield wall 604. Thus, a pressure in this space is reduced and set to be negative by a suction means. For example, these through holes may be formed in a circular shape as shown in FIG. 15b or may be formed in the shape of plural slits extending in a width direction as shown in FIG. 15c. Otherwise, these through holes may be formed in another suitable shape. In FIG. 15a, a guide roller is opposed to a portion of the drum 601 passing through an opposite portion opposed to the separating roller 302. This guide roller is arranged to secure close contact between the transfer paper sheet and the circumferential face of the drum when no negative pressure is generated from the drum side. Each of shafts 608 for rotating the drum is arranged in the vicinity of a lower circumferential face of the drum.

Figure 16A:
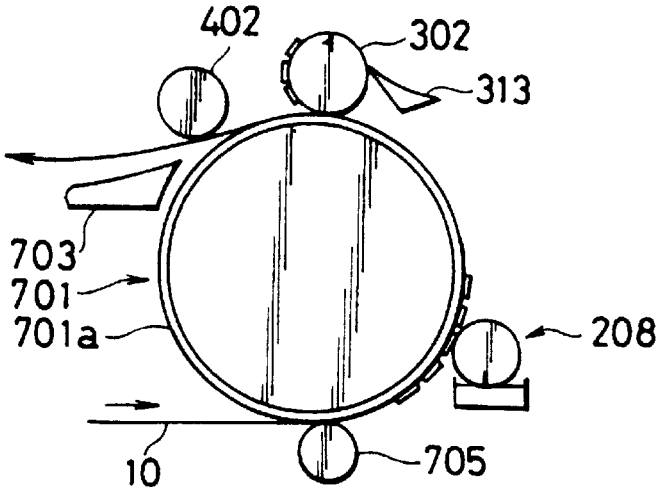
FIGS. 16a to 16c are views for explaining a toner removing device in accordance with another embodiment of the present invention.

As shown in FIG. 16a, an adhesive layer 701a adhesive to the transfer paper sheet may be formed on a circumferential face of the drum 701 instead of the construction shown in FIG. 15.

No adsorbing thin layer for adsorbing the transfer paper sheet by using air suction force and an adhesive in an opposite drum portion opposed to the separating roller 302 is limited to such a unit composite type, but can be also applied to the toner removing device as shown in FIG. 6.

Figure 16B:
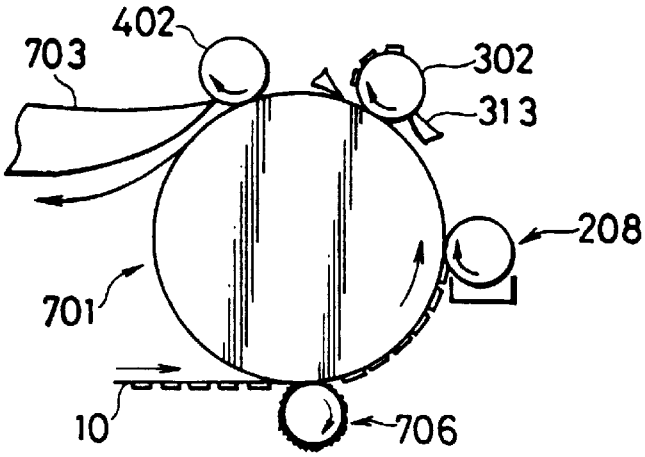

In a toner removing device as an example shown in FIG. 16b, a liquid permeation accelerating roller 706 is constructed such that, for example, innumerable needles are arranged on a circumferential face of the liquid permeation accelerating roller 706. This liquid permeation accelerating roller 706 is opposed to a sheet of transfer paper wound around a drum 701 before the transfer paper sheet is conveyed until a drum portion opposed to a liquid supplying device 208. The needles are arranged to form holes in toner on the transfer paper sheet such that a processing liquid supplied by the liquid supplying device 208 easily permeates an interface between the toner and the transfer paper sheet. The needles may be formed in the shape of a belt. Such a structure is especially effective to remove the toner from the transfer paper sheet on which a toner image having a large amount of toner is formed. Thus, it is possible to prevent the toner from being left by insufficient permeation of the processing liquid on the above interface. Further, it is also possible to prevent the separating roller 302 from being damaged by winding the transfer paper sheet around this separating roller 302.

Such a liquid permeation accelerating roller 706 can be also applied to the toner removing device shown in FIG. 6.

Figure 16C:
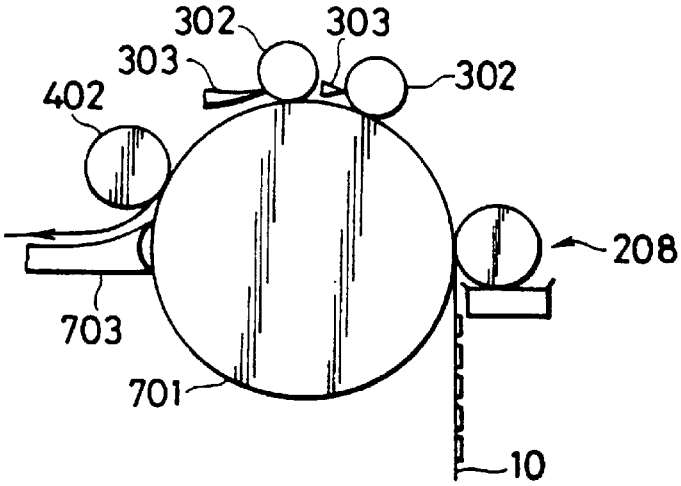

As shown in FIG. 16c, for example, two or more separating rollers 302 may be arranged such that the separating rollers 302 are opposed to a transfer paper sheet conveyed on a drum 701. In this case, a toner separating operation is performed at two stages or more by the separating rollers 302. For example, about 50% of a toner image is transferred onto a first separating roller 302 by using this first separating roller 302 and all the remaining toner is then transferred onto a second separating roller 302 by using this second separating roller 302. Stress applied to the transfer paper sheet can be reduced in the toner separation in comparison with a case in which all the toner is removed from the transfer paper sheet in one toner separation. Accordingly, a damaging amount of the transfer paper sheet can be reduced. Such a structure is also especially effective to remove the toner from the transfer paper sheet on which a toner image having a large amount of toner is formed. Such toner separation at multiple stages can be also applied to the toner removing device shown in FIG. 6.

The liquid supplying unit 2 able to be used in the above toner removing device will next be explained.

Figure 17A:
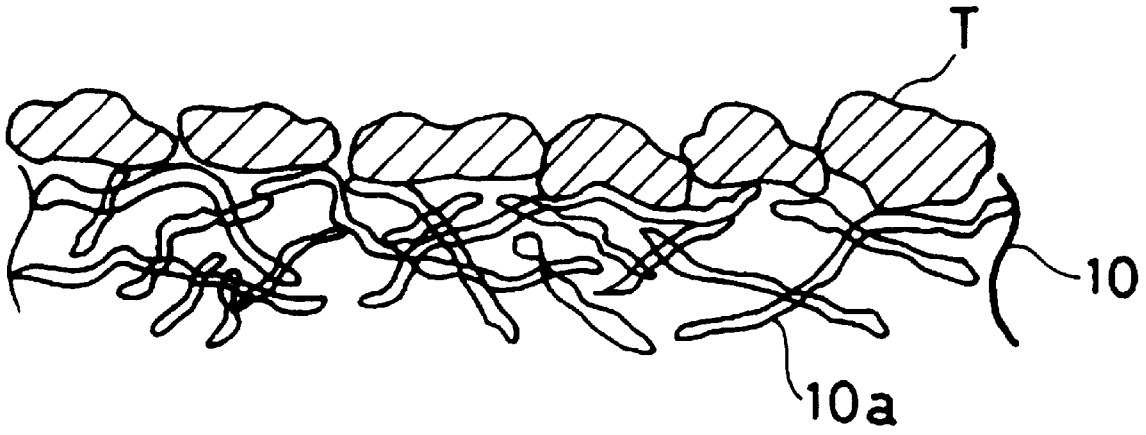
FIG. 17a is a view for explaining a surface portion of a sheet of transfer paper attaching toner thereon.
Figure 17B:
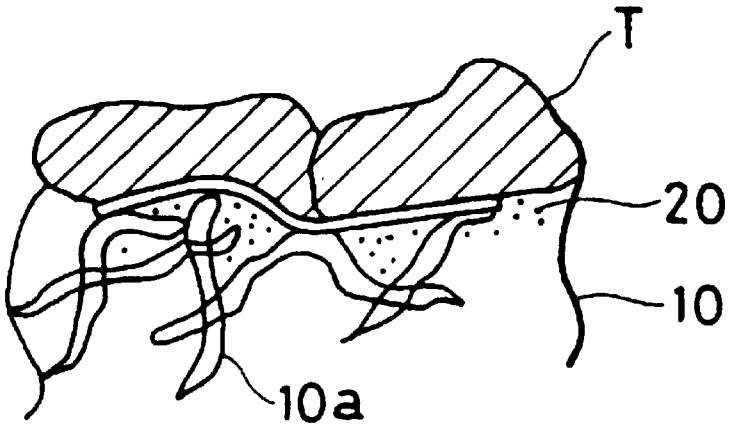
Figure 18:
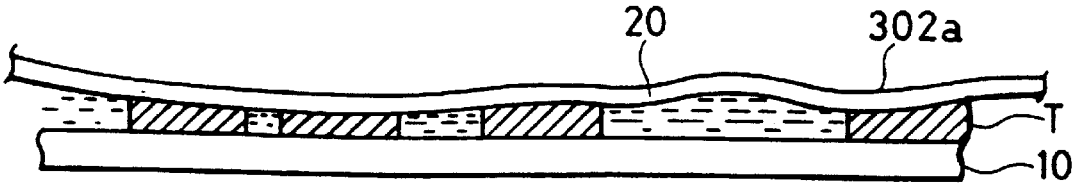
FIG. 18 is a view for explaining contact states of the transfer paper sheet, the toner, a processing liquid and a separating member.

In the above toner removing device, it is desirable to sufficiently impregnate an interfacial portion between toner T and a surface of the transfer paper sheet 10 with an unstabilizing agent such as water, etc. As shown in FIGS. 17a and 17b, similar to a sheet of general paper, the transfer paper sheet 10 generally used in an image forming apparatus such as a copying machine has a fibrous structure in which paper fibers 10a as cellulose fibers are entwined with each other. Accordingly, many fine clearances exist in this fibrous structure. A capillary tube effect is utilized when the processing liquid 20 as the unstabilizing agent such as water permeates the transfer paper sheet 10 including such fine clearances. However, the permeation of the processing liquid 20 into the transfer paper sheet 10 is prevented by a gas such as air within these clearances. As a result, there is a fear that no transfer paper sheet 10 is wet so much with the processing liquid 20. Accordingly, in the above toner removing device, no processing liquid 20 can sufficiently permeate reliably until an interfacial portion between the transfer paper sheet 10 and the toner T. Therefore, when the toner T is separated from the transfer paper sheet 10 by a separating member 302a as shown in FIG. 18, there is a fear of insufficient separation of the toner T from the transfer paper sheet 10.

When the liquid supplying unit 2 is used, the processing liquid 20 can sufficiently permeate reliably until the interfacial portion between the transfer paper sheet and the toner T. A concrete constructional example of this liquid supplying unit 2 will next be described in detail.

Figure 19:
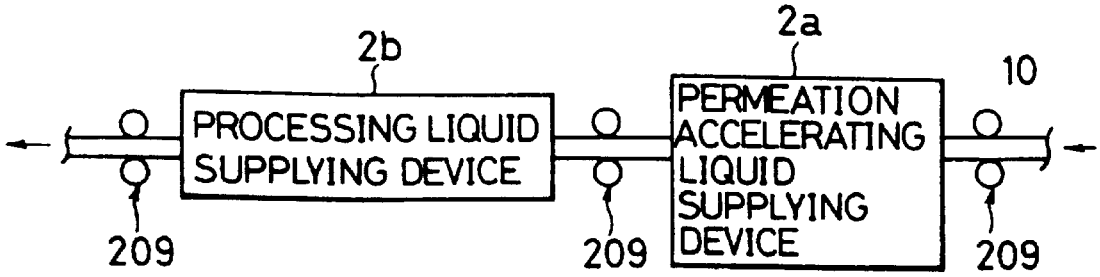
FIG. 19 is a view for explaining the construction of a liquid supplying unit having a permeation-accelerating liquid supplying unit 2a and a processing liquid supplying device 2b.

In the liquid supplying unit 2 used in the above toner removing device, the processing liquid 20 may be supplied to the transfer paper sheet 10 at one time, but may be separately supplied to the transfer paper sheet 10 several times. For example, as shown in FIG. 19, a permeation accelerating liquid 21 as a permeability accelerator is first supplied to the transfer paper sheet 10 by a permeation accelerating liquid supplying device 2a as a permeability accelerator supplying means so as to accelerate or promote permeation of the above processing liquid 20 into the interfacial portion between the transfer paper sheet 10 and toner. Thereafter, the liquid supplying unit 2 may be constructed by a processing liquid supplying device 2b as an unstabilizing agent supplying means such that the processing liquid 20 is supplied to the transfer paper sheet 10 having the supplied permeation accelerating liquid 21. In this case, for example, the permeation accelerating liquid 21 can be constructed by using a surfactant mentioned above. Each of the processing liquid supplying device 2b and the permeation accelerating liquid supplying device 2a can be constructed by using a liquid supplying unit 2 described later or a suitable combination of liquid supplying units 2. Each of the permeation accelerating liquid supplying device 2a and the processing liquid supplying device 2b may be constructed by using plural liquid supplying units 2 such that the permeation accelerating liquid 21 or the processing liquid 20 is supplied to the transfer paper sheet 10 many times.

In a concrete constructional example of the following liquid supplying unit 2, a liquid 22 such as the processing liquid 20 can be supplied to the transfer paper sheet 10 without discriminating the permeation accelerating liquid supplying device 2a and the processing liquid supplying device 2b from each other. Accordingly, in the following figures; the liquid 22 can be suitably used without discriminating the permeation accelerating liquid 21 and the processing liquid 20 from each other.

One constructional example of the liquid supplying unit 2 using a system for dipping the transfer paper sheet 10 into the liquid 22 will first be explained with reference to FIG. 20. This liquid supplying unit 2 has a liquid container 201, a liquid interior conveying roller 202, an unillustrated driving portion of the liquid interior conveying roller 202, a liquid interior guide plate 203, a separating claw 210, a pair of drawing rollers 204, etc. The liquid container 201 is filled with a predetermined amount of the liquid 22. The liquid interior conveying roller 202 guides and conveys the transfer paper sheet 10 into the liquid 22 of the liquid container 201 while the liquid interior conveying roller 202 comes in contact with one face of the transfer paper sheet 10. This one face of the transfer paper sheet 10 is set to an upper face in FIG. 20. The liquid interior guide plate 203 guides a lower face of the transfer paper sheet 10 as the other face thereof into the liquid 22 of the liquid container 201. The pair of drawing rollers 204 constitute a means for removing a surplus amount of the liquid 22 from the transfer paper sheet 10. In this example, the transfer paper sheet 10 fed from a paper feed unit 1 is guided into the liquid 22 of the liquid container 201 by the liquid interior conveying roller 202 and the liquid interior guide plate 203. The transfer paper sheet 10 is then dipped into the liquid 22. Thereafter, a surplus amount of the liquid 22 is removed by the pair of drawing rollers 204 from the transfer paper sheet 10 separated from a surface of the liquid interior conveying roller 202 by the separating claw 210. The transfer paper sheet 10 is then conveyed to the next toner separating unit 5, etc. In this example, a minimum amount of the processing liquid 20 required to reduce adhesive force of toner can be supplied to the transfer paper sheet 10 by the pair of drawing rollers 204 so that a heating amount required for the transfer paper sheet in a subsequent drying process can be reduced. Further, extending and shrinking amounts of the transfer paper sheet 10 caused by moisture absorption can be reduced so that it is possible to restrain the transfer-paper sheet 10 from being deformed in a wavy shape with wrinkles.

Another constructional example of the liquid supplying unit 2 using a system for dipping the transfer paper sheet 10 into the liquid 22 will next be described with reference to FIG. 21. This liquid supplying unit 20 has a conveying belt 211 instead of the liquid interior conveying roller 202 shown in FIG. 20. The conveying belt 211 is wound and tensioned between a pair of conveying rollers 209 rotated by an unillustrated driving portion. In this example, a transfer paper sheet 10 fed from a paper feed unit 1 is caught on a lower face of the conveying belt 211 by its conveyance and is guided into the liquid 22 of a liquid container 201 and is then dipped into the liquid 22. Thereafter, the transfer paper sheet 10 is easily separated from the liquid 22 in a feed terminal portion in which a paper feeding direction is inverted by another conveying roller 209 at an acute angle. The transfer paper sheet 10 is then conveyed to the next toner separating unit 3. In this example, the above pair of drawing rollers 204 may be also arranged. When a plurality of holes are formed in the conveying belt 211, a permeating amount of the liquid 22 can be increased.

Figure 20:
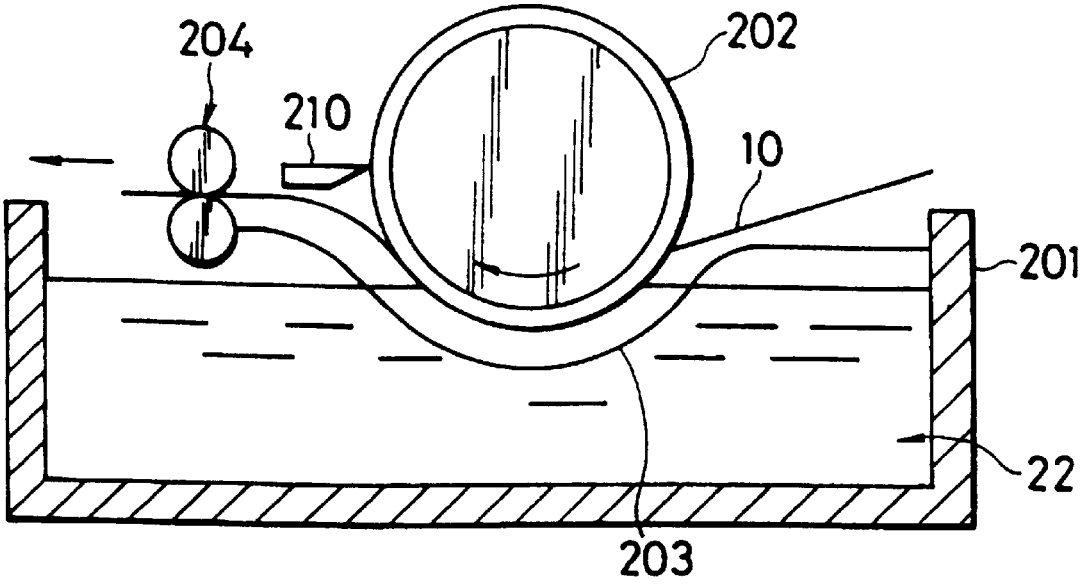
FIG. 20 is a view showing a schematic construction of the liquid supplying unit in a toner removing device.
Figure 21:
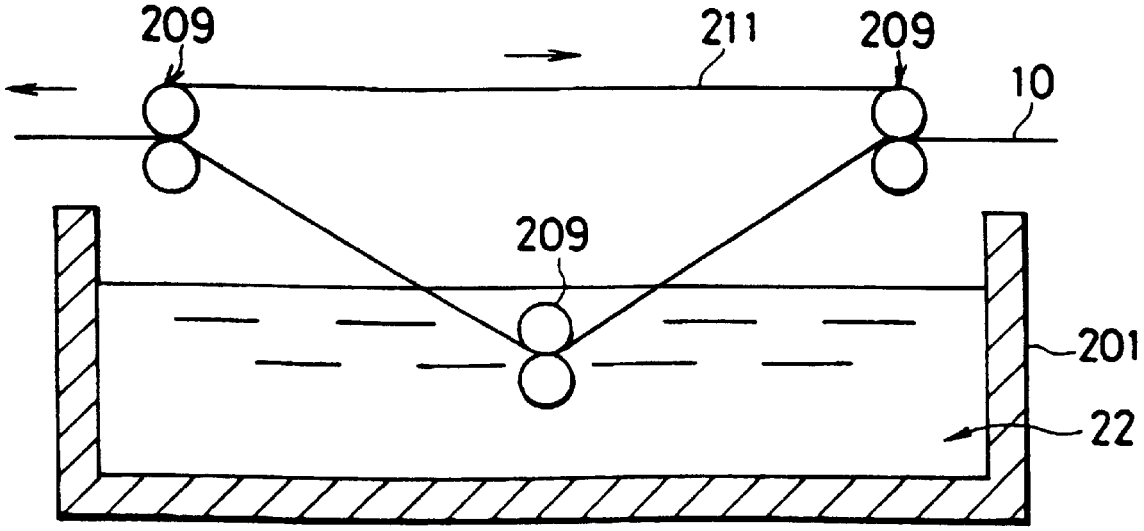
FIG. 21 is a view showing a schematic construction of the liquid supplying unit in a modified example.

When the liquid supplying unit 2 shown in FIG. 20 or 21 is used, the transfer paper sheet 10 is dipped into the liquid 22 so that the liquid 22 permeates the transfer paper sheet 10 from both faces and end portions thereof. Therefore, the liquid 22 reliably permeates rapidly the interior of the transfer paper sheet 10. Accordingly, it is possible to reduce adhesive force on an interface between the toner and paper fibers of the transfer paper sheet 10. In the liquid supplying unit 2 of this kind, an amount of the liquid 22 supplied to the transfer paper sheet 10 is set to a predetermined amount and this predetermined amount can be maintained by liquid amount control for displaying a remaining liquid amount, etc. of the liquid 22 within the liquid container 201 by the above control section. This predetermined amount can be also maintained by liquid concentration control, etc. in liquid resupply, etc. according to the number of processings.

A constructional example of the liquid supplying unit 2 using a system for coating the transfer paper sheet 10 with the liquid 22 will next be explained with reference to FIG. 22. This liquid supplying unit 2 has a liquid container 201, a pair of coating rollers 207, an unillustrated driving portion of the pair of coating rollers 207, a liquid supplying pipe 212, a pump 213, etc. The liquid container 201 is filled with a predetermined amount of the liquid 22. At least a surface portion of each of the coating rollers 207 is formed by a liquid absorbing material. The coating rollers 207 convey the transfer paper sheet 10 while the transfer paper sheet 10 is supported by the coating rollers 207 therebetween. The liquid supplying pipe 212 is used to supply the liquid 22 to one of the coating rollers 207. A lower coating roller 207 is arranged such that a portion of this lower coating roller 207 is dipped into the liquid 22 within the liquid container 201. The liquid absorbing material of the pair of coating rollers 207 may be constructed by a material able to hold the liquid 22 and supply the liquid 22 to the transfer paper sheet such that the transfer paper sheet is coated with the liquid 22. As a concrete example, the liquid absorbing material can be constructed by a sponge, a felt, etc., but is not limited to these materials. In this example, the transfer paper sheet 10 fed from a paper feed unit 1 is conveyed by the pair of coating rollers 207 holding the liquid 22 on a surface and an interior portion thereof while the transfer paper sheet 10 is supported by these coating rollers 207 therebetween. At this time, both faces of the transfer paper sheet 10 are coated with the liquid 22.

If one of the coating rollers 207 is constructed by a sponge having large cells or a soft felt, a pressure difference is caused between a nipping portion of the pair of coating rollers 207 and the other portions thereof. Accordingly, permeating force of the liquid 22 is increased so that a regeneration processing speed can be increased. In this example, both the faces of the transfer paper sheet 10 can be simultaneously coated with the liquid 22. However, when only one face of the transfer paper sheet 10 is coated with the liquid 22, for example, the lower coating roller 207 in FIG. 22 is used as it is and the upper coating roller 207 may be constructed by a normal rubber roller, etc.

Another constructional example of the liquid supplying unit 2 using a system for coating the transfer paper sheet 10 with the liquid 22 will next be described with reference to FIG. 23. This liquid supplying unit 2 is constructed such that one face of the transfer paper sheet 10 such as an upper face thereof is coated with a predetermined amount of liquid 22. The liquid supplying unit 2 has a liquid container 201, a pair of coating rollers 207, an unillustrated driving portion of the pair of coating rollers 207, a liquid reservoir portion 214, a blade 215, a liquid supplying pipe 212, a pump 213, etc. The liquid container 201 is filled with a predetermined amount of the liquid 22. The pair of coating rollers 207 convey the transfer paper sheet 10 while the transfer paper sheet 10 is supported by the coating rollers 207 therebetween. The liquid reservoir portion 214 is arranged such that the liquid 22 comes in contact with a surface of an upper coating roller 207. The blade 215 functions as a surplus liquid amount removing means for restricting an attaching amount of the liquid 22 on surfaces of the coating rollers 207. The liquid supplying pipe 212 and the pump 213 are used to supply the liquid 22 to the liquid reservoir portion 214. In this example, the liquid 22 supplied from the liquid container 201 to the pump 215 is once stored into the liquid reservoir portion 214 and is attached onto a surface of the upper coating roller 207. An attaching amount of the liquid 22 on the surface of the upper coating roller 207 is restricted to a predetermined amount by the blade 215. Accordingly, it is possible to prevent the transfer paper sheet 10 from being excessively wet with the liquid 22. The-transfer paper sheet 10 fed from a paper feed unit 1 is conveyed by the pair of coating rollers 207 while the transfer paper sheet 10 is supported by the coating rollers 207 therebetween. A surface of the transfer paper sheet 10 is then coated with the liquid 22.

In this example, when one coating roller opposite to the other coating roller is formed by a material including air bubbles such as a sponge, permeating force of the liquid 22 into the transfer paper sheet 10 can be increased by using a pressure difference between a nipping portion of the coating rollers 207 and the other portions thereof. Further, a processing face for constantly restricting a coating amount of the liquid 22 is set to a surface of the upper coating roller. However, the liquid supplying unit 2 can be constructed such that this processing face is set to a surface of the lower coating roller.

Figure 22:
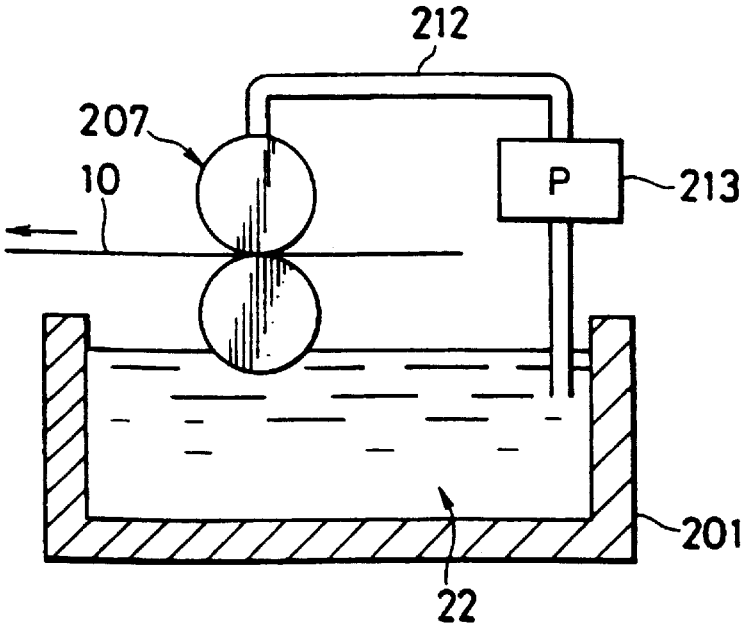
FIG. 22 is a view showing a schematic construction of the liquid supplying unit in another modified example.
Figure 23:
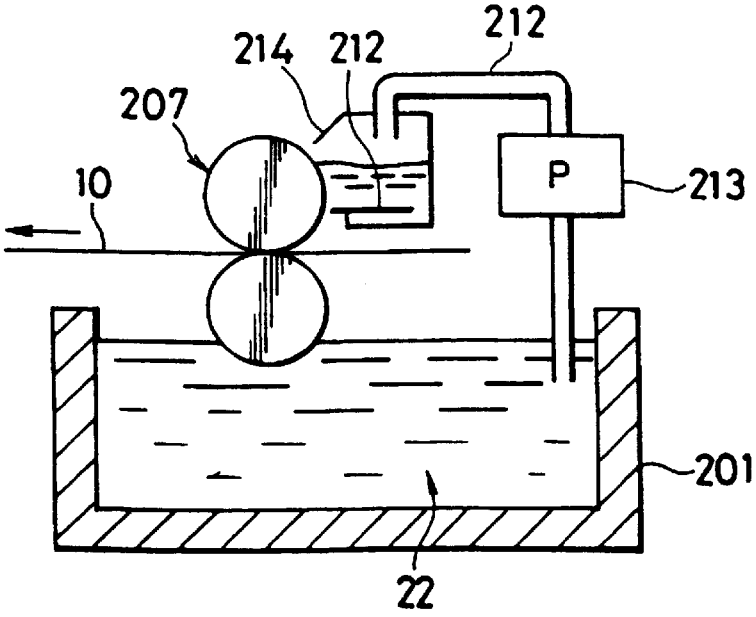
FIG. 23 is a view showing a schematic construction of the liquid supplying unit in another modified example.

If the liquid supplying unit 2 shown in FIG. 22 or 23 is used, a minimum amount of processing liquid 20 required to reduce adhesive force of toner can be supplied to the transfer paper sheet 10 so that a heating amount required for the transfer paper sheet in a subsequent drying process can be reduced. Further, extending and shrinking amounts of the transfer paper sheet 10 caused by moisture absorption can be reduced so that it is possible to restrain the transfer paper sheet 10 from being deformed in a wavy shape with wrinkles. In the liquid supplying unit 2 of this kind, an amount of the liquid 22 supplied to the transfer paper sheet 10 is set to a predetermined amount and this predetermined amount can be maintained by liquid amount control for displaying a remaining liquid amount, etc. of the liquid 22 within the liquid container 201 by the above control section. This predetermined amount can be also maintained by liquid concentration control, etc. in liquid resupply, etc. according to the number of processings.

Figure 24A:
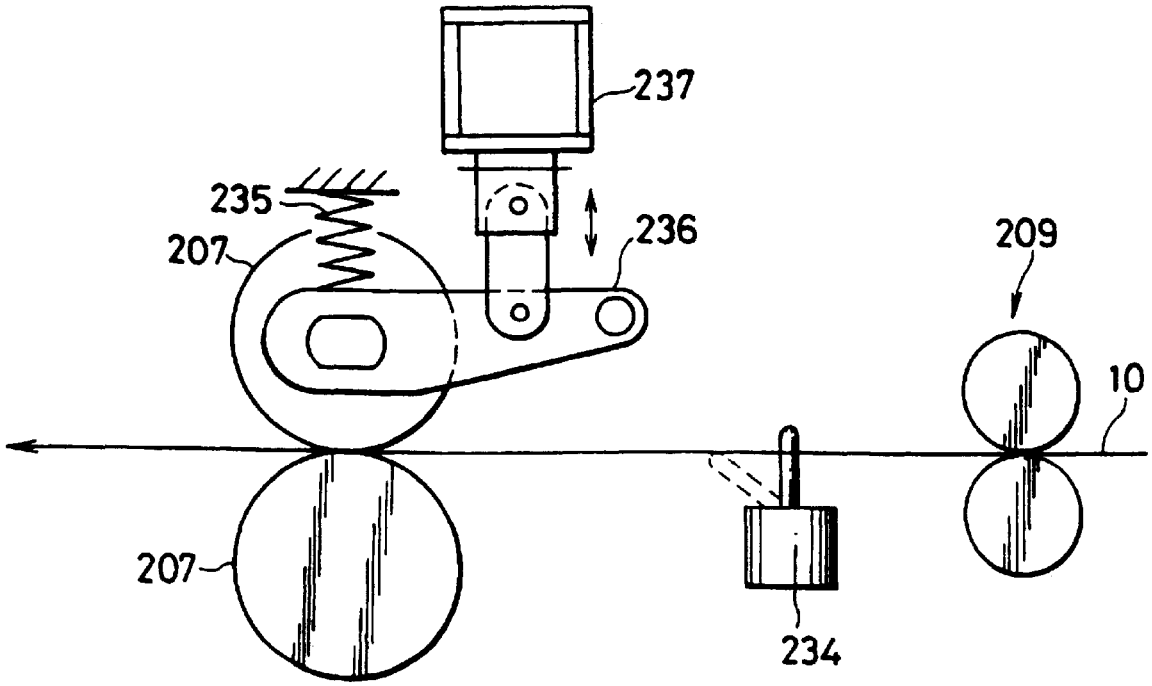
FIGS. 24a and 24b are respectively a view showing a schematic construction of the liquid supplying unit in another modified example and a flow chart of this liquid supplying unit.

A liquid supplying unit 2 having an applied pressure adjuster for adjusting a pressure applied to the pair of coating rollers 207 will next be explained with reference to FIGS. 24a and 24b. As shown in FIG. 24a, this liquid supplying unit 2 has a paper front end sensor 234, a biasing member 235, a movable bearing 236, a pressure releasing solenoid 237, a control section unillustrated in FIG. 24a, etc. The paper front end sensor 234 detects a front end of a conveyed sheet 10 of transfer paper. The biasing member 235 biases an upper coating roller 207 to a lower coating roller 207 such that the upper coating roller 207 is pressed against the lower coating roller 207. The biasing member 235 is constructed by a spring, etc. The movable bearing 236 is fixed to a rotating shaft of the upper coating roller 207. The pressure releasing solenoid 237 is used to release a pressure applied from the upper coating roller 207 to the lower coating roller 207 through the movable bearing 236.

The paper front end sensor 234 can be constructed by using a photosensor with a filler, etc.

Figure 24B:
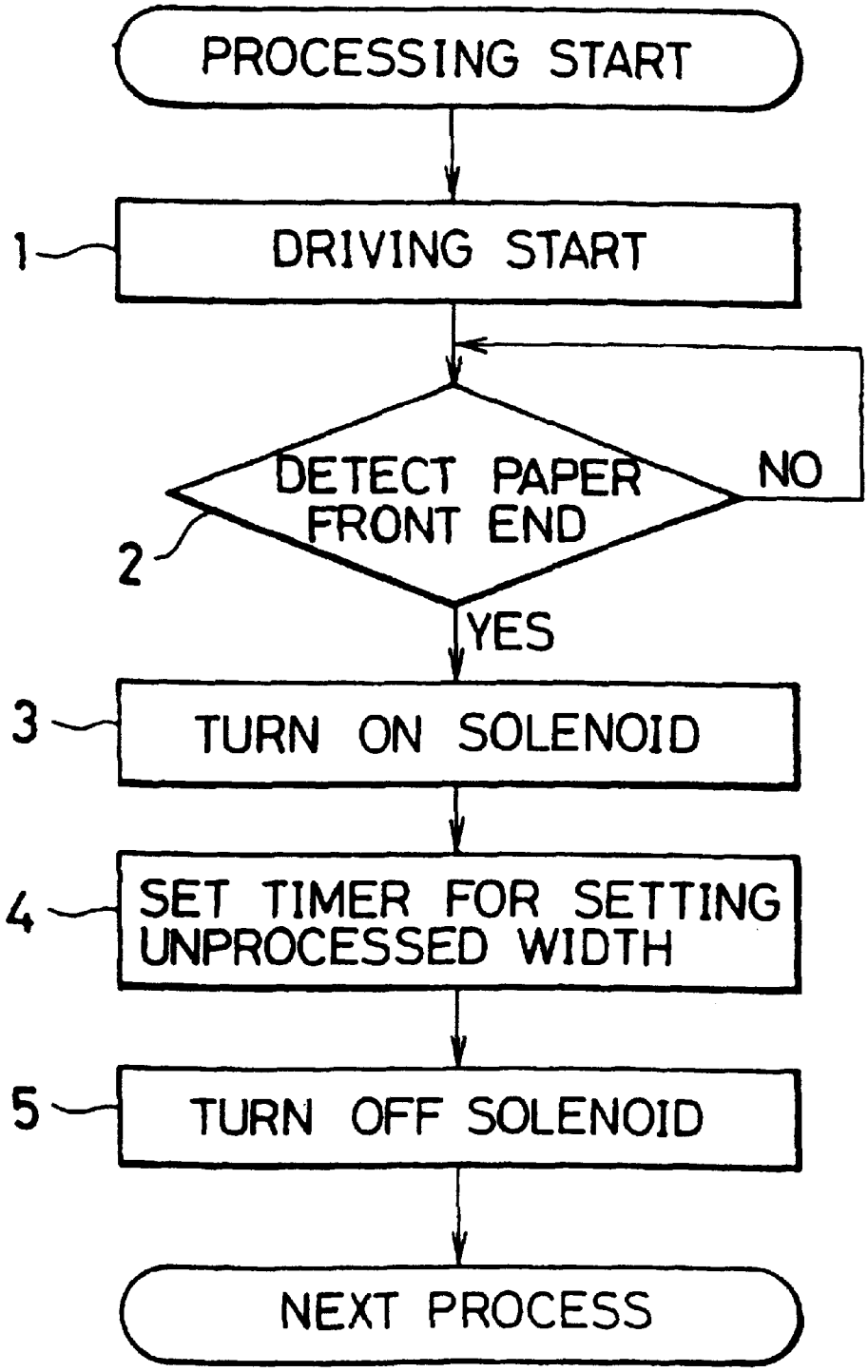

In this example, as shown in FIG. 24b, when an operation of the liquid supplying unit 2 is started, a transfer paper sheet 10 is conveyed from a paper feed unit 1 by a pair of conveying rollers 209. A front end of this transfer paper sheet 10 is detected by the paper front end sensor 234. A detecting signal of the paper front end sensor 234 is transmitted to the control section in steps 1 and 2 shown in FIG. 24b. The control section transmits a signal for releasing the applied pressure to an unillustrated driving portion of the solenoid 237. When the solenoid 237 is then turned on, a movable portion of this solenoid 237 is pulled and the upper coating roller 207 is separated from the lower coating roller 207 through the movable bearing 236. Thus, the applied pressure between the coating rollers 207 is released in a step 4 in FIG. 24b. When a setting time stored to a RAM 919 of the control section in advance has passed, a pressurization starting signal is transmitted from the control section to the driving portion of the solenoid 237. When the solenoid 237 is then turned off, the upper coating roller 207 is biased by the biasing member 235 in a step 5 such that the upper coating roller 207 comes in contact with the lower coating roller 207. The above setting time is determined on the basis of an unprocessed width of the front end of the transfer paper sheet 10, a line speed of the transfer paper sheet in a supporting portion of the pair of coating rollers 207, etc.

In this example, no front end of the transfer paper sheet 10 having a predetermined width is coated with the liquid 22 so that this front end is not wet with the liquid 22. Accordingly, a mold-releasing property of the transfer paper sheet 10 on the surface of a separating roller as a separating member is improved in the next separating process so that the transfer paper sheet 10 is easily separated from the separating roller. If the liquid supplying unit 2 shown in FIGS. 24a and 24b is constructed such that the applied force between the coating rollers 207 is increased with respect to the predetermined width of the front end of the transfer paper sheet 10, the liquid 22 is excessively supplied to only the front end of the transfer paper sheet 10 and this front end is wet with this liquid 22. Accordingly, a wet adsorbing-separating system can be used in the next treating process so that a process for separating the liquid 22 from the transfer paper sheet can be simply constructed.

Figure 25:
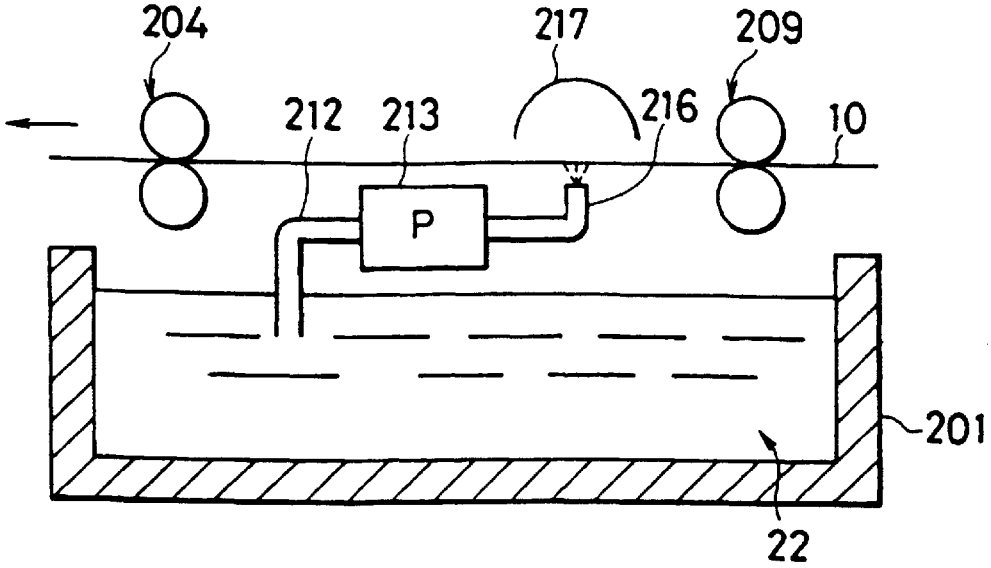
FIG. 25 is a view showing a schematic construction of the liquid supplying unit in another modified example.

A constructional example of a liquid supplying unit 2 using a system for spraying a liquid 22 to a sheet 10 of transfer paper will next be explained with reference to FIG. 25. This liquid supplying unit 2 has a liquid container 201, a nozzle 216, a liquid supplying pipe 212, a pump 213, a pair of conveying rollers 209, a pair of drawing rollers 204, a liquid shield plate 217, etc. The liquid container 201 is filled with a predetermined amount of the liquid 22. The nozzle 216 is used to spray the liquid 22 onto the transfer paper sheet 10. The liquid supplying pipe 212 and the pump 213 are used to supply the liquid 22 to the nozzle 216. The liquid shield plate 217 is used to restrain the liquid 22 from being scattered. In this example, a processing face of the transfer paper sheet 10 fed from a paper feed unit 1 is coated with the liquid 22 by spraying of the nozzle 216. When the processing paper face is coated with the liquid 22 by this spraying, the liquid 22 is excessively supplied to the processing paper face in many cases. However, a surplus amount of the liquid 22 is removed from the transfer paper sheet 10 by the pair of drawing rollers 204 arranged on a downstream side of the liquid supplying unit 2. In this example, a minimum amount of processing liquid 20 required to reduce adhesive force of toner can be supplied to the transfer paper sheet 10 by the pair of drawing rollers 204 so that a heating amount required for the transfer paper sheet in a subsequent drying process can be reduced. Further, extending and shrinking amounts of the transfer paper sheet 10 caused by moisture absorption can be reduced so that it is possible to restrain the transfer paper sheet 10 from being deformed in a wavy shape with wrinkles.

In this example, the processing paper face is set to a lower face, but may be set to an upper face or both faces.

The liquid supplying unit 2 in this example may be constructed such that a discharging amount of the pump 213, an emitting aperture of the nozzle 216, etc. can be varied. In this case, a spraying amount of the liquid 22 may be changed in accordance with a signal from the above control section.

For example, the spraying amount of the liquid 22 can be reduced by controlling the discharging amount of the pump 213 or the emitting aperture of the nozzle 216 such that the discharging amount or the emitting aperture is reduced with respect to a front end of the transfer paper sheet 10. In this case, no front end of the transfer paper sheet 10 having a predetermined width is coated and wet with the liquid 22. Accordingly, a mold-releasing property of the transfer paper sheet 10 on the surface of a separating roller as a separating member is improved in the next separating process so that the transfer paper sheet 10 is easily separated from the separating roller.

Further, for example, the spraying amount of the liquid 22 can be increased by controlling the discharging amount of the pump 213 or the emitting aperture of the nozzle 218 such that the discharging amount or the emitting aperture is increased with respect to the front end of the transfer paper sheet 10. In this case, a wet adsorbing-separating system can be used in the next treating process since the liquid 22 is excessively supplied to only the front end of the transfer paper sheet 10 and this front end is wet with this liquid 22. Accordingly, a process for separating the liquid 22 from the transfer paper sheet can be simply constructed.

Figure 26:
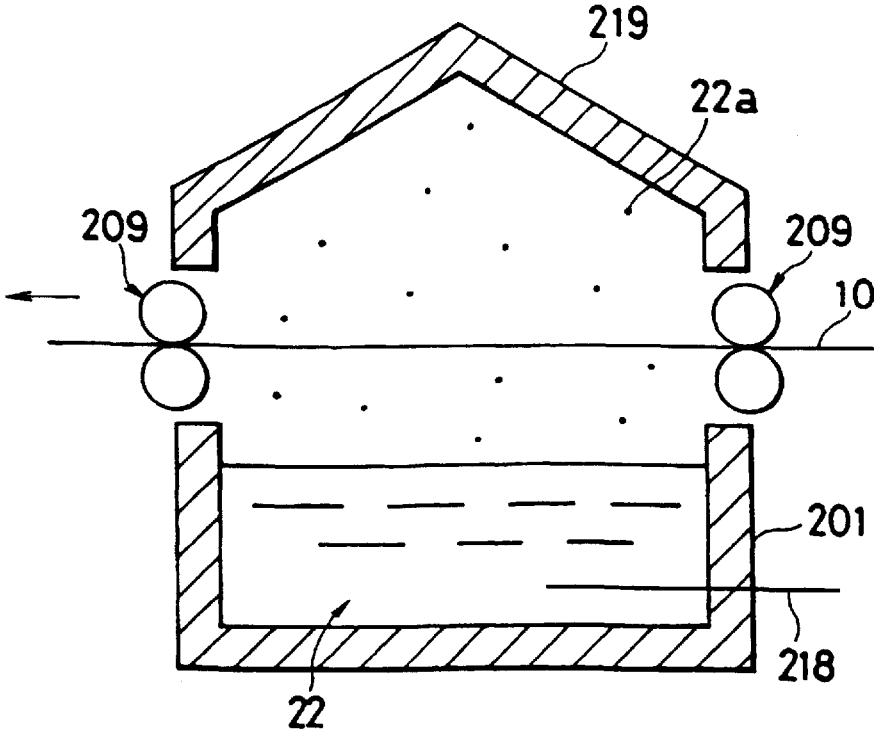
FIG. 26 is a view showing a schematic construction of the liquid supplying unit in another modified example.

A constructional example of a liquid supplying unit 2 using a system for supplying a liquid 22 to a transfer paper sheet 10 in a spraying shape will next be explained with reference to FIG. 26. This liquid supplying unit 2 has a liquid container 201, a sprayer 218, a condenser 219, a nozzle 218, a liquid supplying pipe 212, a pump 213, a pair of conveying rollers 209, a pair of drawing rollers 204, etc. The liquid container 201 is filled with a predetermined amount of the liquid 22. The condenser 219 is used to return a sprayed liquid 22a to the liquid 22. The nozzle 216 is used to spray the liquid 22 onto the transfer paper sheet 10. The liquid supplying pipe 212 and the pump 213 are used to supply the liquid 22 to the nozzle 216. For example, the sprayer 218 can be constructed by using a supersonic oscillator, a heater, etc., but is not limited to these members. In this example, the liquid 22 within the liquid container 201 is formed in a spraying shape by the sprayer 218. The transfer paper sheet 10 fed from a paper feed unit 1 is conveyed by the pair of conveying rollers 209 through the sprayed liquid 22a floating on the liquid container 201. At this time, the sprayed liquid 22a is attached onto a surface of the transfer paper sheet 10 so that the liquid 22 is supplied to the transfer paper sheet 10. The sprayed liquid 22a is again liquefied by the condenser 219 and is reused.

Figure 27:
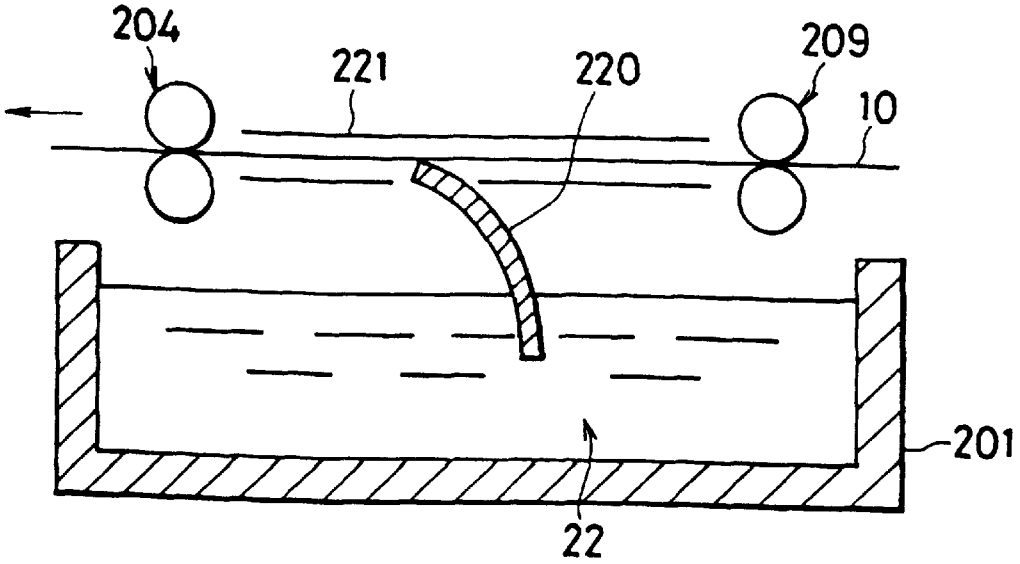
FIG. 27 is a view showing a schematic construction of the liquid supplying unit in another modified example.

A constructional example of a liquid supplying unit using a felt blade 220 will next be explained with reference to FIG. 27. This liquid supplying unit 2 has the felt blade 220, conveying guide plates 221, a pair of conveying rollers 209, a pair of drawing rollers 204, etc. One portion of the felt blade 220 is dipped into a liquid 22 within a liquid container 201. In this example, a transfer paper sheet 10 from a paper feed unit 1 is fed between the conveying guide plates 221 by the pair of conveying rollers 209. The transfer paper sheet 10 then comes in contact with the felt blade 220 sufficiently impregnated with the liquid 22 so that the transfer paper sheet 10 is coated with the liquid 22. A surplus amount of the liquid 22 on the transfer paper sheet 10 is removed therefrom by the pair of drawing rollers 204 arranged on a downstream side of the liquid supplying unit 2. In this example, a minimum amount of processing liquid 20 required to reduce adhesive force of toner can be supplied to the transfer paper sheet 10 by the pair of drawing rollers 204 so that a heating amount required for the transfer paper sheet in a subsequent drying process can be reduced. Further, extending and shrinking amounts of the transfer paper sheet 10 caused by moisture absorption can be reduced so that it is possible to restrain the transfer paper sheet 10 from being deformed in a wavy shape with wrinkles.

Figure 28:
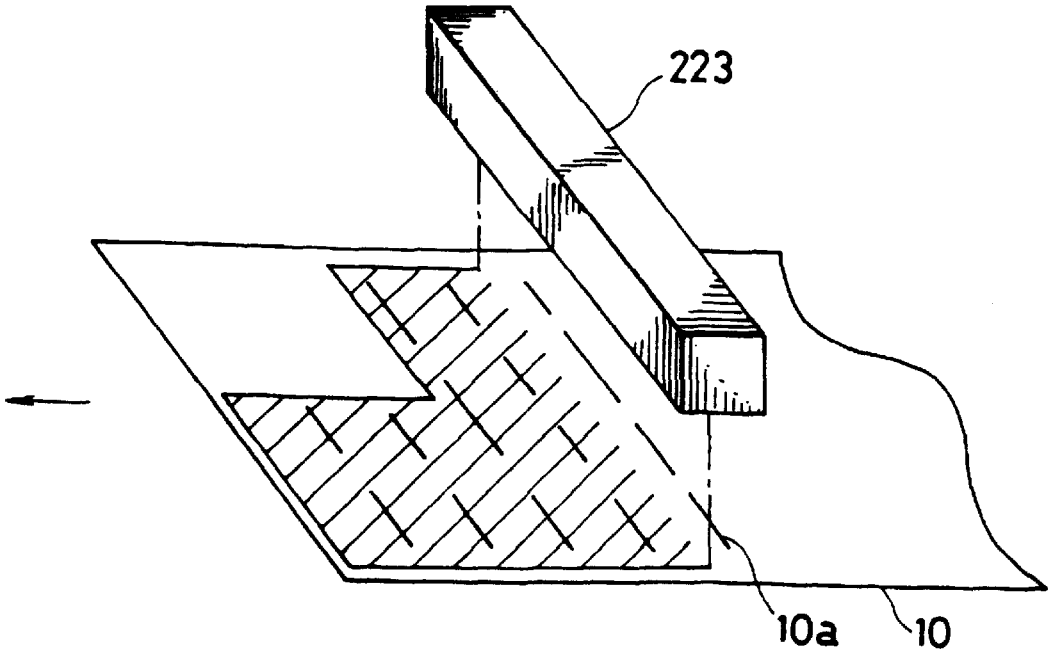
FIG. 28 is a view showing a schematic construction of the liquid supplying unit in another modified example.

A constructional example of a liquid supplying unit 2 using a system for supplying a liquid 22 to a transfer paper sheet by a jet nozzle will next be explained with reference to FIG. 28. This liquid supplying unit 2 has a jet nozzle head 223, an unillustrated image sensor, etc. The jet nozzle head 223 has a plurality of jet nozzles perpendicular to a feeding direction of the transfer paper sheet 10. The image sensor reads an image on the transfer paper sheet 10. In this example, the jet nozzle head 223 jets the liquid 22 to an image region 10a on the transfer paper sheet 10 fed from a paper feed unit 1. An image on the transfer paper sheet 10 is read by the image sensor. An operation of the liquid supplying unit 2 is controlled such that the liquid 22 is jetted or not jetted in accordance with this image region 10a. It is not necessary to finely set accuracies in reading and jetting positions. It is sufficient to supply the liquid 22 to a region larger than the image. For example, an accuracy of 200 to 400 dots per one inch is generally set in ink jet printing used for a printer, etc. In this example, it is sufficient to set a divisional accuracy in a unit of several centimeters. The reading and jetting positions may be controlled with high accuracy. Further, an entire face of the transfer paper sheet may be processed without forming an image reading portion.

If the liquid supplying unit 2 in this example is used, a minimum amount of processing liquid 20 required to reduce adhesive force of toner can be supplied to the transfer paper sheet 10 by controlling a jetting amount of the jet nozzle head 223 so that a heating amount required for the transfer paper sheet in a subsequent drying process can be reduced. Further, extending and shrinking amounts of the transfer paper sheet 10 caused by moisture absorption can be reduced so that it is possible to restrain the transfer paper sheet 10 from being deformed in a wavy shape with wrinkles.

The jetting amount of the jet nozzle head 223 may be changed in accordance with a signal from the above control section. For example, if the jetting amount of the jet nozzles is reduced with respect to a front end of the transfer paper sheet 10, no front end of the transfer paper sheet 10 having a predetermined width is coated and wet with the liquid 22. Accordingly, a mold-releasing property of the transfer paper sheet 10 on the surface of a separating roller as a separating member is improved in the next separating process so that the transfer paper sheet 10 is easily separated from the separating roller.

Further, for example, if the jetting amount of the jet nozzles is increased with respect to the front end of the transfer paper sheet 10, the liquid 22 is excessively supplied to only the front end of the transfer paper sheet 10 and this front end is wet with this liquid 22. Accordingly, a wet adsorbing-separating system can be used in the next treating process so that a process for separating the liquid 22 from the transfer paper sheet can be simply constructed.

Figure 29A:
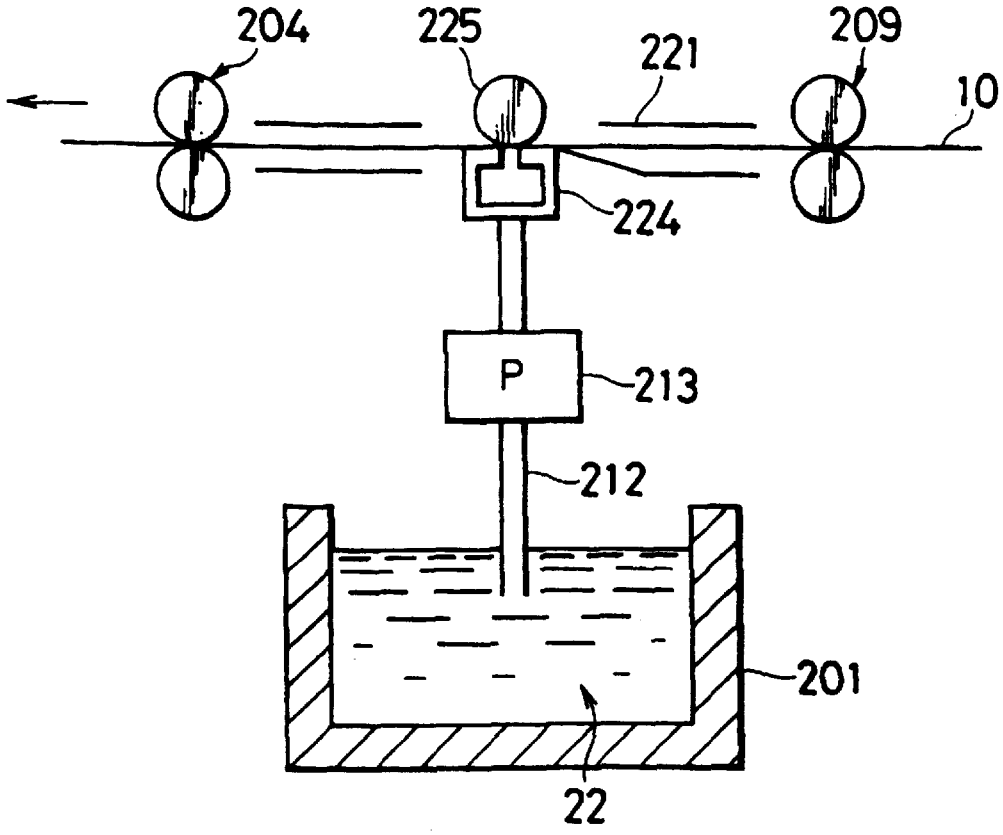
FIG. 29a is a view showing a schematic construction of the liquid supplying unit in another modified example.
Figure 29B:
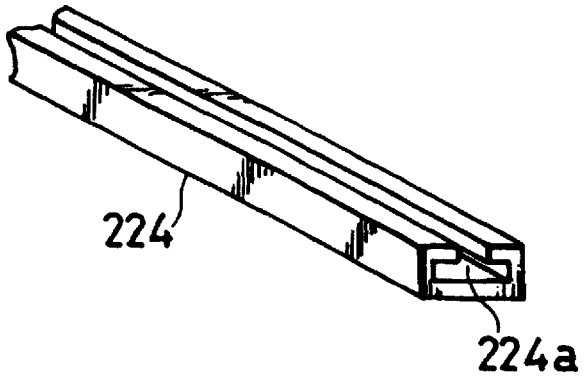

A constructional example of a liquid supplying unit 2 using a system for supplying a liquid 22 within a processing head 224 to a transfer paper sheet 10 by a direct contact will next be explained with reference to FIGS. 29a and 29b. This liquid supplying unit 2 has a processing head 224 (see FIG. 29b), an opposite roller 225, a liquid container 201, a liquid supplying pipe 212, a pump 213, a pair of conveying rollers 209, a pair of drawing rollers 204, conveying guide plates 221, an unillustrated driving portion of the respective rollers, etc. The processing head 224 is hollow and has an elongated opening portion 224a formed in a direction perpendicular to a conveying direction of the transfer paper sheet 10. The opposite roller 225 is arranged in a position opposed to the processing head 224 through the transfer paper sheet 10. The liquid container 201 is filled with a predetermined amount of the liquid 22. The liquid supplying pipe 212 and the pump 213 are used to supply the liquid 22 to the processing head 224. In this example, the transfer paper sheet 10 fed from a paper feed unit 1 is conveyed by the processing head 224 and the opposite roller 225 while the transfer paper sheet 10 is supported by the processing head 224 and the opposite roller 225 therebetween. At this time, the liquid 22 in the opening portion 224a of the processing head 224 comes in direct contact with a lower face of the transfer paper sheet 10 so that the liquid 22 is supplied to the transfer paper sheet 10. A surplus amount of the liquid 22 on the transfer paper sheet 10 is removed therefrom by the pair of drawing rollers 204 arranged on a downstream side of the liquid supplying unit 2. In this example, a minimum amount of processing liquid 20 required to reduce adhesive force of toner can be supplied to the transfer paper sheet 10 by the pair of drawing rollers 204 so that a heating amount required for the transfer paper sheet in a subsequent drying process can be reduced. Further, extending and shrinking amounts of the transfer paper sheet 10 caused by moisture absorption can be reduced so that it is possible to restrain the transfer-paper sheet 10 from being deformed in a wavy shape with wrinkles.

In this example, a liquid face of the processing head 224 comes in close contact with the transfer paper sheet 10 so that evaporation of the liquid 22 from the processing head 224 can be prevented. Further, the liquid container 201 shown in FIG. 29a can be hermetically closed so that the liquid 22 within the liquid container 201 is pumped up and supplied to the processing head 224 by the pump 213. When the liquid container 201 is of a closing type, it is possible to prevent the liquid 22 from being evaporated from the liquid container 201.

A processing head 224 movable in the conveying direction of a transfer paper sheet will next be explained with reference to FIGS. 30a to 30c. The processing head 224 and an opposite roller 225 opposed to an opening portion 224a of this processing head 224 are movably arranged between conveying rollers 209a and 209b. A driving device for operating the processing head 224 and rotating the opposite roller 225 is also arranged.

Figure 30A:
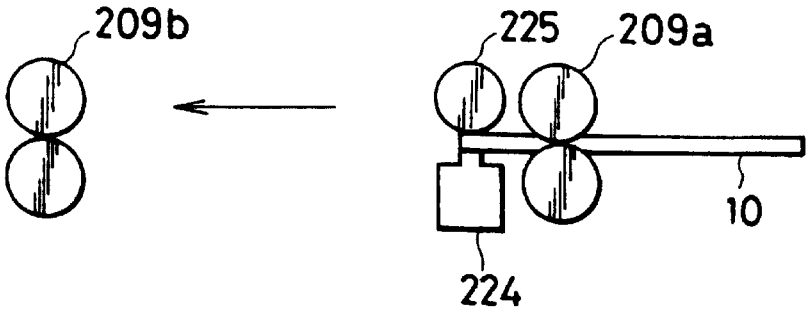
FIGS. 30a to 30c are explanatory views showing an operation of the processing head shown in FIG. 29b.

As shown in FIG. 30a, the transfer paper sheet 10 is conveyed from a paper feed cassette by the conveying rollers 209a, etc. This transfer paper sheet 10 is supported between the rotating opposite roller 25 and the processing head 224 in which supply of the liquid 22 is stopped. Rotation of the opposite roller 225 is controlled by the above control section such that this rotation of the opposite roller 225 is temporarily stopped when the opposite roller 225 has supported a front end of the transfer paper sheet 10 together with the processing head 224. Timing of this temporary stoppage of the rotation of the opposite roller 225 can be controlled on the basis of an unillustrated paper front end sensor arranged on an upstream side of the conveying rollers 209a, an unillustrated paper sensor arranged in the processing head 224 or the opposite roller 225, etc. As shown in FIG. 30b, the processing head 224 and the opposite roller 225 are moved onto a side of the conveying rollers 209b while the processing head 224 and the opposite roller 225 supports the front end of the transfer paper sheet 10 therebetween. The movements of the processing head 224 and the opposite roller 225 are stopped when the processing head 224 and the opposite roller 225 have reached a predetermined position before the conveying rollers 209b. The rotation of the opposite roller 225 is then started such that the conveying rollers 209b can support the transfer paper sheet 10. After the transfer paper sheet 10 is supported by the conveying rollers 209b as shown in FIG. 30c, the pump 213 is turned on and supply of the liquid 22 to the processing head 224 is started. The supply of the liquid 22 to the processing head 224 may be controlled such that this liquid supply is started when a predetermined time has passed from beginning of the rotation of the opposite roller 225. When the transfer paper sheet 10 is conveyed and the liquid 22 is completely supplied to the transfer paper sheet 10, the operation of the processing head 224 and the rotation of the opposite roller 225 are stopped. The processing head 224 and the opposite roller 225 are then returned to their predetermined original positions on the side of the conveying rollers 209a and attain a standby state until the next transfer paper sheet 10 is conveyed.

An unprocessed region having no supplied liquid 22 can be formed at the front end of the transfer paper sheet 10 by performing such an operation. Accordingly, a mold-releasing property of the transfer paper sheet 10 on the surface of a separating roller as a separating member is improved in the next separating process so that the transfer paper sheet 10 is easily separated from the separating roller.

Figure 30B:
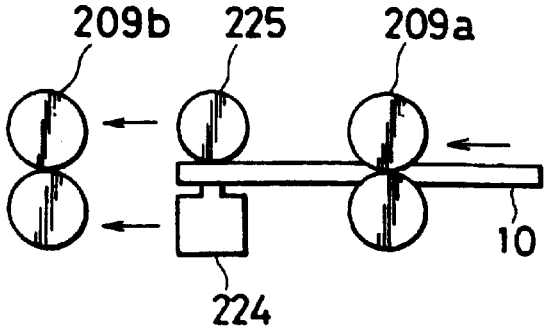
Figure 30C:
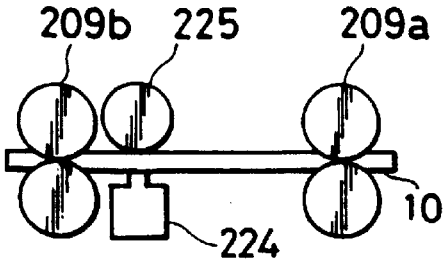

After the transfer paper sheet 10 is supported by the conveying rollers 209b in FIGS. 30a to 30c, the processing head 224 and the opposite roller 225 can be moved such that the processing head 224 and the opposite roller 225 come in frictional contact with a surface of the transfer paper sheet 10 having the supplied liquid 22. For example, the processing head 224 and the opposite roller 225 can be reciprocated between the conveying rollers 209a and 209b. In such a case, the processing head 224, etc. come in frictional contact with the surface of the transfer paper sheet 10 impregnated with the liquid 22. Thus, air bubbles within the transfer paper sheet 10 can be removed therefrom. Accordingly, the liquid 22 can permeate the transfer paper sheet 10 more efficiently and reliably by a capillary tube effect, etc.

Figure 31A:
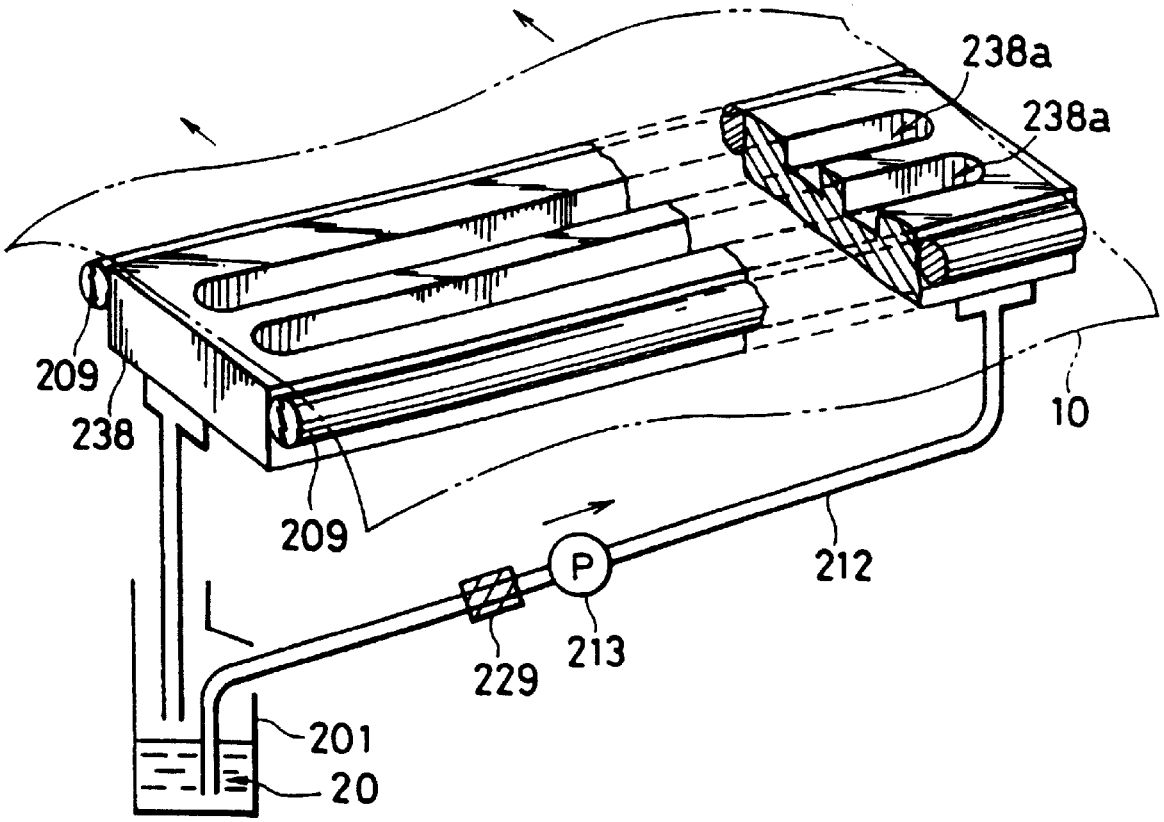
FIG. 31a is a perspective view showing another modified example of the liquid supplying unit.
Figure 31B:
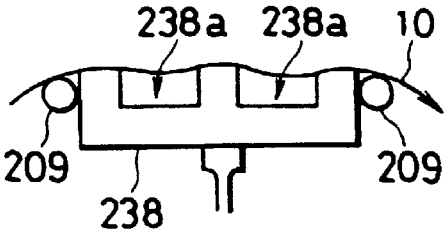

A liquid supplying unit 2 using a processing head 238 for flowing a processing liquid 20 into a groove coming in contact with a transfer paper sheet 10 at a high speed will next be explained with reference to FIGS. 31 to 33. As shown in FIGS. 31a and 31b, two grooves 238a perpendicular to a conveying direction of the transfer paper sheet 10 are formed on a side of the processing head 238 of this .liquid supplying unit 2 coming in contact with the transfer paper sheet 10. The processing liquid 20 within a liquid container 201 is supplied to an end portion of one of the grooves 238a of the processing head 238 through a liquid supplying pipe 212. A filter 229 and a pump 213 are arranged in an intermediate portion of the liquid supplying pipe 212. The supplied processing liquid 20 is moved within the one groove 238a at a high speed and is returned to the liquid container 201 from an end portion of the other groove 238a so that the processing liquid 20 is circulated. A conveying roller 209 is arranged in each of both side portions of the processing head 238 in the conveying direction of the transfer paper sheet.

In this example, the processing liquid 20 is moved into the grooves 238a of the processing head 238 coming in contact with the transfer paper sheet 10 at a high speed. Accordingly, a negative pressure is generated within the grooves 238a in a direction perpendicular to a flowing direction of the processing liquid 20 so that the transfer paper sheet 10 comes in close contact with the processing liquid 20 within the grooves 238a. Thus, the transfer paper sheet 10 is coated with the processing liquid 20. At this time, the transfer paper sheet 10 comes in direct contact with the processing liquid 20 and the processing liquid 20 is moved at a high speed so that air bubbles are removed from a surface of the transfer paper sheet 10. Further, the processing liquid 20 can permeate the transfer paper sheet 10 efficiently and reliably by a capillary tube effect.

The transfer paper sheet 10 on the processing head 238 is close to the grooves 238a so that the transfer paper sheet 10 functions as a cover of the grooves 238a. Therefore, it is possible to prevent the processing liquid 20 from being evaporated and lost.

Further, it is possible to prevent the processing liquid 20 from being evaporated by hermetically closing the liquid container 201. The processing liquid 20 is circulated through the liquid supplying pipe 212, the filter 229 and the pump 213. Accordingly, the cleaned processing liquid 20 can be supplied to the grooves 238a of the processing head 238 at any time.

Figure 32:
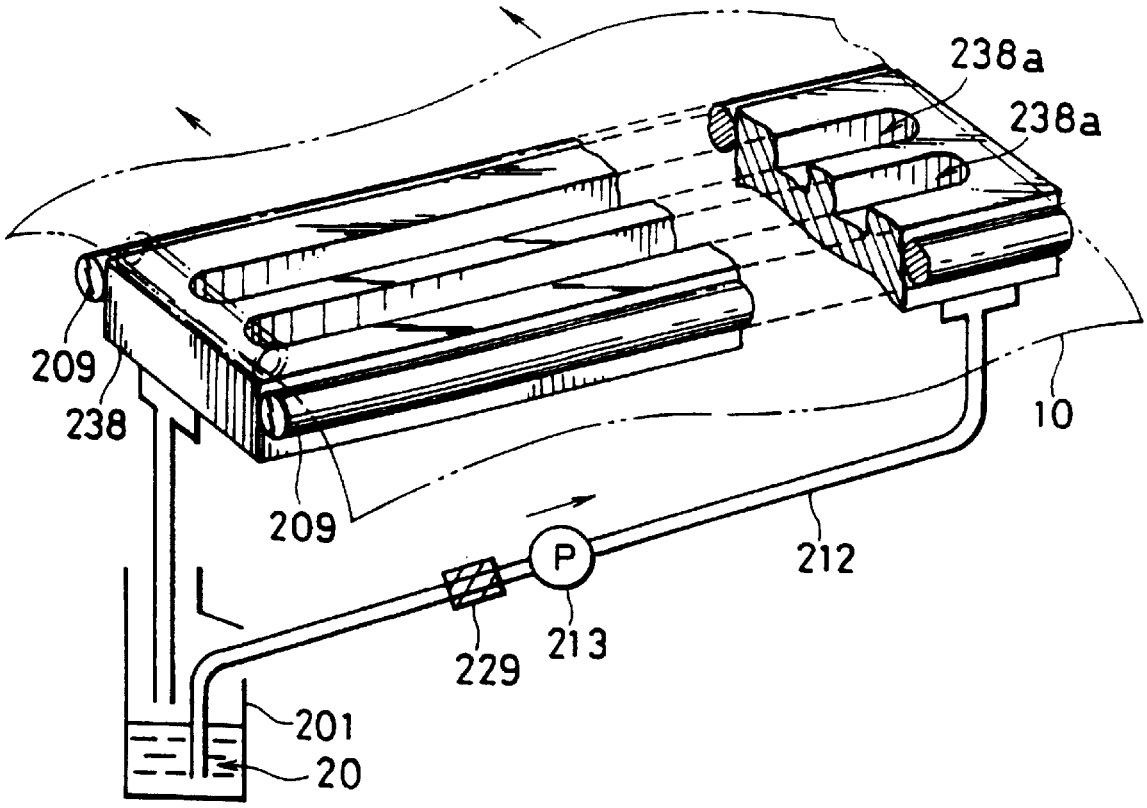
FIG. 32 is a view showing a schematic construction of the liquid supplying unit in another modified example.

FIG. 32 shows a modified example of the liquid supplying unit 2. In this example, a conveying belt is arranged in a region in which no grooves 238a are formed on the processing head 238. This conveying belt is tensioned by two rollers and is arranged between conveying rollers 209 and is also arranged on an upper face of the processing head 238 such that the transfer paper sheet 10 is supported between the conveying belt and the upper face of the processing head 238. Thus, the transfer paper sheet 10 can be reliably conveyed on the processing head 238.

Figure 33:
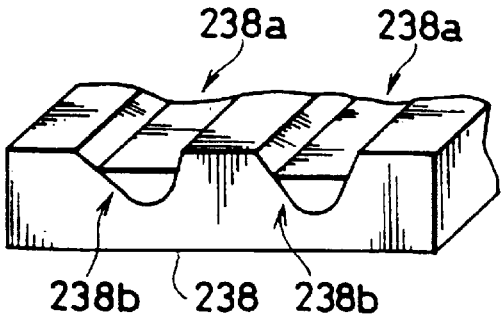
FIG. 33 is a cross-sectional view of a processing head of the liquid supplying unit shown in FIG. 32.

An inside face 238b of each of the grooves 238a of the processing head 238 on a downstream side of the liquid supplying unit 2 in a conveying direction of the transfer paper sheet is slantingly formed as shown in FIG. 33. In this case, when a front end of the transfer paper sheet 10 drops into each of the grooves 238a, the transfer paper sheet 10 can be discharged from the grooves 238a without folding the transfer paper sheet 10. Accordingly, the transfer paper sheet 10 can be reliably conveyed on the processing head 238.

Figure 34:
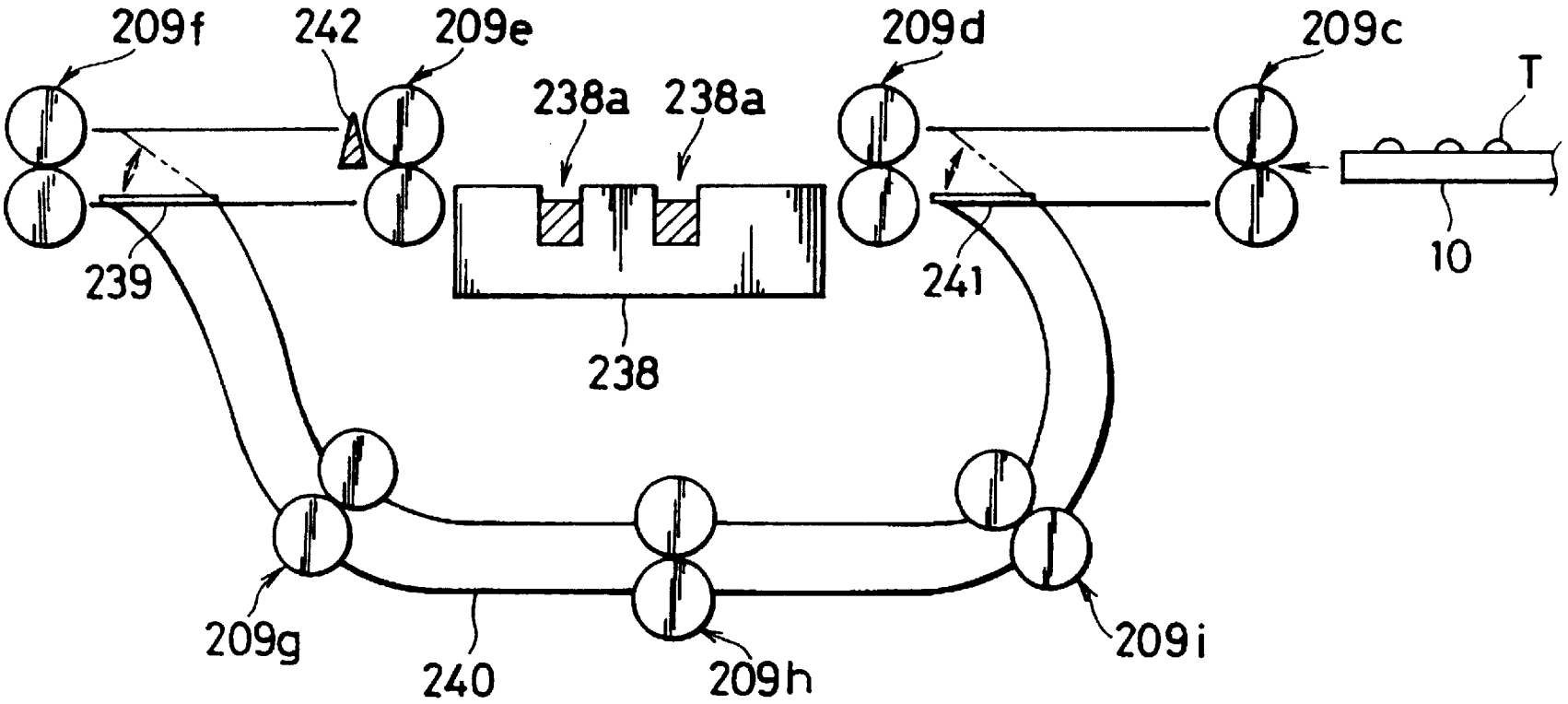
FIG. 34 is a view for explaining an operation of the liquid supplying unit having the processing head shown in FIG. 33.

The operation of a liquid supplying unit 2 having a processing head 238 and capable of supplying a liquid onto the entire surface of a transfer paper sheet 10 will next be described with reference to FIG. 34. A distance between a central position of a conveying roller 209e and a central position of a groove 238a of the processing head 238 on a downstream side of the liquid supplying unit 2 in a conveying direction of the transfer paper sheet is set to a length half or shorter than a length of the transfer paper sheet 10 in the conveying direction when the transfer paper sheet has a minimum size. Positions of a first conveying path switching claw 239 and a second conveying path switching claw 241 are set to positions shown by solid lines in FIG. 34.

The transfer paper sheet 10 is first conveyed onto the processing head 238 by conveying rollers 209c and 209d. At this time, the processing head 238 is set to be turned off. When the processing head 238 is set to be turned on, a front end of the transfer paper sheet 10 drops into grooves 238a by a negative pressure caused within the grooves 238a of the processing head 238 so that there is a fear of folding the transfer paper sheet. Thereafter, the front end of the transfer paper sheet 10 passes through the processing head 238 and is detected by a paper front-rear end sensor 242. At this time, the transfer paper sheet 10 is supported by conveying rollers 209e therebetween so that the transfer paper sheet 10 can be conveyed. Therefore, the processing head 238 is turned on so that a liquid begins to be supplied onto the transfer paper sheet.

When a rear end of the transfer paper sheet 10 is detected by the paper front-rear end sensor 242, the processing head 238 is once turned off. In this case, the processing head 238 may be turned off at any time. For example, the processing head 238 may be turned off after it is confirmed that the transfer paper sheet 10 has passed through a reverse conveying path 240. When the rear end of the transfer paper sheet 10 is detected and a predetermined time has passed thereafter, a pair of conveying rollers 209f are reversely rotated and the position of the first conveying path switching claw 239 is switched to a position shown by a double-dotted chain line in FIG. 34. Thus, the transfer paper sheet 10 is conveyed by conveying rollers 209g, 209h and 209i through the reverse conveying path 240. The transfer paper sheet 10 is then supported by the pair of conveying rollers 209d therebetween. At this time, the position of the second conveying path switching claw 241 is switched in advance to a position shown by a double-dotted chain line in FIG. 34.

When the front end of the transfer paper sheet 10 is detected by the paper front-rear end sensor 242, the processing head 238 is turned on. Thus, a processing liquid 20 is supplied to a portion which is not wet with the processing liquid 20 in the above liquid supplying process. Thereafter, the first conveying path switching claw 239 is returned to the original solid line position and the conveying rollers 209f are rotated in a normal direction. The transfer paper sheet 10 is fed to the next treating process such as a separating process, a drying process, etc. The processing head 238 is turned off when the rear end of the transfer paper sheet 10 is detected by the paper front-rear end sensor 242.

In this example, the processing liquid 20 can be reliably supplied onto an entire face of the transfer paper sheet 10.

Figure 35:
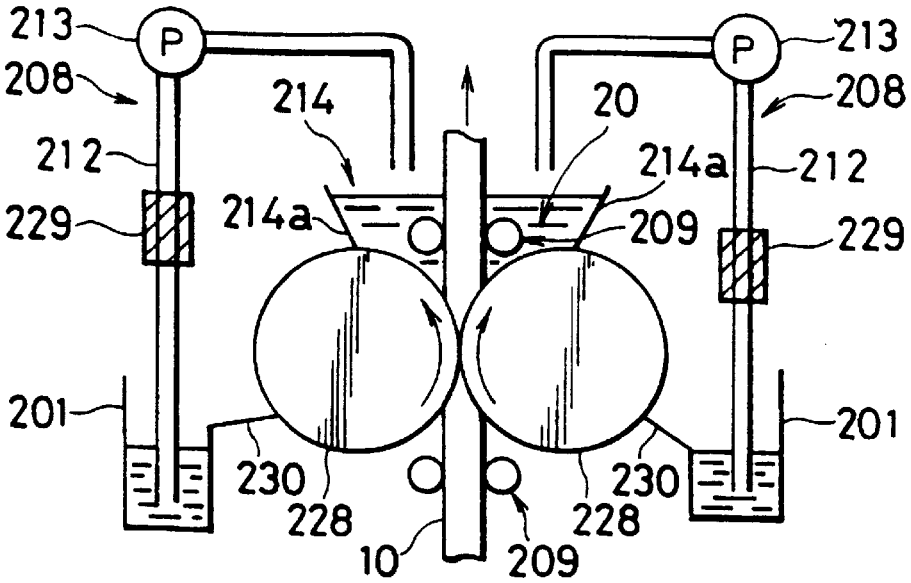
FIG. 35 is a view showing a schematic construction of the liquid supplying unit in another modified example.
Figure 36:
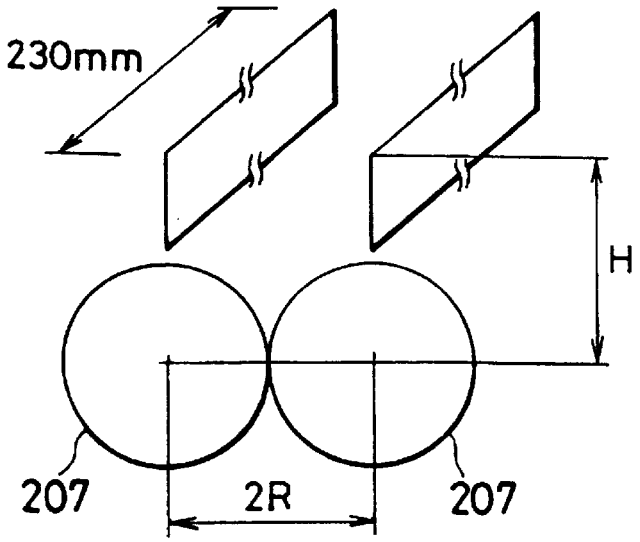
FIG. 36 is a view for explaining the volume of a processing liquid in a liquid reservoir portion of the liquid supplying unit shown in FIG. 35.

One concrete example of a liquid supplying unit 2 having a means for compressing a transfer paper sheet 10 and a means for supplying a liquid to the transfer paper sheet 10 will next be explained with reference to FIG. 35. In the liquid supplying unit 2 in this example, the compressing means is constructed by using a pair of coating-compressing rollers 228 for supporting the transfer paper sheet 10 therebetween and compressing the transfer paper sheet 10 with a predetermined compressing force. The pair of coating-compressing rollers 228 are arranged such that the transfer paper sheet 10 from a paper feed unit 1 is fed from below to above. The pair of coating-compressing rollers 228 are rotated in arrow directions in FIG. 35 by an unillustrated driving portion.

The above liquid supplying means is constructed by a liquid reservoir portion 214 and two sets of liquid supplying devices 208. The liquid reservoir portion 214 is arranged such that a processing liquid 20 comes in contact with both faces of the transfer paper sheet 10 being released from the compression between the pair of coating-compressing rollers 228. The two sets of liquid supplying devices 208 supply the processing liquid 20 to the liquid reservoir portion 214 in accordance with necessity. This liquid reservoir portion 214 has a liquid holding plate 214a. The liquid holding plate 214a is constructed such that a lower end portion of the liquid holding plate 214a slidably comes in frictional contact with a surface of each of the coating-compressing rollers 228. This lower end portion of the liquid holding plate 214a is desirably constructed by a material for preventing each of the coating-compressing rollers 228 from being damaged. In this example, liquid reservoirs are independently formed on both front and rear faces of the transfer paper sheet 10. However, the respective liquid reservoirs on both the faces of the transfer paper sheet 10 may be communicated with each other.

Each of the above two sets of liquid supplying devices 208 is constructed by a liquid container 201, a liquid supplying pipe 212, a pump 213, a filter 229 as a liquid cleaning means, etc. A liquid removing blade 230 is arranged in an upper end portion of the liquid container 201 on a side of each of the coating-compressing rollers 228. The liquid removing blade 230 removes the remaining processing liquid from a surface of each of the coating-compressing rollers 228. Only one set of liquid supplying device 208 may be arranged when the liquid reservoirs on both sides of the transfer paper sheet 10 are communicated with each other.

An unillustrated guide plate and a pair of guide rollers for guiding the transfer paper sheet 10 are suitably arranged on a conveying path of the transfer paper sheet 10. For example, in the construction of the liquid supplying unit 2 shown in FIG. 35, a pair of conveying rollers 209 are arranged on upstream and downstream sides of the pair of coating-compressing rollers 228.

In the above example, the transfer paper sheet 10 having a toner image on a surface thereof is guided and conveyed by the pair of conveying rollers 209, etc. until an inlet of the pair of coating-compressing rollers 228. The pair of coating-compressing rollers 228 convey the transfer paper sheet 10 upward while the pair of coating-compressing rollers 228 support the transfer paper sheet 10 therebetween and compress the transfer paper sheet 10. A gas such as air bubbles within fine clearances of the transfer paper sheet 10 is removed therefrom by this compression. Compressing force applied to the transfer paper sheet 10 is released after the transfer paper sheet 10 has passed through a compressing position of the pair of coating-compressing rollers 228. The processing liquid 20 within the liquid reservoir portions 214 comes in contact with the transfer paper sheet 10 in a releasing portion of this compressing force. Accordingly, when the compressing force is released, the processing liquid 20 within the liquid reservoir portions 214 rapidly permeates the above fine clearances within the transfer paper sheet 10, and also permeates paper fibers such as cellulose fibers as a constructional material of the transfer paper sheet 10 by a capillary tube effect, etc. The processing liquid 20 rapidly permeates the fine clearances and the paper fibers mainly from both face portions of the transfer paper sheet 10 each having no toner image. The processing liquid 20 finally permeates reliably until an interfacial portion between the toner image and the paper fibers. The toner on the transfer paper sheet 10 generally has water-repellency so that no processing liquid 20 is easily attached onto a toner image surface. However, innumerable clearances exist in the toner image as can be seen from the observation of a microscope. Accordingly, the processing liquid 20 also permeates the toner image surface by a capillary tube phenomenon, etc.

As mentioned above, the processing liquid 20 reliably permeates until the interfacial portion between the toner image and the paper fibers on a surface of the transfer paper sheet 10. Thus, adhesive characteristics of the toner and/or the paper fibers are changed so that an attaching or adhesive state of the toner image and the paper fibers of the transfer paper sheet 10 is changed to an unstable state. Accordingly, the toner image can be easily separated from the surface of the transfer paper sheet 10.

The transfer paper sheet 10 having the permeated processing liquid 20 is next conveyed between separating rollers 302 of the next toner separating unit 3 through the pair of conveying rollers 209. As shown in FIG. 18, in this toner separating unit 3, a separating member 302a comes in contact with toner T and the processing liquid 20 on the transfer paper sheet 10. Adhesive force between the separating member 302a and the toner T is set to be stronger than adhesive force between the toner T and a surface of the transfer paper sheet 10. Accordingly, the toner T is separated from the surface of the transfer paper sheet 10. The processing liquid 20 is attached between the separating member 302a and a surface of the transfer paper sheet 10 on which no toner is adhesively attached. Accordingly, no paper fibers on this surface of the transfer paper sheet 10 are separated therefrom by the separating member 302a. Therefore, only the toner T can be separated from the transfer paper sheet 10 without damaging the surface of the transfer paper sheet 10.

It is possible to reuse such a transfer paper sheet 10 separating only the toner T therefrom without damaging this paper surface in a copying machine, etc.

The remaining processing liquid attached onto a surface of each of the coating-compressing rollers 228 is scraped by the liquid removing blade 230 and is stored into the liquid container 201. Thereafter, this remaining processing liquid is supplied by the pump 213 to each of the liquid reservoir portions 214 through the filter 229. When the processing liquid passes through the filter 229, a cleaned processing liquid can be supplied to each of the liquid reservoir portions 214 at any time. As a result, the processing liquid 20 including no dust and impurities, etc. can be supplied to the transfer paper sheet 10 and can permeate more efficiently and reliably the transfer paper sheet 10 until an interfacial portion between the toner T and paper fibers on a surface of the transfer paper sheet 10.

In this example, the compressing force of the pair of coating-compressing rollers 228 is preferably set such that no processing liquid 20 is leaked from a contact position between the coating-compressing rollers. Concretely, no processing liquid is leaked from this contact position if the compressing force is set to be equal to or greater than force corresponding to at least a weight of the processing liquid 20 on the pair of coating-compressing rollers 228.

Figure 38:
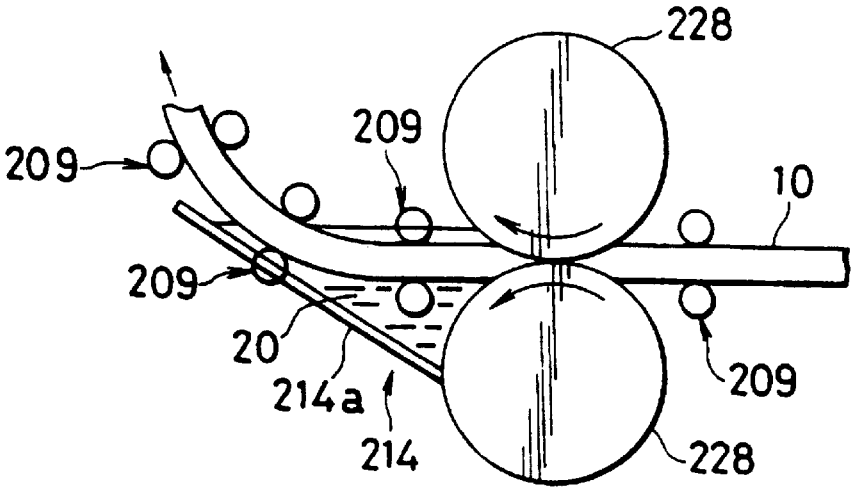
FIG. 38 is a view showing a schematic construction of the liquid supplying unit in another modified example.

An approximate value W of the weight of the processing liquid 20 on the pair of coating-compressing rollers 228 can be estimated as follows. As shown in FIG. 38, the height of a liquid reservoir is set to H (cm). A radius of each of the coating-compressing rollers 228 is set to R (cm). When a sheet of copying paper having a size A4 passes through the pair of coating-compressing rollers 228, it is sufficient to set a length of each of the coating-compressing rollers 228 to at least 23 cm or more. The approximate value W of the weight of the processing liquid 20 on the pair of coating-compressing rollers 228 can be more simply calculated when the processing liquid 20 exists in the shape of a rectangular parallelepiped of $2R \times H \times 23$ ($cm^3$) on the pair of coating-compressing rollers 228 and has a density of 1 $g/cm^3$. In this case, this approximate value W is calculated by the following formula.

$$W = 46 \times R \times H \text{ (g)}$$

For example, when R=5 cm and H=5 cm are set, it is necessary to set the compressing force of the pair of coating-compressing rollers 228 to be equal to or greater than about 1.15 kgf.

Figure 37:
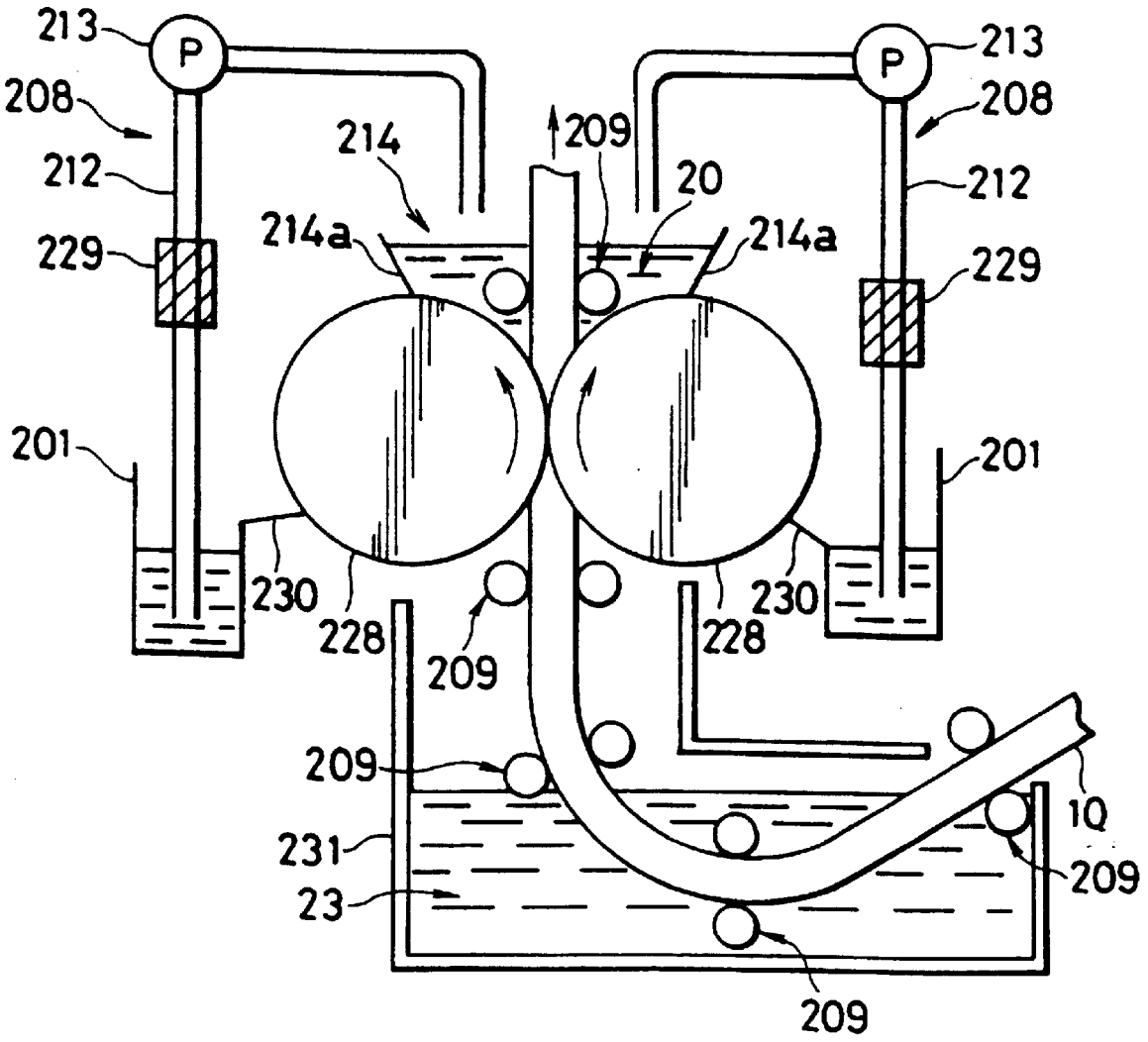
FIG. 37 is a view showing a schematic construction of the liquid supplying unit in another modified example.

Another concrete example of the liquid supplying unit 2 having the compressing means of a transfer paper sheet 10 and the liquid supplying means will next be explained with reference to FIG. 37. The construction of the liquid supplying unit 2 in this example is basically similar to that shown in FIG. 35 except that a dipping device for dipping the transfer paper sheet 10 is arranged. The dipping device functions as a liquid supplying means for supplying a preliminary dipping liquid 23 as a predetermined liquid to the transfer paper sheet 10 by dipping before the transfer paper sheet 10 is compressed by a pair of coating-compressing rollers 228. This dipping device is constructed by a preliminary dipping liquid tank 231 for storing the preliminary dipping liquid 23, an unillustrated conveying guide plate, a pair of conveying rollers 209, etc. The conveying guide plate is arranged such that the transfer paper sheet 10 passes through the preliminary dipping liquid 23 within the preliminary dipping liquid tank 231. Water, etc. can be normally used as the preliminary dipping liquid 23, but the above processing liquid 20 can be also used as the preliminary dipping liquid 23.

In this example, the transfer paper sheet 10 forming a toner image thereon is guided by the pair of conveying rollers 209, etc., and passes through the preliminary dipping liquid 23 within the preliminary dipping liquid tank 231. Thus, the transfer paper sheet 10 is wet with the preliminary dipping liquid 23. Similar to the above example shown in FIG. 35, the transfer paper sheet 10 is conveyed until an inlet of the pair of coating-compressing rollers 228. Since the transfer paper sheet 10 is wet with the preliminary dipping liquid 23, the transfer paper sheet 10 can be easily flexed and compressed. Accordingly, it is possible to more efficiently and reliably remove a gas such as air bubbles from fine clearances of the transfer paper sheet 10 by the pair of coating-compressing rollers 228.

When the transfer paper sheet 10 is wet with the preliminary dipping liquid 23, no preliminary dipping liquid 23 necessarily permeates the interior of the transfer paper sheet 10 sufficiently.

Another concrete example of the liquid supplying unit 2 having the compressing means of a transfer paper sheet 10 and the liquid supplying means will next be explained with reference to FIG. 38. The construction of the liquid supplying unit 2 in this example is basically similar to that shown in FIG. 35 except that the transfer paper sheet 10 is conveyed in a transversal direction. In FIG. 35, the transfer paper sheet 10 is conveyed from below to above with respect to the pair of coating-compressing rollers 228. In contrast to this, for example, the transfer paper sheet 10 in FIG. 38 is conveyed in the transversal direction from rightward to leftward with respect to the pair of coating-compressing rollers 228. In this example, a liquid reservoir portion 214 is arranged on a discharging side of the transfer paper sheet with respect to the pair of coating-compressing rollers 228 such that a processing liquid 20 comes in contact with both front and rear faces of the transfer paper sheet 10 being released from compression of the pair of coating-compressing rollers 228. The liquid reservoir portion 214 has a liquid holding plate 214a. The liquid holding plate 214a is constructed such that a right-hand lower end portion of the liquid holding plate 214a slidably comes in frictional contact with a surface of one coating-compressing roller 228, thereby preventing the processing liquid 20 from being leaked. The right-hand lower end portion of the liquid holding plate 214a is desirably constructed by a material for preventing this one coating-compressing roller 228 from being damaged.

In this example, the transfer paper sheet 10 forming a toner image thereon is guided and conveyed by the pair of conveying rollers 209, etc. until an inlet of the pair of coating-compressing rollers 228. The pair of coating-compressing rollers 228 convey the transfer paper sheet 10 leftward while the pair of coating-compressing rollers 228 support the transfer paper sheet 10 therebetween and compress the transfer paper sheet 10. A gas such as air bubbles within fine clearances of the transfer paper sheet 10 is removed therefrom by this compression. Compressing force applied to the transfer paper sheet 10 is released after the transfer paper sheet 10 has passed through a compressing position of the pair of coating-compressing rollers 228. The processing liquid 20 within the liquid reservoir portion 214 comes in contact with the transfer paper sheet 10 in a releasing portion of this compressing force. Accordingly, when the compressing force is released, the processing liquid 20 within the liquid reservoir portion 214 rapidly permeates the above fine clearances within the transfer paper sheet 10 and also permeates paper fibers such as cellulose fibers as a constructional material of the transfer paper sheet 10 by a capillary tube effect, etc. The processing liquid 20 rapidly permeates the fine clearances and the paper fibers mainly from both face portions of the transfer paper sheet 10 each having no toner image. The processing liquid 20 finally permeates reliably until an interfacial portion between the toner image and the paper fibers.

The processing liquid 20 reliably permeates until the interfacial portion between the toner image and the paper fibers on a surface of the transfer paper sheet 10. Therefore, adhesive characteristics of the toner and/or the paper fibers are changed so that an attaching or adhesive state of the toner image and the paper fibers of the transfer paper sheet 10 is changed to an unstable state. Accordingly, the toner image can be easily separated from the surface of the transfer paper sheet 10 in the next toner separating unit 3.

Figure 39:
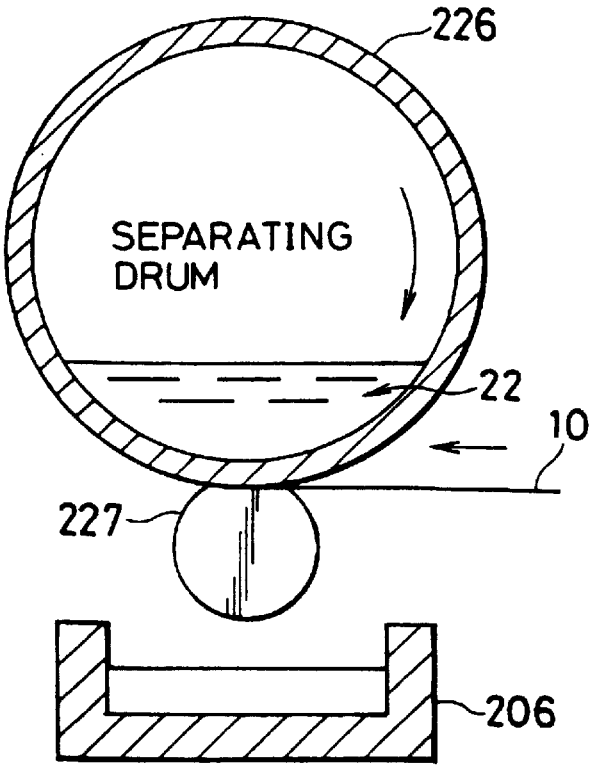
FIG. 39 is a view showing a schematic construction of the liquid supplying unit in another modified example.

A constructional example of a liquid supplying unit 2 having a separating drum 226 used for the toner separating unit 3 will next be explained with reference to FIG. 39. This liquid supplying unit 2 has a cylindrical hollow separating drum 226, an unillustrated driving portion of the separating drum 226, an opposite roller 227, a liquid receiving container 206, etc. The separating drum 226 holds a liquid 22 therein. The opposite roller 227 is arranged such that the opposite roller 227 comes in press contact with a surface of the separating drum 226. The liquid receiving container 206 receives the liquid 22 from the opposite roller 227. Many small holes are formed in an outer wall portion of the separating drum 226. The opposite roller 227 is formed by a material including air bubbles such as a sponge. In this example, the transfer paper sheet 10 fed from a paper feed unit 1 is conveyed while the transfer paper sheet 10 is supported by the separating drum 226 and the opposite roller 227 therebetween. The liquid 22 within the separating drum 226 is emitted therefrom in a nipping portion of the separating drum 226 and the opposite roller 227. The emitted liquid 22 is supplied to the transfer paper sheet 10. Further, the transfer paper sheet 10 is wound around the separating drum 226 and the next separating process is started. The opposite roller 227 is formed by a material including air bubbles such as a sponge, etc. Accordingly, a pressure difference is caused between the nipping portion and the other portions of the opposite roller 227. This pressure difference promotes the emission of the liquid 22 from the separating drum 226, The liquid 22 can be also emitted from the separating drum 226 by increasing a pressure within the separating drum 226.

In the liquid supplying unit 2 shown in each of FIGS. 20 to 39, a supersonic wave may be applied to the liquid 22 (such as the processing liquid 20 and the permeability accelerating liquid 21), or the above liquid interior conveying roller 202, the conveying belt 211, the pair of coating rollers 207, the felt blade 220, etc. In this case, a permeating speed of the liquid 22 (such as the processing liquid 20 and the permeability accelerating liquid 21) permeating the transfer paper sheet 10 can be increased. The liquid supplying unit 2 may also has a temperature controller, etc. for holding a temperature of the liquid 22 (such as the processing liquid 20 and the permeability accelerating liquid 21) in a suitable processing range. In this case, a processing speed and reliability in liquid processing of the liquid supplying unit can be improved. When the liquid 22 (such as the processing liquid 20 and the permeability accelerating liquid 21) is treated, it is necessary to take a measure for preventing the liquid 22 (such as the processing liquid 20 and the permeability accelerating liquid 21) from being scattered in a certain case when a liquid supplying unit body is carried. In another case, it is also necessary to take a measure for suitably positioning a handle or gripper of the liquid supplying unit body such that no liquid 22 is leaked. In another case, it is also necessary to take a measure for constructing the liquid container 201 as a hermetical structure. Techniques of a general wet type copying machine, a diazo-copying machine, etc. can be applied to such measures. When the liquid 22 (such as the processing liquid 20 and the permeability accelerating liquid 21) is circulatively used, it is desirable to arrange a filter for removing dust, impurities. etc. from the liquid 22 in one portion of a circulating path. Each of the above rollers may be replaced with a conveying belt, etc.

In this embodiment, the processing liquid 20 efficiently and reliably permeates an interfacial portion between a toner image and paper fibers on a surface of the transfer paper sheet 10. Therefore, adhesive characteristics of the transfer paper sheet 10 and/or the toner in the interfacial portion are changed so that an adhesive state of the transfer paper sheet 10 and the toner can be reliably changed to an unstable state. Thus, adhesive force between the transfer paper sheet 10 and the toner can be reduced. Accordingly, only the toner can be reliably removed from the transfer paper sheet 10.

When a surplus liquid amount removing means such as the drawing rollers 204, the blade 215, etc. is arranged, a minimum amount of processing liquid 20 required to reduce adhesive force of toner can be supplied to the transfer paper sheet 10 so that a heating amount required for the transfer paper sheet in a subsequent drying process can be reduced. Further, extending and shrinking amounts of the transfer paper sheet 10 caused by moisture absorption can be reduced so that it is possible to restrain the transfer paper sheet 10 from being deformed in a wavy shape with wrinkles.

In the present invention, an image can be formed by an electrophotographic copying machine, etc. For example, in the following embodiment, the present invention is applied to a transfer paper processor as a processor for processing an image holding member in which the liquid 22 such as the above permeability accelerating liquid 21, the processing liquid 20, etc. is supplied to a sheet 10 of unused transfer paper.

A construction similar to that of the toner removing device in the above embodiment can be used for this transfer paper processor. For example, the transfer paper processor can be constructed such that the toner separating unit 3 in the toner removing device shown in FIG. 6, 8, 9, 10, 12 or 13 is removed therefrom and the transfer paper sheet 10 is directly conveyed from the above liquid supplying unit 2 to the drying unit 4. In this case, the liquid supplying unit 2 includes a combination of the above permeation accelerating liquid supplying unit 2a and the processing liquid supplying device 2b.

Figure 40:
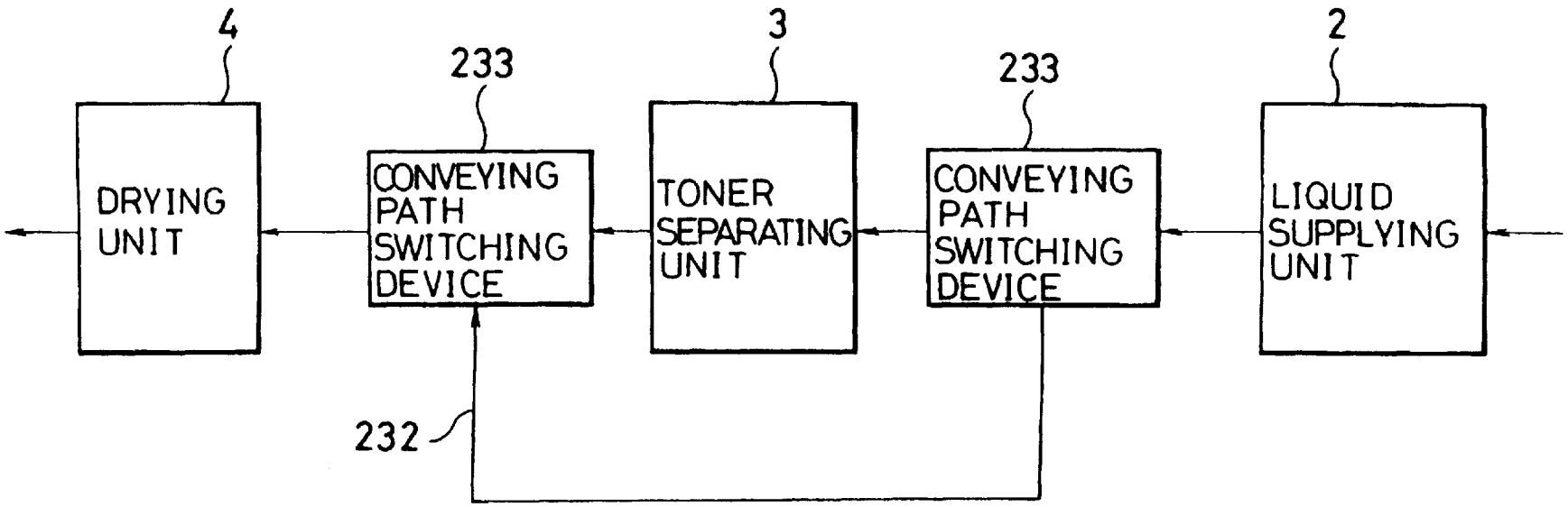
FIG. 40 is a view for explaining a transfer paper processor in accordance with another embodiment of the present invention.

As shown in FIG. 40, the transfer paper processor may have a bypass conveying path 232 for bypassing the toner separating unit of the above toner removing device, an unillustrated mode switching device, and a conveying path switching device 233. The mode switching device can switch a toner removing mode and an unused transfer paper processing mode by a user. In the toner removing mode, toner attached to a sheet of transfer paper is removed from this transfer paper sheet. In the unused transfer paper processing mode, a sheet of unused transfer paper is processed. The conveying path switching device 233 switches conveying paths of the transfer paper sheet by the mode switching device. The transfer paper processor can be constructed such that the transfer paper sheet 10 passes through the bypass conveying path 232 for bypassing the toner separating unit 3 when the unused transfer paper processing mode is to selected.

A permeability accelerating or promoting agent supplied to the transfer paper sheet 10 can be constructed by using a solution of a surfactant mentioned above, etc. An unstabilizing agent can be constructed by the processing liquid 20 used in the above first embodiment except for pure water. Namely, the unstabilizing agent can be constructed by using at least one kind of aqueous solution selected from a group of an aqueous solution including a water-soluble polymer, an aqueous solution including a surfactant, and an aqueous solution including a water-soluble polymer and a surfactant.

In the transfer paper processor in this embodiment, the processing liquid 20 such as an aqueous solution including a surfactant can efficiently and reliably permeate the unused transfer paper sheet 10 onto which no toner is attached. Accordingly, when a toner image is formed on this transfer paper sheet 10 and is then separated from the transfer paper sheet 10, an attaching or adhesive state of the toner and a surface of the transfer paper sheet 10 is changed to an unstable state. Therefore, the toner image can be reliably separated from the surface of the transfer paper sheet 10 in comparison with the general transfer paper processor.

When the transfer paper processor has a surplus liquid amount removing means such as the drawing rollers 204, the blade 215, etc., a minimum amount of processing liquid 20 required to reduce adhesive force of toner can be supplied to the transfer paper sheet 10 so that a heating amount required for the transfer paper sheet in a subsequent drying process can be reduced. Further, extending and shrinking amounts of the transfer paper sheet 10 caused by moisture absorption can be reduced so that it is possible to restrain the transfer paper sheet 10 from being deformed in a wavy shape with wrinkles.

In each of the above embodiments, the present invention is applied to the transfer paper sheet 10 having an image formed by an electrophotographic copying machine of a transfer type, or is applied to a sheet 10 of unused transfer paper before the image is formed. However, the present invention can be also applied to an image holding member such as a sheet of recording paper used for another image forming apparatus such as a facsimile telegraph, a printer, etc. Further, the present invention is not limited to the image holding member having a fibrous structure, but can be also applied to any image holding member on which an image can be formed. For example, the image holding member used in the present invention may be constructed by a laminated material in which a surface layer of a base sheet such as a plastic layer is formed by a material layer such as a paper layer, etc.

A concrete constructional example of the toner separating unit 3 will next be described in detail. In FIG. 6 showing the entire construction of the toner removing device, the transfer paper sheet 10 is supported by the two separating rollers 302 therebetween and toner is removed from both faces of the transfer paper sheet 10. However, in the following toner separating unit 3, toner is removed from one face of the transfer paper sheet 10 by one separating roller 302. The following structure can be also applied to the toner separating unit 3 in which the transfer paper sheet 10 is supported by the two separating rollers 302 therebetween and toner is removed from both faces of the transfer paper sheet 10 as shown in FIG. 6.

Figure 41:
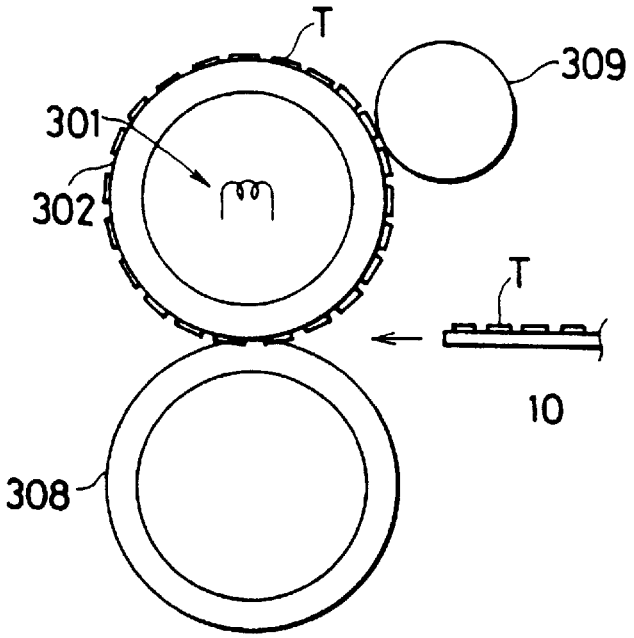
FIG. 41 is a view showing the schematic construction of a toner separating unit arranged in the toner removing device.

FIG. 41 shows one concrete example of a toner separating unit 3 having a means for smoothing uneven toner attached onto the separating roller 302. This toner separating unit 3 has a hollow separating roller 302, a backup roller 308, a pressing roller 309, an unillustrated driving portion, etc. A heating lamp 301 as a means for softening toner T is arranged within the hollow separating roller 302. The backup roller 308 is arranged such that the backup roller 308 comes in contact with a surface of the separating roller 302. The pressing roller 309 is arranged as a pressing member of the above smoothing means such that the pressing roller 309 presses against the surface of the separating roller 302 while the pressing roller 309 is rotated.

The backup roller 308 and the driving portion constitute a separating member moving means for moving the separating roller 302 in a state in which the surface of the separating member 302 comes in contact with a surface of a copying paper sheet 10 as a transfer paper sheet. The transfer paper sheet 10 attaching the toner T on an upper face thereof is supported by the backup roller 308 and the separating roller 302 therebetween and is conveyed leftward in FIG. 41. The above driving portion can be constructed such that one or both of the separating roller 302 and the backup roller 308 are rotated in arrow directions. When the backup roller 308 rotates and the separating roller 302 is rotated by the rotation of the backup roller 308, an attaching amount of the toner attached to the separating roller 302 is increased by repeatedly using the separating roller 302. In this case, it is possible to constantly maintain a moving speed of the surface of the separating roller 302 and a conveying speed of the transfer paper sheet 10 in a paper supporting portion even when a diameter of the separating roller 302 is increased by the toner attachment.

A material of a surface portion of the above pressing roller 309 is preferably constructed by a material having an excellent mold-releasing property with respect to the toner T. Concretely, this material is made of Teflon, etc.

In this example, the heating lamp 30 is used as a means for softening the toner. However, a pressurizing device for softening the toner by pressurization may be used instead of the heating lamp 30. This heating lamp 50, the pressurizing device, etc. may be arranged on the upstream side of a contact portion between the separating roller 302 and the transfer paper sheet 10.

In this example, the transfer paper sheet 10 attaching the toner T onto an upper face thereof is supported between the separating roller 302 and the backup roller 308 and is conveyed leftward. In a supporting portion of the separating roller 302 and the backup roller 308, the toner attaching face of the transfer paper sheet 10 comes in press contact with a surface of the separating roller 302 having adhesive force of the toner T greater than that between a surface of the transfer paper sheet 10 and the toner T. Thereafter, when the transfer paper sheet 10 passes through this supporting portion, the toner T is separated from the surface of the transfer paper sheet 10 while the toner T is attached onto the surface of the separating roller 302.

At this time, the separating roller 302 is heated by the heating lamp 301 to soften the toner T on the transfer paper sheet 10 supported by the separating roller 302 and the backup roller 308. Accordingly, adhesive force between the toner T and the transfer paper sheet 10 is further reduced and adhesive force between the toner T and the surface of the separating roller 302 is relatively increased. Accordingly, the toner T can be easily separated from the surface of the separating roller 302.

When the toner T is separated from the surface of the transfer paper sheet 10, the toner T attached onto the surface of the separating roller 302 has an irregular portion corresponding to an image pattern on the transfer paper sheet 10. However, this irregular and uneven toner portion is smoothed by the pressing roller 309 pressing against the surface of the separating roller 302. The surface of the separating roller 302 smoothed with respect to the toner attachment then comes in contact with the surface of the transfer paper sheet 10 onto which the toner T is attached. Thus, the separating roller 302 is used for the next separating processing.

Figure 42:
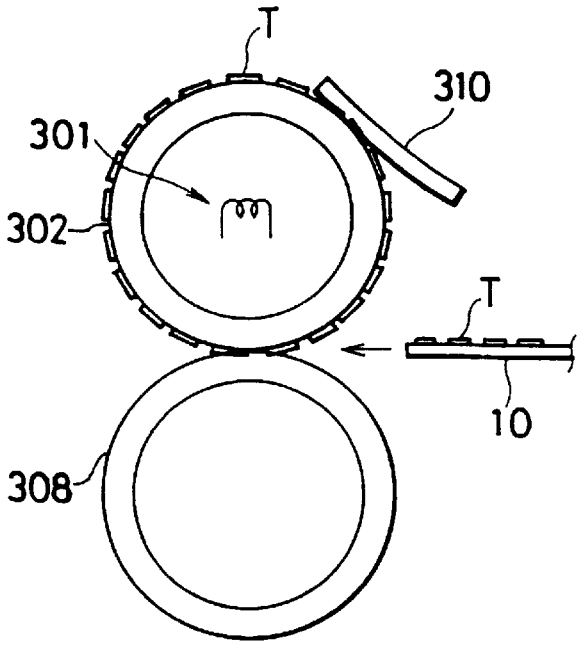
FIG. 42 is a view showing a schematic construction of the toner separating unit in a modified example.

Another concrete example of the toner separating unit 3 having the above smoothing means will next be explained with reference to FIG. 42. In this toner separating unit 3, a pressing blade 310 is used instead of the above pressing roller 309 as a pressing member of the smoothing means. The pressing blade 310 is arranged such that the pressing blade 310 presses against a surface of the separating roller 302. In this example, the pressing blade 310 presses against toner having an irregular shape corresponding to an image pattern on the transfer paper sheet 10 and unevenly attached onto the separating roller 302, thereby smoothing this toner. The surface of the separating roller 302 smoothed with respect to the toner attachment then comes in contact with a surface of the transfer paper sheet 10 onto which the toner T is attached. Thus, the separating roller 302 is used for the next separating processing.

As mentioned above, the irregular toner corresponding to the image pattern on the separating roller 302 is smoothed by the smoothing means so that a contact state of the surface of the transfer paper sheet 10 on the surface of the separating roller 302 is set to a uniform state. Accordingly, it is possible to prevent irregular separation such as local insufficient separation from being caused so that the separating roller 302 can be repeatedly used.

Figure 43:
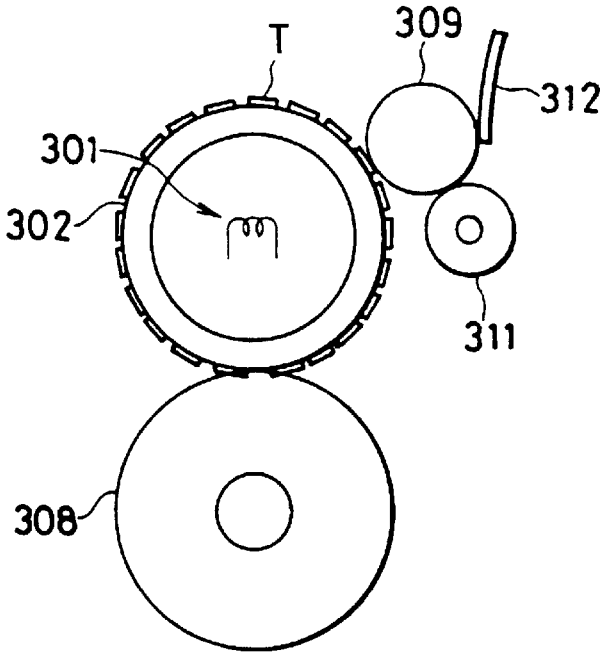
FIG. 43 is a view showing a schematic construction of the toner separating unit in another modified example.

As shown in FIG. 43, the above toner separating unit 3 may have a mold-releasing agent coating roller 311 and a scraper blade 312. The mold-releasing agent coating roller 311 functions as a mold-releasing agent coating means for coating a surface of the pressing roller 309 with a mold-releasing agent such as silicon oil, etc. The scraper blade 312 functions as an image forming substance removing means for scraping off toner T on the pressing roller 309. In this case, the surface of the pressing roller 309 is coated with the mold-releasing agent by the mold-releasing agent coating roller 311 so that a mold-releasing property of the surface of the pressing roller 309 with respect to the toner T can be improved. The scraper blade 312 can scrape off the toner T attached onto the surface of the pressing roller 309 so that no toner is attached onto the surface of the pressing roller 309. Accordingly, the toner T attached on the separating roller 302 in an irregular shape can be reliably smoothed.

Figure 44:
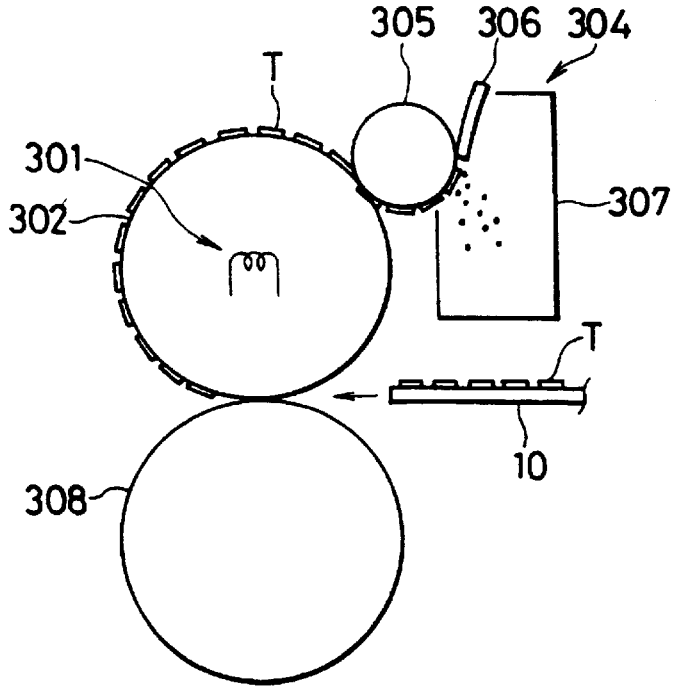
FIG. 44 is a view showing a schematic construction of the toner separating unit in another modified example.

FIG. 44 shows one concrete example of a toner separating unit 3 having a toner removing device 304 as an image forming substance removing means for removing attached toner T from the surface of a separating roller 302. This toner separating unit 3 has a hollow separating roller 302, a backup roller 308, an unillustrated driving portion, etc. A heating lamp 301 as a means for softening toner T is arranged within the hollow separating roller 302. The backup roller 308 is arranged such that the backup roller 308 comes in contact with a surface of the separating roller 302. The toner removing means has a cleaning roller 305, a scraper blade 306 and a toner receiver or container 307. The cleaning roller 305 removes the toner T from the surface of the separating roller 302. The scraper blade 306 scrapes off the toner T on the cleaning roller 305. The toner receiver or container 307 stores the toner T scraped off by the scraper blade 306.

At least a surface of the above cleaning roller 305 is constructed by a material for setting a mold-releasing property of the separating roller 302 about the attached toner T thereon to be inferior to a mold-releasing property of the surface of the cleaning roller 305 about the attached toner thereon. This surface of the cleaning roller 305 is concretely constructed by a metallic material including aluminum, copper, nickel, etc., or a high molecular or polymer material such as polyethylene-terephthalate (PET) having dispersed titanium oxide, etc. However, no surface of the cleaning roller 305 is limited to these materials.

In this example, the toner T separated from a surface of the transfer paper sheet 10 and attached to the surface of the separating roller 302 is removed from this separating roller 302 by the cleaning roller 305. The toner T attached onto the cleaning roller 305 is scraped off by the scraper blade 306 and is stored into the toner receiver or container 307.

Figure 45:
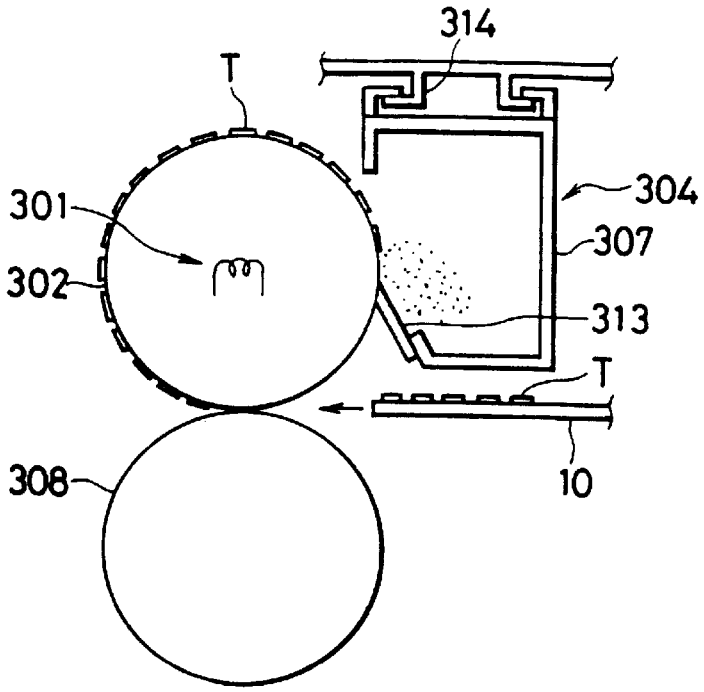
FIG. 45 is a view showing a schematic construction of the toner separating unit in another modified example.

As shown in FIG. 45, the above toner removing device 304 may be constructed such that the toner T on the separating roller 302 is directly scraped off by a scraper blade 313. The toner T scraped off by the scraper blade 313 is stored into a toner receiver or container 307. For example, the scraper blade 313 is formed by a metal coated with Teflon, etc. such that the scraper blade 313 has a preferable mold-releasing property with respect to the toner T. Accordingly, it is possible to prevent the toner T from being attached onto a surface of the scraper blade 313. The toner receiver or container 307 is constructed such that an upper portion of the toner receiver 307 can be moved along guide rails 314 arranged on a body side of the toner removing device 304. In accordance with necessity, the toner receiver 307 can be detached from the toner removing device so that the toner within the toner receiver 307 can be thrown away.

Figure 46:
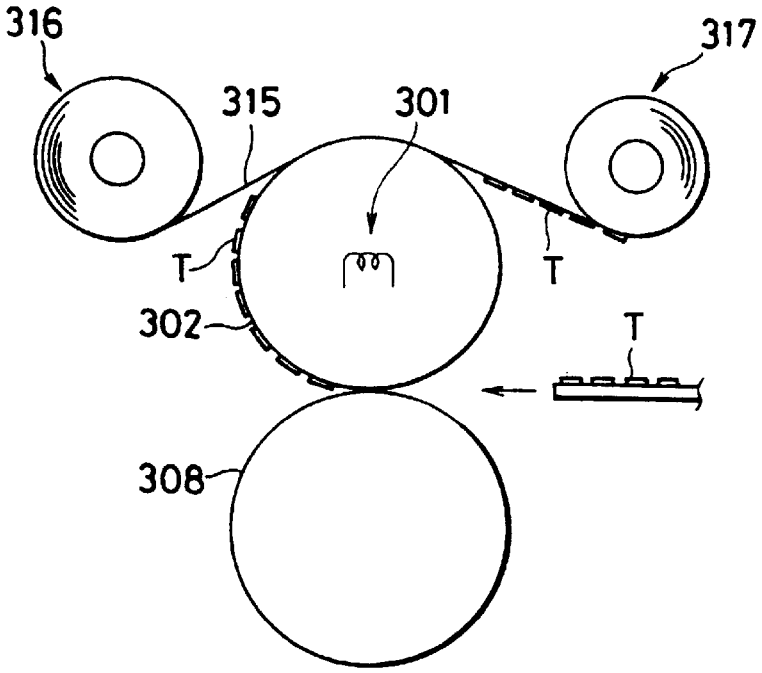
FIG. 46 is a view showing a schematic construction of the toner separating unit in another modified example.

As shown in FIG. 46, toner T in the above toner removing device 304 may be removed from the separating roller 302 by a web or belt 315 tensioned such that the web 315 comes in press contact with the separating roller 302. The web 315 is supplied from an unused web roll 316. This web 315 is moved at a speed different from the moving speed of a surface of the separating roller 302 while the web 315 comes in press contact with the surface of the separating roller 302 attaching toner T thereonto. After the toner T is removed from the separating roller 302, the web is wound around a winding roll 317.

In the above toner removing device 304, the toner T attached onto the surface of the separating roller 302 can be removed therefrom at any time or in accordance with necessity so that surplus attachment of the toner T can be prevented. Accordingly, it is possible to preferably maintain separating performance of the separating roller 302 and use the separating roller 302 for a long period.

A toner collector may be arranged as a means for collecting toner T removed from the above toner removing device 304. As explained in FIG. 45, this toner collector may be constructed as one concrete example such that an upper portion of the toner receiver 307 can be moved along the guide rails 314 arranged on a body side of the toner removing device. In this case, in accordance with necessity, the toner receiver 307 can be detached from the toner removing device so that the toner within the toner receiver 307 can be thrown away.

Figure 47A:
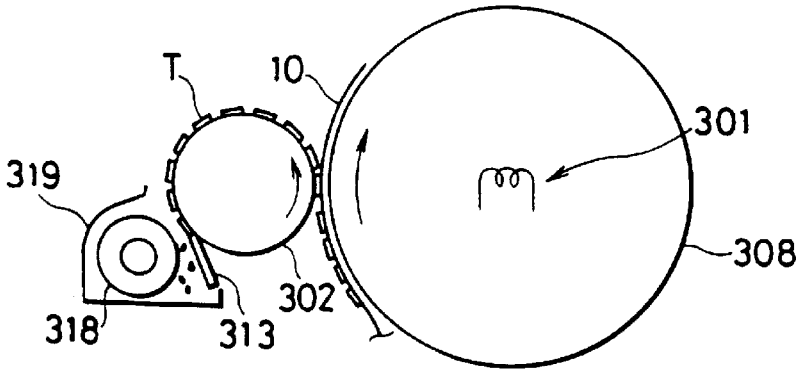
FIG. 47a is a view showing a schematic construction of the toner separating unit in another modified example.
Figure 47B:
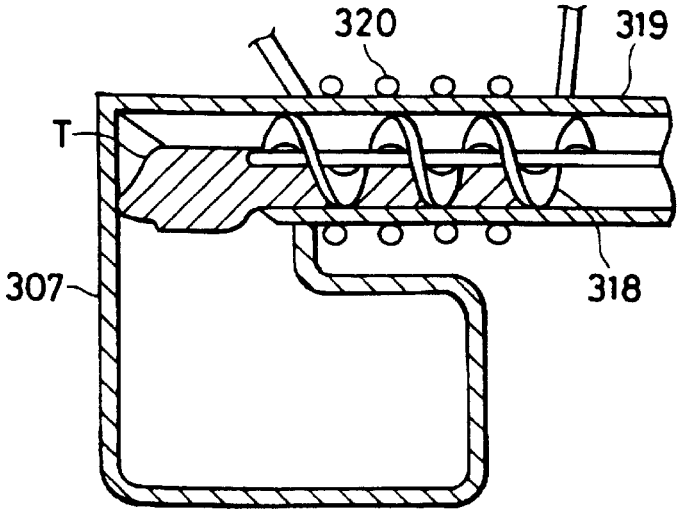
Figure 47C:
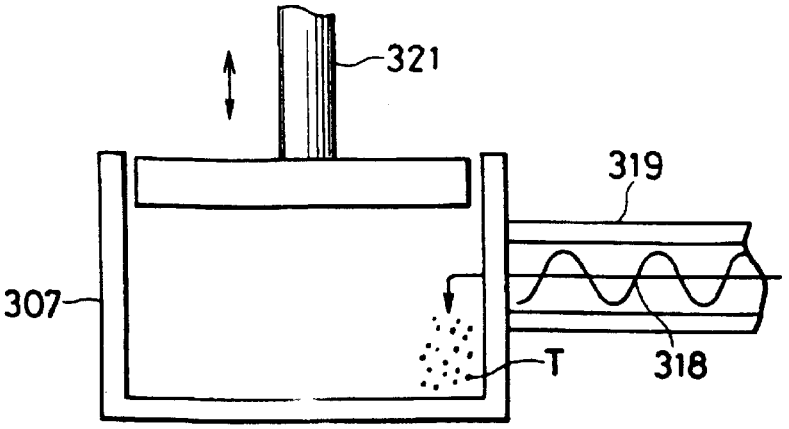
FIG. 47c is a view for explaining a compressing member of the toner collecting portion shown in FIG. 47b.

A toner collector as shown in each of FIGS. 47a to 47c can be arranged. This toner collector also functions as a conveying member for conveying a transfer paper sheet 10 by adsorbing this transfer paper sheet 10 onto a backup roller 308. The toner collector has a toner conveying path 319 with a built-in screw 318, a heater 320, a toner container 307, a compressing member 321, an unillustrated driving portion of the screw 318, an unillustrated heater power source, etc. The heater 320 is arranged in an end portion of the toner conveying path 319. The compressing member 321 functions as a means for compressing toner T within the toner container 307. This compressing member may be manually operated. However, a driving portion for automatically operating the compressing member may be arranged.

In this example, the toner T attached onto a surface of the separating roller 302 is scraped off and stored into the toner conveying path 319 by a scraper blade 313 as shown in FIG. 47a. As shown in FIG. 47b, the toner T within the toner conveying path 319 is conveyed to an end portion thereof by the screw 318. The toner T is then stored into the toner container 307 while the toner T is melted within the toner conveying path 319 heated by the heater 320. As shown in FIG. 47c, the toner T stored within the toner container 307 is compressed by the compressing member 321 to increase a toner density so that the toner T is solidified. The solidified toner T within the toner container 307 is thrown away at any time.

As mentioned above, the toner T can be collected into the toner container 307 and can be thrown away by arranging the toner collector so that the toner separating unit 3 can be used for a long period. Further, a volume of the toner T can be reduced by increasing the toner density within the toner container 307 so that toner storing efficiency can be improved and the toner removing device can be made compact. Further, since the collected toner can be easily thrown away, it is possible to easily maintain the toner removing device and improve operability and service availability of the toner removing device.

The period of a limit of a toner collecting amount of the toner collector may be set to be approximately equal to the period of a separating limit of the separating member such as the separating roller 302, etc.

The next explanation relates to a toner separating unit 3 having a control means for detecting an amount of toner attached onto the separating roller 302 and controlling rotation of the separating roller 302 such that this rotation is stopped on the basis of detected results of the toner amount.

Figure 48:
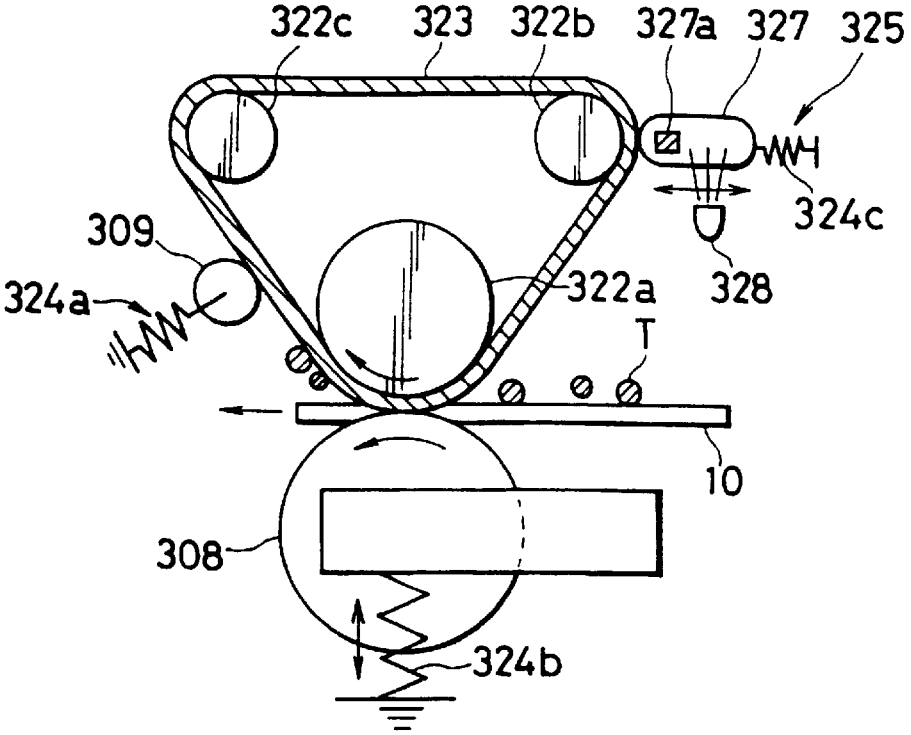
FIG. 48 is a view showing a schematic construction of the toner separating unit in another modified example.

FIG. 48 shows one concrete example of the toner separating unit 3 having this control means. This toner separating unit 3 has a separating belt 323, a pressing roller 309, a backup roller 308, a toner attaching amount detector 325, an unillustrated control section as the above control means, etc. The separating belt 323 functions as a separating member tensioned between conveying rollers 322a, 322b and 322c. The pressing roller 309 is biased by a resilient member 324a such as a spring, etc. such that the pressing roller 309 presses against a surface of the separating belt 323. The backup roller 308 is biased by a resilient member 324b such as a spring, etc. such that the backup roller 308 comes in press contact with the conveying roller 322a through the separating belt 323. The toner attaching amount detector 325 detects an amount of the toner attached onto the separating belt 323. The control section is constructed by a central processing unit (CPU), a RAM, a ROM, an input/output (I/O) portion, etc.

The toner attaching amount detector 325 is constructed by a reflecting plate 327, a photosensor 328 of a reflecting type, etc. The reflecting plate 327 has-a light reflecting face 327a and is biased by a resilient member 324c such as a spring, etc. such that the reflecting plate 327 comes in contact with a surface of the separating belt 323. The photosensor 328 irradiates light to the reflecting plate 327 and detects an intensity of light reflected on the reflecting plate 327.

In this example, the transfer paper sheet 10 attaching toner T on an upper face thereof is supported by the separating belt 323 and the backup roller 308 therebetween and is conveyed in a leftward direction in FIG. 48. When the transfer paper sheet 10 passes through a supporting portion of the separating belt 323 and the backup roller 308, the toner T is separated from the transfer paper sheet 10 and is attached onto a surface of the separating belt 323. Thus, the attached toner T is laminated on the surface of the separating belt 323, thereby forming a toner layer. This toner layer is smoothed by the pressing roller 309 and then comes in contact with a left-hand end portion of the reflecting plate 327. At this time, the reflecting plate 327 is moved rightward and leftward in accordance with a thickness of the toner layer on the separating belt 323 so that the intensity of light reflected on the reflecting face 327a is changed. As a result, an output voltage Vsp of the photosensor 328 is changed in accordance with the thickness of the toner layer on the separating belt 323. The output voltage Vsp of the photosensor 328 is inputted to the above control section and can be used for various kinds of controls mentioned below.

An output voltage V1 of the photosensor 328 corresponding to a thickness of the toner layer requiring exchange or replacement of the separating belt 323 is set to a reference value in one example of controls based on the output voltage of the photosensor 328. This output voltage V1 is stored into the control section in advance. Then, the output voltage V1 as a reference value is compared with the output voltage Vsp of the photosensor 323. When it is judged that the exchange of the separating belt 323 is required or an exchanging period of this belt is near at hand, an operation of the toner removing device can be controlled such that an operator can know such judging contents by a display on a display panel, a warning sound, etc.

In another example of the above controls, the reference value is set to an output voltage V2 of the photosensor 328 corresponding to a thickness of the toner layer at which no transfer paper sheet 10 can be supported and conveyed. This output voltage V2 is stored into the control section in advance. When the output voltage Vsp of the photosensor 323 is approximately equal to the reference value V2, the entire operation of the toner removing device can be controlled and stopped. Thus, it is possible to prevent the transfer paper sheet 10 from being jammed in advance. The entire operation of the toner removing device may be stopped after the separating belt 323 is rotated by a predetermined number of rotations. In this case, for example, a projected detecting mark is formed on the separating belt 323. When the output voltage Vsp of the photosensor 323 is approximately equal to the above reference value V2, passage of the detecting mark is detected by the above toner attaching amount detector 325. Thus, the number of rotations of the separating belt 323 is counted and is used for controls of the toner removing device.

Figure 49:
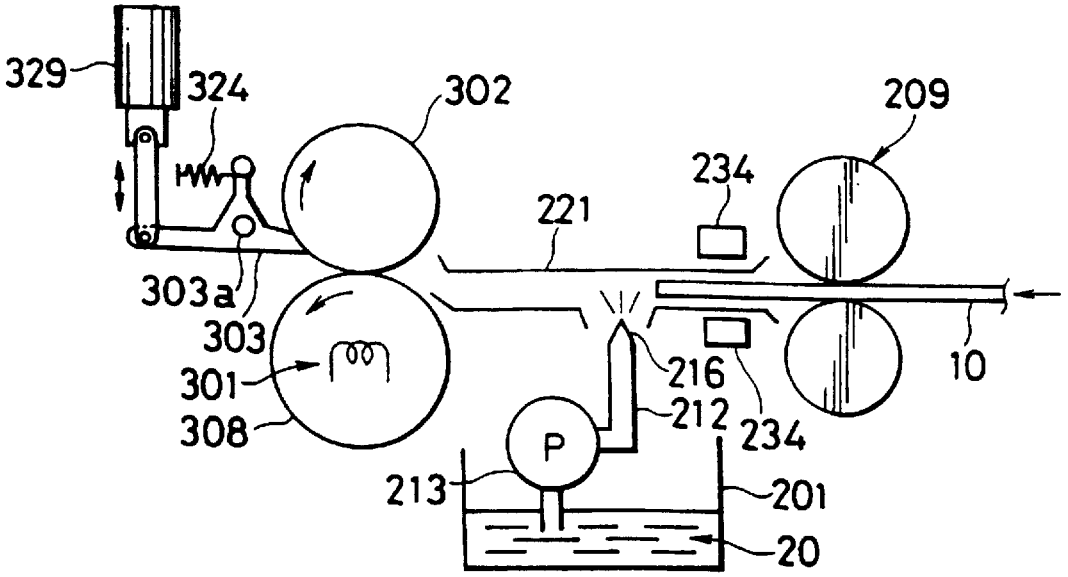
FIG. 49 is a view showing schematic constructions of the toner separating unit and the liquid supplying unit in another modified examples.

FIGS. 49 to 51 show one concrete example of a toner separating unit 3 having a means for separating a transfer paper sheet 10 from the surface of a separating roller 302 after toner T is separated from the transfer paper sheet 10. In this case, a liquid supplying unit 2 is also explained together with the toner separating unit 3 since it is more effective to use the liquid supplying unit 2 in combination with this separating means.

The toner separating unit 3 in this example has a separating roller 302, a backup roller 308, a separating claw 303, a resilient member 324 such as a spring, a solenoid 329, a driving portion of the solenoid 329, etc. The backup roller 308 has a heating lamp 301 therein. The separating claw 303 functions as a separating means freely rotatable around a rotational axis 303a of this separating claw 303. The resilient member 324 biases the separating claw 303 such that an end tip of a separating portion of the separating claw 303 comes in contact with a surface of the separating roller 302. The solenoid 329 moves the separating claw 303 such that the end tip of the separating portion of the separating claw 303 is separated from the surface of the separating roller 302. When no toner is removed from the transfer paper sheet 10, the end tip of the separating portion of the separating claw 303 is separated from the surface of the separating roller 302 by the solenoid 329 such that no surface of the separating roller 302 is damaged and no toner attached onto the surface of the separating roller 302 is scraped off. At a separating time of the separating claw 303, the solenoid 329 is turned off so that the separating claw 303 comes in slight contact with the surface of the separating roller 302 by biasing force of the resilient member 324 such as 0.1 to 10 gf.

The liquid supplying unit 2 in this example has a processing liquid sprayer, a conveying guide plate 221, a paper front end sensor 234, etc. The processing liquid sprayer is constructed by a liquid container 201 for storing a processing liquid 20, a liquid supplying pipe 212, a pump 213, a nozzle 216, etc. The paper front end sensor 234 detects a front end of a transfer paper sheet 10 conveyed from a paper feed unit 1. For example, the paper front end sensor 234 can be constructed by using a photosensor of a transmission or reflecting type, or a photosensor with a filler.

The toner removing device in this example has an unillustrated control section for controlling operations of the paper front end sensor 234, the solenoid 329, etc. For example, this control section can be constructed by a central processing unit (CPU), a RAM, a ROM, an input/output (I/O) portion, etc.

In this example, as shown by a timing chart in FIG. 50, the front end of the transfer paper sheet 10 conveyed from the paper feed unit 1 is detected by the paper front end sensor 234. The pump 213 is turned on by the control section after a predetermined delay time $t_1$ has passed after the detection of the paper front end. The control section further controls an operation of the liquid supplying unit 2 such that the processing liquid 20 is sprayed toward the transfer paper sheet 10 from the nozzle 216. Thus, it is possible to form a paper front end region in which no processing liquid 20 is supplied to the transfer paper sheet 10. This paper front end region has a length of several mm (preferably 2 to 10 mm) from the front end of the transfer paper sheet 10. Thus, after the next separating processing of the toner separating unit 3 is completed, the front end of the transfer paper sheet 10 is easily separated from a surface of the separating roller 302 by flexibility of the transfer paper sheet 10.

As shown by the timing chart of FIG. 50, the operation of the toner removing device is controlled by the control section such that the solenoid 329 is turned on just before a predetermined time $t_2$ has passed after the detection of the front end of the transfer paper sheet 10. The end tip of the separating portion of the separating claw 303 comes in contact with the surface of the separating roller 302 by biasing force of the resilient member 324. As shown in FIG. 51, the front end of the transfer paper sheet 10 is mechanically separated from the surface of the separating roller 302 in addition to the paper separation using the flexibility of the transfer paper sheet 10. Thus, the front end of the transfer paper sheet 10 can be more reliably separated from the surface of the separating roller 302. It is more effective to separate the paper front-end from the surface of the separating roller 302 by using the separating claw 303 in combination with a method for forming the above unsupplying region of the processing liquid in a front end portion of the transfer paper sheet 10.

Figure 52:
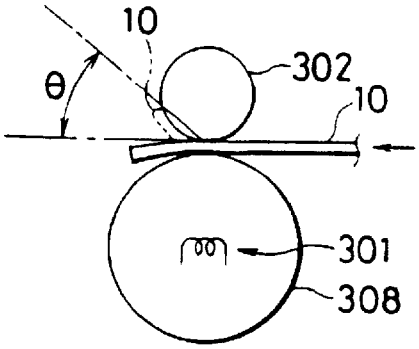
FIG. 52 is a view showing a schematic construction of the toner separating unit in another modified example.

FIG. 52 shows another concrete example of the toner separating unit 3.

The toner separating unit 3 in this example has a separating roller 302 having a small diameter preferably set to about 30 mm or less. In this example, a separating angle θ of a transfer paper sheet 10 is set to an angle between a conveying direction of the transfer paper sheet 10 just before a contact portion of the separating roller 302 and the transfer paper sheet 10, and a separating direction of a front end of the transfer paper sheet 10 which is separated from the separating roller 302 and is seen from a terminal end of this contact portion. This front end of the transfer paper sheet 10 is shown by a double-dotted chain line in FIG. 52. This separating angle θ is set to an acute angle. In other words, the moving locus of a surface of the separating roller 302 on a downstream side from the contact portion has curvature set such that the transfer paper sheet 10 is curved and separated from the separating roller 302 by flexibility of the transfer paper sheet 10. Accordingly, the front end of the transfer paper sheet 10 passing through the contact portion can be reliably separated from the surface of the separating roller 302. Thus, in this example, the front end of the transfer paper sheet 10 can be reliably separated from the separating roller 302 without arranging any complicated paper separating means.

It is more effective to use the toner separating unit 3 in this example in combination with the construction shown in FIG. 49. The construction of the toner separating unit 3 in this example can be also applied to a case in which a separating belt as a separating member formed in the shape of a belt and tensioned by conveying rollers is used. In this case, it is sufficient to reduce the diameter of a conveying roller on a downstream side with respect to a contact portion between the separating belt and the transfer paper sheet 10.

Another concrete example of the toned separating unit 3 having-the above separating means will next be explained with reference to FIGS. 53 and 54. In this example, a liquid supplying unit 2 is also explained together with the toner separating unit 3 since it is more effective to use the liquid supplying unit 2 in combination with this separating means.

Figure 53A:
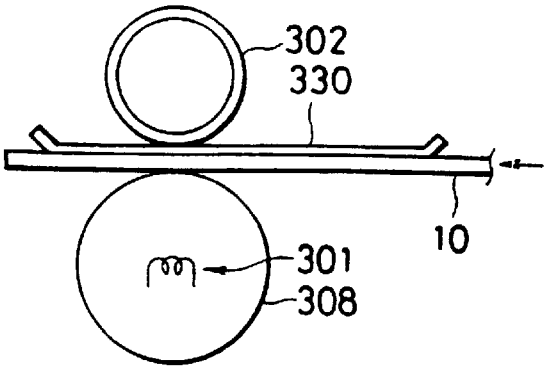
FIG. 53a is a view showing a schematic construction of the toner separating unit in another modified example.
Figure 53B:
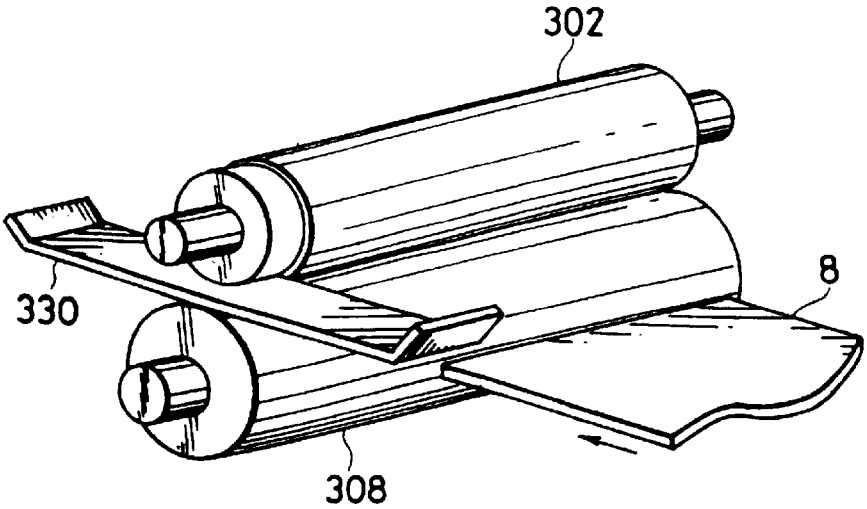

As shown in each of FIGS. 53a and 53b, the toner separating unit 3 in this example has a separating roller 302, a backup roller 308 with a built-in heating lamp 301, a separating side plate 330, etc. The separating side plate 330 guides a transfer paper sheet 10 in a predetermined conveying direction such that no side end portion of the transfer paper sheet 10 comes in contact with a surface of the separating roller 302. A surface of the separating side plate 330 is desirably processed by fluororesin such as Teflon such that this surface of the separating side plate 330 has a mold-releasing property for preventing toner from being easily attached onto this surface. An extending distance of the separating side plate 330 extending from a side end of the transfer paper sheet 10 is preferably set to about 3 to 10 mm.

Figure 54A:
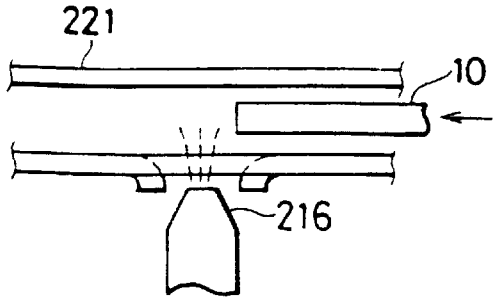
Figure 54B:
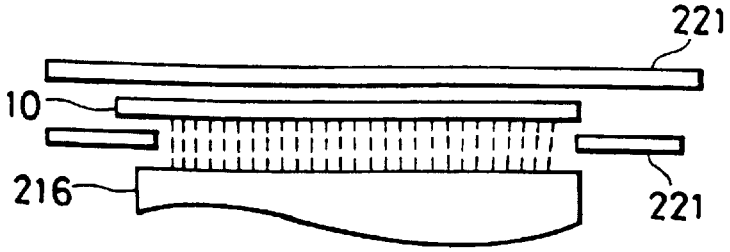

As shown in FIGS. 54a and 54b, the liquid supplying unit 2 in this example has a processing liquid sprayer, a conveying guide plate 221, etc. The processing liquid sprayer is constructed by a nozzle 216, etc. The conveying guide plate 221 is extended such that no processing liquid 20 is supplied to a side end portion of the transfer paper sheet 10. This side end portion of the transfer paper sheet 10 is set to a left-hand paper end portion in FIG. 54b. An extending distance of this conveying guide plate 221 extending from the side end of the transfer paper sheet 10 is preferably set to 1 to 10 mm.

In this example, the side end portion of the transfer paper sheet 10 fed from a paper feed unit 1 is guided along a lower side of the separating side plate 330 so that the transfer paper sheet 10 reaches a contact portion between the separating side plate 330 and the separating roller 302. After the transfer paper sheet 10 has passed through this contact portion, the transfer paper sheet 10 is further conveyed while the side end portion of the transfer paper sheet 10 is guided along the lower side of the separating side plate 330. Thus, it is possible to prevent toner from being attached onto the separating roller 302. Further, the transfer paper sheet 10 can be reliably separated from a surface of the separating roller 302.

An unsupplying region of the processing liquid 20 is formed in advance in the side end portion of the transfer paper sheet 10. Accordingly, it is possible to further prevent the toner from being attached onto the separating roller 302. Since no flexibility of the transfer paper sheet 10 is reduced, the transfer paper sheet 10 can be more reliably separated from the separating roller 302 on only sides of the transfer paper sheet 10.

Figure 55:
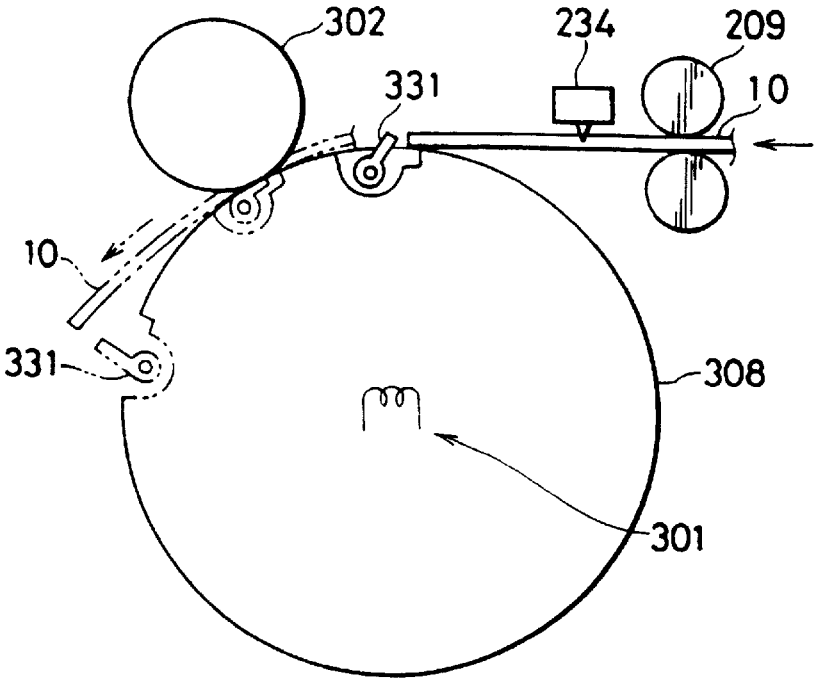
FIG. 55 is a view showing a schematic construction of the toner separating unit in another modified example.

Another concrete example of the toner separating unit 3 having the above separating means will next be explained with reference to FIG. 55. The toner separating unit 3 in this example has a separating roller 302, a backup roller 308 with a built-in heating lamp 301, etc. A recessed portion is formed in a surface portion of this backup roller 308. A clamp claw 331 is arranged in this recessed portion such that the clamp claw 331 can be opened and closed. The clamp claw 331 holds a front end of a transfer paper sheet 10 in accordance with necessity. The clamp claw 331 is biased by an unillustrated biasing member such as a spring, etc. such that this clamp claw 31 is normally opened.

In this example, the toner separating unit 3 also has a paper front end sensor 234 for detecting a front end of the transfer paper sheet 10 fed from a paper feed unit 1, and an unillustrated control section for controlling driving portions of the paper front end sensor 234, the backup roller 308 and a pair of conveying rollers 209, etc. For example, the paper front end sensor 234 can be constructed by using a photosensor of a transmission or reflecting type, or a photosensor with a filler. For example, the control section can be constructed by a central processing unit (CPU), a RAM, a ROM, an input/output (I/O) portion, etc.

In this example, a front end of the transfer paper sheet 10 fed from the paper feed unit 1 is detected by the paper front end sensor 234. After a predetermined time has passed, the backup roller 308 is rotated so that the recessed portion for the clamp claw 331 in an opening state is moved in synchronization with the front end of the transfer paper sheet 10. At this time, the clamp claw 331 is pushed by a surface of the separating roller 302 so that the clamp claw 331 is moved into the recessed portion against biasing force of the biasing member. The clamp claw 331 passes through a contact position between the backup roller 308 and the separating roller 302 in a state in which the transfer paper sheet 10 is pushed toward the recessed portion. Thereafter, the backup roller 308 is rotated by a predetermined distance and the clamp claw 331 is then separated from the separating roller 302. When the clamp claw 331 is separated from the separating roller 302, the clamp claw 331 attains the opening state by the biasing member so that the front end of the transfer paper sheet 10 is opened. Thus, the front end of the transfer paper sheet 10 can be reliably separated from the separating roller 302.

When a large amount of processing liquid 20 is supplied to the transfer paper sheet 10 in the liquid supplying unit 2, the transfer paper sheet 10 can be reliably separated from the separating roller 302 without using a rotating body having a large diameter as the backup roller 308. In this case, a separating claw 303 as shown in FIG. 51, etc. may be suitably arranged to more reliably separate the transfer paper sheet 10 from each of the rollers.

When the toner removing device has a rotating body for holding and conveying the transfer paper sheet 10 on a surface thereof and having a large diameter as a paper holding drum, the transfer paper sheet 10 fed from the paper feed unit 1 is supported between the paper holding drum and a coating roller 207 coming in press contact with this paper holding drum. After the processing liquid 20 is then supplied to the transfer paper sheet 10, the transfer paper sheet 10 is conveyed while the transfer paper sheet 10 comes in close contact with a surface of the paper holding drum. Toner on the transfer paper sheet 10 is attached onto the separating roller 302 and this toner is then separated from the transfer paper sheet 10. At this time, adsorbing force of the processing liquid 20 is applied between the transfer paper sheet 10 and the paper holding drum. Therefore, the transfer paper sheet 10 is attached onto the surface of the paper holding drum against adhesive force between the separating roller 302 and the transfer paper sheet 10, or adhesive force between the toner and the transfer paper sheet 10. The transfer paper sheet 10 is moved to the next contact position between the paper holding drum and a drying roller with a built-in drying lamp while the transfer paper sheet 10 is attached onto the surface of the paper holding drum. The transfer paper sheet 10 is dried by the drying roller and is separated from the surface of the paper holding drum since the adsorbing force of the processing liquid 20 is lost.

In the above embodiment, the present invention is applied to the transfer paper sheet 10 having an image formed by an electrophotographic copying machine of a transfer type. However, the present invention can be also applied to an image holding member such as a sheet of recording paper used in another image forming apparatus such as a facsimile telegraph, a printer, etc. The present invention is not limited to an image holding member having a fibrous structure, but can be also applied to any image holding member on which an image can be formed. For example, the image holding member in the present invention may be constructed by a laminated material, etc. in which a surface layer of a base sheet such as a plastic layer, etc. is formed by a material layer absorbing a liquid and having elasticity such as a sheet of paper.

A modified example of the above drying unit 4 will next be described.

A modified example of the drying unit 4 relative to modifications of a pair of drying rollers 402 and 404 will first be explained with reference to FIGS. 56a to 56f and FIGS. 57a to 57f.

For example, in the toner removing device shown in FIG. 6, a press contact portion of the pair of drying rollers 402 and 404 is filled with vapor from a sheet of transfer paper. Accordingly, it is desirable to efficiently discharge this vapor from the press contact portion so as to efficiently dry the transfer paper sheet. Further, in this press contact portion, the transfer paper sheet tends to be deformed with wrinkles extending in a conveying direction of the transfer paper sheet. Accordingly, it is desirable to convey the transfer paper sheet while the transfer paper sheet is pulled in a width direction thereof. Therefore, the drying unit in this example uses the following roller as at least one of the drying rollers 402 and 404.

Figure 56A:
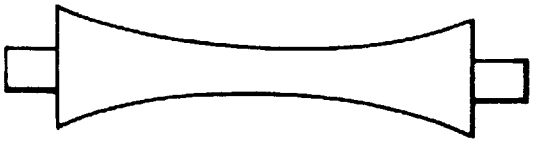

FIG. 56a shows a roller formed in a drum shape in which the diameter of a central portion of the roller in an axial direction thereof is smaller than diameters of both end portions of the roller. The transfer paper sheet can be conveyed by this roller while the transfer paper sheet is pulled on both sides thereof in a width direction in a press contact portion between this roller and another roller.

Figure 56B:
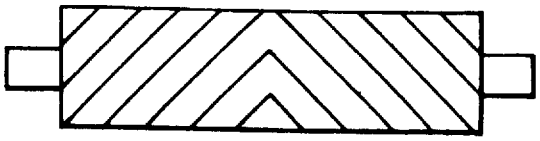

In FIG. 56b, a plurality of V-shaped grooves 407 are formed on a surface of a roller and extend to both side end portions of this roller such that a central portion of this roller in its axial direction is set to a vertex. The transfer paper sheet can be also conveyed by this roller while the transfer paper sheet is pulled on both sides thereof in a width direction in a press contact portion between this roller and another roller. For example, the transfer paper sheet can be also conveyed by forming spiral grooves in the shape of screws instead of such V-shaped grooves 407. In this case, for example, spiral grooves are formed in the shape of a left-hand screw on a right-hand circumferential face of the roller and are also formed in the shape of a right-hand screw on a left -hand circumferential face of the roller such that a central recessed portion of the roller in its axial direction is set to a boundary. If the spiral grooves are formed on the circumferential faces of the roller, vapor in a press contact portion between this roller and another roller can be discharged from this press contact portion by rotating the rollers in a state in which this vapor is held within the spiral grooves. Accordingly, it is possible to efficiently dry the transfer paper sheet.

Figure 56C:
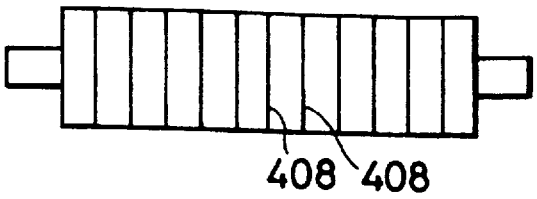
Figure 56D:
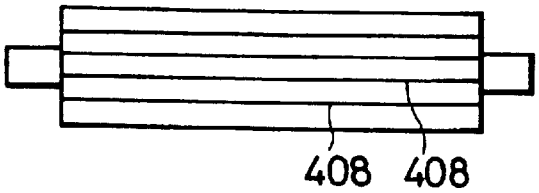
Figure 56E:
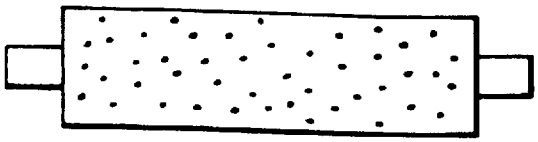
Figure 56F:
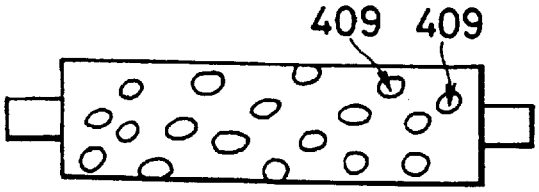

Similar to the roller shown in FIG. 56b, each of rollers shown in FIGS. 56c to 56f is constructed such that recessed and projected shapes are formed on a circumferential roller face and vapor is discharged from a press contact portion by rotating each of the rollers in a state in which the vapor is held within a recessed portion. Concretely, the roller shown in FIG. 56c has a plurality of projected stripes 408 spaced from each other along its axial direction such that each of the projected stripes 408 is wound around this roller by one turn in its circumferential direction. The roller shown in FIG. 56d has a plurality of projected stripes 408 extending in an axial direction of the roller such that the projected stripes 408 are spaced from each other in a circumferential direction of the roller. The roller shown in FIG. 56e has a coarse circumferential surface. The roller shown in FIG. 56f is constructed such that many recessed portions 409 are formed on a circumferential face of the roller.

Figure 57A:
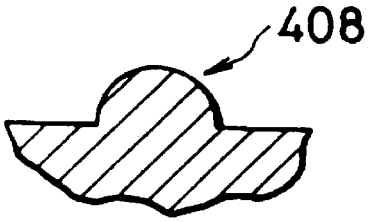
Figure 57B:
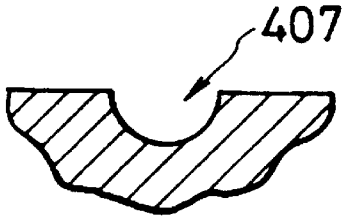
Figure 57C:
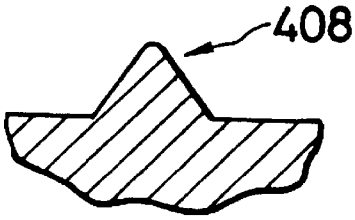
Figure 57D:
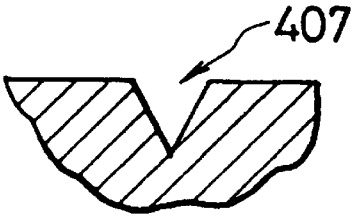
Figure 57E:
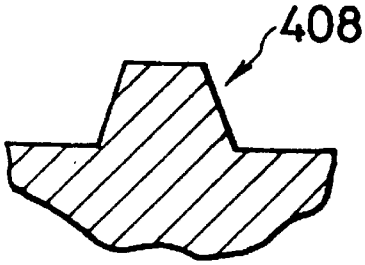
Figure 57F:
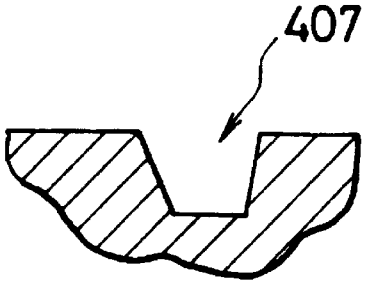

As shown in FIGS. 57a to 57f, the projected and recessed portions of the roller on its circumferential face shown in each of FIGS. 56b to 56f can be formed in an arc shape in cross section as shown in FIGS. 57a and 57b, a triangular shape in cross section as shown in FIGS. 57c and 57d, a trapezoidal shape in cross section as shown in FIGS. 57e and 57f, etc.

The rollers shown in FIGS. 56c and 56d can be used as a pair. In this case, as shown in FIG. 58a, the projected stripe portions 408 of rollers 409 and 410 are desirably formed such that groove portions 411 and 412 are alternately arranged as much as possible in an opposite portion of these rollers. The groove portion 411 is formed as a clearance of the projected stripe portions 408 in a surface portion of the roller 409. The groove portion 412 is also formed as a clearance of the projected stripe portions 408 in a surface portion of the roller 410. The groove portions 411 and 412 are preferably alternated with each other completely. Further, sizes of the groove portions 411 and 412 are desirably set such that an entire surface of the transfer paper sheet 10 is opposed to one of the groove portions 411 and 412. In such a structure, an area for a portion of the transfer paper sheet 10 able to be opposed to the groove portion 411 or 412 is increased in the roller opposite portion in comparison with a case in which both the groove portions 411 and 412 are opposed to each other in the roller opposite portion at a large rate. Accordingly, water vapor can be preferably discharged from the transfer paper sheet through the groove portions 411 and 412.

After the projected and recessed portions are formed on a surface of the roller as shown in each of FIGS. 56b to 56d, this recessed portion may be buried by a member 413 having preferable gas permeability and water absorbing capacity as shown in FIG. 58b. In accordance with this structure, vapor in a press contact portion between this roller and another roller can be efficiently absorbed into this member 413 in the recessed portion so that drying efficiency of the transfer paper sheet can be further improved.

Another modified example of the drying unit will next be explained with reference to FIGS. 59a and 59b.

In the drying unit shown in FIG. 59a, an upper roller 409 is constructed by a base roller 414 and a surface roller 415 formed on the base layer 414. For example, the base roller 414 is made of a metal or heat resisting resin having a certain hardness. For example, the surface layer 415 is formed by a gas permeable member such as a noncombustible cloth, a cloth, a heat resisting sponge, etc. A lower roller 410 comes in contact with this upper roller 409. For example, this lower roller 410 is constructed by a heating roller with a built-in heater. In such a drying unit, vapor is emitted from a sheet of transfer paper in a press contact portion between the upper and lower rollers, and can be discharged from the press contact portion by absorbing this vapor into the surface layer 415 of the upper roller 415. When the upper roller 419 is constructed by a gas permeable material having a certain hardness, it is not necessary to construct the drying unit as a structure composed of two or more layers as mentioned above.

As shown in FIG. 59b, a roller having a plurality of external holes 417 is formed as the base roller 414 of the upper roller 409 shown in FIG. 59a such that the holes 417 extend through a hollow interior of this roller from a surface thereof. If this roller having the holes 417 is used and the hollow interior of this roller is connected to a fan 418 for discharging vapor, the vapor is absorbed into this hollow interior through the above surface layer 415 and the external holes 417. This vapor can be further discharged to the exterior of the drying unit by the fan 418.

As shown in FIG. 60a, a cover 419 for covering a circumferential portion of the upper roller 409 may be arranged to concentratedly use suction force of the above fan 418 such that the vapor is absorbed into the hollow interior through the surface layer 415 and the external holes 417. In the example shown in FIG. 60a, a separating claw 420 is arranged around each of upper and lower rollers 409 and 410 to prevent a transfer paper sheet from being wound around each of these upper and lower rollers. The separating claw 420 is biased by a spring such that an end tip of the separating claw 420 comes in contact with a circumferential surface of each of the rollers 409 and 410. The end tip of the separating claw 420 additionally arranged around the upper roller 409 may be constructed by a gas permeable member such as a sponge tending to easily damage the surface layer 415 and engage the separating claw 420 with the surface layer 415. However, in this case, it is desirable to form this end tip of the separating claw 420 in a rounded shape as shown in FIG. 60b. As shown in FIG. 60c, a gas permeable member unattaching portion 421 having a ring shape may be arranged instead of the rounded end tip of the separating claw 420 to prevent the separating claw 420 from being engaged with the surface layer 415. The gas permeable member unattaching portion 421 having a ring shape may be arranged in addition to the rounded end tip of the separating claw 420. As shown in FIG. 60c, the gas permeable member unattaching portion 421 is arranged around the base roller 414 by one turn in its circumferential direction such that an end tip portion of the separating claw 420 is moved into the gas permeable member unattaching portion 421. In this structure, for example, it is possible to completely prevent the transfer paper sheet from being wound around the base roller 414 by making the end tip portion of the separating claw 420 come in contact with a circumferential face of the base roller 414.

Another modified example of the drying unit will next be explained with reference to FIG. 61.

In the example shown in FIG. 61, the drying unit has a belt 424, a face-shaped heater 425 and an inlet guide 426. The belt 424 is wound between a pair of supporting rollers 422 and 423 and is formed by a thermally conductive material such as a metal, etc. The face-shaped heater 425 is arranged in a position proximate to a belt portion moving upward within a space surrounded by the belt 424. For example, the inlet guide 426 guides a transfer paper sheet 10 fed from the toner separating unit 3 in the toner removing device shown in FIG. 6 onto the belt 424. Thus, the transfer paper sheet fed from the toner separating unit 3 is conveyed onto the belt 424 while this transfer paper sheet is guided by the inlet guide 426. This transfer paper sheet is dried while the transfer paper sheet is conveyed on the belt 424 heated by the face-shaped heater 425.

The drying unit also has a pressure roller 429, heaters 427 each having a rear face cover 428, separating claws 430 and 431, a discharging guide 432 and a pair of transfer paper discharging rollers 433. The pressure roller 429 comes in contact with a belt portion wound around an upper portion of the supporting roller 422 on a paper discharging side of the belt 424. Each of the heaters 427 is arranged above an upper moving portion of the belt 424 such that each of the heaters 427 is proximate to this upper moving portion. The separating claws 430 and 431 prevent the transfer paper sheet from being wound around the pressure roller 429 and the belt 424. The discharging guide 432 guides the transfer paper sheet discharged from the belt 424. The pressure roller 429 is used to correct a wavy shape of the transfer paper sheet formed after the transfer paper sheet is dried. For example, each of the above heaters 427 is constructed by an infrared heater. Each of the heaters 427 is arranged to efficiently dry the transfer paper sheet by further heating this transfer paper sheet from an upper side thereof. In the example shown in FIG. 61, each of the heaters 427 is attached to the drying unit in an inclining state in which each of the heaters 427 is separated from the belt 424 as the transfer paper sheet approaches a paper feeding side. Thus, no transfer paper sheet is easily jammed by engaging the transfer paper sheet with each of the heaters 427. The separating claws 430 and 431 can be omitted when each of the pressure roller 429 and the supporting roller 422 on the paper discharging side of the belt 424 has a sufficiently small diameter and the transfer paper sheet can be curved and separated from these rollers.

Figure 63A:
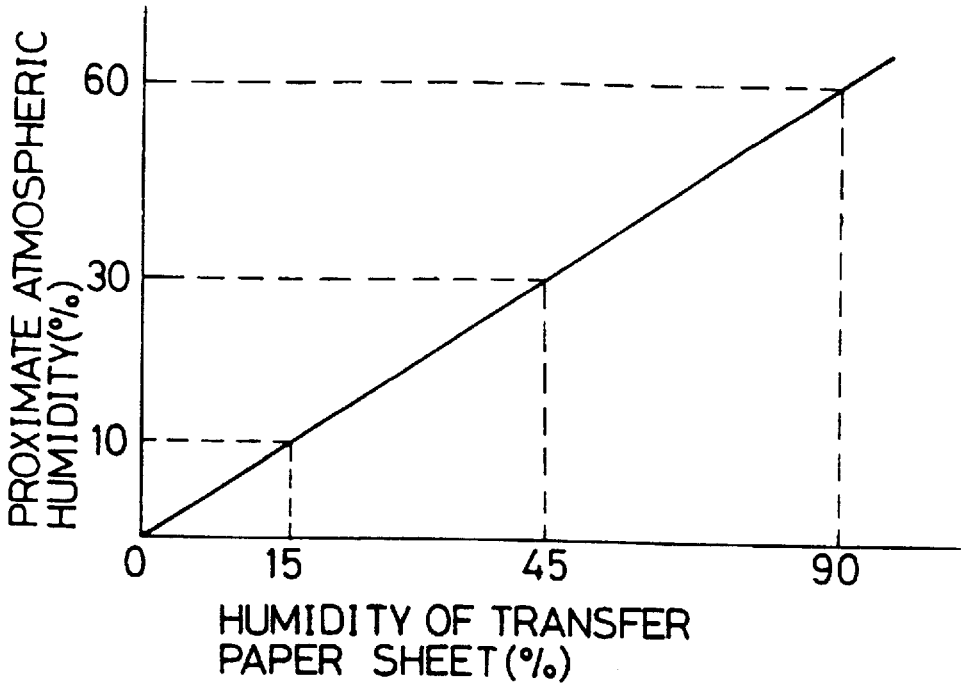
Figure 63B:
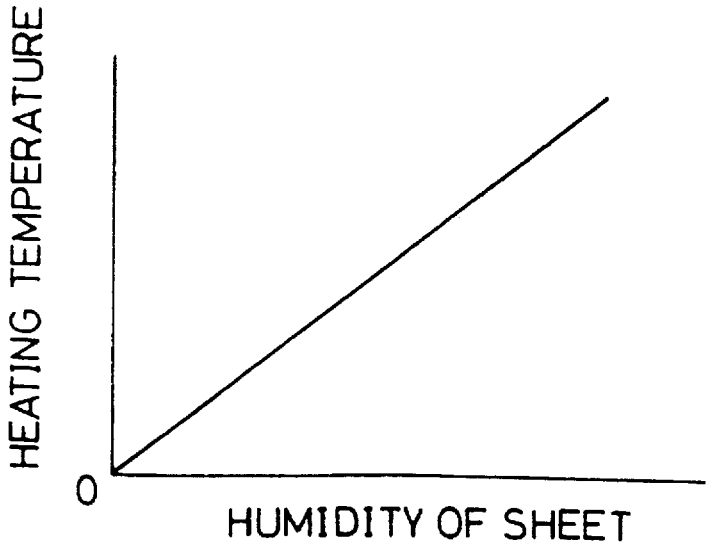
Figure 63C:
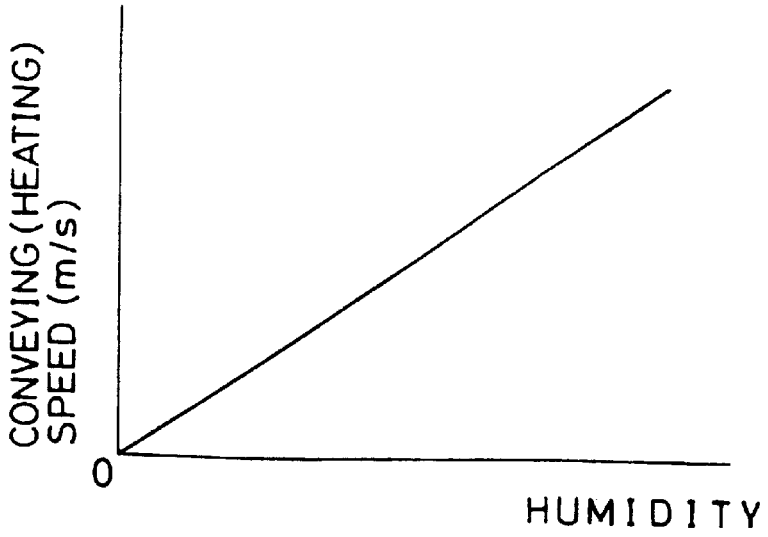
Figure 63D:
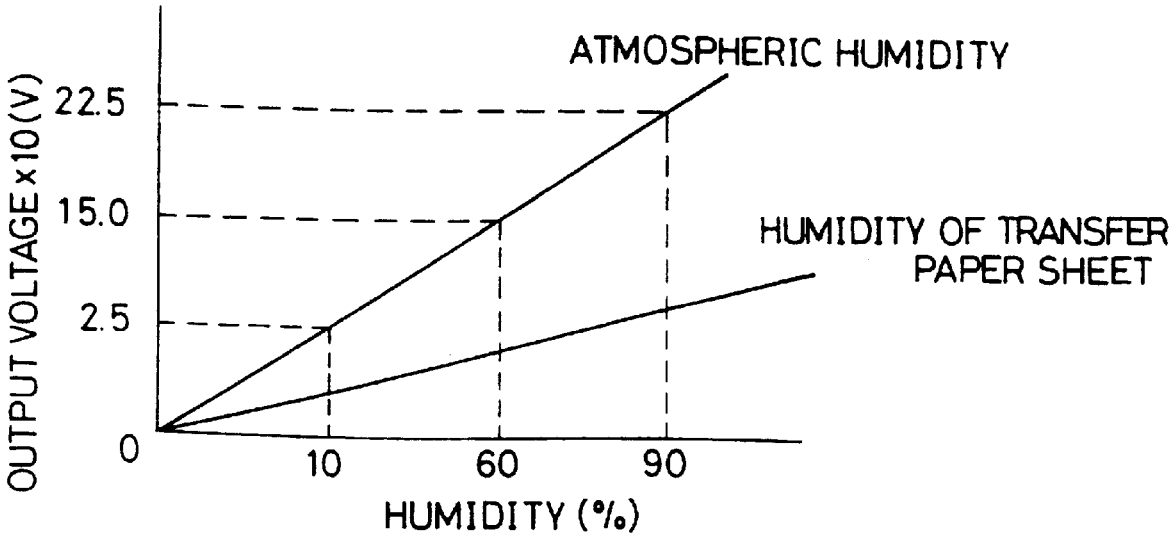

This drying unit also has a temperature-humidity sensor 434 for detecting a drying degree of the transfer paper sheet. For example, a humidity sensor can be used as this temperature-humidity sensor 434. For example, as shown in FIG. 63a, this temperature-humidity sensor uses that there is a predetermined relation between humidity of the transfer paper sheet and an atmospheric humidity around this transfer paper sheet. FIG. 63d shows relations between the humidity of the transfer paper sheet, the atmospheric humidity thereof and an output voltage of the temperature-humidity sensor 434. In FIG. 63d, the humidity of the transfer paper sheet is provided on an axis of abscissa and the output voltage of the sensor 434 is provided on an axis of ordinate. For example, as shown in FIG. 63b, setting temperatures of the face-shaped heater 425, etc. can be switched in accordance with the humidity of the transfer paper sheet by using these relations. Further, as shown in FIG. 63c, conveying speeds of the transfer paper sheet using the belt 424 can be switched in accordance with the humidity of the transfer paper sheet by using these relations.

In the example shown in FIG. 61, the face-shaped heater 425 within the belt 424 has a size approximately corresponding to an area for the belt 424 tensioned by the pair of supporting rollers 422 and 423. The face-shaped heater 425 is fixedly arranged in the drying unit. The heaters 427 above the belt 424 are also fixedly arranged in the drying unit. For example, as shown in FIGS. 62a and 62b, the heaters 427 may be constructed such that a posture of each of the heaters 427 can be changed and a covering width of each of the heaters 427 can be changed in a width (W) direction of the belt 424 by changing the posture of each of the heaters 427. In this case, postures of the heaters 427 and 425 are switched in accordance with a width of the transfer paper sheet 10 to be dried.

Another modified example of the drying unit 4 will next be explained with reference to FIG. 64a.

The drying unit shown in FIG. 64a has a pair of belts 438 and 424. The belts 438 and 424 are arranged in parallel with each other in a predetermined region in a state in which a sheet of transfer paper is supported by opposite surfaces of these belts 438 and 424 therebetween. Concretely, the lower belt 424 is wound around a discharging side supporting roller 422 and a feeding side supporting roller 423 approximately arranged at the same height. The discharging side supporting roller 422 is set to a driving roller. The belt 424 is further supported by a backup roller 439 in an intermediate portion of an upper moving portion of the belt 424. The upper belt 438 is wound around a discharging side supporting roller 435, a feeding side supporting roller 436 and a pull-up supporting roller 437. The discharging side supporting roller 435 is opposed to the discharging side supporting roller 422 of the lower belt 424. The feeding side supporting roller 436 is opposed to the above backup roller 439. The pull-up supporting roller 437 is located above these supporting rollers 435 and 436 on an upstream side from the feeding side supporting roller 436 in a feeding direction of the transfer paper sheet.

In a paper supporting region, both the belts 424 and 438 are arranged in parallel with each other in a state in which these belts 424 and 438 come in contact with each other. In this paper supporting region, the transfer paper sheet can be supported and conveyed by the belts 424 and 438 between opposite faces of these belts. The paper supporting region is set to a region ranged from an opposite portion between the backup roller 439 and the feeding side supporting roller 436 of the upper belt 438 to an opposite portion between the discharging side supporting rollers 422 and 435 of the belts 424 and 438. The lower belt 424 is constructed by a preferable thermally conductive material such as a metallic material. A face-shaped heater 425 is arranged within a space surrounded by the lower belt 424 in a position in which a portion of the lower belt 424 can be heated in the above paper supporting region. In contrast to this, the upper belt 438 is constructed by a gas permeable material such as a noncombustible cloth, a cloth, a material having a network structure, etc. A suction fan 441 is arranged within an internal space surrounded by this upper belt 438 such that a negative pressure can be generated in this internal space. A cover 442 is arranged to prevent upper air from flowing into this space surrounded by the upper belt 438 through an upper moving portion of the upper belt 438. The cover 442 is also arranged to effectively use suction force of the suction fan 441 for suction of vapor from the transfer paper sheet in the above paper supporting region. The cover 442 covers the upper moving portion of the upper belt 438, etc. An air flow sucked by this suction fan 441 is shown by an arrow in FIG. 64a.

For example, an infrared heater 440 for heating the transfer paper sheet in advance is arranged in a wedge-shaped opposite space on paper feeding sides of the belts 424 and 438. A temperature-humidity sensor 434 for detecting a drying degree of the transfer paper sheet is arranged within the space surrounded by the upper belt 438. Separating claws 430 and 431 are biased by springs, etc. such that end tips of the separating claws 430 and 431 respectively come in contact with winding portions of the belts 438 and 424 wound around the discharging side supporting rollers 435 and 422. For example, a paper detecting sensor 950 for detecting a rear end of the transfer paper sheet is arranged in a predetermined position on an upstream side from the paper supporting region formed by the belts 438 and 424 in a conveying direction of the transfer paper sheet. A signal of this paper detecting sensor 950 is inputted to a control section 953 for controlling the operation of a driving circuit 952 for driving a drive motor 951 of the belt 424.

In the above construction, when the face-shaped heater 425 is operated, the transfer paper sheet is heated in the paper supporting region through the thermally conductive lower belt 424. Thus, a processing liquid portion included in the transfer paper sheet is evaporated from this paper sheet. This evaporated vapor is raised by suction of the suction fan 441 through the gas permeable belt 438 and is discharged to the exterior of the drying unit. The heater 440 for preheating the transfer paper sheet is arranged in the wedge-shaped opposite space on the paper feeding sides of the belts 424 and 438 as shown in FIG. 64a. When the suction fan 441 is operated, the evaporated vapor from the transfer paper sheet is also heated by this heater 440 before the paper supporting region. This evaporated vapor is sucked into the space surrounded by the upper belt 438 through a portion of the upper belt 438 between the feeding side supporting roller 436 and the pull-up supporting roller 437. This evaporated vapor is then discharged to the exterior of the drying unit. Thus, the processing liquid is evaporated from the transfer paper sheet conveyed to the paper supporting region by the face-shaped heater 425, etc. The transfer paper sheet is dried such that the transfer paper sheet has desirable moisture.

The operation of the face-shaped heater 425 can be controlled on the basis of the above signal of the paper detecting sensor 950 such that the face-shaped heater 425 is started at timing for making the transfer paper sheet reach the paper supporting region. The heater 440 for preheating the transfer paper sheet is started at timing prior to the starting timing of the face-shaped heater 425. Areas for the face-shaped heater 425 and the above paper supporting region are set to correspond to a maximum size of the transfer paper sheet as a dried object. The areas for the face-shaped heater 425 and the paper supporting region are preferably set to correspond to a size equal to or greater than this maximum size. When the entire transfer paper sheet is fed into the paper supporting region, the face-shaped heater 425 may be started. Otherwise, when the entire transfer paper sheet is fed into the paper supporting region, a preheating state of the face-shaped heater 425 providing a relatively small heating amount to the transfer paper sheet may be changed to a heating state for providing a required heating amount to the transfer paper sheet. In this case, a uniform heating amount is provided to an entire surface of the transfer paper sheet. Therefore, it is possible to prevent the transfer paper sheet from being deformed with wrinkles, etc. by uneven heating. In this case, it is desirable to stop movements of the belts 424 and 438 such that the transfer paper sheet is dried in a stopping state in the paper supporting region. For example, the control section calculates in advance a predetermined time required until the entire transfer paper sheet is fed into the paper supporting region after a rear end of the transfer paper sheet has passed through an arranging position of the above paper detecting sensor 950. When the entire paper transfer paper is fed into the paper supporting region, this state of the transfer paper sheet can be detected according to whether or not this required time has passed after the detection of the rear end of the transfer paper sheet using the paper detecting sensor 950.

In the drying unit in this example, the transfer paper sheet is dried in a state in which the transfer paper sheet is supported by the belts 424 and 438 therebetween. Accordingly, it is possible to prevent the transfer paper sheet from being deformed with wrinkles, etc. at a drying time.

Further, the upper belt 438 is formed by a gas permeable material so that vapor from the transfer paper sheet is raised through the upper belt 438 and can be smoothly separated from the transfer paper sheet.

The lower belt 424 is formed by a thermally conductive material so that heat from a heating source can be preferably transmitted to the transfer paper sheet. In particular, the transfer paper sheet can be efficiently heated through the lower belt 424 when the heating source is arranged below a portion of the lower belt 424 within the paper supporting region.

The gas permeable belt is located above in the paper supporting region. Accordingly, when a gas impermeable belt is used as the thermally conductive belt, no upward escaping flow of vapor from the transfer paper sheet in the paper supporting region is prevented by this belt.

Driving line speeds of the belts 424 and 438 may be controlled by using an output of the above temperature-humidity sensor 434. Further, when the transfer paper sheet is insufficiently heated, a warning display and stopping control of the drying unit may be performed.

As shown in FIG. 64b, a face-shaped heater 445 is formed in a curved shape such that portions of belts 424 and 438 are pushed on one side in the paper supporting region. In this case, a transfer paper sheet is pushed against the curved heater 445 between the belts 424 and 438. Accordingly, it is possible to more effectively prevent the transfer paper sheet from being deformed in a wavy shape after the transfer paper sheet is dried.

In FIG. 64b, the lower belt 424 has supporting rollers 442, 443 and 423. A diameter of the discharging side supporting roller 442 is set to be small to such an extent that the transfer paper sheet can be curved and separated from the belt 424 by flexibility of the transfer paper sheet after the transfer paper sheet is dried. Namely, the diameter of the discharging side supporting roller 442 is set to be small to such an extent that so-called curving separation of the transfer paper sheet can be performed. Therefore, it is not necessary to arrange a separating claw.

The drying unit shown in each of FIGS. 64a, 63b and 60 uses belts. For example, the lower belt 424 may be arranged such that this lower belt 424 extends to the separating unit 3 in the toner removing device shown in FIG. 6. In this case, the lower belt 424 comes in contact with the separating roller 302 in a state in which the transfer paper sheet is held by the lower belt 424. Further, similar to the separating roller 302, a surface of this belt 424 may be formed by a material easily attached to softened toner in comparison with a surface of the transfer paper sheet. In this case, the toner on both faces of the transfer paper sheet can be simultaneously separated from this transfer paper sheet by using this belt 424 as a separating member. Another modified example of the drying unit 4 will next be explained with reference to FIG. 65a.

In FIG. 65a, this drying unit has a pair of rollers 409, 410, covers 442, a pair of inlet rollers 446, inlet guides 426, a pair of discharging rollers 433 and discharging guides 432. A heater 416 is arranged within each of the rollers 409 and 410. The rollers 409 and 410 are approximately arranged at the same height. The covers 442 respectively cover circumferential portions of these rollers 409 and 410. The inlet rollers 448 are arranged to feed a transfer paper sheet 10 into a press contact portion of the rollers 409 and 410 from above. The inlet guides 426 guide the transfer paper sheet conveyed by the pair of inlet rollers 446. The pair of discharging rollers 433 convey the transfer paper sheet discharged from the press contact portion of the rollers 409 and 410. The discharging guides 432 guide the transfer paper sheet conveyed by the pair of discharging rollers 433.

In this drying unit, the transfer paper sheet 10 is fed onto a lower side from the press contact portion of the rollers 409 and 410 approximately arranged at the same height. Accordingly, no vapor emitted and raised from the transfer paper sheet heated in this press contact portion comes in contact with the transfer paper sheet after the transfer paper sheet has passed through the press contact portion. Accordingly, it is possible to avoid a state in which vapor from the press contact portion comes in contact with the transfer paper sheet once dried in the press contact portion so that the transfer paper sheet is again wet. Since the rollers 409 and 410 are approximately arranged at the same height, the press contact portion is formed in a shape opened upward so that the vapor can be efficiently discharged from the press contact portion.

As shown in FIG. 65b, a heating roller 410 with a built-in heater 418 and a roller 409 formed by a gas permeable material may be approximately arranged at the same height so that the transfer paper sheet is fed into a press contact portion of the rollers 409 and 410 from above while the transfer paper sheet is wound around the heating roller 410 at a predetermined angle. In accordance with this structure, it is possible to improve drying efficiency of the transfer paper sheet by winding the transfer paper sheet around the heating roller 410 and heating this transfer paper sheet. Since the roller 409 is constructed by a gas permeable material, vapor from a portion of the transfer paper sheet in the press contact portion and a portion of the transfer paper sheet immediately after passage of this press contact portion can be separated from the transfer paper sheet while this vapor is raised through the roller 409. In this example, no heater is arranged in the roller 409. Accordingly, there is a fear of curling the transfer paper sheet by a difference in drying degree between front and rear faces of the transfer paper sheet. For example, it is sufficient to discharge the transfer paper sheet by using a pair of curl rollers instead of the pair of discharging rollers 433 so as to prevent such a curl. Otherwise, it is sufficient to discharge the transfer paper sheet by using a pair of curl rollers in addition to the pair of discharging rollers 433 so as to prevent such a curl.

The drying unit shown in each of FIGS. 65a and 65b has a supporting portion of the transfer paper sheet using the pair of inlet rollers 446, a supporting or press contact portion of the transfer paper sheet using the pair of rollers 409 and 410, and a supporting portion of the transfer paper sheet using the pair of discharging rollers 433. Further, a line speed of the transfer paper sheet is desirably set to restrain the transfer paper sheet from being flexed between these supporting portions such that the line speed is increased on a downstream side in a conveying direction of the transfer paper sheet.

Another modified example of the drying unit 4 will next be explained with reference to FIG. 66a.

In FIG. 66a, this drying unit has a pair of heating rollers 409, 410, a cover 442, a pair of inlet rollers 446, inlet guides 426, a pair of discharging rollers 433 and discharging guides 432. A heater 416 is arranged within each of the rollers 409 and 410. The cover 442 covers circumferential portions of these rollers 409 and 410. The inlet rollers 446 are arranged to feed a transfer paper sheet 10 into a press contact portion of the rollers 409 and 410 from above. The inlet guides 426 guide the transfer paper sheet conveyed by the pair of inlet rollers 446. The pair of discharging rollers 433 convey the transfer paper sheet discharged from the press contact portion of the rollers 409 and 410. The discharging guides 432 guide the transfer paper sheet conveyed by the pair of discharging rollers 433. For example, the inlet guides 426 and the discharging guides 432 are formed such that the transfer paper sheet is wound around each of the heating rollers 409 and 410 at an angle exceeding 180 degrees and passes through the pair of heating rollers 409 and 410 while the transfer paper sheet is approximately curved in an S-shape on each of front and rear sides thereof. Further, a separating claw 447 is arranged to prevent the transfer paper sheet passing through the press contact portion of the rollers 409 and 410 from being wound around the upstream roller 409 as it as. The separating claw 447 is biased by a spring such that an end tip of the separating claw 447 comes in contact with the roller 409. A separating claw 448 is similarly arranged to prevent the transfer paper sheet from being wound around the downstream roller 410 as it as.

In this drying unit, the transfer paper sheet passes through the pair of heating rollers 409 and 410 while the transfer paper sheet is approximately curved in an S-shape on each of front and rear sides thereof. Accordingly, a function similar to that of a calender roller can be fulfilled by the pair of heating rollers 409 and 410. Accordingly, it is possible to prevent wrinkles, curls, wavy deformation, etc. of the transfer paper sheet after the transfer paper sheet is dried.

As shown in FIG. 66b, one or more rollers 449, 450 may be additionally arranged. The number of rollers 449 and 450 is preferably set to an even number. The roller 449 comes in contact with one of a pair of heating rollers with a built-in heater on a downstream side in a conveying direction of the transfer paper sheet. The rollers 449 and 450 preferably come in contact with each other. Further, intermediate guides 451, 452 and separating claws 453, 454 may be arranged such that the transfer paper sheet can be conveyed while the transfer paper sheet is approximately curved in an S-shape on each of front and rear sides thereof between adjacent rollers. In accordance with this structure, it is possible to further prevent wrinkles, curls, wavy deformation, etc. of the transfer paper sheet. Each of the additional rollers 449 and 550 is desirably constructed by a gas permeable member. Further, it is desirable to correct (de-curl) curled portions of the transfer paper sheet while the transfer paper sheet is cooled by subsequent rollers after the transfer paper sheet has been heated and dried by the pair of heating rollers on an upstream side. A de-curl roller may be used instead of such a roller constructed by a gas permeable member.

In another toner removing device, there is a difference between amounts of a liquid included on the front and rear sides of the transfer paper sheet fed into the drying unit since the liquid is concentratedly included on only one of the front and rear sides. In this toner removing device, a heater may be built in only rollers coming contact with a liquid concentrating side of the transfer paper sheet such that the transfer paper sheet can be concentratedly dried on only this one side. Namely, the heater may be alternately built in such rollers. For example, when the liquid is concentrated onto a face side of the transfer paper sheet coming in contact with an uppermost stream heating roller in FIG. 66b, the heater is built in only each of odd rollers. Each of such rollers may be constructed such that a roller nearer the downstream side in the conveying direction of the transfer paper sheet has a larger outside diameter. In this case, it is possible to more preferably prevent the transfer paper sheet from being curled.

In the drying unit shown in each of FIGS. 66a and 66b, it is desirable to set a line speed of the transfer paper sheet such that the line speed of the transfer paper sheet nearer the downstream side in the conveying direction of the transfer paper sheet is increased.

A guide formed by wire may be used instead of a guide plate to convey the transfer paper sheet while the transfer paper sheet is approximately curved in an S-shape on the front and rear faces between a pair of rollers. As shown in FIG. 67a, a grip roller 456 may be used instead of the guide plate. In the example shown in FIG. 67a, de-curl rollers are constructed by three rollers 455a, 455b and 455c. A pair of grip rollers 456 are used as guides of the transfer paper sheet on a circumferential face of the middle roller 455b. A belt 424 for conveying the transfer paper sheet 10 on an upper face thereof is used as a guide of the transfer paper sheet around the rollers 455a and 455c on both sides of the middle roller 455b. The transfer paper sheet 10 is finally separated from the belt 424 by curving separation using a supporting roller 442 having a small diameter. A face-shaped heater 425 is used to dry the transfer paper sheet. A heater may be arranged in each of the de-curl rollers 455a, 455b and 455c instead of such a face-shaped heater 425. Otherwise, a heater may be arranged in each of the de-curl rollers 455a, 455b and 455c in addition to such a face-shaped heater 425.

As shown in FIG. 67b, the transfer paper sheet may be conveyed while the transfer paper sheet is curved on both front and rear sides thereof between de-curl rollers 455a, 455b, 455c and 455d in a state in which the transfer paper sheet is supported and guided from both sides thereof by belts 438 and 424.

Another modified example of the drying unit will next be explained with reference to FIG. 68a.

In FIG. 68a, the drying unit has a tray 501, a clamper 461 and a hot air type fan 462. The tray 501 is used to arrange a transfer paper sheet 10 thereon. The clamper 461 clamps an end portion of the transfer paper sheet 10 on the tray 501. The hot air type fan 462 blows hot air to the transfer paper sheet 10 on the tray 501. The transfer paper sheet passing through a toner separating unit 3 is conveyed on a right-hand side along an arrow A shown in FIG. 68a so that the transfer paper sheet is fed onto this tray 501. After the end portion of the transfer paper sheet is clamped by the above clamper 461, the hot air type fan 462 is operated to dry the transfer paper sheet. After a predetermined time has passed, the transfer paper sheet is completely dried. This dried paper sheet is conveyed on a left-hand side along the above arrow A by an unillustrated paper feed means and is then discharged onto an unillustrated paper discharging tray. Otherwise, an operator takes out the transfer paper sheet while the transfer paper sheet is held on this tray 501 as it is. In the latter case, the tray 501 also functions as the paper discharging tray.

As shown in FIG. 68a, this drying unit may have a pressing member 463 for pressing the transfer paper sheet on the tray 483 from above. For example, as shown in FIG. 68b, the pressing member 463 is formed in a shape in which no hot air is interrupted by the pressing member 463. The pressing member 463 can be raised and lowered and presses the transfer paper sheet on the tray 501 by an unillustrated raising-lowering means when it is necessary to press the transfer paper sheet. The pressing member 463 shown in FIG. 68b has frame portions having widths $L_1$, $L_2$ and $L_3$ respectively corresponding to sizes A4, B4 and A3 and lengths respectively corresponding to these widths. An edge portion of the transfer paper sheet having each of these sizes can be pressed by each of these frame portions.

Another modified example of the drying unit will next be explained with reference to FIG. 68c.

In FIG. 68c, this drying unit is constructed by a thermally conductive belt 424, a clamper 460 and a hot air type fan 462. For example, the thermally conductive belt 424 is constructed by a metal, etc. and is wound around a pair of supporting rollers 422 and 423. The clamper 460 is arranged on this belt 424. The hot air type fan 462 is arranged above an upper moving portion of the belt 424 and is also arranged on a rear face of this upper moving portion. In this drying unit, a sheet 10 of transfer paper is conveyed from a right-hand side in FIG. 68c and is fed onto the belt 424. The transfer paper sheet is dried by hot air from the above hot air type fan 462 while a front end of the transfer paper sheet 10 is clamped by the clamper 460 and the transfer paper sheet is conveyed on a left-hand side in FIG. 68c.

Another modified example of the drying unit will next be explained with reference to FIG. 69a.

The drying unit shown in FIG. 69a is a sorter type unit approximately having the same basic structure as a sorter of-a bin fixing system used by additionally arranging this sorter in a copying machine. This drying unit has a plurality of bins 470 for storing transfer paper sheets therein. A transfer paper sheet is fed into this drying unit by a pair of conveying rollers 474. A distributing roller 472 and a deflecting claw 473 are arranged to distribute this transfer paper sheet to each of the bins 470 such that the distributing roller 472 and the deflecting claw 473 correspond to each of the bins 470. In this drying unit, a pressing member 475 is arranged to heat and dry the transfer paper sheet stored into each of the bins 470 in a pressing state. For example, the pressing member 475 has a face-shaped heater and can be raised and lowered by an unillustrated raising-lowering mechanism. The pressing member 475 is arranged every bin. In the example shown in FIG. 69a, a basic end portion 471 of each of the bins is rotatably attached to a unit frame body such that the transfer paper sheet dried on each of the bins 470 can be discharged onto a paper discharging tray 501 arranged separately from the bins 470. An end side of each of the bins 470 can be swung by an unillustrated actuator. The paper receiving tray 501 can be raised and lowered as shown by an arrow 477 by an unillustrated raising-lowering mechanism such that the transfer paper sheet from each of the bins 470 can be received within the paper receiving tray 501. A sensor 476 detects passage of the transfer paper sheet, etc.

In this drying unit, the transfer paper sheet separating toner therefrom and wet with a processing liquid is fed onto each of the bins 470 by driving control of the deflecting claw 473, etc. similar to those in a normal sorter. The number of paper sheets fed onto one of the bins 470 may be set to one or plural. This paper sheet number is suitably set in accordance with drying ability of the pressing member 475 and a desirable drying speed thereof. When each of the bins 470 is filled with paper sheets, the operation of a toner removing device body is stopped. Concretely, for example, when a final sheet of transfer paper for making each of the bins 470 full is fed from the paper feed unit 1 shown in FIG. 6, the next paper feed operation is inhibited. The pressing member 475 is then moved until a position for pressing the transfer paper sheet on each of the pins 470 and the above heater is turned on so that the transfer paper sheet begins to be heated. When the transfer paper sheet is completely dried, the pressing member 475 is escaped above. For example, each of the pins 470 is sequentially swung around its basic end portion 471 from a lower bin such that a front end portion of each of the bins 470 is lowered in accordance with the movement of the paper receiving tray 501. Thus, the transfer paper sheet is slipped, dropped and stored onto the paper receiving tray 501. Thereafter, each of the bins 470 is reversely swung and returned to its original posture. When transfer paper sheets are completely discharged from all the bins 470, the paper feed operation of the paper feed unit 1 can be performed.

In this drying unit, a transfer paper sheet is heated and dried by using the pressing member 475 on each of the bins 470 in a pressing state. Accordingly, the transfer paper sheet can be dried while occurrence of wrinkles of the transfer paper sheet, etc. are restrained. Since the transfer paper sheet is dried on each of the plural bins 470, a relatively large number of transfer paper sheets can be simultaneously dried.

In this drying unit, the paper receiving tray 501 is separately arranged. However, this paper receiving tray 501 may be commonly used as a paper receiving tray of the bins 470 such that a user takes the dried transfer paper sheet out of the bins 470. In this case, it is not necessary to arrange a mechanism for swinging the bins.

The heater is arranged in the pressing member 475 to heat and dry the transfer paper sheet in a pressing state, but may be arranged on a side of each of the bins 470.

One paper receiving tray 501 receives transfer paper sheets from all the bins 470 by moving this paper receiving tray 501. However, the paper receiving tray 501 may be arranged in each of the bins 470.

When all the bins 470 are filled with transfer paper sheets, the paper feed operation of the paper feed unit 1 is stopped and the transfer paper sheets are discharged from the bins 470 to the paper receiving tray 501. However, instead of this structure, the transfer paper sheets may be discharged from each of the bins 470 sequentially filled with the paper sheets onto the paper receiving tray 501. In this case, toner can be removed from a transfer paper sheet without interruption by setting at least one of the bins 470 capable of storing transfer paper sheets at any time.

FIG. 69b shows a modified example of the sorter type drying unit. In the drying unit shown in FIG. 69a, each of the bins 470 is swung around its basic end portion to discharge the transfer paper sheet onto the paper receiving tray 501. However, in this sorter type drying unit shown in FIG. 69b, each of bins 470 is slantingly arranged such that a transfer paper sheet can drop on a bottom face of each of the bins 470. Further, a stopper 479 is arranged and can be swung around a basic end portion 478 of each of the bins 470. The stopper 479 is attached to an end portion of each of the bins 470 such that the stopper 479 can take positions for stopping and allowing a dropping movement of the transfer paper sheet in the basic end portion 478. In this example, a heater 480 is arranged in the vicinity of each of the bins 470 to heat each of the bins 470. A plurality of paper receiving trays 501 are arranged in accordance with the respective bins 470. The other construction is similar to that in the above drying unit shown in FIG. 69a. Therefore, constructional members corresponding to those in FIG. 69a are designated by the same reference numerals.

FIG. 70a shows another modified example of the sorter type drying unit. The drying unit shown in each of FIGS. 69a and 69b approximately has the same basic structure as the sorter of a bin fixing system. However, the sorter type drying unit shown in FIG. 70a approximately has the same basic structure as the sorter of an open moving system every one bin. Namely, an opening capable of receiving a transfer paper sheet fed from a discharging roller 481 is formed every one of bins 470 and is moved by a mechanism similar to that in the sorter of an open moving system every one bin additionally arranged and used in a copying machine. For example, this mechanism is constructed by using a Geneva wheel, a helical cam, a lead cam, etc. A pressing member 475 is arranged above an uppermost bin 470. A heater 480 is arranged below a lowermost bin 470 to heat this lowermost bin 470. Further, a paper receiving tray 501 is arranged on an end tip side of the bins 470. Each of the bins 470 can be swung around a basic end portion 471 thereof such that the transfer paper sheet can be discharged onto the paper receiving tray 501.

In this drying unit, when a transfer paper sheet begins to be dried at a paper filling time of all the bins 470, etc., mutual clearances between all the bins 470 can be reduced such that transfer paper sheets on an adjacent lower bin 470 can be pressed. Further, the pressing member 475 is moved such that this pressing member 475 presses transfer paper sheets on the uppermost bin 470. Further, the heater 480 is turned on. After the transfer paper sheet is completely dried, the bins 470 are sequentially swung from the lower bin 470 so that the transfer paper sheet is discharged onto the paper receiving tray 501.

Another modified example of the drying unit will next be explained with reference to FIG. 70b.

The drying unit in this example is constructed by a heating drum 482 as a solid body and a belt 484 for pressing a sheet of paper. For example, the heating drum 482 is made of aluminum, iron, etc. and a heating lamp 482a is built in this heating drum 482. The belt 484 is wound around a plurality of supporting rollers 483 and is endlessly moved in a state in which the belt 484 is wound around a circumferential face of the heating drum 482 at a constant angle. The heating drum 482 has a diameter set such that no transfer paper sheet 10 is easily curled. For example, this diameter is desirably set to be equal to or greater than about 90 mm.

A material of the belt 484 can be constructed by using a cloth such as a canvas ground, a cotton ground, a Tetron ground, etc. having a heat resisting property and gas permeability. It is desirable to use a material which cannot be extended as much as possible. The transfer paper sheet can be supported between a circumferential face of the heating drum 482 and an inner face of the belt 484 with a certain force. This force is set such that the transfer paper sheet 10 is not shrunk in a complete free shape with wrinkles and is not easily curled and deformed in a wavy shape while the transfer paper sheet is dried in a winding region on the circumferential face of the heating drum 482. For example, when the belt 484 has 240 mm in width, tensile force of this belt is set to be equal to or greater than 7 kgw and is preferably set to be equal to or greater than 15 kgw. The transfer paper sheet is dried such that a liquid holding amount of the transfer paper sheet is equal to or smaller than 10%. In this case, turning-on and turning-off operations of the built-in heating lamp 482a are desirably controlled such that a surface of the heating drum 482 is maintained at a temperature equal to or higher than 100° C. A deviation preventing mechanism such as deviation stop rings 485 is desirably arranged to prevent the belt 484 from being deviated on one side. For example, the deviation stop rings 485 come in contact with both end faces of the belt 484 so that the deviation of the belt 484 is restricted.

In this drying unit, when toner is removed from only one face of the transfer paper sheet, a face of the transfer paper sheet removing the toner therefrom comes in close contact with a circumferential face of the heating drum 482. The transfer paper sheet is then dried and conveyed while the transfer paper sheet is supported between the belt 484 and the circumferential face of the heating drum 482. Thus, when paper fibers slightly rise by the toner removal, the rising paper fibers can be returned to its original state by pressing the paper fibers against the circumferential face of the heating drum 482 as a solid body.

The drying unit in this embodiment can be assembled into the toner removing device as one unit. However, the present invention can be also applied to an independent dryer for drying a sheet of transfer paper unable to be used as it is in an electrophotographic copying machine of a transfer type, etc. since toner is removed from the transfer paper sheet and a surplus moisture amount is left in the transfer paper sheet. In this case, the toner is removed from the transfer paper sheet by using a toner removing device in which the drying unit is omitted or has insufficient drying performance. The present invention can be also applied to a drying unit assembled into a device for supplying a predetermined processing liquid to the transfer paper sheet except for the toner removing device. Further, the present invention can be applied to an independent dryer for drying the transfer paper sheet in which surplus moisture discharged from such a processing liquid supplying device is left.

Different from the toner removing device shown in FIG. 6, the toner separating unit 3 is can be constructed such that toner can be separated from only one side of the transfer paper sheet (see FIG. 6). In this case, the transfer paper sheet is conveyed and circulated within the toner removing device so that the toner can be removed from both front and rear faces of the transfer paper sheet. A constructional example of this toner removing device will next be explained.

FIG. 71a shows the schematic construction of a conveying system for conveying and circulating a transfer paper sheet in such a constructional example. In FIG. 71a, a processing section 80 has a liquid supplying unit 2 (see FIG. 6), a toner separating unit 3 able to separate toner from only one face of the transfer paper sheet as mentioned above, and a drying unit 4 (see FIG. 6) arranged in accordance with necessity. A pair of conveying rollers 81 and a deflecting claw 82 are arranged between the processing section 80 and a paper receiving tray 501. A circulative conveying path 84 is arranged below the processing section 80 and is constructed by a plurality of conveying roller pairs 86, 87, 89, 90, 91 and 92 and a guide claw 93. A switchback path 83 is formed in one portion of this circulative conveying path 84. The switchback path 83 is concretely arranged in the vicinity of the pair of conveying rollers 87. The switchback path 83 is used to take a sheet of transfer paper fed by the pair of rollers 87 out of the circulative conveying path 84, and switch back the transfer paper sheet and then feed again this transfer paper sheet into the circulative conveying path 84. Concretely, the switchback path 83 is formed by a normal-reverse conveying roller 85, a driven roller, etc. The normal-reverse conveying roller 85 can be rotated in normal and reverse directions. The driven roller comes in contact with one of the pair of conveying rollers 87. The transfer paper sheet 10 shown in FIG. 71a is fed from an unillustrated paper feed unit 1 (see FIG. 6).

In this conveying system, the transfer paper sheet 10 fed from the unillustrated paper feed unit 1 is conveyed to the above processing section 80. Toner is then removed from only one face of the transfer paper sheet 10 through the processing section 80. Thereafter, the transfer paper sheet 10 is fed by the pair of conveying rollers 81 and is again fed by the deflecting claw 82 to the processing section 80 through the circulative conveying path 84. In this case, the transfer paper sheet passes through the switchback path 83 on the circulative conveying path 84. Accordingly, when the transfer paper sheet is again fed to the processing section 80 through the circulative conveying path 84, front and rear faces of the transfer paper sheet are reversed in comparison with a case in which the transfer paper sheet firstly passes through the processing section 80. Therefore, when the transfer paper sheet secondly passes through the processing section 80, toner on another face of the transfer paper sheet is separated therefrom so that the toner is removed from both the faces of the transfer paper sheet. Thereafter, the transfer paper sheet is discharged onto the paper receiving tray 501 by the conveying rollers 81 and the deflecting claw 82.

In this conveying system shown in FIG. 71a, CCD sensors 94 and 95 are arranged on both sides of the transfer paper sheet fed to the processing section 80. Operations of the conveying system and the processing section 80 can be controlled by using signals of these CCD sensors 94 and 95. For example, it is judged by using the signals of the CCD sensors 94 and 95 whether toner is attached onto both faces or only one face of the transfer paper sheet 10 fed from the paper feed unit 1. When the toner is attached onto both faces of the transfer paper sheet, the transfer paper sheet is conveyed to separate the toner from these both faces. In contrast to this, when the toner is attached onto only face of the transfer paper sheet, a conveying operation of the transfer paper sheet and the operation of the processing section 80 can be controlled according to whether or not a toner face is concretely located on a toner separable side in the processing section 80. When the toner face is concretely located on the toner separable side in the processing section 80, it is sufficient to discharge the transfer paper sheet onto the paper receiving tray 501 as it is after the transfer paper sheet has passed through the processing section 80. In contrast to this, when the toner face is concretely located on a side opposite to the toner separable side in the processing section 80, no processing section 80 is operated in accordance with necessity and the transfer paper sheet passes through this processing section 80. Thereafter, the transfer paper sheet passes through the circulative conveying path 84 including the switchback path 83. The processing section 80 is again operated and the transfer paper sheet passes through this processing section 80. Toner is then removed from the transfer paper sheet and the transfer paper sheet is discharged onto the paper discharging tray 501.

It is judged by using the signals of the CCD sensors 94 and 95 whether or not the toner is sufficiently removed from the transfer paper sheet. The transfer paper sheet may be switched back in accordance with necessity until the toner is completely removed from the transfer paper sheet. Namely, the conveying operation of the transfer paper sheet may be controlled such that the transfer paper sheet passes through the processing section 80 many times. A liquid may be supplied onto the transfer paper sheet 10 many times by repeatedly passing the transfer paper sheet through the processing section 80. In this case, it is possible to use a processing liquid in which no permeability accelerator such as a surfactant is included. Further, when the transfer paper sheet is separately coated with an unstabilizing liquid and a permeability accelerating liquid, the toner removing device can be constructed such that no transfer paper sheet is coated with the permeability accelerating liquid.

FIG. 71b shows a modified example of the conveying system shown in FIG. 71a. This conveying system has an intermediate tray unit 195 on a circulative conveying path. A sheet of transfer paper is switched back on the switchback path 83. Thereafter, a plurality of transfer paper sheets are once stored and can be again fed to a processing section 80.

For example, a toner separating unit 3 for separating toner from only one face of the transfer paper sheet is arranged as shown in FIG. 47. In this toner separating unit 3, a backup roller 308 is arranged such that the backup roller 308 is opposed to a separating roller 302. A surface of this backup roller 308 is preferably formed by a material having an excellent mold-releasing property with respect to toner T as mentioned above. However, there is no problem even when toner on the transfer paper sheet is slightly transferred and attached onto the surface of the backup roller 308 as long as no transfer paper sheet is attached to the backup roller 308. This is because the toner transferred and attached onto the surface of the backup roller 308 is transferred from this surface onto the separating roller 302 after the transfer paper sheet passes through a contact portion between the separating roller 302 and the backup roller 308. A condition for setting such a toner transfer operation is satisfied when adhesive force between the toner and the backup roller 308 is equal to or greater than adhesive force between the toner and the transfer paper sheet and is also equal to or smaller than adhesive force between the toner and the separating roller 302.

FIG. 72a shows an example of the entire construction of a toner removing device having a conveying system similar to that shown in FIG. 71a. In this constructional example, a sensor 100 for detecting the size of a transfer paper sheet is arranged on the downstream side of a processing section 80 as one example. After toner is removed from the transfer paper sheet, the transfer paper sheet can be stored into each of cassettes 510, 511 and 512 arranged every paper size. For example, the transfer paper sheet can be fed to an unillustrated copying machine through a conveying path 111 from each of these cassettes 510, 511 and 512. Further, for example, a CCD sensor 96 is arranged to detect a conveying state of the transfer paper sheet intermediately fed from a paper feed tray 110 toward the processing section 80. The CCD sensor 96 judges whether the fed paper sheet is a transfer paper sheet unsuitable for toner removing processing or a transfer paper sheet requiring no toner removal. When such a transfer paper sheet is fed, the transfer paper sheet is discharged onto a paper discharging tray 501 in an upper portion of the toner removing device as it is without passing this transfer paper sheet through the processing section 80.

As shown in FIG. 72a, the toner removing device has a conveying path 99 from a switchback path 83 to the paper discharging tray 501 in the upper portion of the toner removing device. If such a conveying path 99 is formed and a position of the transfer paper sheet immediately after passage of the processing section 80 is set to a reference position, the transfer paper sheet can be discharged onto a portion of the paper discharging tray 501 located on a side of the paper feed tray 110 in a state in which a front face of the transfer paper sheet on the paper feed tray 110 is set to an upper face. For example, the processing section 80 can be constructed such that toner can be separated from an upper face of the transfer paper sheet in a vertical direction. Therefore, the transfer paper sheet is arranged such that a toner face of the transfer paper sheet is directed upward on the paper feed tray 110. In this case, after the transfer paper sheet passes through the processing section 80, the transfer paper sheet is discharged to the paper discharging tray 501 in the upper portion of the toner removing device. Accordingly, when the transfer paper sheet is simply reversed, a toner removing face of the transfer paper sheet is directed downward in the paper discharging tray 501. However, in the example shown in FIG. 72a, the transfer paper sheet is discharged to the paper discharging tray 501 after the transfer paper sheet passes through the switchback path 83. Accordingly, the toner removing face of the transfer paper sheet is directed upward. If the toner face and the toner removing face of the transfer paper sheet are directed upward on the paper feed tray 110 and the paper discharging tray 501, it is possible to easily confirm a removing degree of the toner removed from the transfer paper sheet.

FIG. 72b shows another example of the entire construction of a toner removing device having a conveying system similar to that shown in FIG. 71a. In this constructional example, a switchback path 83 is formed by using a paper discharging tray 501 in an upper portion of the toner removing device. In this toner removing device, a sheet of transfer paper is fed from a paper feed tray 110 to a processing section 80. Thereafter, the transfer paper sheet passes through the switchback path 83 and a circulative conveying path 84 and is again fed to the processing section 80. Thus, toner can be removed from both faces of the transfer paper sheet. Thereafter, the transfer paper sheet is stored to each of cassettes 510, 511 and 512 having a size corresponding to that of the transfer paper sheet on the basis of the signal of a size detecting sensor 100. In the example shown in FIG. 72b, when the processing section 80 is constructed such that toner can be removed from a lower face of the transfer paper sheet in a vertical direction, a toner removing face of the transfer paper sheet is directed upward by switching back the transfer paper sheet when the transfer paper sheet is fed onto the discharging paper tray 501. Therefore, it is possible to easily confirm a removing degree of the toner before the transfer paper sheet is stored to each of the cassettes 510, 511 and 512. If the toner face of the transfer paper sheet is set to be directed upward on the paper feed tray 110 in the constructional example shown in each of FIGS. 72a and 72b, the transfer paper sheet can be conveyed in a state in which the toner removing face of the transfer paper sheet is also directed upward on a conveying path 111 for conveying the transfer paper sheet from each of the cassettes 510, 511 and 512 to a copying machine, etc.

In the regenerating method of an image holding member having a first construction, an image forming substance is removed from a sheet of paper in a state in which adhesive force between the paper sheet and the image forming substance is reduced by water or a predetermined aqueous solution. At least one portion of the image holding member forming copied and printed images thereon is constructed by the paper sheet. Accordingly, the image forming substance can be sufficiently removed from the image holding member without damaging a paper layer.

In particular, in the regenerating method of an image holding member having a second construction, at least one portion of the image holding member forming an image thereon in the first construction is constructed by paper and an image constructed by an image forming substance can be formed on a paper layer of the image holding member;

at least one kind of aqueous solution is selected from a group of an aqueous solution including a surfactant, an aqueous solution including a water-soluble polymer, and an aqueous solution including a water-soluble polymer and a surfactant;

the at least one kind of aqueous solution is held in the image holding member;

the image holding member is dried after this holding; and the image is formed on the dried image holding member. Accordingly, the image forming substance can be more sufficiently removed from the image holding member without damaging the paper layer.

In the regenerating apparatus of an image holding member having a third construction, the image holding member has a fibrous surface and an image forming substance is stably formed on this fibrous surface;

the regenerating apparatus removing the image forming substance from the image holding member and constructed such that a stabilized adhesive state between the fibrous surface and the image forming substance is changed to an unstable state;

a separating member comes in close contact with the image forming substance with reduced adhesive force on the fibrous surface; and the image forming substance is removed from the fibrous surface. Accordingly, the image forming substance can be preferably removed from the image holding member without almost damaging the fibrous surface of the image holding member.

In particular, in the regenerating apparatus of an image holding member having a fourth construction, the image forming substance is softened when the image forming substance is removed from the fibrous surface. Accordingly, it is possible to further restrain the fibrous surface of the image holding member from being damaged and toner as the image forming substance can be efficiently removed from the image holding member.

In an apparatus for regenerating an image holding member in a fifth construction, the image holding member has a fibrous surface and an image forming substance is stably formed on this fibrous surface;

the regenerating apparatus removing the image forming substance from the image holding member and constructed such that an adhesive state of the fibrous surface is set to an unstable state in which stabilized adhesion between the fibrous surface and the image forming substance is changed to unstable adhesion;

a separating member comes in close contact with the image forming substance with reduced adhesive force on the fibrous surface; and the image forming substance is removed from the fibrous surface. Accordingly, the image forming substance can be preferably removed from the image holding member without almost damaging the fibrous surface of the image holding member.

In particular, in a sixth construction of the present invention, after the image forming substance is removed from the fibrous surface in the fifth construction, the adhesive state of the fibrous surface is restored to a stabilizing state between the fibrous surface and an image forming substance approximately equal to the image forming substance on the image holding member before regenerative processing. Accordingly, the image forming substance can be stably attached onto the image holding member when the image holding member is used to form an image after this regenerative processing.

In an apparatus for regenerating an image holding member in a seventh construction, the image holding member has a fibrous surface and thermally melted toner is stably fixed onto the fibrous surface;

the regenerating apparatus removing the thermally melted toner from the image holding member and comprising:

impregnating means for impregnating the image holding member with a fixing state reducing substance for reducing fixing force stabilized between the fibrous surface and the thermally melted toner; and toner removing means for making a toner separating member come in close contact with the thermally melted toner with unstable reduced adhesive force on the fibrous surface;

the toner removing means removing the thermally melted toner from the image holding member by transferring the thermally melted toner onto the separating member from the fibrous surface. Accordingly, the image forming substance can be preferably removed from the image holding member without almost damaging the fibrous surface of the image holding member.

In particular, in the regenerating apparatus of an image holding member having an eighth construction, the thermally melted toner is softened by heating means to easily transfer the thermally melted toner onto the separating member when the thermally melted toner is removed from the fibrous surface. Accordingly, it is possible to further restrain the fibrous surface of the image holding member from being damaged and the thermally melted toner can be efficiently removed from the image holding member.

In the regenerating apparatus of an image holding member having a ninth construction, restoring means sets smoothness and humidity of the image holding member as a sheet to be approximately equal to those before regenerative processing after the thermally melted toner is removed from the fibrous surface. Accordingly, the image holding member can be constructed such that the image holding member has a feel or touch similar to that obtained before the regenerative processing, and an image is then formed on this image holding member without causing any problems.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for regenerating an image holding member in which at least one portion of the image holding member is constructed by paper;

an image is constructed by an image forming substance fixed on a paper layer of the image holding member and at least one kind of water or aqueous solution is selected from a group of water, an aqueous solution including a surfactant, an aqueous solution including a water-soluble polymer, and an aqueous solution including a water-soluble polymer and a surfactant;

the regenerating method comprising the steps of: impregnating the paper layer of the image holding member having the image forming substance with said at least one kind of water or aqueous solution so as to reduce an adhesive force between the image forming substance and the image holding member; and separating the image forming substance from the paper layer of the image holding member through an image separating member by heating adhesion or pressure adhesion.

2. A method for regenerating an image holding member as claimed in claim 1, wherein at least one portion of the image holding member forming an image thereon is constructed by paper and an image constructed by an image forming substance can be formed on a paper layer of the image holding member;

at least one kind of aqueous solution is selected from a group of an aqueous solution including a surfactant, an aqueous solution including a water-soluble polymer, and an aqueous solution including a water-soluble polymer and a surfactant;

said at least one kind of aqueous solution is held in the image holding member;

the image holding member is dried after this holding; and the image is formed on the dried image holding member.

3. An apparatus for regenerating an image holding member having a fibrous surface and an image forming substance is stably fixed onto the fibrous surface comprising:

impregnating means for impregnating the image holding member with a fixing state reducing substance such that a fixing force between the image forming substance and said fixing state reducing substance is reduced; and toner removing means for positioning a separating member in close contact with said impregnated image holding member so that the image forming substance is transferred from the fibrous surface onto said separating member.

4. An apparatus for regenerating an image holding member as claimed in claim 3, wherein the thermally melted toner is softened by heating means to easily transfer the thermally melted toner onto the separating member when the thermally melted toner is removed from the fibrous surface.

5. An apparatus for regenerating an image holding member as claimed in claim 3, wherein the regenerating apparatus further comprises restoring means for setting smoothness and humidity of the image holding member as a sheet to be approximately equal to those before regenerative processing after the thermally melted toner is removed from the fibrous surface.

6. An apparatus for regenerating an image holding member as claimed in claim 4, wherein the regenerating apparatus further comprises restoring means for setting smoothness and humidity of the image holding member as a sheet to be approximately equal to those before regenerative processing after the thermally melted toner is removed from the fibrous surface.

7. A method of recycling an image-bearing support material for supporting image thereon, in which at least a part of the image-bearing support material comprises a chartaceous material with cellulose fibers as a main component the image is constructed by an image forming substance stably fixed on the chartaceous material of the image-bearing support material, and at least one kind of water or aqueous solution is selected from a group of water, and an aqueous solution including a surfactant, an aqueous solution including a water-soluble polymer, and an aqueous solution including a water-soluble polymer and a surfactant, the recycling method comprising the steps of:

impregnating the image-bearing support material with said at least one kind of water or aqueous solution for changing a stabilized adhesive state between the chartaceous material of the image-bearing support material and the image forming substance to an unstable state; and separating the image from the chartaceous material of the image-bearing support material through an image separating member by transferring the image onto the image separating member by heating adhesion or pressure adhesion.

8. A method according to claim 7, wherein at least one kind of aqueous solution is selected from a group of an aqueous solution including a surfactant, an aqueous solution including a water-soluble polymer, and an aqueous solution including a water-soluble polymer and a surfactant, and the image-bearing support material is impregnated with said at least one kind of aqueous solution;

the image-bearing support material is dried after the impregnation; and the image is formed on the dried image-bearing support material.

9. An apparatus for recycling an image-bearing support material for supporting an image thereon, in which at least a part of the image-bearing support material comprises a chartaceous material with cellulose fibers as a main component, and the image is constructed by an image forming substance stably fixed on the chartaceous material of the image-bearing support material, the recycling apparatus comprising:

impregnating means for impregnating the image-bearing support material with a fixing state reducing substance for changing a stabilized adhesive state between the chartaceous material of the image-bearing support material and the image forming substance to an unstable state; and a separating member for separating the image forming substance with reduced adhesive force from the chartaceous material of the image-bearing support material by bringing the separating member in contact with the image under the condition that said image forming substance is softened by heating means, and by transferring the image onto the separating member.

10. An apparatus according to claim 9, wherein the recycling apparatus further comprises restoring means for setting smoothness and humidity of the image-bearing support material as a sheet to be approximately equal to those before recycling process, after the image forming substance is removed from the chartaceous material of the image-bearing support material.

11. An apparatus according to claim 9, wherein said fixing state reducing substance is at least one kind of water or aqueous solution selected from a group of water, and aqueous solution including a surfactant, an aqueous solution including a water-soluble polymer, and an aqueous solution including a water-soluble polymer and a surfactant.

12. An apparatus according to claim 11, wherein the recycling apparatus further comprises restoring means for setting smoothness and humidity of the image-bearing support material as a sheet to be approximately equal to those before recycling process, after the image forming substance is removed from the chartaceous material of the image-bearing support material.

13. An apparatus for recycling an image-bearing support material for supporting image thereon, in which at least a part of the image-bearing support material comprises a chartaceous material with cellulose fibers as a main component, and the image is constructed by thermally melted toner stably fixed on the chartaceous material of the image-bearing support material, the recycling apparatus comprising:

impregnating means for impregnating the image-bearing support material with a fixing state reducing substance for reducing fixing force stabilized between the chartaceous material of the image-bearing support material and the thermally melted toner; and toner removing means for bringing a toner separating member in close contact with the thermally melted toner with unstable reduced adhesive force on the chartaceous material of the image-bearing support material, and for removing the thermally melted toner from the chartaceous material of the image-bearing support material by transferring the thermally melted toner onto the toner separating member.

14. An apparatus according to claim 13, wherein the recycling apparatus further comprises restoring means for setting smoothness and humidity of the image-bearing support material as a sheet to be approximately equal to those before the recycling process, after the thermally melted toner is removed from the chartaceous material.

15. An apparatus according to claim 13, wherein the thermally melted toner is softened by heating means to easily transfer the thermally melted toner onto the toner separating member when the thermally melted toner is removed from the chartaceous material of the image-bearing support material.

16. An apparatus according to claim 15, wherein the recycling apparatus further comprises restoring means for setting smoothness and humidity of the image-bearing support material as a sheet to be approximately equal to those before recycling process, after the thermally melted toner is removed from the chartaceous material.

17. An apparatus for reusing an image-bearing support material for supporting an image thereon, in which at least a surface of the image-bearing support material forms a chartaceous material with cellulose fibers as a main component, and the image is constructed by thermally melted toner stably fixed on the surface of the image-bearing support material, said reusing apparatus comprising:

a liquid supply unit having a liquid container, resist rollers, and drawing rollers, said liquid container being filled with processing liquid, said resist rollers transferring image-bearing support material in said processing liquid of said liquid container, said drawing rollers drawing said image-bearing support material from said liquid container, said processing liquid having a character for reducing fixing force stabilized between the surface of the image-bearing support material and the thermally melted toner, said processing liquid being at least one kind of water or aqueous solution selected from a group of water; and a toner separating unit having a heater, and a toner separating member, said heater softening toner on said image-bearing support member passed through said liquid supply unit, said toner separating member transferring said softened toner from said image-bearing support material.

18. An apparatus according to claim 17, wherein said toner separating member is a separating belt.

19. An apparatus according to claim 17, wherein the reusing apparatus further comprises a drying unit for drying said image-bearing support member, the drying unit having a heating drum and belt, said heating drum being a solid body, said belt contacting a portion thereof on a surface of said heating drum.

20. An apparatus according to claim 17, wherein said toner separating unit further comprises a cleaner, said cleaner removing toner from said surface of said toner separating member.

*21. An apparatus for regenerating an image holding member to make it reusable by removing a thermally melted image forming substance formed on the image holding member, said apparatus comprising a supplying member, a separating member, and a heating member, wherein*

(*a*) *said supplying member supplies a fixing state unstabilizing liquid to at least an interface section between the image holding member and the image forming substance formed thereon,*

*said liquid changing a stable fixing state acting between said image holding member and said image forming substance to an unstable state;*

(*b*) *said separating member, which is located in a downstream side of said supplying member with respect to a conveying direction of the image holding member and is driven by a driving member along the conveying direction of the image holding member, contacts with said image holding member, which is supplied said liquid by said supplying member, whereby said image forming substance, which is softened by said heating member, transfers from said image holding member to said separating member, and said image forming substance is removed from said image holding member by separating said image holding member and said separating member each other; and*

(*c*) *said heating member heats said image holding member to such a degree that said image holding member has some moisture of said liquid supplied by said supplying member after removing said image forming substance, or that said image holding member can be separated from said separating member even though a fixing force acting between said image forming substance and said image holding member becomes strong by heating.*

*22. An apparatus for regenerating an image holding member as claimed in claim 21, further comprising a drying member, wherein*

(*d*) *said drying member dries said image holding member separated from said separating member, thereby removing the liquid residing in said image holding member.*

*23. An apparatus for regenerating an image holding member as claim in claim 21, wherein*

*said heating member heats said image forming substance until said image holding member and said separating member are separated each other.*

*24. An apparatus for regenerating an image holding member as claimed in claim 21, wherein*

*said separating member is formed in a belt-like shape.*

*25. An apparatus for regenerating an image holding member as claimed in claim 21, wherein*

*said supplying member comprises a container and a roller,*

*(a1) said container containing said liquid,*

*(a2) said roller being dipped with at least its surface in the liquid in said container, and rolling to draw said liquid from said container and to supply said liquid to said image holding member.*

*26. An apparatus for regenerating an image holding member to make it reusable by removing a thermally melted image forming substance formed on the image holding member, said apparatus comprising a supplying member, a close contact member, a separating member and a heating member, wherein*

*(a) said supplying member supplies a fixing state unstabilizing liquid to at least an interface section between the image holding member and the image forming substance stably fixed therein,*

*said liquid changing a stable fixing state acting between said image holding member and said image forming substance to an unstable state;*

*(b) said close contacting member is located in a downstream side of said supplying member with respect to a conveying direction of the image holding member, and closely contacts with a surface of said separating member for forming a close contacting section between said separating member and said close contacting member, whereby said image forming substance is transferred from said holding member to said separating member said image holding member passes through said close contacting section;*

*(c) said separating member transfers said image forming substance, which has been softened by said heating member, form said image holding member to the surface of said separating member; and*

*(d) said heating member heats said image holding member to such a degree that said image holding member has some moisture of said liquid while said image holding member is passing through said close contacting section.*

*27. An apparatus for regenerating an image holding member as claimed in claim 26, wherein*

*said separating member is formed in a belt-like shape.*

*28. An apparatus for regenerating an image holding member as claimed in claim 26, wherein*

*said close contacting member is formed in a roller-like shape.*

*29. An apparatus for regenerating an image holding member as claimed in claim 26, wherein*

*said close contacting member contains said heating member therein.*

*30. An apparatus for regenerating an image holding member as claimed in claim 27, further comprising a supporting member,*

*(e) said supporting member facing said close contacting member with said separating member between at said close contacting section for supporting said separating member on a surface opposite to the surface on which said belt-like shaped separating member transfers said image forming substance.*

*31. An apparatus for regenerating an image holding member as claimed in claim 30, wherein*

*said supporting member contains said heating member therein.*

*32. A method for regenerating an image holding member to make it reusable by removing a thermally melted image forming substance formed on the image holding member, said method comprising the steps of:*

*supplying a fixing state unstabilizing liquid to at least an interface section between the image holding member and the image forming substance formed thereon,*

*said liquid changing a stable fixing state acting between said image holding member and said image forming substance to an unstable state;*

*softening said image forming substance formed on said image holding member supplied with said liquid, and causing softened image forming substance to contact a separating member; and*

*after said image holding member and said separating member contact each other, separating said image holding member and said separating member each other in a state where the supplied liquid remains on said image holding member.*

*33. A method for regenerating an image holding member to make it reusable by removing a thermally melted image forming substance formed on the image holding member, said method comprising the steps of:*

*supplying a fixing state unstabilizing liquid to at least an interface section between the image holding member and the image forming substance formed thereon,*

*said liquid changing a stable fixing state acting between said image holding member and said image forming substance to an unstable state; and*

*softening said image forming substance formed on said image holding member supplied with said liquid by a heater, and causing said softened image forming substance to contact a separating member, said image holding member being then separated from said separating member,*

*said heater heating said image holding member to a degree where separation of said separating member and said image holding member is not prevented by a fixing force acting between said image forming substance and said image holding member, said fixing force, which has been lowered as said liquid is supplied in said supplying step, becoming again strong due to heating.*

*34. A method for regenerating an image holding member as claimed in claim 32 or 33, further comprising the step of:*

*drying said liquid residual on said image holding member separated from said separating member.*

*35. An apparatus for regenerating an image holding member to make it reusable by removing a thermally melted image forming substance formed on the image holding member, said apparatus comprising:*

*changing means for changing a stable fixing state acting between the image holding member and the image forming substance to an unstable state or a low stable state;*

*softening means for softening said image forming substance;*

*removing means for removing said image forming substance softened by said softening means from said image holding member; and*

*conveying means for conveying said image holding member, the stable fixing state acting between the image holding member and the image forming substance of which is changed to the unstable state or the low stable state by said changing means, to said removing means.*

*36. An apparatus for regenerating an image holding member as claimed in claim 35, wherein*

*said changing means supplies a liquid which changes a stable fixing state acting between the image holding member and the image forming substance to an unstable state or a low stable state; and*

*said softening means is a heater,*

*said heater heating said image holding member to such a degree that said image holding member has some moisture of said liquid supplied by said changing means, when said image forming substance is removed from said image holding member by said removing means and said image holding member is separated from said removing means.*

*37. An apparatus for regenerating an image holding member as claimed in claim 35, wherein*

*said changing means supplies a liquid which changes a stable fixing state acting between the image holding member and the image forming substance to an unstable state or a low stable state; and*

*said softening means is a heater,*

*said heater heats said image holding member to such a degree that said image holding member can be separated from said removing means even though a fixing force acting between said image forming substance and said image holding member becomes strong by heating, when said image forming substance is removed from said image holding member by said removing means and said image holding member is separated from said removing means.*

*38. An apparatus for regenerating an image holding member as claimed in claim 36 or 37, wherein*

*said removing means is formed in a belt-like shape and removes said softened image forming substance from said image holding member to a surface thereof.*

*39. An apparatus for regenerating an image holding member as claimed in claim 36 or 37, further comprising drying means, wherein*

*said dying means dries said image holding member separated from said removing means, thereby removing the liquid residing in said image holding member.*

* * * * *